US007516891B2

(12) United States Patent
Chaum

(10) Patent No.: US 7,516,891 B2
(45) **Date of Patent: *Apr. 14, 2009**

(54) BALLOT INTEGRITY SYSTEMS

(76) Inventor: David Chaum, 14652 Sutton St., Sherman Oaks, CA (US) 91403

(*) Notice: Subject to any disclaimer, the term of this patent is extended or adjusted under 35 U.S.C. 154(b) by 0 days.

This patent is subject to a terminal disclaimer.

(21) Appl. No.: 11/519,709

(22) Filed: Sep. 11, 2006

(65) Prior Publication Data

US 2007/0095909 A1 May 3, 2007

Related U.S. Application Data

(63) Continuation-in-part of application No. 10/348,547, filed on Jan. 21, 2003, now Pat. No. 7,210,617.

(60) Provisional application No. 60/358,109, filed on Feb. 20, 2002, provisional application No. 60/412,749, filed on Sep. 23, 2002, provisional application No. 60/716,215, filed on Sep. 12, 2005, provisional application No. 60/740,007, filed on Nov. 28, 2005, provisional application No. 60/740,131, filed on Nov. 28, 2005, provisional application No. 60/758,280, filed on Jan. 12, 2006, provisional application No. 60/788,412, filed on Mar. 30, 2006, provisional application No. 60/834,760, filed on Jul. 31, 2006.

(51) Int. Cl.
*G06K 17/00* (2006.01)

(52) U.S. Cl. ......................... 235/386; 235/51; 235/487; 705/12

(58) Field of Classification Search ................. 235/386, 235/51, 486, 487; 705/12; 283/103, 106, 283/5
See application file for complete search history.

(56) References Cited

U.S. PATENT DOCUMENTS

| | | | | |
|---|---|---|---|---|
| 2002/0175514 | A1 * | 11/2002 | Warther | 283/5 |
| 2004/0024635 | A1 * | 2/2004 | McClure et al. | 705/12 |
| 2006/0226221 | A1 * | 10/2006 | Langberg | 235/386 |
| 2007/0023514 | A1 * | 2/2007 | Morales | 235/386 |

* cited by examiner

*Primary Examiner*—Edwyn Labaze
(74) *Attorney, Agent, or Firm*—Clark & Brody

(57) ABSTRACT

Disclosed are voting systems based on paper ballots that provide integrity of the election outcome through the novel use of encrypted votes and other techniques. In some example embodiments, holes through layers allow voters to see and mark symbols on lower layers, carbonless coatings allow voters to obtain substantially identical marks on facing surfaces, self-adhesive stickers are removed from one position and placed by voters hiding vote-revealing indicia on a second position, and scratch-off layers bearing vote-revealing indicia are destroyed while being removed to expose coded information. Simplified cryptography for realizing these systems is also presented. Related systems allow those with various disabilities to develop and check voted ballot forms that are substantially indistinguishable from those voted by other voters. Inclusion of write-in votes is provided for. Also provided are inclusion of provisional ballots and spoilt ballots and integration with registration sign-in.

23 Claims, 72 Drawing Sheets

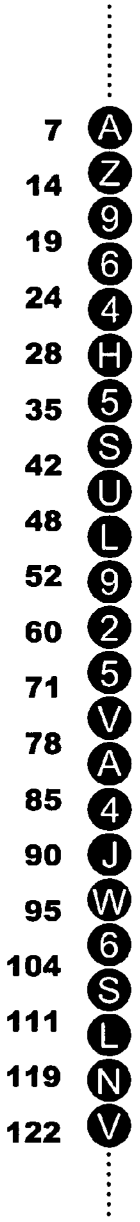

1 Dianne Feinstein; 2 Barbara Boxer; 3 Mike Thompson; 4 Wally Herger;
5 Douglas Ose; 6; 7 John T. Doolittle; 8 Robert T. Matsui; 9 Lynn C. Woolsey;
10 George Miller; 11 Nancy Pelosi; 12 Barbara Lee; 13 Ellen O. Tauscher;
14; 15 Richard W. Pombo; 16 Tom Lantos; 17 Fortney Pete Stark;
18 Anna G. Eshoo; 19 Mike Honda; 20 Zoe Lofgren; 21 Sam Farr;
22 Gary A. Condit; 23 George P. Radanovich; 24; 25 Calvin M. Dooley;
26 William M. Thomas; 27 Lois Capps; 28 Elton Gallegly; 29 Brad Sherman;
30 Howard P. "Buck" McKeon; 31 Howard L. Berman; 32; 33 Adam Schiff;
34 David Dreier; 35 Henry A. Waxman; 36 Xavier Becerra; 37 Hilda A. Solis;
38 Lucille Roybal-Allard; 39 Grace Flores Napolitano; 40; 41 Maxine Waters;
42; 43 Jane Harman; 44 Juanita Millender-McDonald; 45 Stephen Horn;
46 Edward R. Royce; 47; 48 Jerry Lewis; 49 Gary G. Miller; 50 Joe Baca;
51 Ken Calvert; 52 Mary Whitaker Bono; 53; 54 Dana Rohrabacher;
55 Loretta Sanchez; 56 Christopher Cox; 57 Darrell Issa; 58 Susan A. Davis;
59 Bob Filner; 60; 61 Randy "Duke" Cunningham; 62 Duncan Hunter;
63 Dianne Feinstein; 64 Barbara Boxer; 65 Mike Thompson; 66 Wally Herger;
67 Douglas Ose; 68 John T. Doolittle; 69 Robert T. Matsui; 70 Lynn C. Woolsey;
71; 72 George Miller; 73 Nancy Pelosi; 74 Barbara Lee; 75 Ellen O. Tauscher;
76 Richard W. Pombo; 77 Tom Lantos; 78; 79 Fortney Pete Stark;
80 Anna G. Eshoo; 81 Mike Honda; 82 Zoe Lofgren; 83 Sam Farr;
84 Gary A. Condit; 85; 86 George P. Radanovich; 87 Calvin M. Dooley;
88 William M. Thomas; 89 Lois Capps; 90 Elton Gallegly; 91 Brad Sherman;
92 Howard P. "Buck" McKeon; 93 Howard L. Berman; 94; 95 Adam Schiff;
96 David Dreier; 97 Henry A. Waxman; 98 Xavier Becerra; 99 Hilda A. Solis;
100 Lucille Roybal-Allard; 101 Grace Flores Napolitano; 102 Maxine Waters;
103; 104 Jane Harman; 105 Juanita Millender-McDonald; 106 Stephen Horn;
107 Edward R. Royce; 108 Jerry Lewis; 109 Gary G. Miller; 110 Joe Baca;
111; 112 Ken Calvert; 113 Mary Whitaker Bono; 114 Dana Rohrabacher;
115 Loretta Sanchez; 116; 117 Christopher Cox; 118 Darrell Issa;
119 Yes on "A"; 120 No on "A"; 121 No on "B"; 122 Yes on "B"

Fig. 8

Governor 7; Lieutenant Governor 14; Secretary of State 19; State Controller 24; State Treasurer 28; Attorney General 35; Insurance Commissioner 42; Board of Equalization - District 5 48; U.S. Senate 52; U.S. Congress - District 7 60; State Senate - District 2 71; State Assembly - District 22 78; Supreme Court 85; Appellate Court - District 3 90; Appellate Court - District 3 - Division 1 95; Superintendent of Public Instruction 105

1 Dianne Feinstein; 2 Barbara Boxer; 3 Mike Thompson; 4 Wally Herger; 5 Douglas Ose; 6; 7 John T. Doolittle; 8 Robert T. Matsui; 9 Lynn C. Woolsey; 10 George Miller; 11 Nancy Pelosi; 12 Barbara Lee; 13 Ellen O. Tauscher; 14; 15 Richard W. Pombo; 16 Tom Lantos; 17 Fortney Pete Stark; 18 Anna G. Eshoo; 19 Mike Honda; 20 Zoe Lofgren; 21 Sam Farr; 22 Gary A. Condit; 23 George P. Radanovich; 24; 25 Calvin M. Dooley; 26 William M. Thomas; 27 Lois Capps; 28 Elton Gallegly; 29 Brad Sherman; 30 Howard P. "Buck" McKeon; 31 Howard L. Berman; 32; 33 Adam Schiff; 34 David Dreier; 35 Henry A. Waxman; 36 Xavier Becerra; 37 Hilda A. Solis; 38 Lucille Roybal-Allard; 39 Grace Flores Napolitano; 40; 41 Maxine Waters; 42; 43 Jane Harman; 44 Juanita Millender-McDonald; 45 Stephen Horn; 46 Edward R. Royce; 47; 48 Jerry Lewis; 49 Gary G. Miller; 50 Joe Baca; 51 Ken Calvert; 52 Mary Whitaker Bono; 53; 54 Dana Rohrabacher; 55 Loretta Sanchez; 56 Christopher Cox; 57 Darrell Issa; 58 Susan A. Davis; 59 Bob Filner; 60; 61 Randy "Duke" Cunningham; 62 Duncan Hunter; 63 Dianne Feinstein; 64 Barbara Boxer; 65 Mike Thompson; 66 Wally Herger; 67 Douglas Ose; 68 John T. Doolittle; 69 Robert T. Matsui; 70 Lynn C. Woolsey; 71; 72 George Miller; 73 Nancy Pelosi; 74 Barbara Lee; 75 Ellen O. Tauscher; 76 Richard W. Pombo; 77 Tom Lantos; 78; 79 Fortney Pete Stark; 80 Anna G. Eshoo; 81 Mike Honda; 82 Zoe Lofgren; 83 Sam Farr; 84 Gary A. Condit; 85; 86 George P. Radanovich; 87 Calvin M. Dooley; 88 William M. Thomas; 89 Lois Capps; 90 Elton Gallegly; 91 Brad Sherman; 92 Howard P. "Buck" McKeon; 93 Howard L. Berman; 94; 95 Adam Schiff; 96 David Dreier; 97 Henry A. Waxman; 98 Xavier Becerra; 99 Hilda A. Solis; 100 Lucille Roybal-Allard; 101 Grace Flores Napolitano; 102 Maxine Waters; 103; 104 Jane Harman; 105 Juanita Millender-McDonald; 106 Stephen Horn

Fig. 9

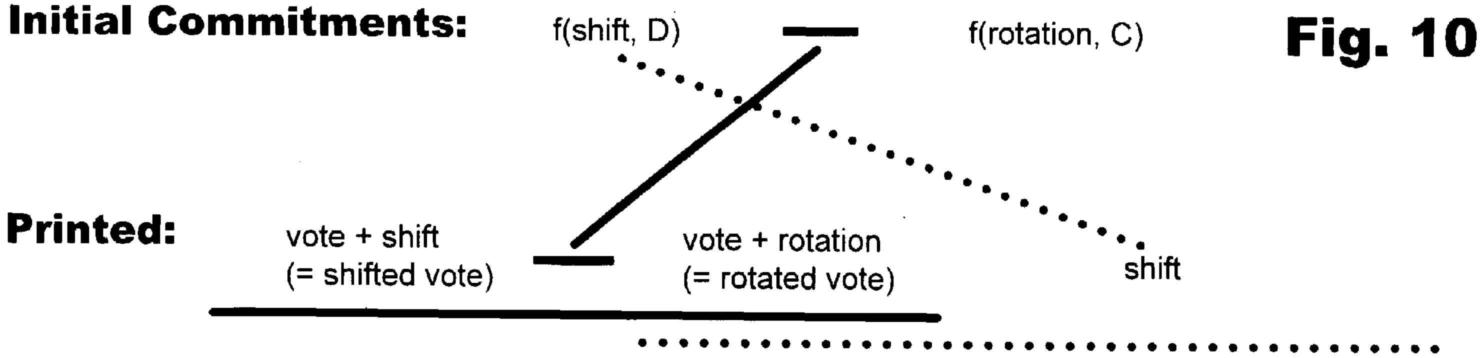

Fig. 10

Inspection of paper by voter:

*Establishes that the relationship between the printed shift and shifted vote corresponds to the voter's vote.*

Case A:

rotated vote shifted vote

Show that: [committed <rotation> – <shift>]
= rotated vote – shifted vote

*Establishes that the rotated vote is determined correctly by the shifted vote and both commits.*

Case B:

rotated vote shift, D

*Establishes that the committed shift corresponds to the printed shift.*

Results:

*If what is established by case "A" and "B" were both to be established, then the rotated vote would be established to be the voter's vote plus the committed rotation.*
*If the rotated vote is not correctly formed, then this fact will be revealed by at least one of "A" and "B" .*

100122230916131027072009

ABCDEFGHIJKLMNOPQRSTUVWXYZ_-
1220012202201121022001011101
5125985814330279860474616723

Fig. 13a

Q3HCXYZEGRMIGELO

OFHJXNDU3VCAQSGTI5MKRBPLYWZE
ABCDEFGHIJKLMNOPQRSTUVWXYZ_-
QNOUI5RKYZSJEMFXVDBHC3ATPWGL

Fig. 13b

Fig 25a

| | | |
|---|---|---|
| 1 | 0 | 0 |
| 1 | 0 | 1 |
| 0 | 1 | 0 |

Fig 25b

| | | |
|---|---|---|
| $S_{i,j} \oplus V_{i,j}$ | $S_{i,j}$ | $S_{i,j}$ |
| $S_{i,j} \oplus V_{i,j}$ | $S_{i,j}$ | $S_{i,j} \oplus V_{i,j}$ |
| $S_{i,j}$ | $S_{i,j} \oplus V_{i,j}$ | $S_{i,j}$ |

Fig 25c

| | | |
|---|---|---|
| $S_{i,j}$ | $S_{i,j} \oplus V_{i,j}$ | $S_{i,j} \oplus V_{i,j}$ |
| $S_{i,j}$ | $S_{i,j} \oplus V_{i,j}$ | $S_{i,j}$ |
| $S_{i,j} \oplus V_{i,j}$ | $S_{i,j}$ | $S_{i,j} \oplus V_{i,j}$ |

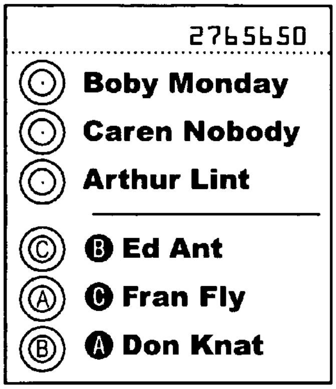
Fig 53C
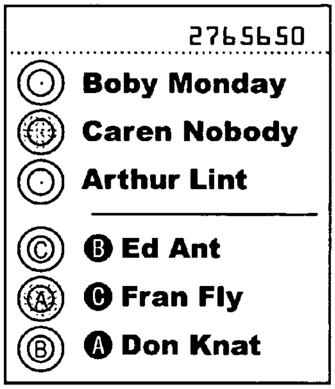
Fig 53D
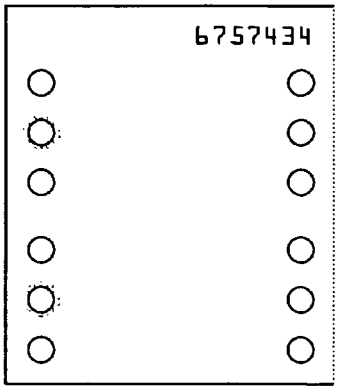
Fig 53E
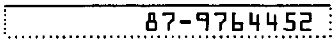
Fig 53F
Fig 53I
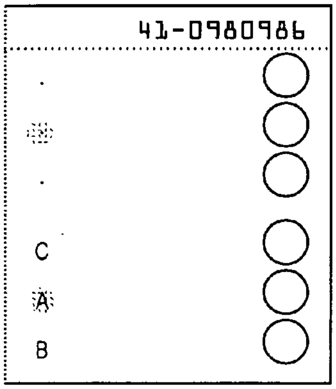
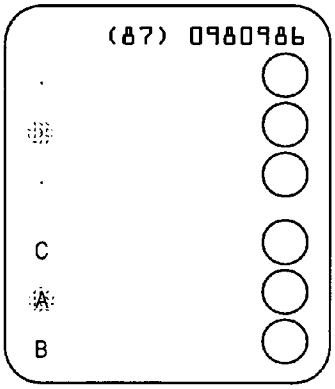
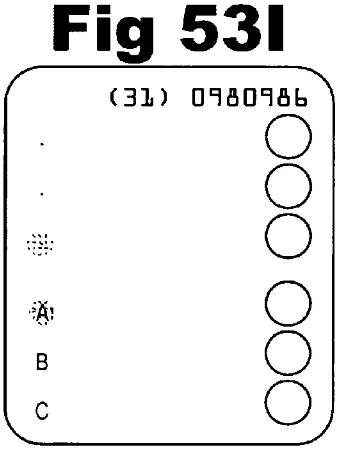
Fig 53G
Fig 53H
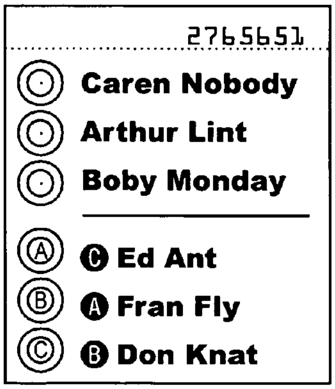
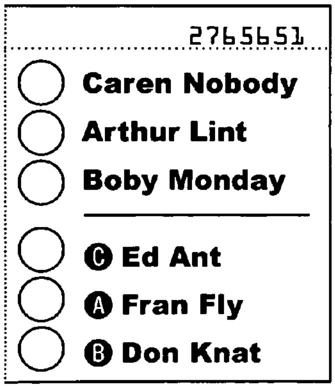
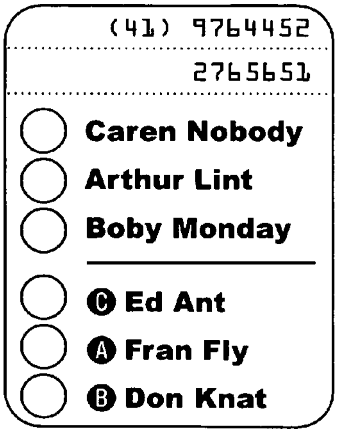
Fig 53J
Fig 53K
Fig 53L

BALLOT INTEGRITY SYSTEMS

The present application is a Continuation In Part of U.S. patent application, by the present applicant, titled "Secret-Ballot Systems with Voter-Verifiable Integrity," filed Jan. 21, 2003 with Ser. No. 10/348,547 now U.S. Pat No. 7,210,617. Priority is claimed from: U.S. Provisional Application, by the present applicant, titled "Having your receipt and secret ballot too," U.S. PTO 60/358,109, filed Feb. 20, 2002; U.S. Provisional Application, by the present applicant, titled "Layered receipts with reduced shared data," U.S. PTO 60/412,749, filed Sep. 23, 2002; and United States Provisional Application, by the present applicant, titled "Layered receipts with reduced shared data," U.S. PTO 60/412,749, filed Sep. 23, 2002.

The present application claims priority from the following U.S. Provisional Applications, by the present applicant, that are hereby included by reference in their entirety: (a) U.S. Provisional application No. 60/716,215, titled "Symmetric punched and daubed ballot systems," and filed Sep. 12, 2005; (b) U.S. Provisional application No. 60/740,007, titled "Tactile audio encrypted ballots and receipts," and filed Nov. 28, 2005; (c) U.S. Provisional application No. 60/740,131, titled "Auditable efficient election protocols," and filed Nov. 28, 2005; (d) U.S. Provisional application No. 60/758,280, titled "Paper encrypted vote and receipt systems," and filed Jan. 12, 2006; (e) U.S. Provisional application No. 60/788,412, titled "Receipt voting systems," and filed Mar. 30, 2006; (f) U.S. Provisional application No. 60/834,760, titled "Scratch-off voting systems," and filed Jul. 31, 2006; and any other related such applications.

BACKGROUND OF THE INVENTION

1. Field of the Invention

The present invention relates generally to election systems and more specifically to security and privacy in such systems.

2. Description of the Prior Art

Various techniques for producing, rendering, controlling access to, voting, capturing, posting, counting, and auditing election systems are known.

It is believed that a central issue in election systems is their ability to convince voters that the votes of all valid voters participating in the election are correctly counted.

Another issue in voting systems is ballot secrecy, which should prevent other than the voter from learning how the voter voted, with or without cooperation of the voter. When paper ballots are used, it is believed desirable in many settings that the form used to capture the vote does not bear the cleartext vote but rather an encrypted vote. For instance, this allows those transporting ballots and polling place scanners to be kept from learning the cleartext votes. Partly related, at least in some settings, is the issue of to what extent ballots voted by different groups are readily distinguished. Some systems can process ballots from multiple sources into a single batch of outcomes, but the ability of those operating the system and supplying the forms to discriminate or track batches of ballots can be an issue in some settings.

It is known that election outcomes can be substantially affected by the order in which candidates are placed on ballots. So-called "ballot rotation" systems are presumably aimed at addressing this, but often are imperfect in concept and introduce additional costs and errors in implementation. Also, where voters can be seen from a distance, the order of candidates being readily determined, such as even with standard rotation systems, allows their choices to be more readily recognized. Nevertheless, in some settings, particular ballot orders are required by law and/or desirable for ease in locating candidates. Systems that allow full control over order has the advantage of being well suited to the range of such settings.

Another desirable characteristic of voting systems in some settings is universal applicability of a ballot form. Thus, the voter votes the same form whether using a polling place with automation, a polling place with only a ballot box, a polling place in which automation has failed, or mail in or otherwise delivered ballots. From the perspective of voter experience, a common ballot form has advantages in terms of voter education as well as for voters that would otherwise have to use different forms in different settings.

Demand printing of ballots is attractive, particularly for large number of "ballot styles" where flexibility in election processes is desired. For instance, voters who wish ballots in particular languages and/or those who would like to vote at a polling place that has a different ballot style from their "home" polling place. The ability to use ordinary commercial printers, such as those currently made for offices or even consumers, is believed attractive from a cost and scalability perspective.

Substances added to ballots, such as coatings, can have environmental and/or toxic effects and be problematic for recycling, and thus may have additional costs and/or be undesirable in some settings.

It is generally believed, and actively advocated, that voters with disabilities should be able to vote in a way that is autonomous, makes their votes indistinguishable from those of other voters, and provides them with the same level of verification and protection against improper influence as other voters. The present application is in one aspect oriented towards obtaining the advantages of encrypted ballot/receipt systems for voters who cannot read the ballots and/or mark it. This is directed at attendance voting settings using machine-read ballots, such as where voters vote at polling places using so-called "optical scan" systems.

There are, generally speaking, three known approaches for obtaining marked paper ballots where the voter is present but need not see indicia on ballots, and in only one do the voters actually mark their own ballots.

The first approach may be called "human assisted" marking, and varies by jurisdictions. It does not provide autonomy, because one or more persons assist the voter in the act of voting. Some jurisdictions, for example, require voting with the assistance of a poll worker, who typically is to read the ballot aloud to the voter and to record the responses uttered by the voter. Unfortunately, it may be particularly difficult for a blind person to ascertain with certainty who overhears their votes. Not only does this give poor voter privacy, but it also facilitates various types of so-called "improper influence," such as at least potential confirmation in vote buying or coercion schemes. Integrity issues are also raised, since there may be little to ensure the voter or others that the poll worker records the votes faithfully. In other jurisdictions, representatives of multiple parties are required to assist the voter, thereby improving integrity but at the expense of further reduced autonomy and secrecy. In yet other jurisdictions, the voter may bring a person of the voter's choice. This is potentially better as far as voter concerns, although it enables some improper influence schemes. In some countries it is allowed for more than one person to enter the booth (or even for proxies to vote), such as family members or those in possession of certain documents. While such permissive schemes may offer some convenience, they facilitate various kinds of fraud and improper influence, and are not considered further here.

The second known approach may be called "automated" marking, such as with machines developed by Vogue Election Products & Services of Glen Ellyn, Ill. These are essentially so-called "DRE" (Direct Recording Electronic) voting machines. Instead of recording the vote electronically for later transmission by those running the election (often through a physical device anyway such as a memory card), however, they print the vote as a form that is provided to the voter for casting. In some cases a pre-printed form may be scanned in or otherwise loaded by the device and only the votes are marked on it by the device's print engine; in other cases the form may be rendered and printed completely by the device. In addition to audio voting interaction, as with DRE's, displays may offer enlarged or otherwise enhanced images readable by those who would not be able to read the ballot directly. One additional considerable advantage of audio capability generally is that sited but illiterate voters can also use it. Furthermore, it is believed often less costly, time consuming and cumbersome to generate audio in various languages compared to typesetting and laying out corresponding forms. There are, however, believed to be substantial procurement, storage, and transportation costs, as well as reliability issues for such hardware devices, which apparently integrate printers and scanners with touchscreen user interfaces. A fundamental shortcoming of the approach generally is believed to be that, even in the best case, when the device marks standard ballots, the ballots are readily recognized as having been marked by machine.

The third approach may be called that of "tactile" marking. One example is Braille ballots. These can only be used, however, by the small fraction of the blind population (believed sometimes estimated at roughly 5% of the legally blind in the United States) who are currently able to read Braille adequately. Of course the ballots would also stand out as having been voted by the blind. A hybrid Braille and ink ballot would address this issue, but would not be very practical, as it would greatly increasing the size, thickness, handling difficulty, and cost of ballots and processing.

The other major example of the third approach, called here "tactile audio," relates to the so-called "tactile ballot templates." These are believed to at least have been used, for example, in public sector elections in Rhode Island, Canada, Peru and Sierra Leone. They provide in essence what may be called a "guide," such as a sheet of relatively rigid material held in alignment with the ballot paper, which includes openings where marks are allowed. In addition to the tactile nature of those openings themselves, other tactile indications are included formed in the guide, such as in Braille or simpler codes. An audiotape or the like is typically provided that informs the voter of which candidates or question responses correspond to which coded openings on the guide. The audio aspect brings with it the advantage, already mentioned earlier, that sighted voters who are illiterate or wish a language that is not available in printed form can use the system to vote. Such an approach is believed attractive for unencrypted votes.

The tactile audio approach does not provide voters using it with the integrity and secrecy protections of the encrypted vote/receipt systems mentioned earlier. For instance, voters are unable to check, after leaving the poling place, that: they were provided with correct information about what to mark, that their marks are accurately scanned, and that the scanned values are properly included in the final tally. As another example, readable ballots do not provide the secrecy advantages of encrypted ballots, such as: for handling while in a polling place or for so-called provisional ballots or what may be referred to as "vote-from-any-precinct," which both require that the voter identity be linked to ballots during protracted handling/processing.

Accordingly, objects of the invention in this aspect include bringing advantages of encrypted ballot and/or receipt systems to audio tactile ballots at polling places and other settings, including audio assisted and assistant-marked balloting generally.

A further aspect relates to processing of encrypted votes. Known voting systems make extensive use of sophisticated types of cryptographic functions and protocols (such as, for instance, public key, secret-shared homomorphic systems), limiting the ease with which they can be widely understood by the public. Those previously proposed by the present applicant are believed to have privacy substantially exponentially good in the number of rounds and detection of cheating substantially exponentially high in the number of votes improperly changed. (Underlying this, a choice for statistical integrity, compared to that based on cryptography, with privacy based on cryptography, is often made to protect against the chance that an adversary wishing to change the outcome of the election might have access to unexpected algorithms or resources.) A system introduced here offers substantially perfect privacy and probability of detection of improper changes exponential in the number of rounds (in a similar underlying model). The amount of computation and data storage is reduced, while maintaining strong integrity properties. Moreover, it optionally only uses a basic type of encryption, that is believed more familiar to and more readily understood by the public.

Encrypted vote systems are known in which voters mark paper ballots and retain receipts that allow them to check online that their votes were recorded correctly. Privacy and secret ballot properties have been provided, although there is room for improvement in this regard. Some systems have a single entity that performs operational aspects and that obtains as a consequence special access to privacy of votes. In some systems and settings, the checking information posted can reveal some information about the vote to other than the voter.

Various user interface approaches have been proposed, as exemplified by two types. In the one type, users mark next to a candidate and in the second type they mark in a position indicated by a symbol matching that next to the candidate. The former presents candidates in substantially randomized order and the latter in whatever order is wished by those conducting the election, such as alphabetical order. As a consequence it is believed that neither is clearly preferably for all applications or even all contests within a ballot. Moreover, system for the two types of interface have addressed different settings and with apparently different mechanisms. Simplicity of mechanism has advantages in election system applications.

Carbon paper and so-called carbonless paper are well known for making copies of marks made on forms, such as those made by voters. One known problem with such techniques, however, is that the original may be apparently well marked, but the copy does not come through well. With demand printed ballots, physical structure related to so-called "ballot style," such as holes or scratch-off may be problematic and can lead to general formats that are less than optimal in terms of clarity, economy, and aesthetics. Moreover, demand printed ballots are ideally substantially indistinguishable from those printed otherwise. Physical structures have increased associated direct and handling costs.

The use of self-adhesive "stickers" by voters to indicate their choices through the selection of stickers placed on a ballot template was proposed by Boram in U.S. Pat. No.

4,717,177. The resulting ballot exposes the votes to those who might see it in transport and handling, which in some settings is not a desirable feature. Moreover, such forms to not provide an encrypted vote function. Furthermore, the unused portion of stickers in known systems also reveals the vote and does not serve as a receipt in an encrypted voting system.

It is often desired in voting systems to hide how a particular voter has voted, providing privacy and/or so-called secret ballot properties, as mentioned. A related technology is envelopes and/or material layers, such as covering sheets adhered in place or the like. So-called "scratch-off" layers typically formed from materials including latex on paper cardstock or the like are known and familiar to the general public particularly because of their use in lotteries and the like. In some settings, it may be desired to provide integrity of the election that is verifiable including by voters who are in possession of the ballot form, while maintaining ballot secrecy. In an example inventive aspect, accordingly ballot secrecy is maintained in some cases including even if the voter does not follow procedures and in some cases including side information and/or virtual transmission of ballots, using scratch-off and/or other removable layers. Desired would be forms that allow the voter to discover codes that can be authenticated as valid when supplied over telephone or Internet, in part at least because the forms need not by physically transported back to, and then also process when received by, those running the election.

Control of access to attendance voting is typically done through the known device of a physical poll book, which are being replaced in some jurisdictions by automated and even online systems. Verification by voters, however, is cumbersome with manual poll books, since the information is often neither optimally complete nor well organized for the task at hand. As with voting machines, automated registration systems provide little transparency to voters.

In a further inventive aspect, voters who are to be allowed to vote in a polling place are displayed in the sequence in which they are admitted, at least the most recent part of the display being visible to voters. Certain sensitive information, such as private addresses and/or signatures on file, is allowed to be viewed by voters present. In some example settings the poll book is on paper, in others it is automated, and in yet others the book for the particular polling place is in paper but automated information is available for other polling locations within some political subdivision.

Known encrypted vote systems that can accommodate so-called "write-in" votes use automated equipment in the voting booth, and such equipment can be substantially more costly than manual systems. Receipts in known encrypted vote schemes use information related to each independently processed contest or ballot question, their size is substantially proportional to the amount of such information. Also, in known cryptographic receipt systems, although arguably not substantial issues, compromise of cryptographic protection can link receipts to ballots and the sophistication of cryptographic systems has been an impediment to their early adoption.

Objects of the present invention in one aspect, accordingly, include secure receipts whose size is substantially independent of the number of contests or questions and that accommodate write-in votes without in-booth automation. Another object, in some embodiments, is an augmentation of manual encrypted vote systems to include write-in vote without introducing additional automation to be used by voters. A further object, at least in some embodiments, is less reliance on cryptographic techniques and in particular a receipt-to-ballot linking that cannot be learned by compromise of such techniques.

The present invention aims, accordingly and among other things, to provide novel and improved voting and related systems. Transparent integrity, ballot secrecy, usability, accessibility, and robustness in such systems are important goals generally. Objects of the invention also include addressing all the above mentioned as well as providing practical, robust, efficient, low-cost election systems. All manner of apparatus and methods to achieve any and all of the forgoing are also included among the objects of the present invention.

Other objects, features, and advantages of the present invention will be appreciated when the present description and appended claims are read in conjunction with the drawing figurers.

BRIEF DESCRIPTION OF THE DRAWING FIGURES

FIG. 1*a* through 1*g* each show example split ballots in accordance with the teachings of the present invention.

FIG. 6 discloses some exemplary symbologies, in accordance with the teachings of the present invention.

FIG. 7 discloses some exemplary symbologies, in accordance with the teachings of the present invention.

FIG. 8 shows an exemplary ballot in accordance with the teachings of the present invention.

FIG. 9 shows another exemplary ballot in accordance with the teachings of the present invention.

FIG. 10 is a combination block, functional and flow diagram schema for an exemplary voting system, in accordance with the teachings of the present invention.

FIG. 11 is a combination block, functional and flow diagram for an overall exemplary voting system, in accordance with the teachings of the present invention.

Figure 12:
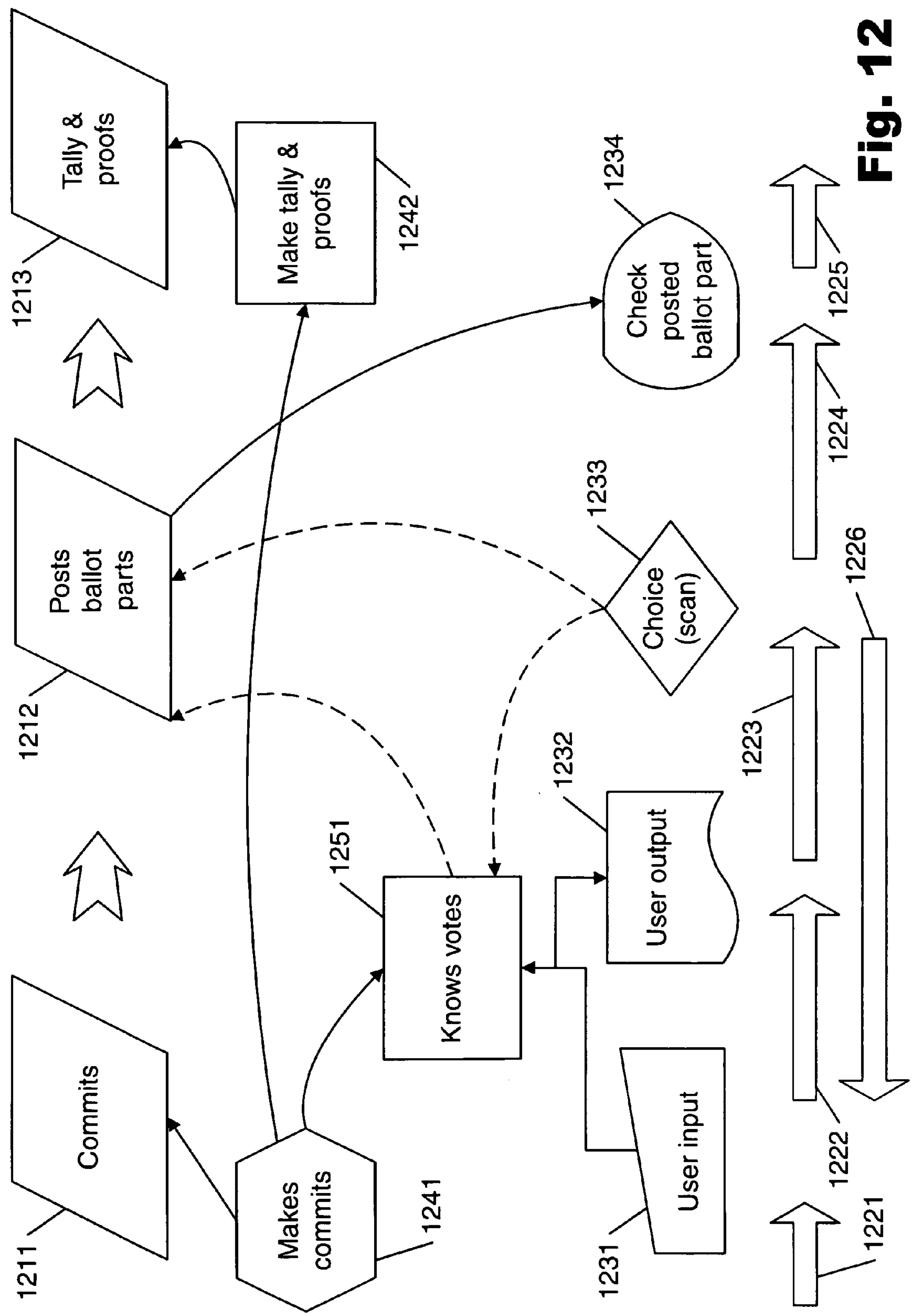

FIG. 12 is a combination block, functional and flow diagram for an overall exemplary voting system, in accordance with the teachings of the present invention.

FIG. 13 shows some exemplary write-in ballots in accordance with the teachings of the present invention.

FIG. 14 shows combination block, functional, schematic, and protocol diagrams for exemplary ways to control voter interaction for some embodiments in accordance with the teaching of the present invention.

FIG. 15 shows combination block, functional, schematic, and protocol diagrams for exemplary ways to control voter interaction in some exemplary embodiments of the invention.

FIG. 16 shows various views of an example single voting station, with automatic paper handling capabilities, in accordance with the teachings of the present invention.

Figure 17:
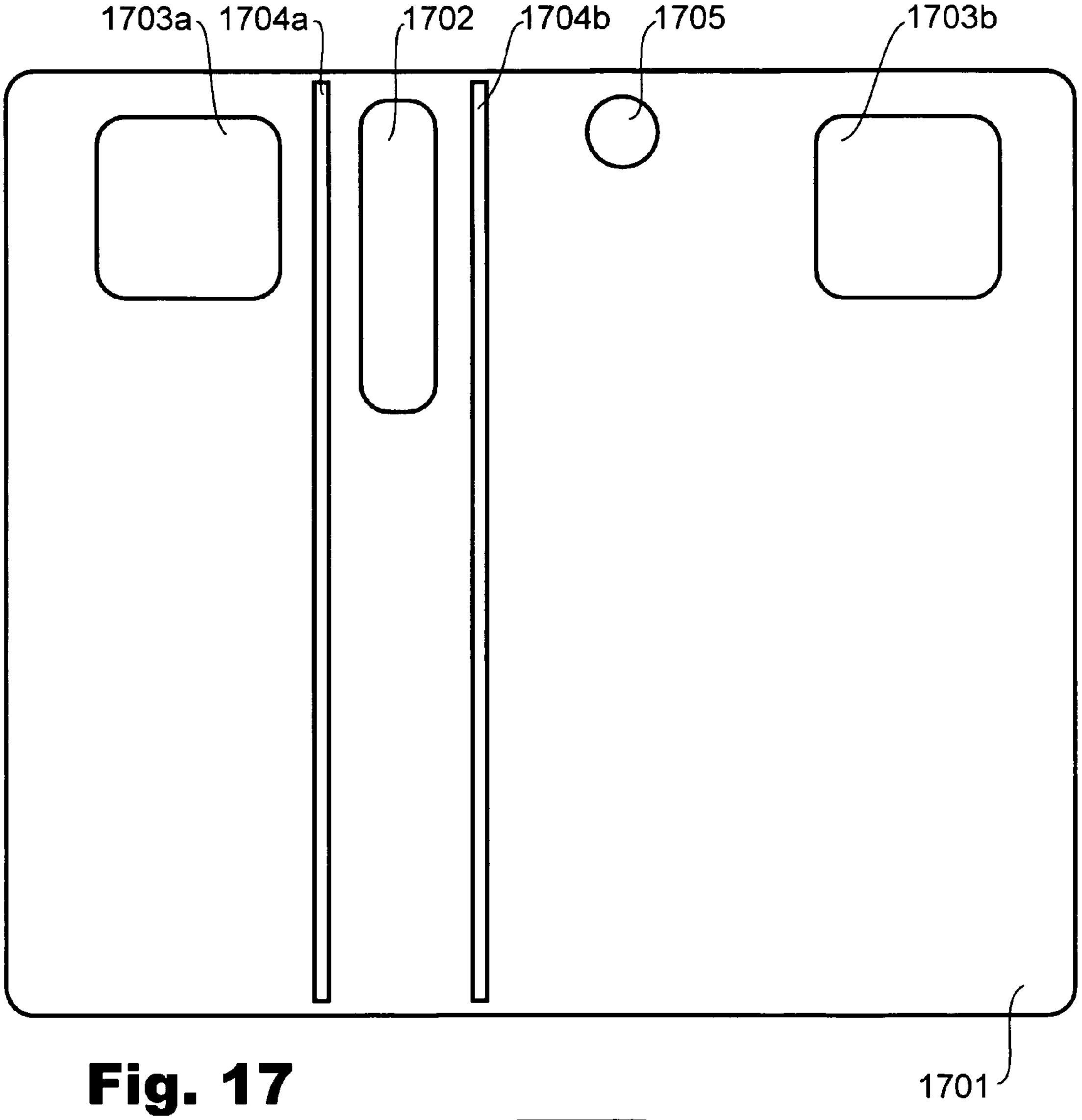

FIG. 17 shows a plan schematic functional view of an exemplary inventive ballot carrier cassette in accordance with the present invention.

Figure 18:
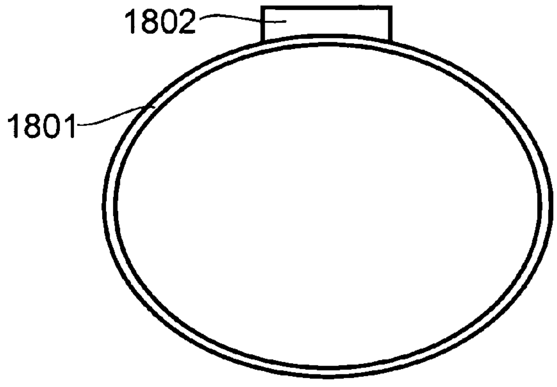

FIG. 18 shows an exemplary band in accordance with the invention.

FIG. 19 shows an exemplary scratch-off ticket in three states in accordance with the teachings of the invention.

Figure 20:
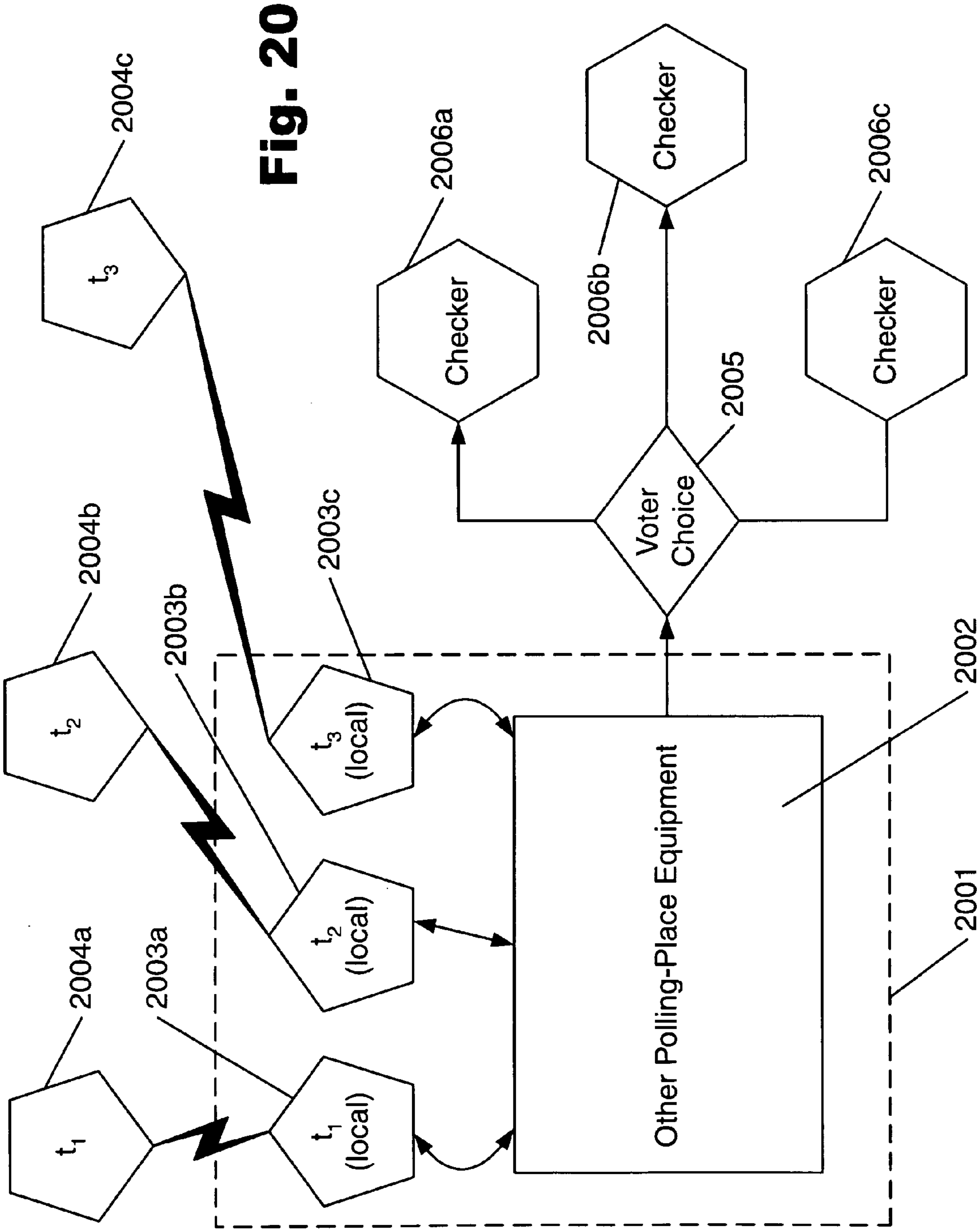

FIG. 20 shows a combined block, functional and flow diagram of an example voting location with trustee modules, online connections and plural checkers, in accordance with the teachings of the present invention.

Figure 21B:
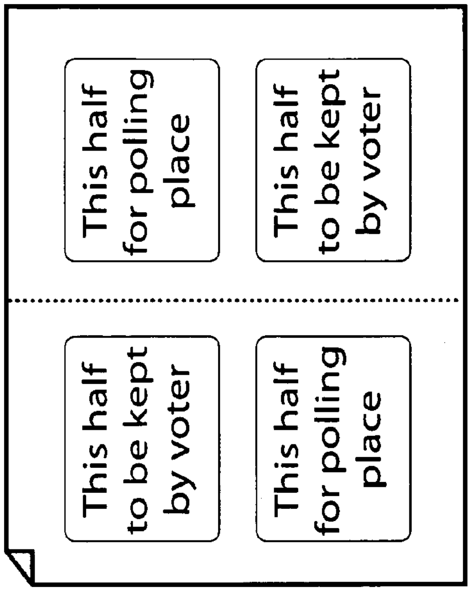
Figure 21D:
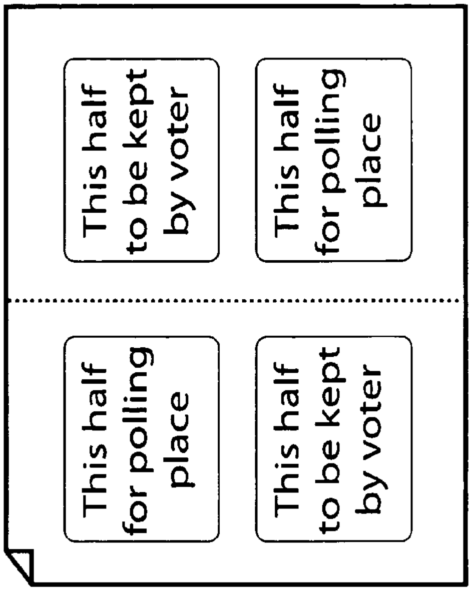
Figure 21A:
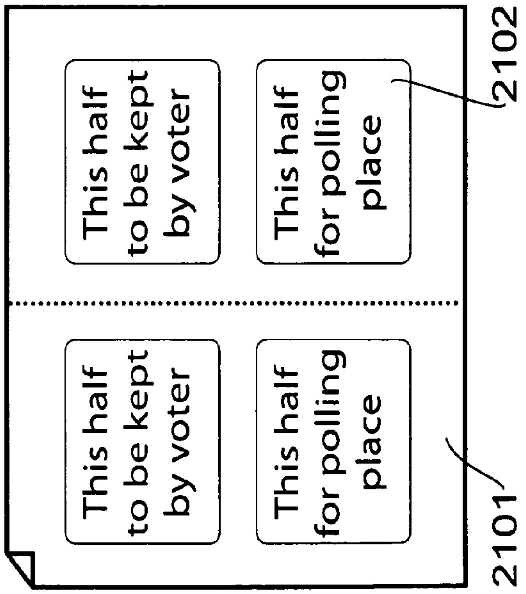
Figure 21C:
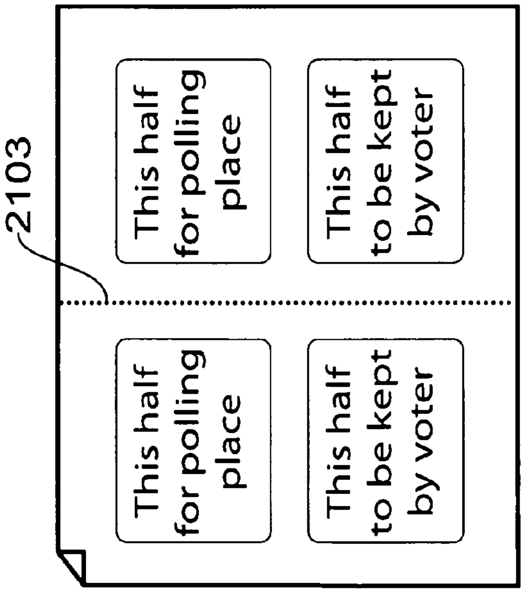

FIG. 21*a* through 21*c* each show exemplary scratch-off coin-flip ballot features in accordance with the teachings of the present invention.

Figure 22A:
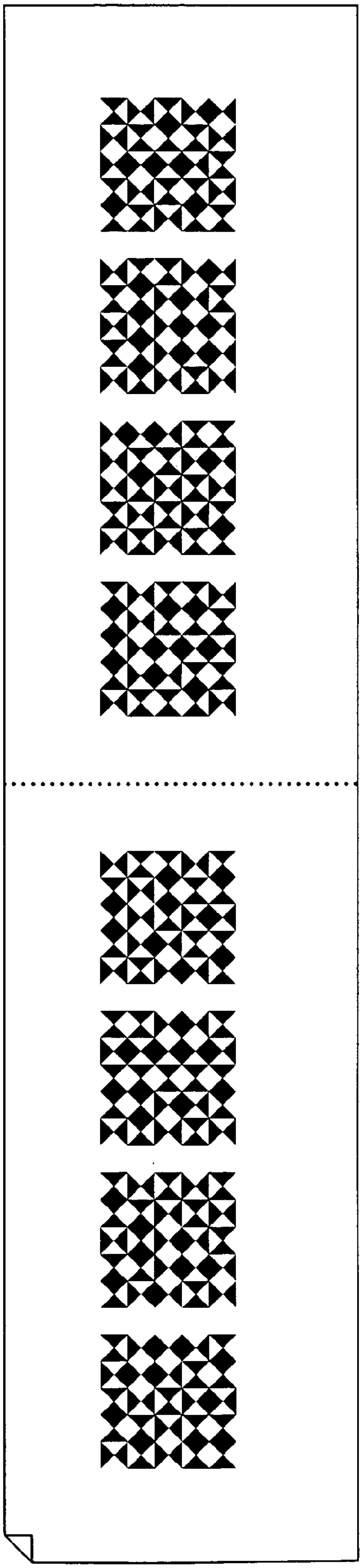
Figure 22B:
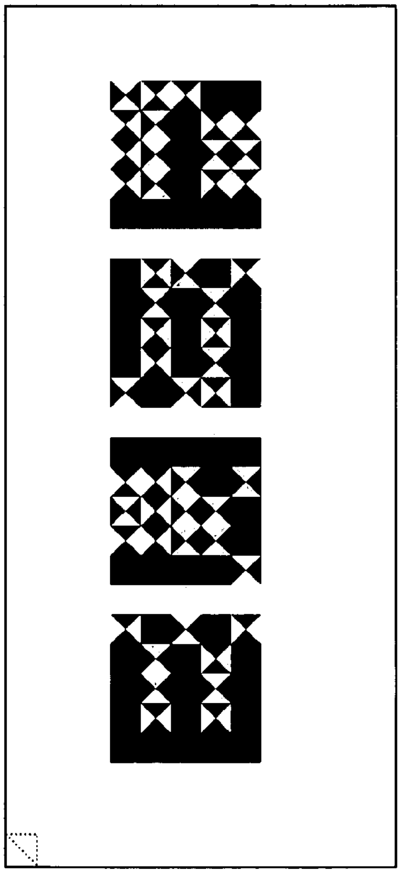

FIG. 22*a* and 22*b* show exemplary monochrome overlay ballot features in accordance with the teachings of the present invention.

Figure 23A:
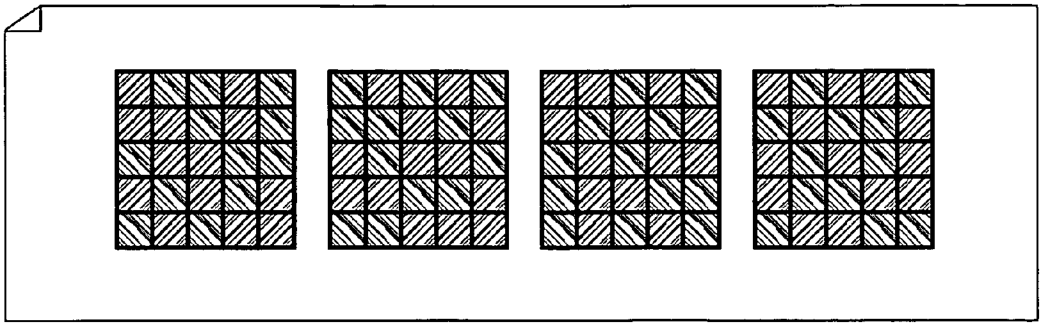
Figure 23B:
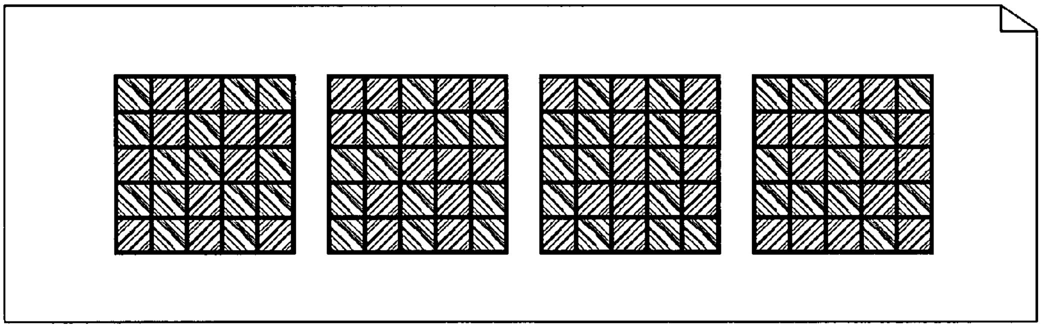
Figure 23C:
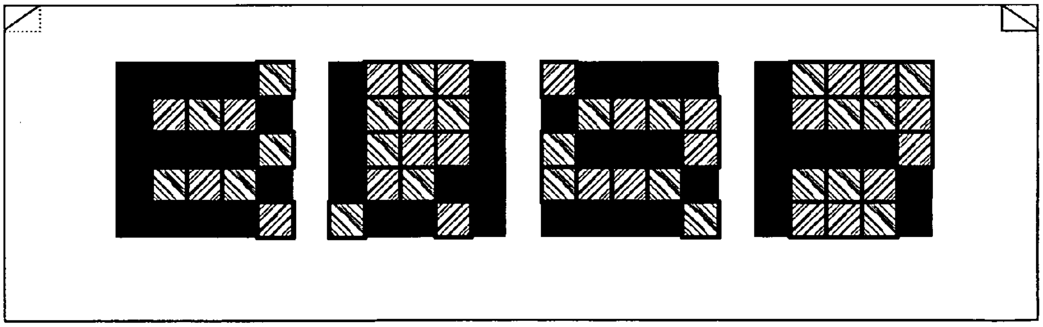

FIG. 23*a* through 23*c* each show exemplary color overlay ballot features in accordance with the teachings of the present invention.

FIG. 24*a* through 24*e* show example schemas and formulas for overlay systems in accordance with the teachings of the present invention.

FIG. 25*a* through 25*c* show example schemas and formulas for streamlined overlay systems in accordance with the teachings of the present invention.

Figure 26A:
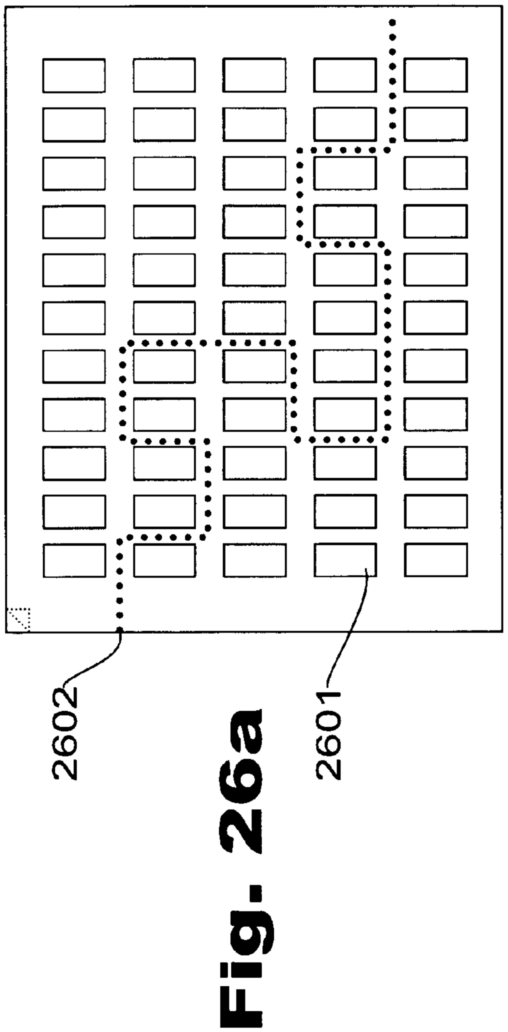
Figure 26B:
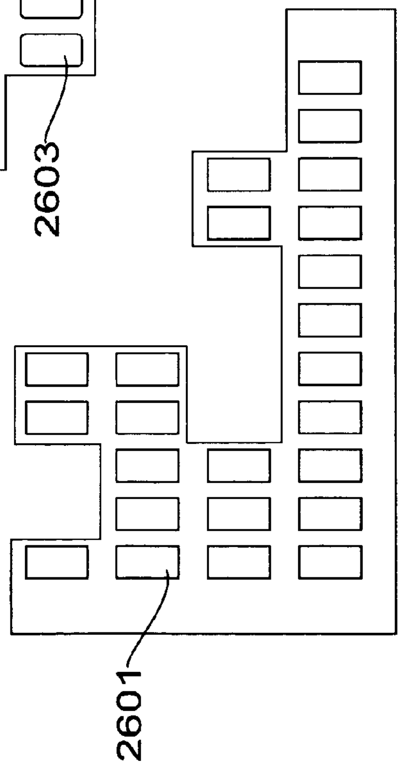
Figure 26C:
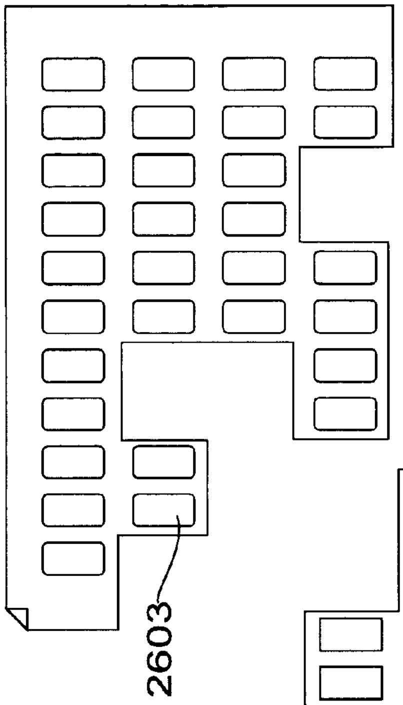

FIG. 26*a* through 26*c*, show an exemplary ballot form splitting comprising more than two potential parts in accordance with the teachings of the present invention.

Figure 27A:
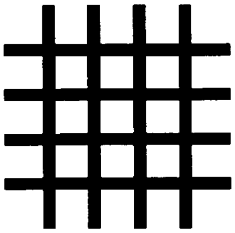

FIG. 27 shows exemplary ballot form material and printing technique in accordance with the teachings of the present invention.

FIG. 28 shows an exemplary single pixel spacing around a block of pixels in accordance with the teachings of the present invention.

FIG. 29 shows exemplary stacked window sizes in accordance with the teachings of the present invention.

FIG. 30 shows an exemplary embodiment of staggered pixel locations in accordance with the teachings of the present invention.

FIG. 31 shows exemplary pre-laminated media in accordance with the teachings of the invention.

FIG. 32 shows exemplary media that changes from one transmissive color to another in accordance with the teachings of the present invention.

FIG. 33 shows sections of exemplary printhead and roller arrangements in accordance with the teachings of the present invention.

Figure 34:
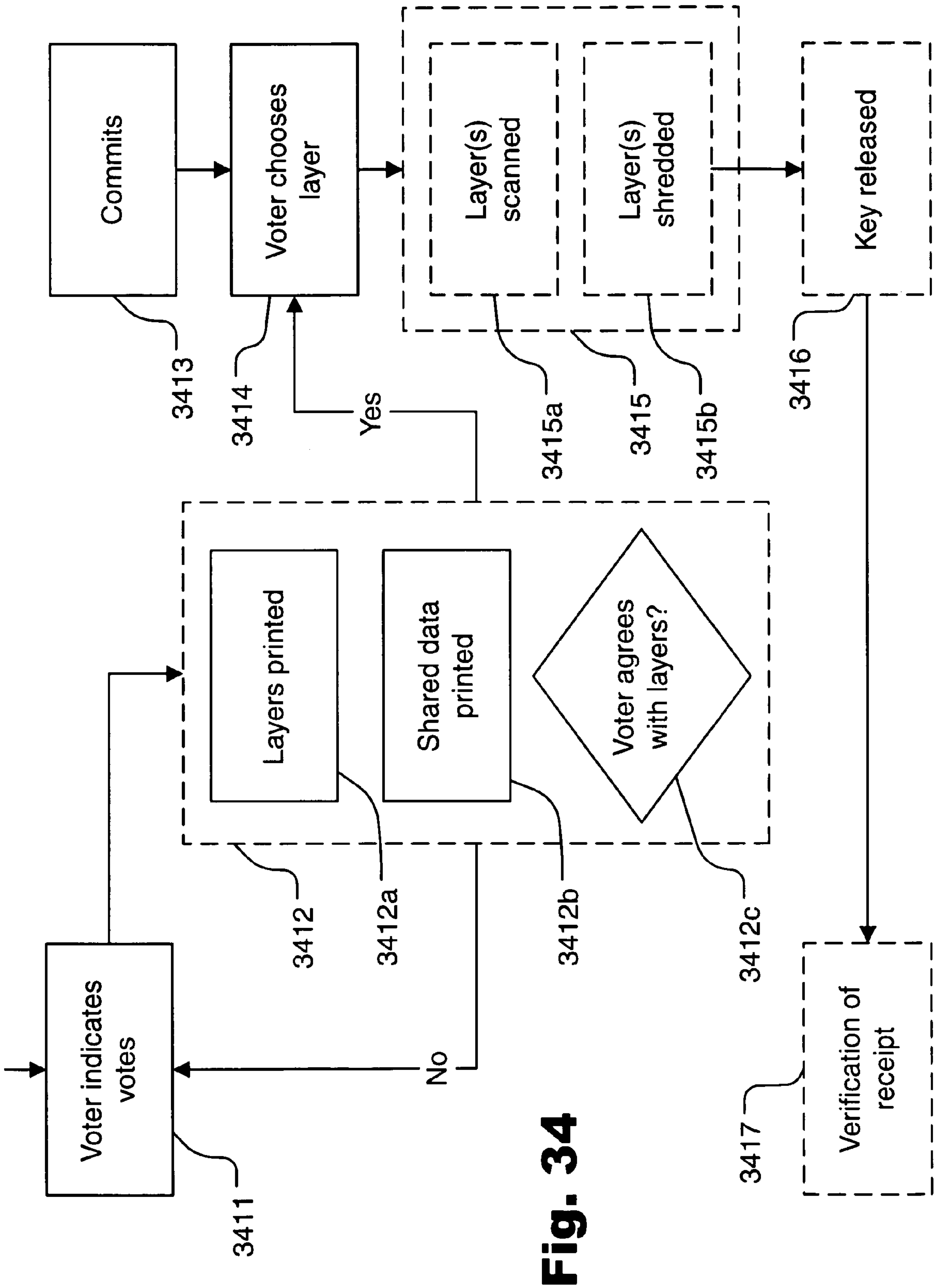

FIG. 34 depicts an exemplary overall detailed block, schematic, partial ordering, flowchart, plan view, and protocol schema in accordance with the teachings of the present invention.

FIG. 35 shows a plan view and schematic diagram of an exemplary printed two-layer receipt, in accordance with the teachings of the present invention.

Figure 35A:
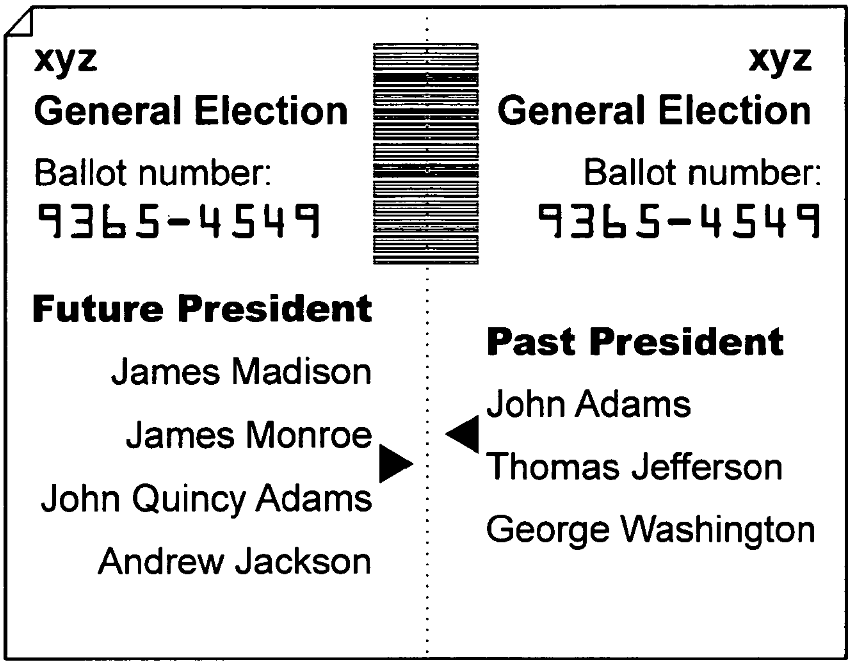
Figure 35B:
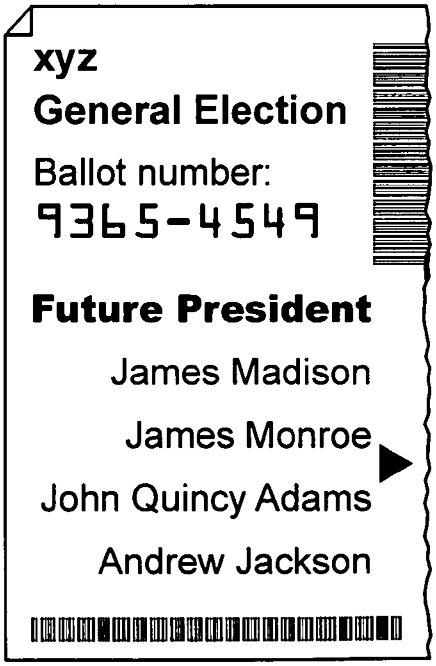
Figure 35C:
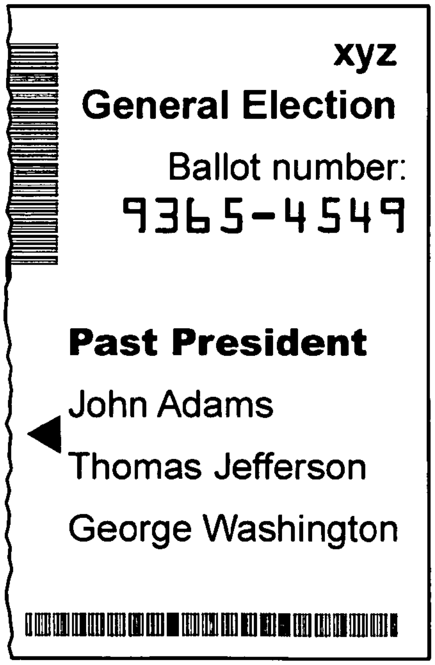
Figure 36A:
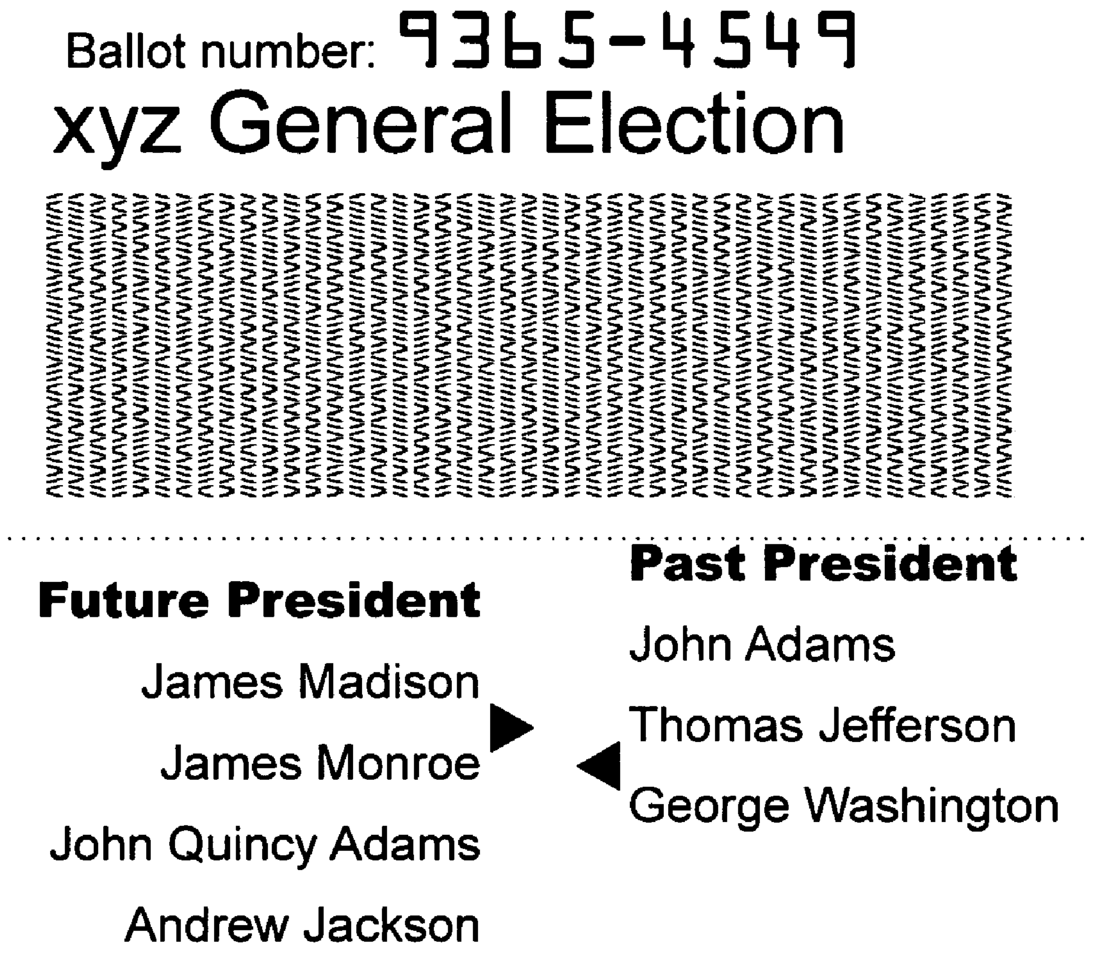
Figure 36B:
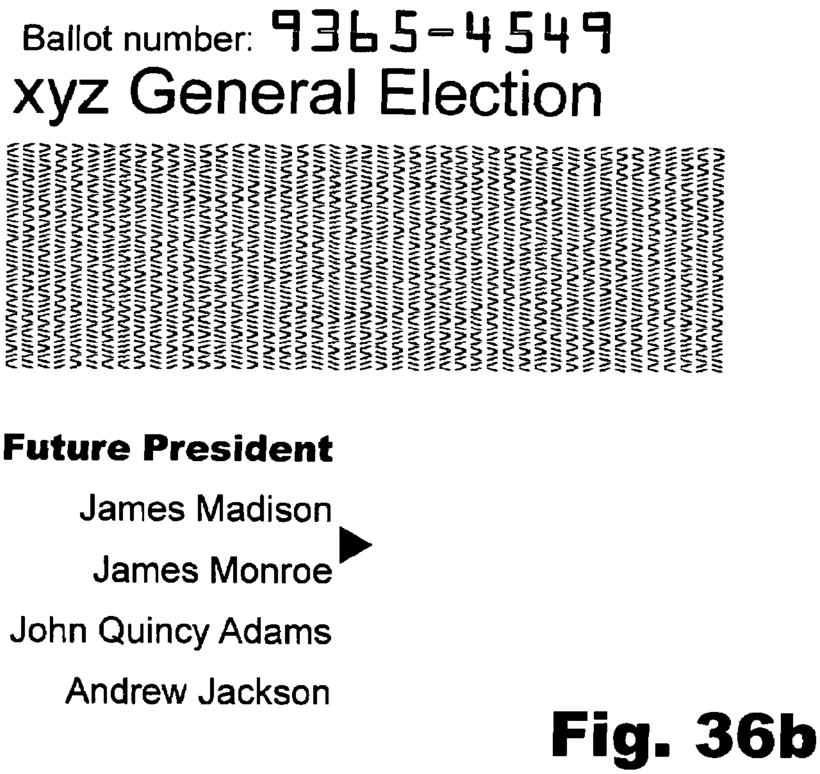

FIG. 36 is a variation on the embodiment of FIG. 35.

FIG. 37 presents a plan view and schematic diagram for an exemplary multi-layer receipt with a marked ballot, in accordance with the teachings of the present invention.

Figure 38C:
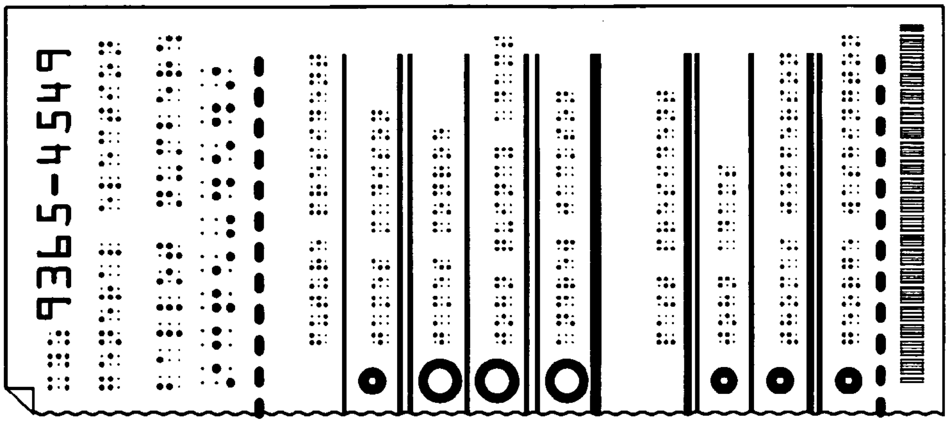
Figure 38B:
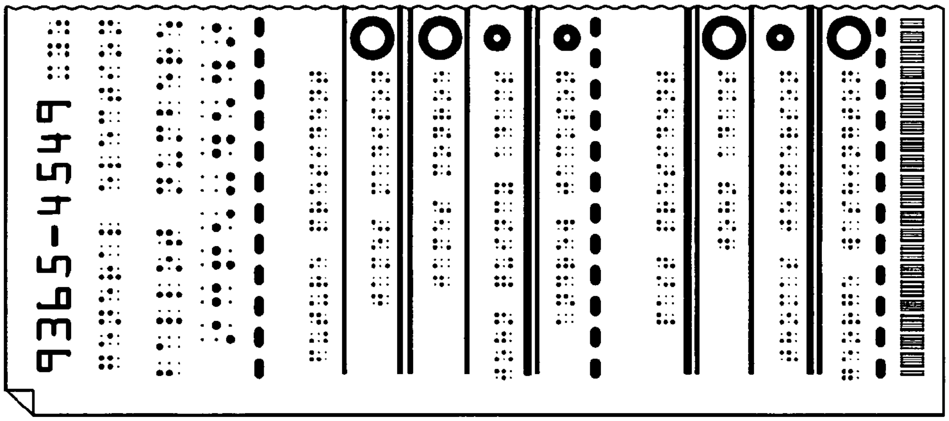
Figure 38A:
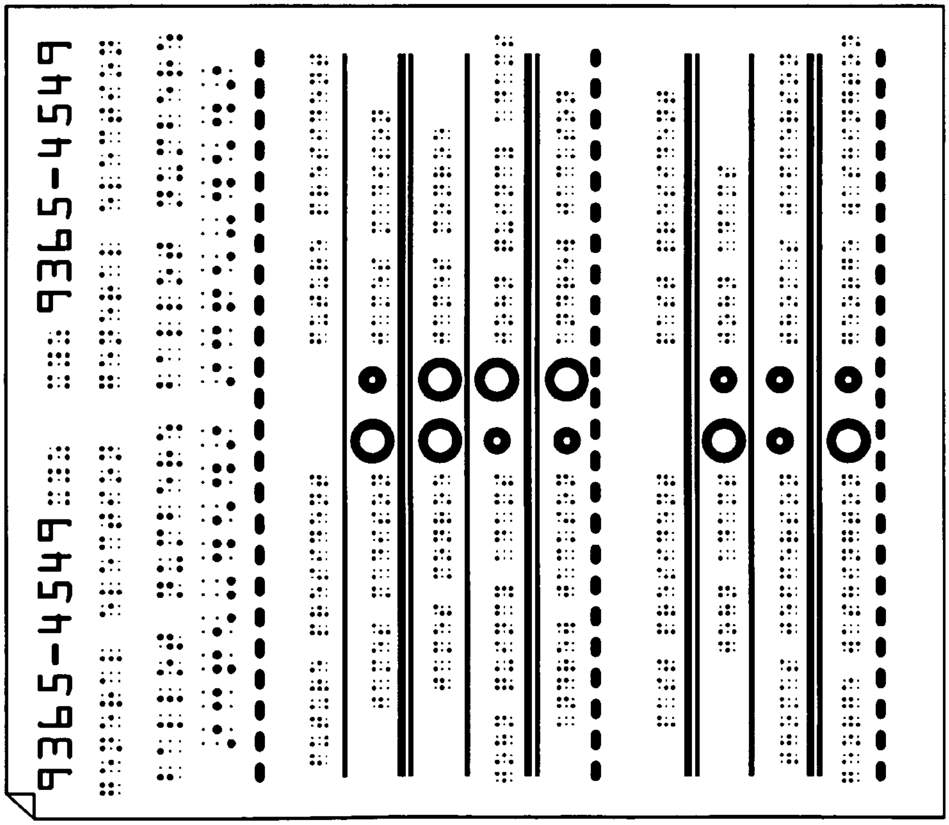

FIG. 38 gives a plan view and schematic diagram for an exemplary tactile receipt, in accordance with the teachings of the present invention.

FIG. 39*a* through 39*d* present a plan view and schematic diagram for an exemplary multi-layer receipt with a marked ballot, in accordance with the teachings of the present invention.

FIG. 40*a* through 40*d* shows a plan view and schematic diagram for an exemplary two-layer receipt, in accordance with the teachings of the present invention.

FIG. 41 is a combination plan, schematic, and layout diagram of an exemplary embodiment of a punchscan ballot in accordance with the teachings of the present invention.

Figure 42:
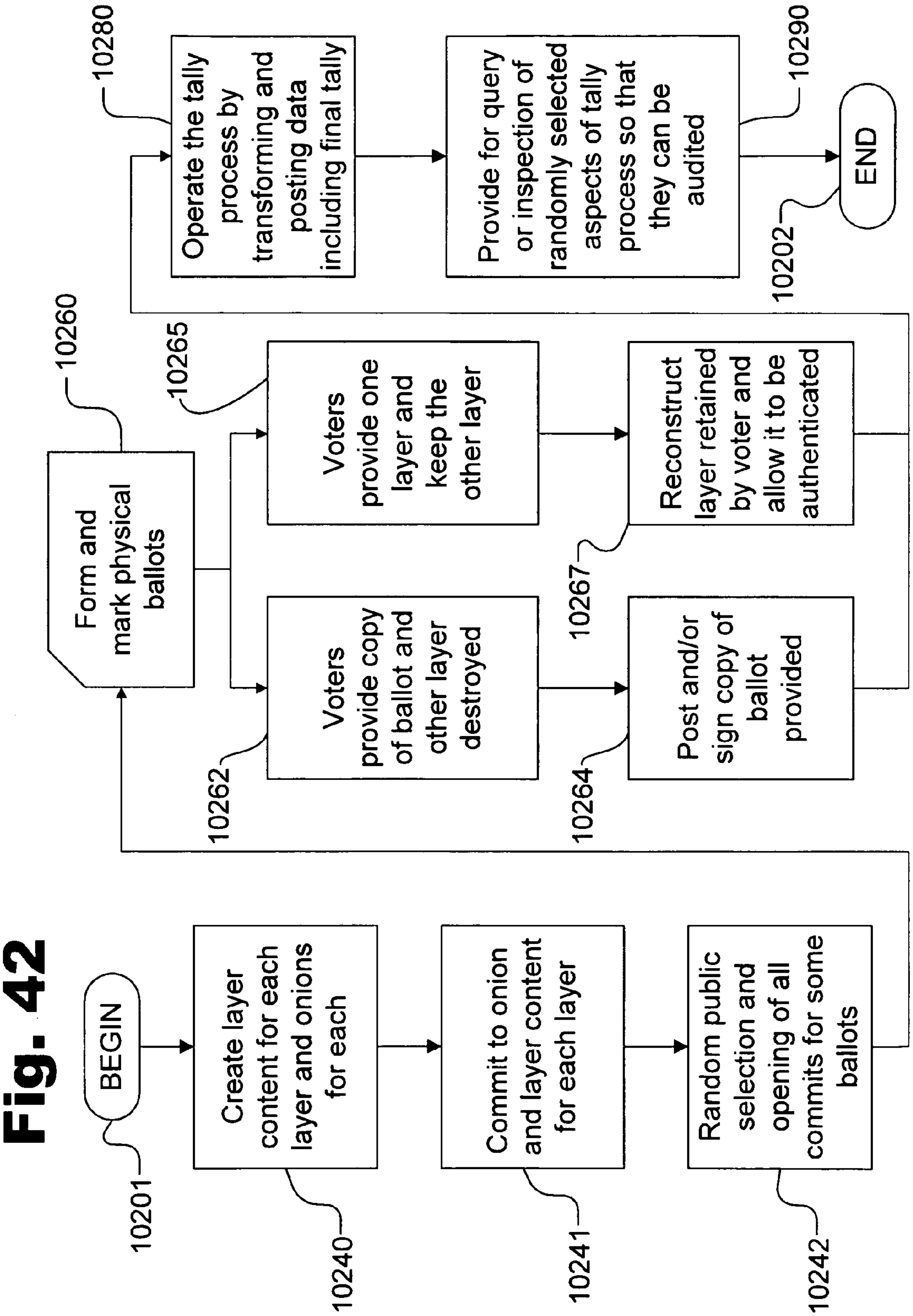

FIG. 42 is a combination block, schematic, flow, diagram of an exemplary embodiment of a overall punchscan election in accordance with the teachings of the present invention.

Figure 43:
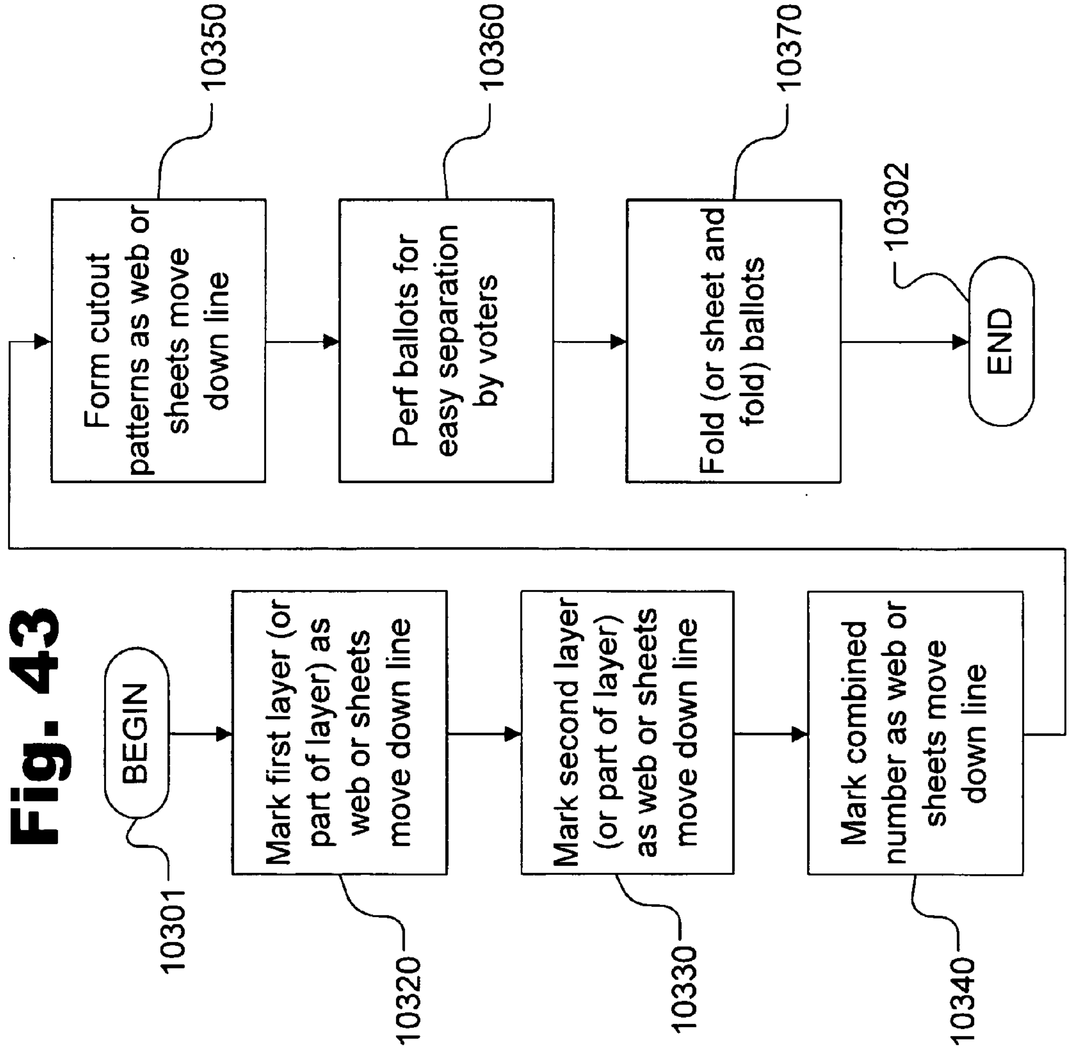

FIG. 43 is a combination block, schematic, flow, diagram of an exemplary embodiment of a punchscan ballot production in accordance with the teachings of the present invention.

Figure 44:
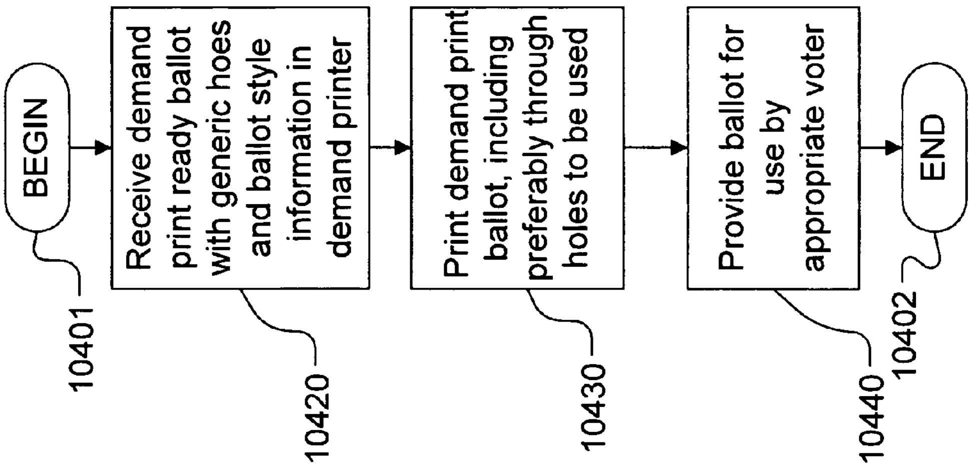

FIG. 44 is a block diagram and flowchart of an exemplary embodiment of a punchscan ballot demand printing in accordance with the teachings of the present invention.

Figure 45:
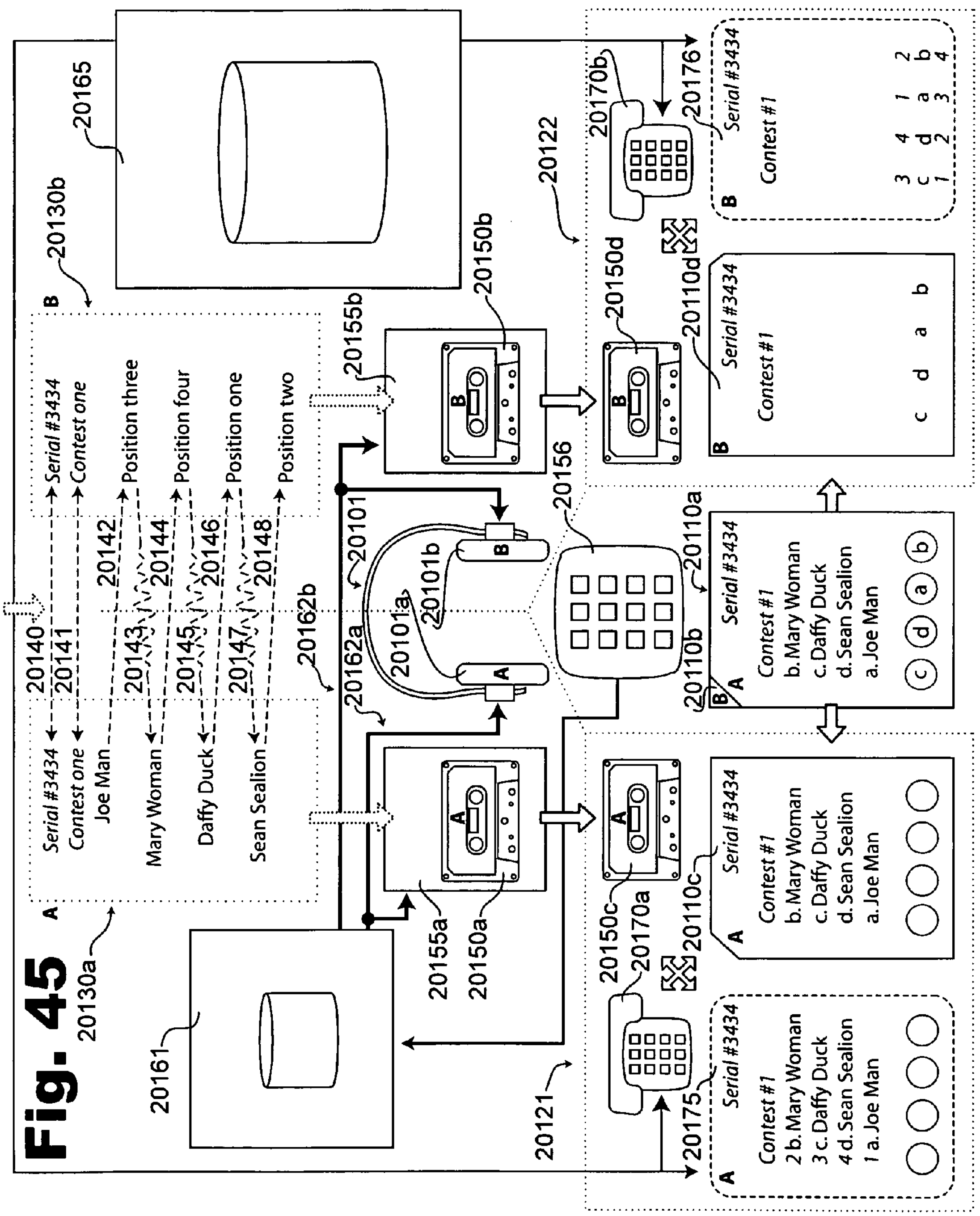

FIG. 45 is a combination block, flowchart, schematic of an exemplary embodiment of a first disabilities friendly voting system in accordance with the teachings of the present invention.

Figure 46:
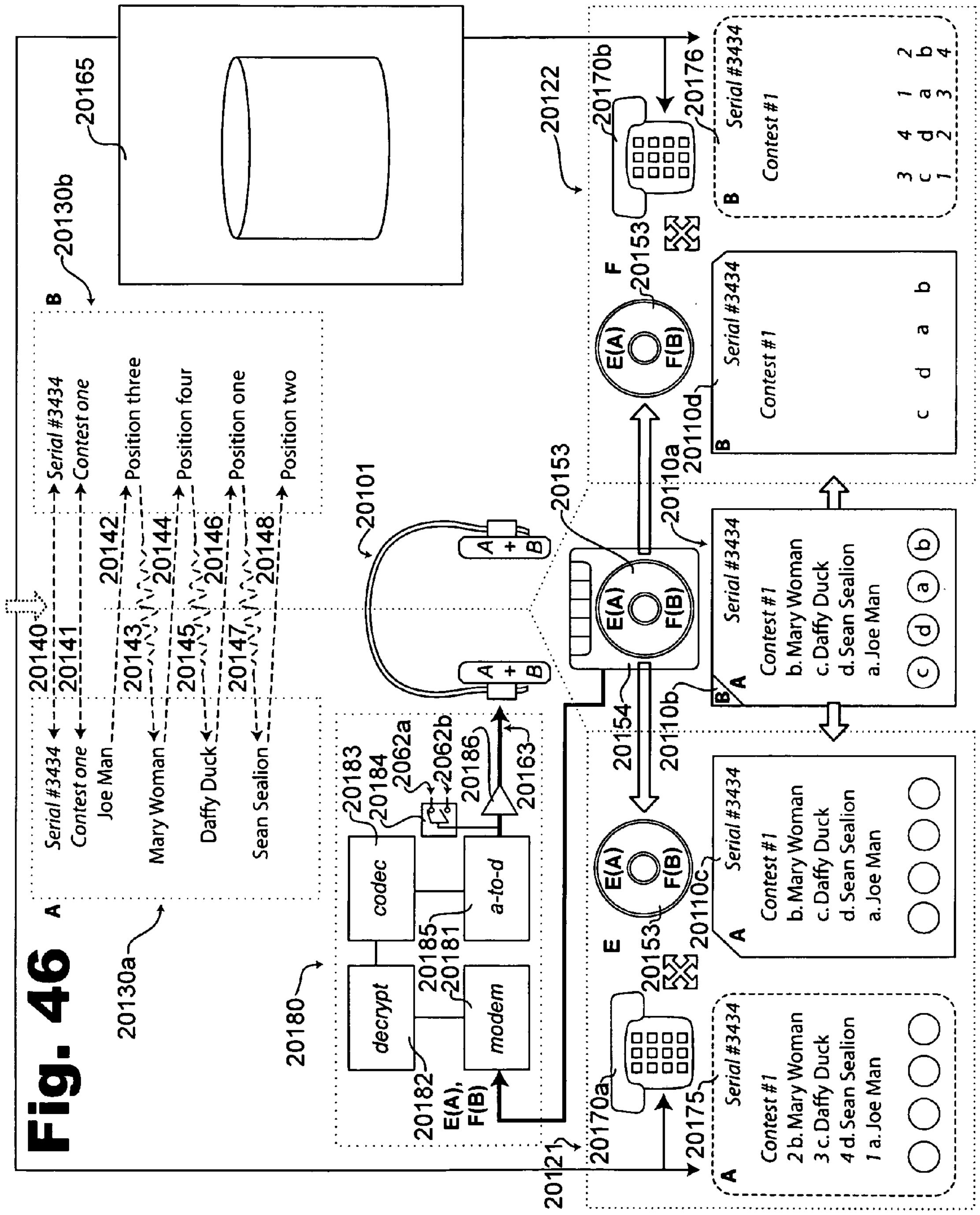

FIG. 46 is a combination block, flowchart, schematic of an exemplary embodiment of a second disabilities friendly voting system in accordance with the teachings of the present invention.

Figure 47:
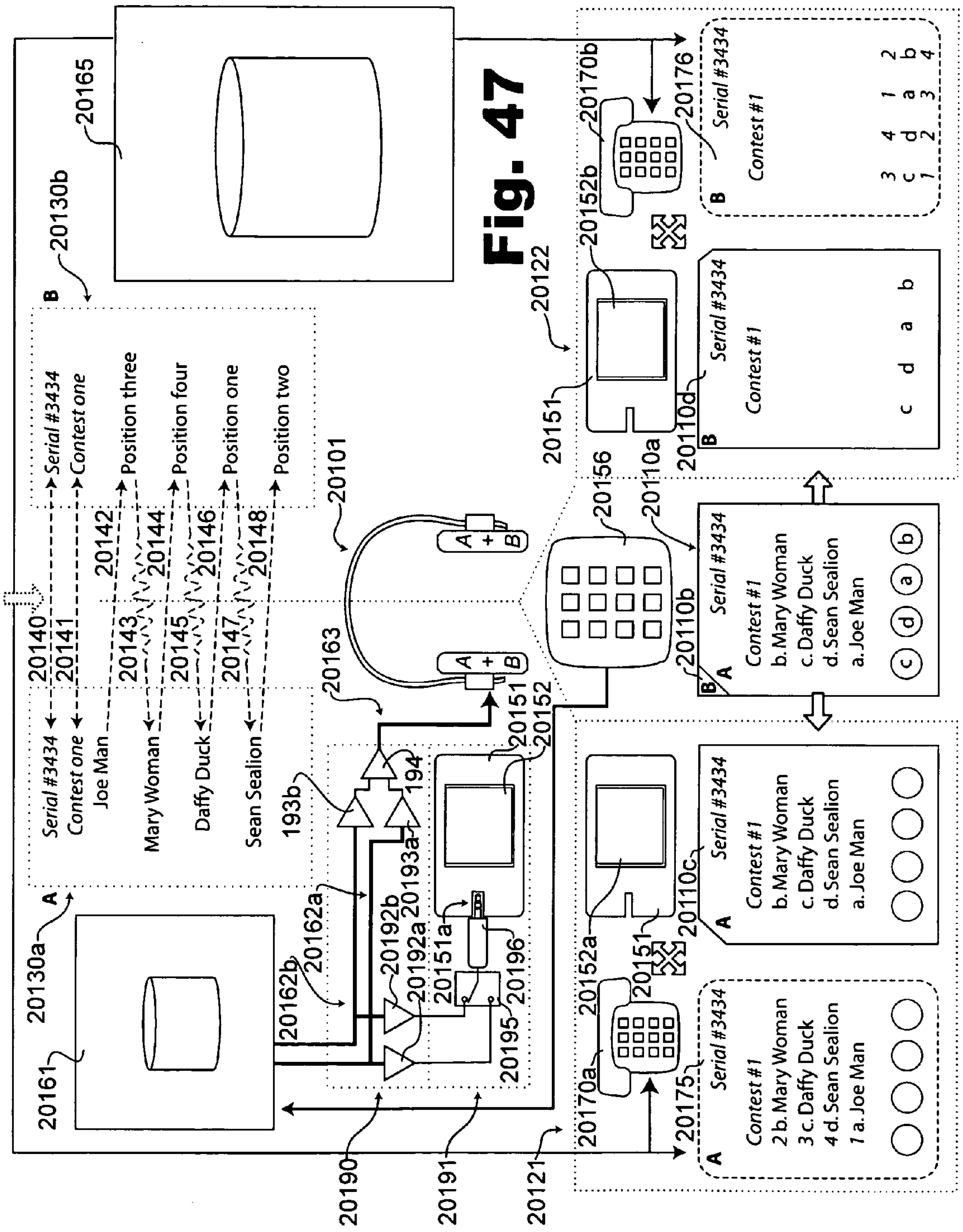

FIG. 47 is a combination block, flowchart, schematic of an exemplary embodiment of a third disabilities friendly voting system in accordance with the teachings of the present invention.

Figure 48:
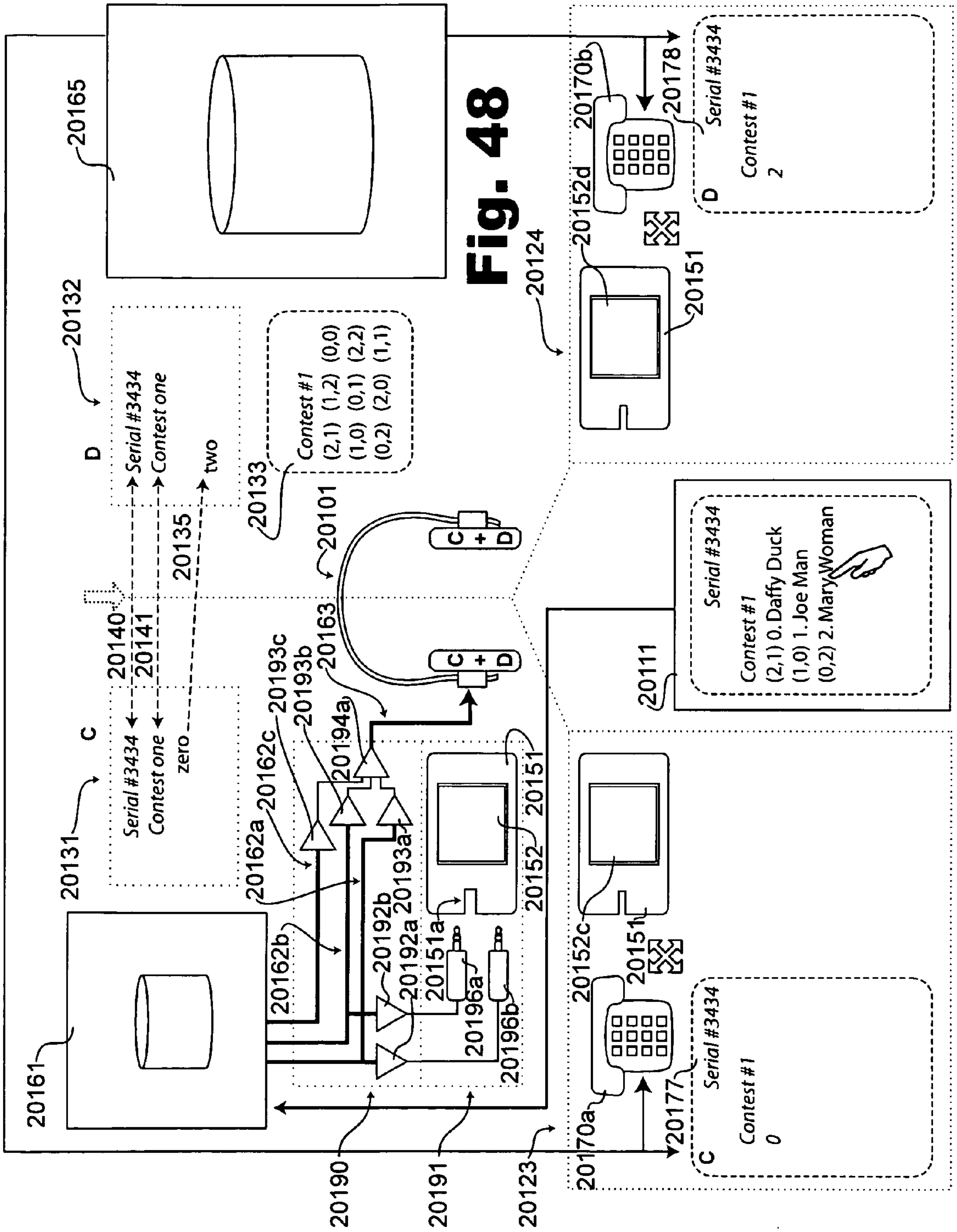

FIG. 48 is a combination block, flowchart, schematic of an exemplary embodiment of a fourth disabilities friendly voting system in accordance with the teachings of the present invention.

Figure 49:
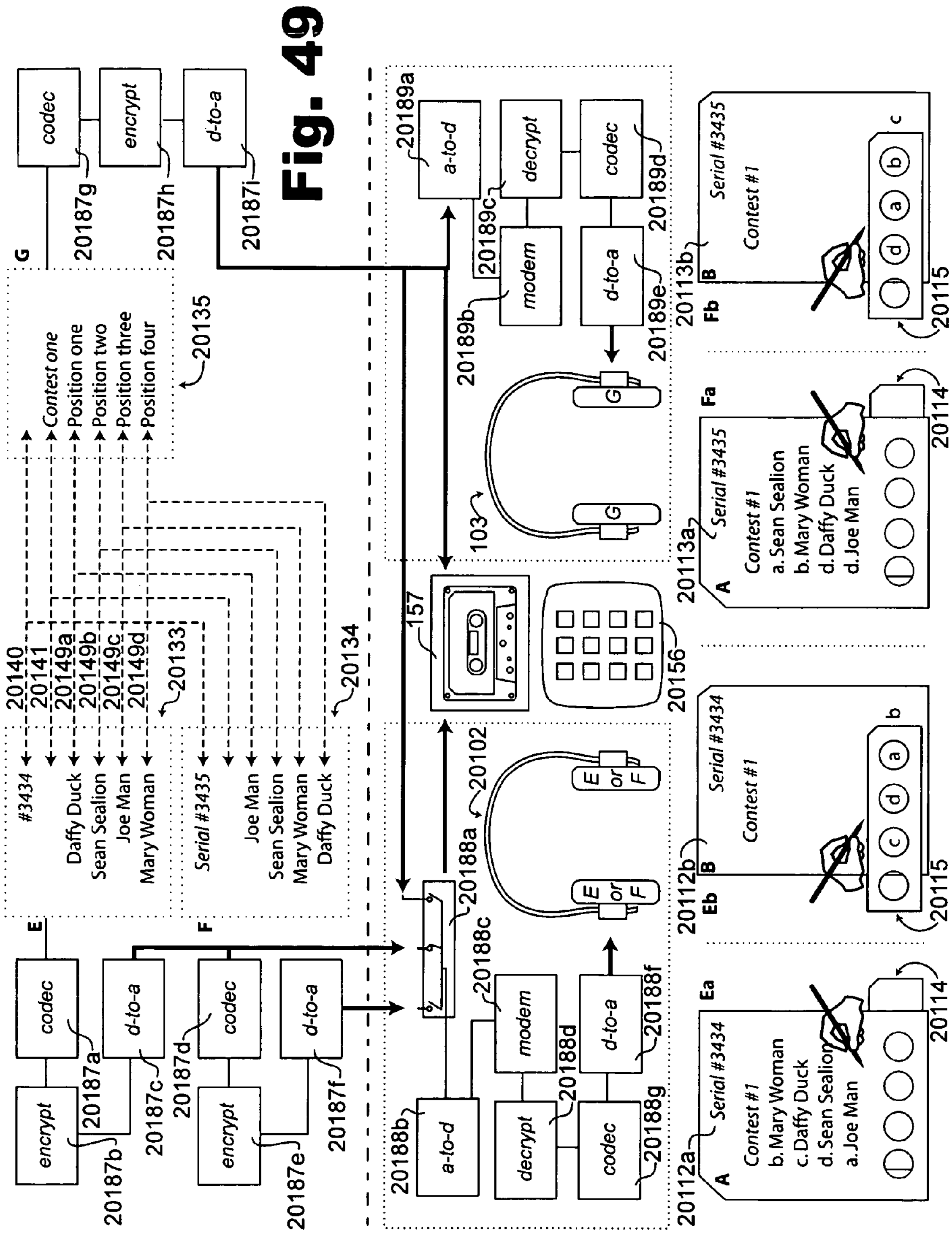

FIG. 49 is a combination block, flowchart, schematic of an exemplary embodiment of an untrusted-assistant disabilities friendly voting system in accordance with the teachings of the present invention.

Figure 50:
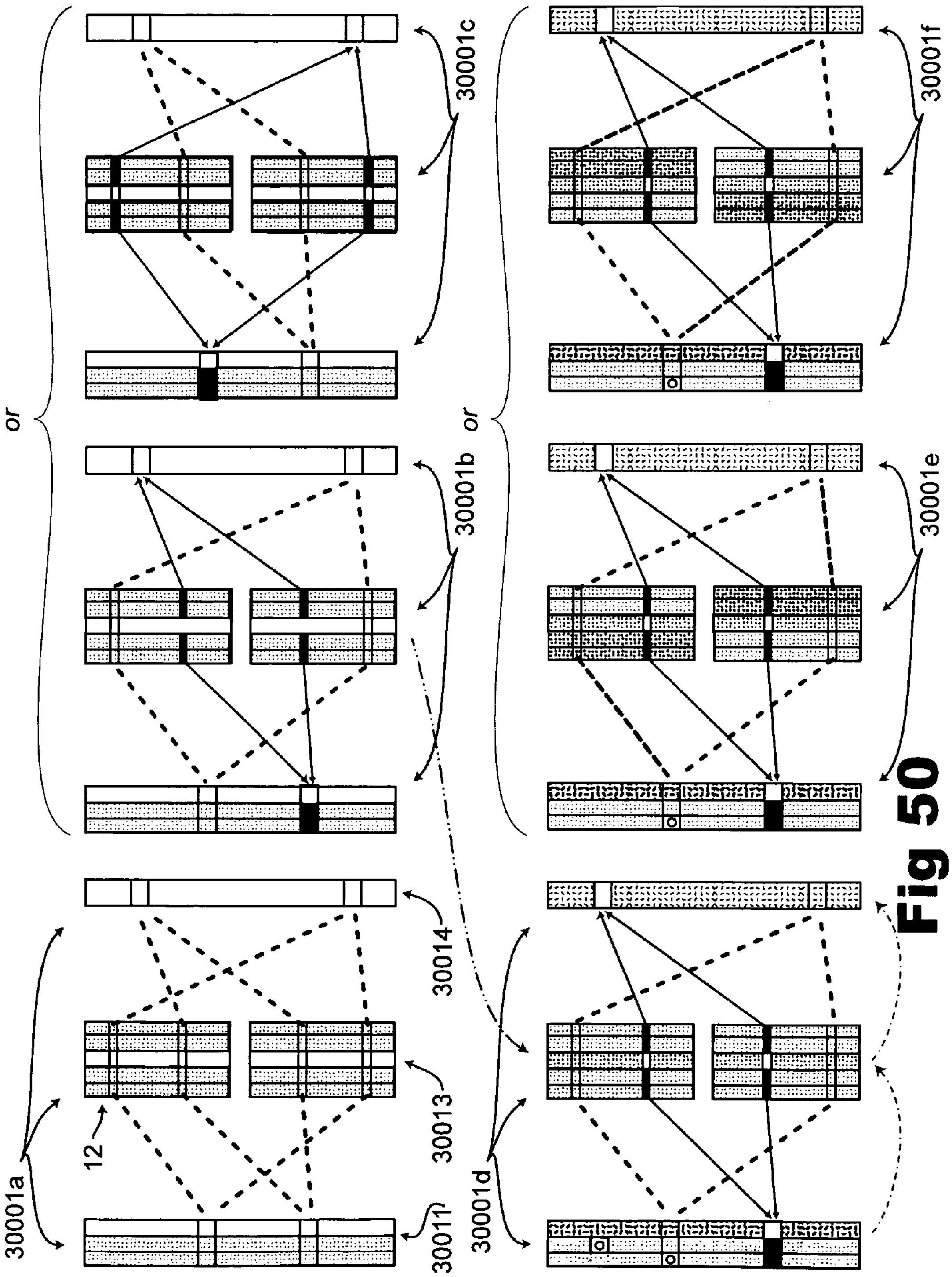

FIG. 50 is a combination block, flow, data, and cryptographic protocol diagram of an exemplary embodiment of a mixing system in accordance with the teachings of the present invention.

Figure 51:
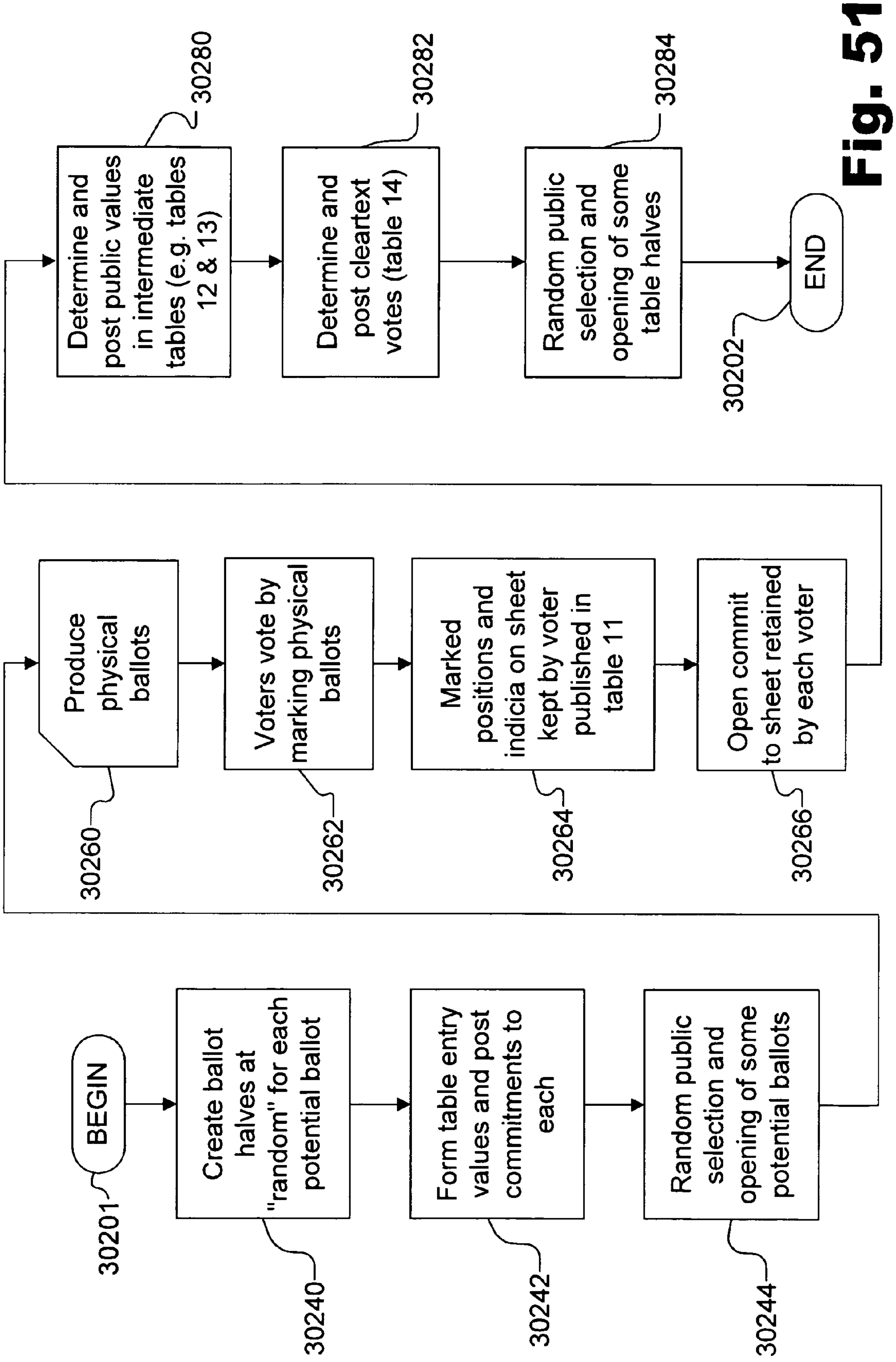

FIG. 51 is a combination block, flowchart, schematic, and protocol diagram of an exemplary embodiment of a mixing system in accordance with the teachings of the present invention.

FIG. 52 is a combination schematic and plan view of an exemplary embodiment of two-sheet combination ballot in accordance with the teachings of the present invention.

FIG. 53 is a combination schematic and plan view of an exemplary embodiment of three-sheet combination ballot in accordance with the teachings of the present invention.

Figure 54:
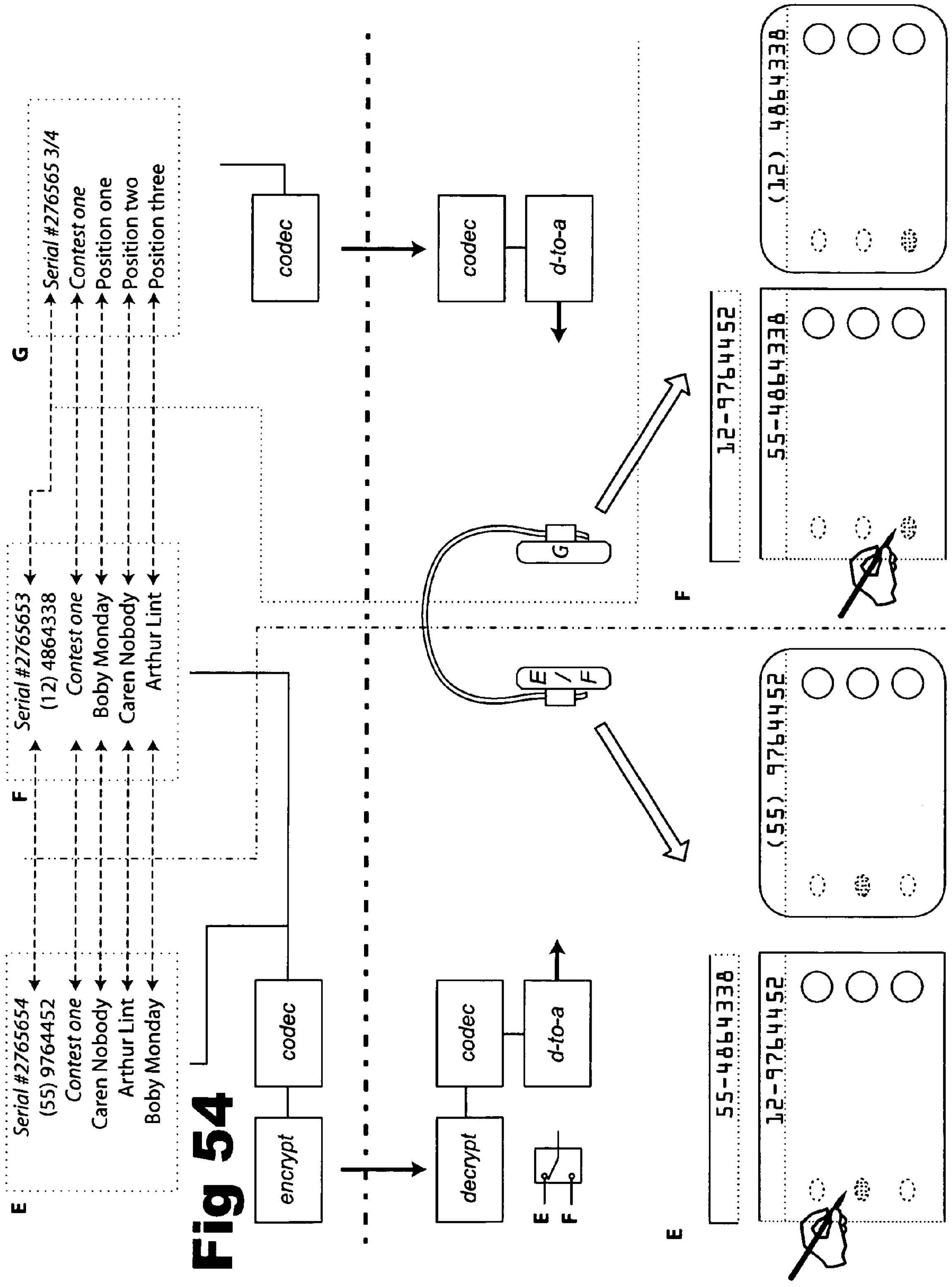

FIG. 54 is a combination block, flowchart, schematic, and protocol diagram of an exemplary embodiment of a combination disability friendly voting system in accordance with the teachings of the present invention.

Figure 55:
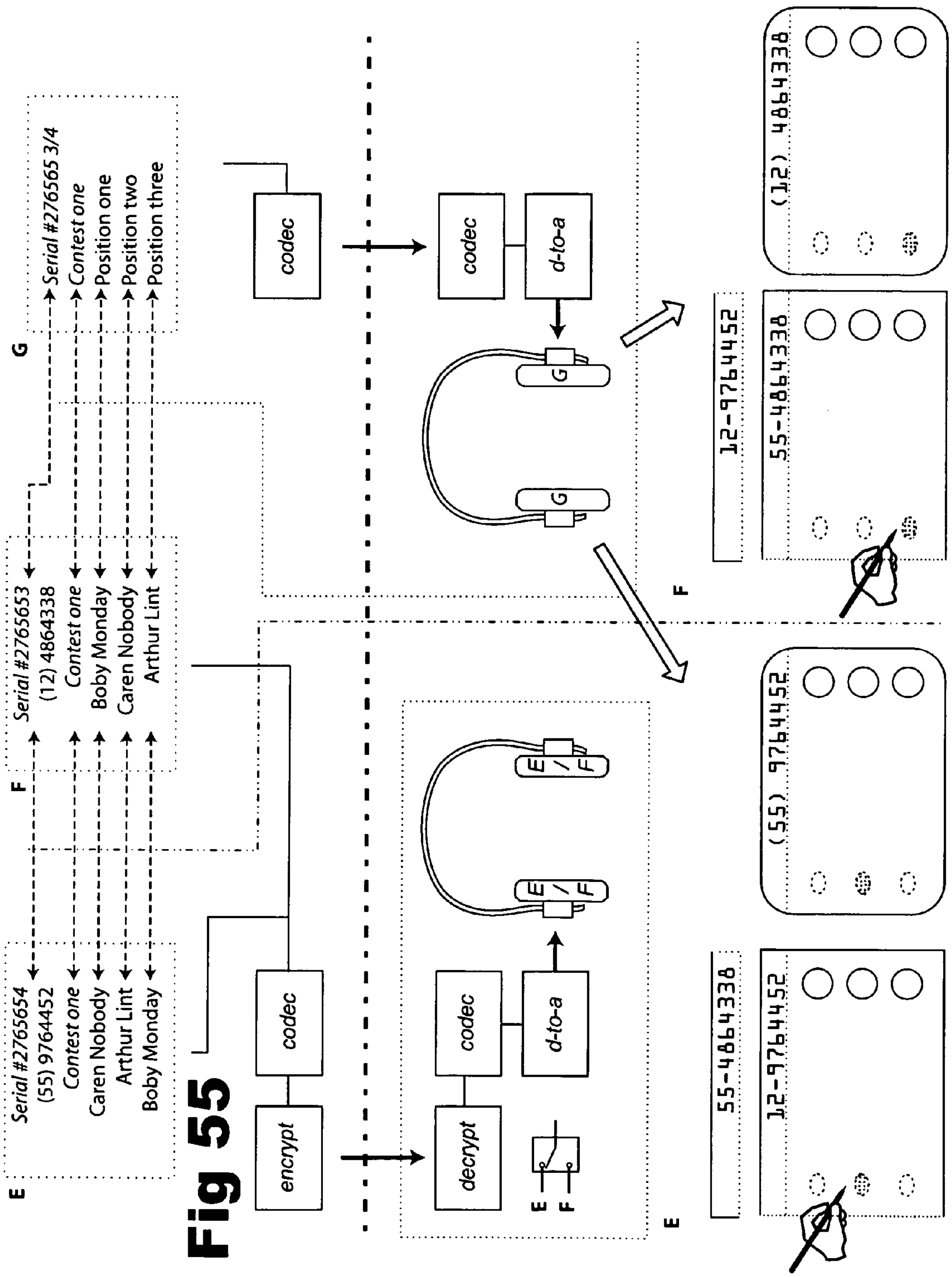

FIG. 55 is a combination block, flowchart, schematic, and protocol diagram of an exemplary embodiment of an untrusted-assistant combination disability friendly voting system in accordance with the teachings of the present invention.

Figure 56:
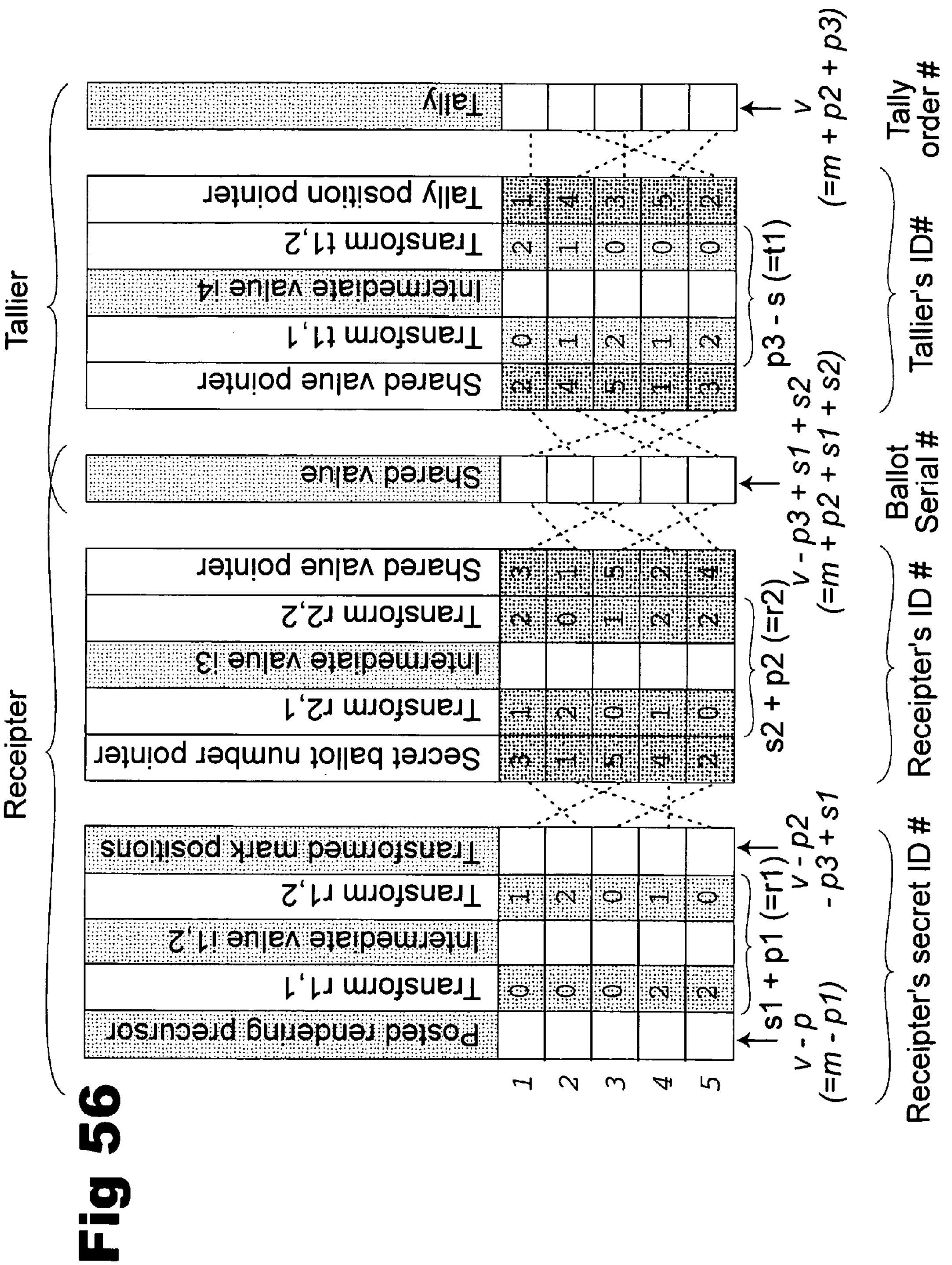

FIG. 56 is a combination block, flowchart, schematic, and protocol diagram of an exemplary embodiment of a two-party mixing system in accordance with the teachings of the present invention.

FIG. 57 is a combination schematic and plan view of an exemplary embodiment of a carbonless ballot form in accordance with the teachings of the present invention.

FIG. 58 is a combination schematic and plan view of an exemplary embodiment of a sticker palette and associated ballot form in accordance with the teachings of the present invention.

FIG. 59 is a combination schematic diagram and plan view of an exemplary embodiment of a ballot form including printing above scratch-off layers in accordance with the teachings of the present invention.

Figure 60:
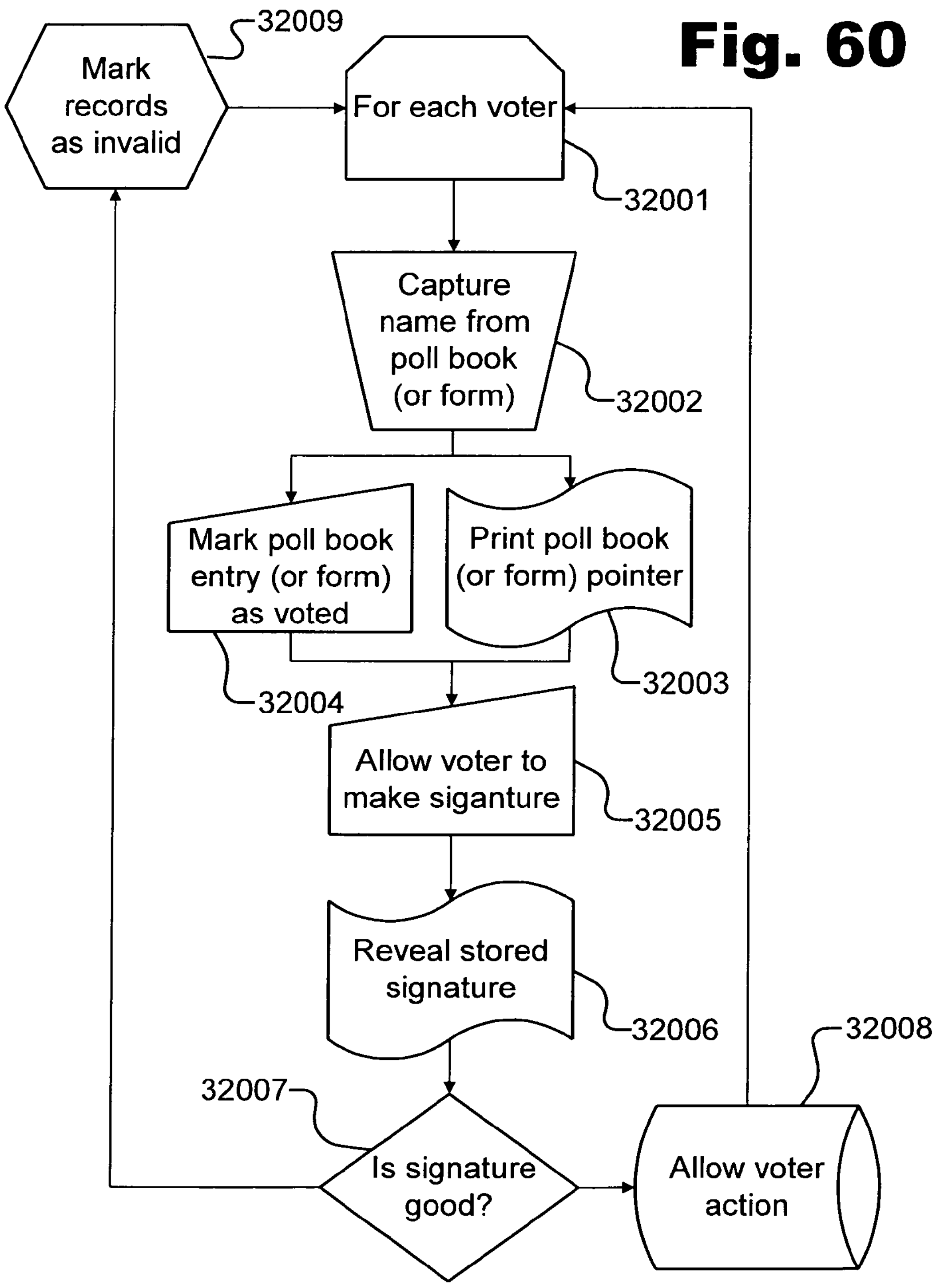

FIG. 60 is a combination block, flow, functional, schematic diagram, of an exemplary embodiment of a paper-based polling-place sign-in and forms in accordance with the teachings of the present invention.

FIG. 61 is a combination block, functional, schematic diagram, plan, and pictorial view of an exemplary embodiment of a partly automated paper-based polling-place sign-in and forms in accordance with the teachings of the present invention.

FIG. 62 is a combination block, functional, schematic diagram, plan, and pictorial view of an exemplary embodiment of a manual paper-based polling-place sign-in and forms in accordance with the teachings of the present invention.

Figure 63A:
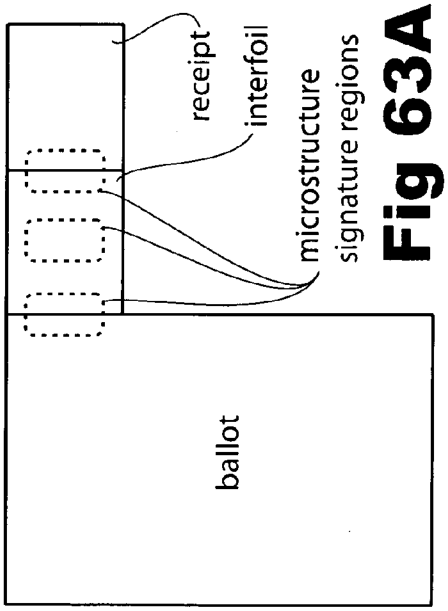

FIG. 63 is a combination schematic and plan view of an exemplary embodiment of an interfoil and counterfoil arrangement in accordance with the teachings of the present invention.

Figure 64A:
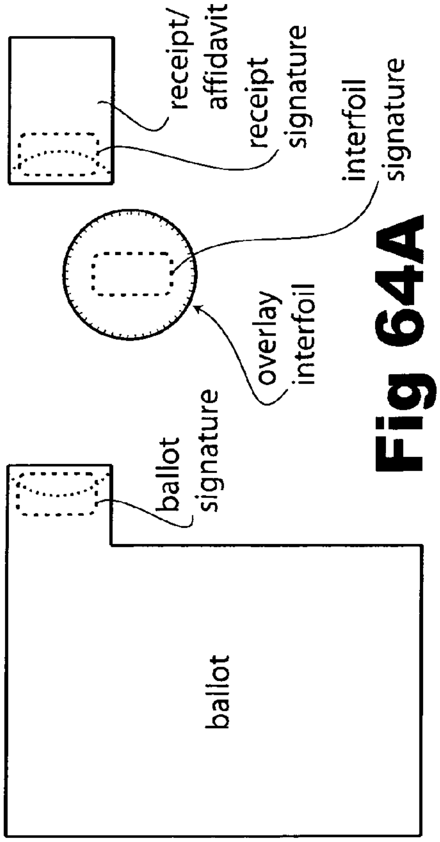

FIG. 64 is a combination schematic and plan view of an exemplary embodiment of a counterfoil overlay arrangement in accordance with the teachings of the present invention.

Figure 65A:
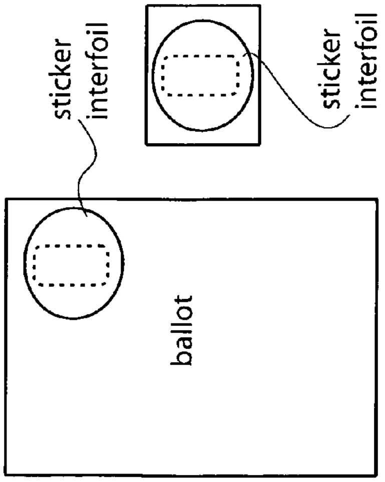

FIG. 65 is a combination schematic and plan view of an exemplary embodiment of a sticker interfoil arrangement in accordance with the teachings of the present invention.

FIG. 66 is a combination schematic and plan view of an exemplary embodiment of a split foil arrangement in accordance with the teachings of the present invention.

Figure 67:
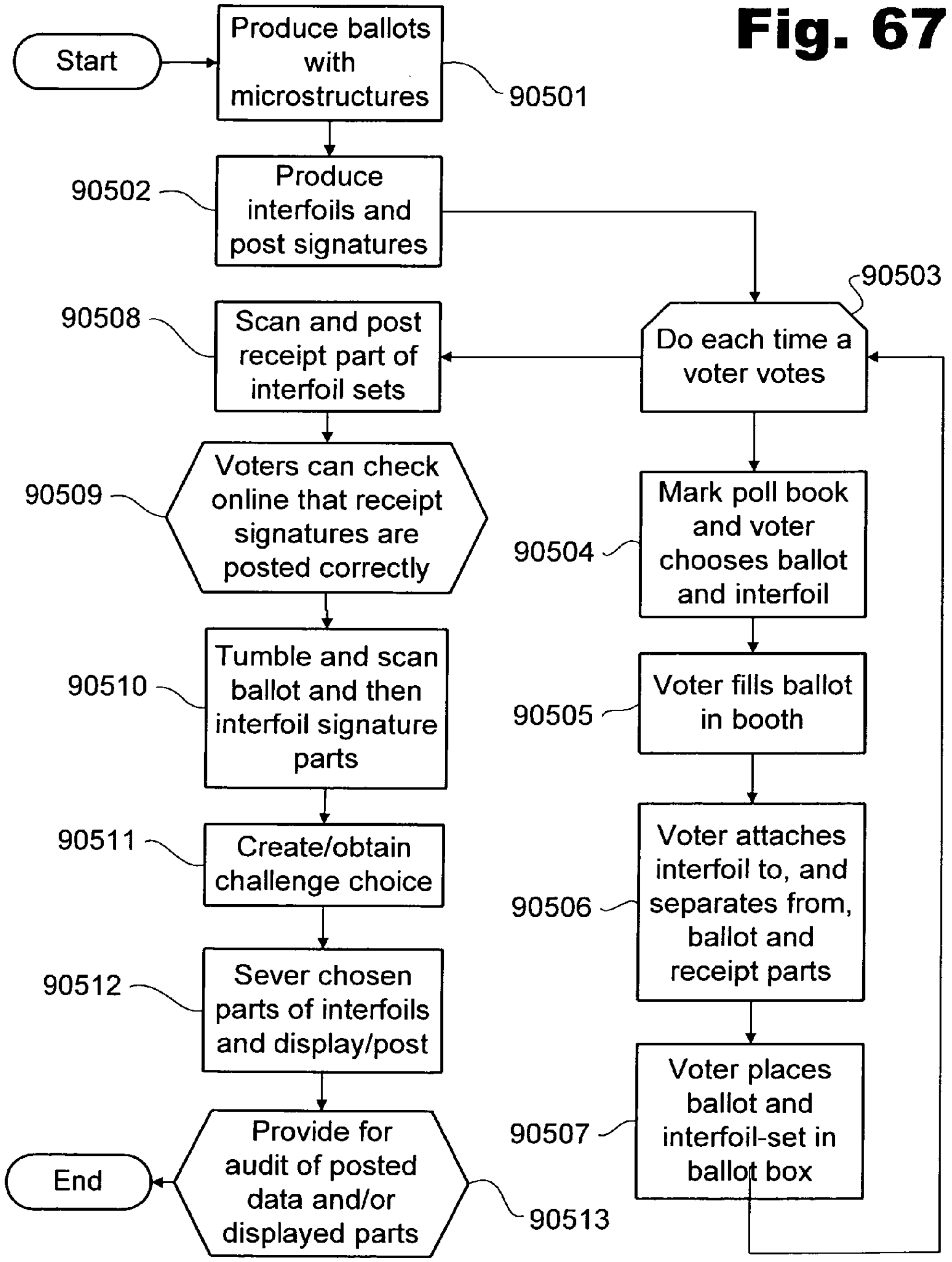

FIG. 67 is a detailed flow and block diagram related to an exemplary embodiment of a ballot with write-in in accordance with the teachings of the present invention.

FIG. 68 is a plan and schematic view of an exemplary embodiment of a ballot with write-in in accordance with the teachings of the present invention.

Figure 69:
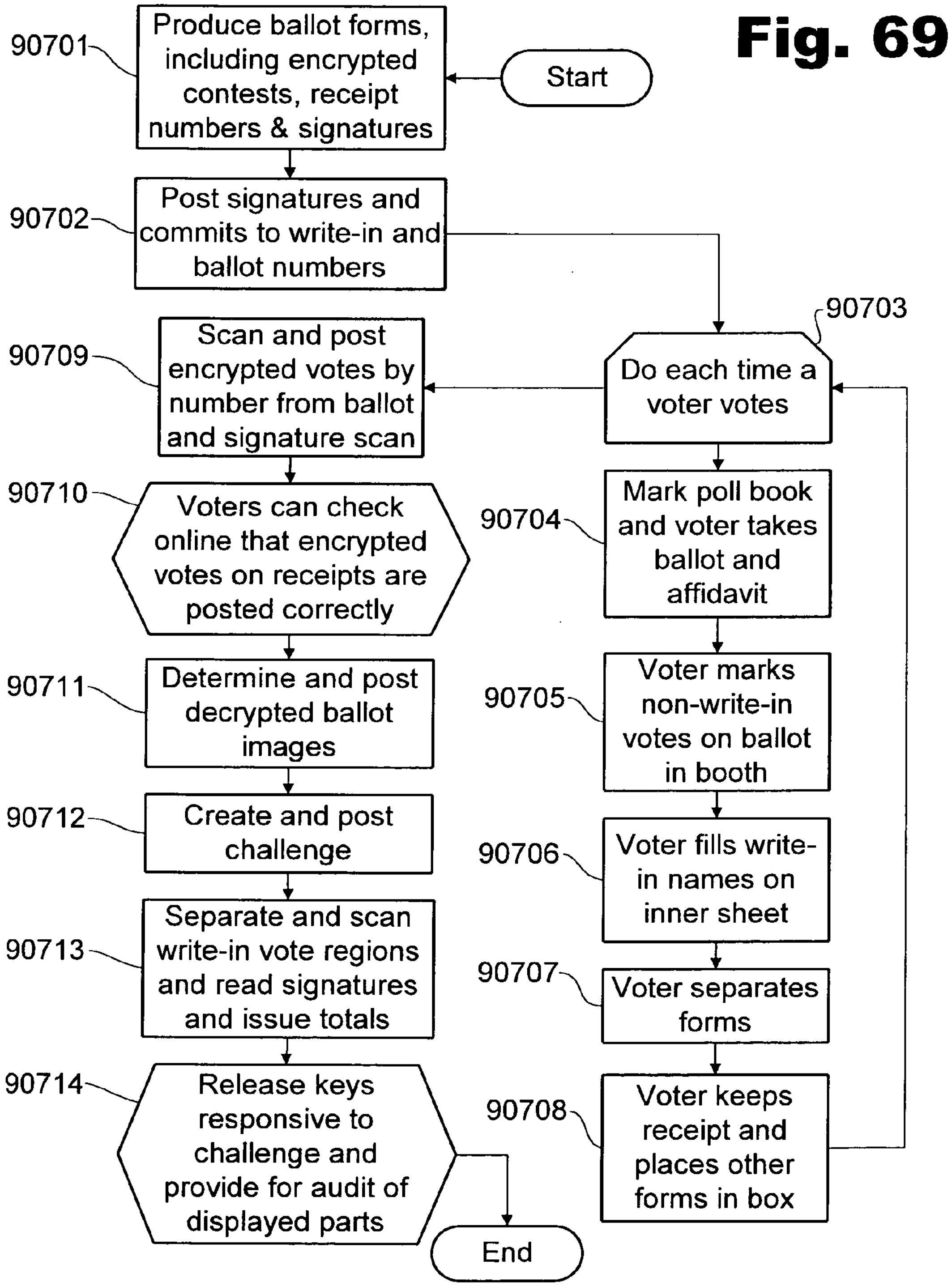

FIG. 69 is a detailed flow and block diagram related to an exemplary embodiment of a ballot with write-in in accordance with the teachings of the present invention.

FIG. 70 is a detailed plan and schematic diagram of an exemplary punchscan ballot with write-in in accordance with the teachings of the present invention.

FIG. 71 is a detailed plan and block diagram of an exemplary ballot with write-in in accordance with the teachings of the present invention.

BRIEF SUMMARY OF THE INVENTION

This section introduces some of the inventive concepts, in a way that will readily be appreciated through making significant simplifications and omissions for clarity and should not be taken to limit their scope in any way; the next section presents a more general view.

Disclosed are voting systems based on paper ballots that provide integrity of the election outcome through the novel use of encrypted votes and other techniques.

In one aspect, forms are disclosed that allow encrypted votes to be me marked and audited by voters and tallied by those running the election subject to public audit. One example form type is comprised of two substantially overlaid layers, with holes in the upper layer exposing indicia printed on the upper surface of the lower layer. Symbols are substantially randomly associated, per ballot, with candidates on the top layer and placed in substantially random hole positions on the bottom layer. Voters find the symbol next to the candidates of their choice on the lower layer and mark both around and through that corresponding hole.

Another example form type is a carbonless form with cooperating surfaces facing each other. Substantially random positions of candidates are printed on the top layer. Voters fill ovals next to the candidate of their choice on the top layer and the mark is transferred, with special identical so-called self-contained carbonless coatings, to the bottom of that layer and substantially equally to the top of the lower layer, which serves as a receipt. The top sheet is a conventionally-marked and humanly-readable cleartext ballot, and when it is scanned full duplex, the marks on the receipt layer are substantially verified as matching.

Yet another example form type uses techniques somewhat related to known adhesive-label voting, but adapted to encrypted votes so that the choice of which sticker corresponds to which vote is hidden after it is voted, because the association of sticker symbols to candidates is made by indicia printed where the label is adhered to the ballot when voted. The release-coated pallet from which stickers are chosen by the voters servers as a receipt because it is missing the symbols/stickers that encode the votes, but which missing symbol corresponds with which vote is hidden. Again, voters are able to audit other unused positions/ballots to ensure the correspondence of the printing to committed/posted data.

Still another example uses techniques somewhat related to known scratch-off voting, but adapted to encrypted votes. In particular, voters remove a region of latex that has the mapping between other regions and votes on it, in order to reveal a first part of a code. Then the voter removes the latex from the region indicated by the destroyed indicia to obtain another part of the code. The physical form optionally is maintained by the voter, while the codes are transmitted by the voter to the election system. Commits to the codes are opened, revealing that they are authentic and locking in the encrypted vote that is also receipted by the pattern of removed latex. Again, voters are able to audit other unused positions/ballots to ensure the correspondence of the printing to committed/posted data.

In other aspects, voters with various disabilities are provided facilities allowing them to readily vote with systems such as those just described. In one example, a blind voter hears through headphones how to mark the particular ballot by utterance of candidate names associated with tactile positions. What is heard is committed to in advance, optionally in parts, and the voter is able to select some such commits to be opened for audit. Voters who can read but not mark can communicate what are in effect “encrypted marking instructions” to an assistant, and these are preferably also recorded. Voters who can hear but not mark signal an assistant where to mark based on an audio selected from pre-committed audio that is subject to audit. Assistants in some examples mark actual ballot parts as a voter would, or where this would reveal the vote to the assistant, through privacy shields or using generic forms.

In still other aspects, simplified cryptography for realizing these systems is also presented. Known encrypted vote systems us public key cryptography, typically to form so-called mix cascades. Such sophisticated cryptography has proven to be a barrier to adoption of encrypted vote systems and other cryptography-based voting based on them. The present application discloses novel techniques that allow the complex cryptography to be replaced by basic encryption of data for which keys are held and potentially revealed during audit.

In yet other aspects, a related system for establishing, in a significantly voter-verifiable manner, the number of encrypted votes that should be included in the election, an integrated poll book, sign-in device, and affidavit function is disclosed. The handwritten signatures made by a substantial but limited number of immediately previous voters are visible to the voter signing in. Signatures on record are revealed for side-by-side comparison, only once the voter signature has been completed. Linking signatures to traditional poll-book and/or affidavits is provided by numbers and/or stickers.

In still further aspects, write-in vote integrity (as well as other ballot and system integrity) is achieved using physical authentication of paper. Microstructure associated with special numbers on ballots is photographed and committed to. Voters, as today, both mark a write-in position and then write-in a candidate in a related space provided. By opening the commits including to unused forms and others similar to those used for vote tabulation itself described above, audit of write-in votes is provided for.

An example application for attendance voting is as follows: The voter first makes a selection of candidates, for instance by substantially known techniques, such as marking a form and scanning it in or by using a man-machine interface such as a touchscreen. A "ballot form" is then generated and printed that unambiguously shows the voter's choices. The voter can review the printed form and, if it is acceptable, proceed to cast the ballot. (If not acceptable, it can be spoilt and all or part of the process repeated). A part of the ballot form is selected preferably at least randomly by the voter (and preferably in a way, such as by tossing a coin, that prevents the voter from being able to cause certain outcomes). The non-selected part is destroyed (or retained in whole or part by the polling place). Authentication of the selected part is provided, such as by special paper, printing, ink, attachments, digital signature and/or posting on a network by the voting authorities. The selected part of the form is then physically released to the voter, who can take it out of the polling place and allow anyone to verify it and its authentication.

The ballot form is preferably arranged so that, no matter which of the two the voter chooses, it does not reveal the vote. One example way to achieve the desired property with a two-part ballot is that a first part contains the index of the voted candidate in the second part and the second part contains the candidates listed in an apparently randomly rotated order. Thus, the first part alone reveals nothing about who was voted for, since the indices it contains are in effect "randomized" by the cyclic shift of candidate names on the second part. And, the second part alone reveals nothing about who was voted for, because the amount of shift should be random and independent of the choice.

The link between the ballots and the tabulation process is the coded vote, which is printed on the ballot form in such a way that it (or at least a part of it) is included on every half that is released to a voter. It remains to convince the voter that (at least with reasonable probability) this coded vote is formed correctly from the actual vote. There are three steps. First, before the voting, certain secret numbers are committed to by publishing them in encrypted form. Second, when the voter has a printed ballot form that is acceptable, a preferably random choice is made of which part is released to the voter and which is shredded, as already described. Third, depending on which part is released, different information about the commits is made public and/or otherwise authenticated and can be readily checked for consistency with the released part of the form. Since the randomly-selected part satisfies the consistency check, the voter knows that there is at least a fifty-fifty chance that the coded vote is correctly formed.

(As is well known in the field of cryptography, a value is committed to by in effect encrypting it and publishing/printing the encrypted form. To "open" the "commit," the key used to form the encryption is revealed and anyone can verify the value committed to. A type of commit preferred here can be opened to reveal a single value, because mathematically there is only one key that can open it and in only one way.)

An example will now be presented of what is committed to and what is revealed when the different ballot parts are released. A single contest and particular ballot number are considered for clarity. The rotation amount and the shift amount are each values that are committed to separately. The rotation amount is what is added to the actual vote to form the coded vote. The shift amount is the amount by which the candidate names are cyclically shifted when printed. If the ballot part comprised of the shifted candidate names is released, then the commitment to the shift amount is opened and it is checked that this value correctly determines the order in which the candidate names are printed. If the ballot part with the index of the candidate is released, then no commitment is opened, but the difference between the two is (commitment schemes allowing differences between commitments to be opened are well known). This difference is checked for equality with the difference between the index and the coded vote.

As will be appreciated, if both of these checks were to be made, then the coded vote would, it is believed, have been shown to be correct. (Checking both, however, would entail revealing the vote.) Even though only one check is made, it would detect an incorrect coded vote with probability at least 50%. And since the choices of which halves are revealed are preferably independent, it is believed that the probability that n coded votes in an election could be incorrect is less than $2^{l/n}$. For instance, this means that 10 undetected incorrect coded votes in total could be present only with probability less than a tenth of a percent and 20 with probability less than one in a million.

Other embodiments encode votes graphically, for example, treating each pixel of each letter of a candidate name separately. The pixels of one half ballot can be combined with those of the other half by superimposing the two halves and viewing the light transmitted through the sandwiched combination. A kind of "exclusive-or" combining can be achieved by known and substantially improved novel techniques. For example, effective media and printing techniques are disclosed as well as the use of metamer filters that eliminate background speckle and substantially increase image clarity. By committing to some of the pixels on one half and some on the other, in such a way that letters are determined by either half, and opening all the commits of bits of the half removed, no separate encrypted value is needed. Moreover, allowing each half to be divided into parts substantially in the same random way, and releasing different parts from different halves, the probability of a substantially improper ballot yielding a proper half is significantly reduced.

The keys used in the commits can be obtained from (or made known to) plural trustees, in such a way that they cannot count the coded votes until they all (or some agreed subset) cooperate in so doing and also that no subset (possibly below an agreed threshold) will be able to link votes tallied with the individual ballots. Information can be retained and/or destroyed by the parties to limit or allow reconstruction of data in various scenarios.

GENERAL DESCRIPTION

Some example systems disclosed have symmetry allowing the ballot to be divided in two after it is marked and the voter to keep either part as a receipt. Other example systems develop a cleartext readable ballot and encrypted vote receipt as a result of a voter marking selected candidates with a single mark. Other examples produce an encrypted receipt and an encrypted vote, where the encrypted vote is preferably sent in for counting and the receipt retained by the voter. Still other systems turn a ballot into an encrypted receipt that bears authentication codes that can be used to vote remotely. The first two are particularly well suited to attendance voting, as well as mail in. The third is believed attractive primarily for mail-in voting as it does not require special tools to mark and produces an encrypted ballot. The fourth is well suited to remote voting where a physical ballot is not returned by the voter.

Extensions relate to some or all the example systems. The underlying cryptography can be achieved without using any primitive other than basic commitment, such as encryption with a key that is later revealed when/if the commit is to be opened. Voting by the blind and those who have difficulty making marks is achieved for the first two mentioned systems, which are attractive for attendance voting. Write-in capability for attendance and remote voting systems is achieved in a way applicable to all the systems.

Check-in systems for attendance voting sessions are also disclosed with novel voter verifiable integrity and that relate to the encrypted vote attendance systems described.

In one aspect, as will be appreciated, disclosed here is a voting system with audio presentation of voting options, at least two different audio channels potentially played to a voter, where each voter is able to take for verification and without compromising privacy at least a copy of at least one of the channels and the choice of which channel the voter will take is substantially unpredictable to the system and the channel contents substantially previously committed to.

In another aspect, disclosed is a voting system with at least one potential confidential presentation to a voter, related to at least a commitment to at least one such potential confidential communication, and where the voter communicates signals to an assistant to indicate where the assistant is to make marks and at least one potentially confidential presentation is auditable without compromising voter privacy.

In still another aspect, disclosed is an encrypted vote system based on cryptography comprising substantially only commitments to values, where it is verifiable to the public based on accepted random challenges that encrypted votes result in the cleartext tally with substantial probability but substantially not which ballot corresponds to what contribution to the cleartext tally.

In yet another aspect, disclosed is a voting system in which receipts substantially authenticated by at least some parties conducting the election include substantially a code that allows an online version of the form submitted by the voter to be viewed in the correct way but where different codes would correspond to different choices being viewed.

In a further aspect, disclosed is voting system in which at least two parties each have substantially separate secrets needed to determine the correspondence between ballot forms and results and said two parties are involved in printing.

In a still further aspect, disclosed is a paper ballot system in which provision is made for a voter to remove a substantially self-adhesive element from one part of at least a related form and apply at least a part of the element to at least a part of at least a related form and where: (a) the vote is hidden in the resulting combination from view by the public having access to completed unvoted forms; or (b) voters being supplied substantially more than one part per choice and opening substantially previously committed values to substantiate that at least some of the parts supplied have corresponding indicia; (c) commits are made to parts of the information on the form, some of which are selected for opening during audit; or (d) establishing based on audit that the tally substantially reflects the votes cast.

In a yet further aspect, disclosed is a voting system with choice determined by indicia destroyed to reveal coded votes including: establishing based on audit that the tally substantially reflects the votes cast; or voters being supplied substantially more than one part per choice and opening substantially previously committed values to substantiate that at least some of the parts supplied have corresponding indicia; or establishing based on audit that the tally substantially reflects the votes cast.

In a yet still further aspect disclosed is a polling-place sign-in system that exposes a substantially fixed number of chronologically preceding sign-ins to the next voter signing in.

In a still yet further aspect disclosed is committed form substantially microstructure region signatures of forms and later selectively opening at least some of said commitments.

In one aspect, as will be appreciated, what is disclosed here is a method for conducting an election including at least two voters and at least one election official entity, the improvement comprising the steps of: allowing at least one of said voters to make a voting decision between at least one of plural votes; providing each of said voters with a composite receipt that at least encodes in a substantially recognizable way said election decision between said at least one of said plural votes of the voter; allowing each of said voters to select a portion of said composite receipt to keep, the portion of the composite receipt kept substantially obscuring at least said election decision of the voter; processing by said at least one election official entity of information contained substantially in said receipt portions kept by said at least two voters to produce results of said election; and proving by said at least one election official entity substantially to at least one other entity that said information contained in said receipt portions kept by said voters was properly included in said results of said election. Also, the election method just described optionally including said at least one election official entity committing to a batch of said receipt portions kept by said voters. Further, the election method just described optionally including providing a substantially unique identifier for at least said receipt portions kept and allowing any valid said receipt portion kept that has been omitted from said batch to be determined to have been so omitted. Also the election method just described optionally, wherein said identifier including a public key digital signature related to said receipt portion kept. Additionally, the method first described including said receipt portion kept containing a form of said voting decision information encoded in a substantially encrypted representation. Furthermore the method just described wherein said encoding having been formed using a pubic key of at least said at least one election official party. Additionally, the method first described including providing, at least with substantial probability, that an improperly formed said composite receipt would either be recognizable to a voter as having inconsistent shared information or would be recognized as improperly formed if it were the portion kept by the voter. Further, the method first described wherein said at least one election official party processing said batch to obtain said election results in a way that is substantially verifiable by substantially any interested party. Also the election method just described, including said convincing even if said election official entity had unlimited computing resources. Additionally, the method first described wherein said processing performed by plural election official entities such that secrets in the custody of more than one of the election official entities are substantially keys used to decrypt and determine the correspondence between said receipt portions kept by said voters and said votes chosen by said voters.

In another aspect, as will be appreciated, what is disclosed here is a form having at least two parts, comprising: at least one voter choice encoded on each of two of said at least two parts, said voter choice readily recognizable by a voter when the voter is in possession of both of the two parts; said voter choice substantially unrecognizable to the public in either of said two parts when either part is viewed separately; at least some shared information encoded on each of two of said at least two parts, said shared information on a first of the two parts readily recognizable by a voter as substantially related in content to said shared information on a second of the two parts; and at least some uniquely identifying information encoded on at least two of said at least two parts of said form. Also, where the previously described form is at least partly transmissive of light and allowing the voter to substantially readily view the voter choice when plural said parts are layered on top of each other. Furthermore, the previously described form allowing the voter to substantially readily view the voter choice when two of said parts are positioned side by side. Additionally, the previously described form including shared information and the remaining information contained in two of said at least two parts such that an improperly formed part would be revealed as such, provided said voter checks that the shared information is properly shared, at least for some choice of part by the voter.

In another aspect, as will be appreciated, what is disclosed here is apparatus for producing a form of at least two is parts, comprising: first coding and indicia producing means for producing on each of two of said at least two parts, said voter choice readily recognizable by a voter when in possession of both of the two parts, and for making said choice unrecognizable to the public from either of said two parts separately; and second coding and indicia producing means for making at least some shared information encoded on each of two of said at least two parts, the shared information on a first of the two parts readily recognizable by a voter as substantially related in content to said shared information on a second of the two parts. Also, the previously described apparatus including developing said form in an attached state so that it can be separated into parts after a voter has an opportunity to check said at least one choice. Furthermore, the previously described apparatus including developing said form in an detached state so that it can be assembled into a whole to allow the voter to check said at least one choice. Additionally, the previously described apparatus including developing said shared information in the same part of said form that is attached to a part of the form that the voter is allowed to keep for different choices of parts of the form to be taken by the voter. Also, the just described developing including producing registration between indicia on plural layers so that information encoded in the relationship between the indicia of the layers is readily viewed by the voter. Furthermore, the just described developing including means for forming a digital signature on a part of said form and the digital signature signing at least substantially at least an encoded version of the choice information on at least one part of said form.

A voting system in some examples has multiple physical "layers" that the voter is able to choose between, so that the voter preferably takes a subset of the layers as a kind of receipt and the other layers are retained and/or destroyed by the system. The actual vote is not readily revealed by the "voter" layers, those taken by the voter; the other layers, the "system" layers when combined with the voter layers, however, reveal the vote. For clarity, although any number of layers greater than one, any number of contests, and whatever ballot logic, as will be appreciated, can be used, a single 1 out of m contest and two layers will be primarily described here for clarity.

In some examples, for concreteness, what is printed on one layer can be thought of as an element in a finite group; and on the other layer an element of the same group; the vote itself would then be the result of applying the group operation to the two elements. For example, in a single binary contest, one layer contains a 1 or 0, the other also a 1 or 0, and the vote is the exclusive-OR of the two. In another example, one layer contains a cyclic rotation of a list of m candidates (or m−1 candidates and a no-vote option position) and the other layer a pointer to one of the m positions; when these two elements are combined by the group operation the result is the index in the standard rotation of the candidate voted for. In still other examples, each group element corresponds to a part of the vote. For instance, an element can correspond to a single choice in an n out of m contest, where the element indicates whether or not that item is selected and/or the order in which it is selected. In still other examples, a symbol representing an element appears adjacent to the vote candidate name on each of two lists; the selected candidate(s) are the ones where the two elements labeling it are equal. In yet another example, the "visual X-OR" of bits on one layer with those on another layer.

Each layer has a corresponding "commitment" value, that is preferably fixed by being physically instantiated, such as by printing or publishing, before the choice is known of which layer will be taken as the voter layer. In some exemplary embodiments the commitment value of a layer corresponds with an "onion" that will be used when that layer is the voter layer. The onion allows, in some example embodiments, a series of mix nodes or another multiparty arrangement or a single party to determine the value of the group element it encodes.

In some exemplary embodiments, the onion of each layer encodes the group element of the indicia of the opposite layer. In counting the votes in some such embodiments, the group element of the indicia of the voter layer is combined using the group operation with the element in the voter-layer onion, such as by the first mix node. Thus, the output of the series of mix nodes should be the vote and is the result of applying the group operation on two elements: the one in the onion of the voter layer and that of the indicia on the voter layer. This vote should be equal to what was seen by the voter: the group operation on the indicia of the system layer (as contained in the voter-layer onion) and the indicia of the voter layer.

The indicia for the system layer would, in these examples, preferably not be available along with the voter layer when it is to be verified and the vote is to be concealed. Nevertheless, the commitment for the system layer (which, in some examples, at least would be physically with the voter layer) can also be checked along with the voter layer, such as by being opened or re-constructed, to ensure that it is properly formed and that it commits to the indicia printed on the voter layer. Thus, each commit is believed to have a chance of half of being checked (when its layer is the system layer) and the choice of which will be verified is preferably made after the commits are fixed.

In some other exemplary embodiments, two further "compensation" elements are shared between the layers, both being printed across both layers and/or by other means preferably so that they are substantially verifiable as the same on both layers. One compensation element applies to each onion, with the correspondence between onions and compensation elements for example being known and fixed. The role that the element encoded in the onion played alone in processing in the preceding examples is replaced by the group element resulting from applying the group operation to the onion and its compensation element. When the voter layer is processed using its onion, the result of combining the compensation element for that onion and the indicia element is used instead of the indicia element alone. Thus, the output of the mix series would then be the group operation applied to three elements: that of the voter-layer onion, its compensation element, and the indicia on the voter layer. Verification of the voter layer preferably includes verification that when the voter-layer indicia element results from combining by the group operation the contents of the system-layer onion and the system-layer onion compensation element. One believed advantage of such embodiments with compensation elements is that they allow the onions to be able to be formed and committed to independently of the voter's vote, such as before votes are cast.

In some embodiments there is "shared data" that is preferably included in the voter layer, no matter which layer the voter chooses to take. One way to achieve shared data, already mentioned, is by indicia that overlaps a shear line separating the two parts, such as for instance using barcode bars that extend across all potential positions of the shear line. Another way to achieve shared data is to print it on both layers in such a way that it would preferably be obvious to voters if the two were not substantially the same, such as by a pattern that produces a solid field when combined but whose separate layer parts are each individually verifiable as properly formed. Yet another way is by having the layers overlap in part. For example, two vertical perforation lines allow the voter to take either the left or the right two-thirds of the form. Another exemplary way is to provide the shared data as at least part of a form not included among the two layers but that is supplied substantially along with them, in some cases as a self-adhesive label. Still another novel approach is to provide the shared commit after the voter has reviewed the layers but before the choice of layers is made. One technique that can be applied generally is breaking the effective shared data into parts, a first part is provided before the voter choice and the second part is provided afterwards, but in such a way that the first part substantially determines the second, such as by a cryptographic hash or the like.

In some embodiments the effect of shared data can be achieved by allowing choice. For instance, if a voter can choose between plural instantiations of what should be substantially the same shared data, such as at substantially the same point that the choice of layers is made, then it is believed that some attacks based on providing different shared data depending on the choice of layers are substantially thwarted, since the choice of which shared data will be used is outside the control of the attacker.

Dividing the secured processing and storage between system components is preferably accomplished according to a variety of factors, including local preferences, although some exemplary arrangements can be anticipated. For instance, the secret seeds values used to generate all the commits can be generated by the voting machine itself. This can be done on the fly, and even with so-called "forward secrecy," by signing new signing keys using old ones and destroying old secret key matter. Where the onions are not to be provided to voters but rather published in advance, they can still be generated by the individual voting machine. In systems, as other examples, where a second "check out" device is to provide keys allowing the commitments to be checked, it may obtain these from the voting machine itself, it may compute everything itself and supply the voting machine what it requires, or the two machines may cooperate in forming and releasing the various values. Various types of security modules, smart card, key guns, secure channels, pass phrases, random number generators, hash functions, digital signatures and so forth may be combined in various ways to provide security of handling secret values, as is known in the art. More generally, a variety of parties/devices may be involved in producing and in some cases re-constructing the various values used at various points in the system and arrangements may be such that various subsets of parties will be required to cooperate in various aspects.

In one exemplary system, a printer prints a receipt in two columns, each listing the names of candidates (or other items to be voted on). Each list is in a cyclically shifted order. Additionally, pointer indicia in each column point to the voted items in the other column. A web or sheet-fed printer can be used. One example embodiment allows the voter or a poll-worker to separate the layers, such as according to a pre-perforated line, and then process them manually—preferably scanning the user layer and shredding the system layer—and providing the voter with additional information that in effect provides a digital signature on the user layer and/or allows opening the commits on the system layer. In another example, after voter verification of the combined layers, a device captures part of the form and then allows the voter to choose between the layers. In some examples of this embodiment, the choice of the voter is by operating a mechanical device that causes the columns to be physically split: the column not to be taken is diverted to a shredder; the column to be taken leaves the device, preferably in a way that the voter can readily see that it has not been substituted or modified, such as being continuously visible through at least a window. Final information, such as keys unlocking signatures on the chosen layer, for instance, can be printed for the voter to take, by the apparatus at least once the choice is made but preferably once the chosen column has been fully scanned and verified. In some embodiments shared data is on a part of the from that is included no matter which of the two layers the voter selects.

In another exemplary system, a so-called "mark sense" style ballot form can be used, on which a voter is to fill-in or connect shapes, such as circles, ovals, squares, broken arrows, and so forth, such as those that are known. What the voter applies, typically visible indicia by pencil, pen, dauber, or whatever, preferably in combination with pre-printed indicia giving it meaning, will here be called a "mark." This form can in some examples be pre-printed and waiting for the voter or "demand printed" just as it is needed to be made available to a voter. Having marked the choices on the form, the voter provides it for processing by a device that scans it and returns it, preferably visibly without being able to substituted or modify it. Then two layers are printed on substantially transparent material. (In other exemplary embodiments, holes are punched in material so that they overlap or not.) These layers preferably are arranged one over the other and the combination is arranged over the ballot. The printing on the layers is such that, in some examples, there are two possibilities for each layer over each mark: when the combinations are the same on both layers, the mark is not selected; when the combinations differ on the layers, the mark is selected. For instance, each possibility for a layer can be a half circle/oval or other shape, such that only when different halves are selected on the different layers is a complete circling or enclosing of the mark visible to the voter. After reviewing the layers, the voter surrenders the ballot, so that it can optionally be retained for recount or audit purposes and/or destroyed at some point. Also, the voter chooses one layer to keep and the other is preferably destroyed in a way readily witnessed by the voter. One example way to achieve this processing is a scanner that re-scans the ballot and the one layer for shredding, and/or scans the voter layer for correctness before it prints any final keys preferably on the voter layer or on a self-adhesive part. The candidate/question names, possibly in abridged form, are preferably printed on the overlays and/or divided among them, for instance, providing audit of the names on the ballot styles.

Some embodiments may be suitable for use by the blind, some of whom read Braille, and a majority of whom do not. An audio ballot can be provided, such as the familiar "IVR" telephone systems, where prompts would be provided in the familiar style such as "Touch 1 for George Washington, 2 for Abraham Lincoln . . . " and so forth. Preferably after each contest is voted, a strip of embossed paper emerges. Pairs of symbols are printed for each candidate and the pairs are separated by horizontal lines. Scanning down the list, the voter can find the pair in which the symbols are identical, as mentioned above, and that is the position voted for. The lines provide that the compensation bits are verifiable by the voter as shared data, such as by the use of two readily distinguishable types of lines.

In some systems where the votes are visible because of the relationship between the two layers, such as by the visual XOR, the final output includes only half of the pixels. The present techniques allow each pixel to be treated as a bit as already described and thereby provides the entire set of pixels as the output.

Ballot Format

A ballot form can be arranged in a variety of ways to allow what will be called "splitting" or "stretching" into parts in accordance with the inventive concepts disclosed. One approach is physical separation of a single piece of paper into two or more parts, either with overlapping areas that go with the selected part or without overlap. Another can allow more selective destruction of information, such as by erasing, blotting out and/or changing visible indicia. Whatever way and media to render indicia for the voter may be suitable, but it preferably does not readily allow undetected changing while or after the voter makes the choice of which part to keep.

Whatever graphic devices may be used to allow the un-split ballot to indicate the voter choice. Indicia, positions, patterns, or whatever can indicate the choice by relying on information on the two or more parts. One kind of example uses unique indicia for each index on one part and substantially the same indicia for the names on the other part. Another example kind indicates a position within a graphic on one side and the corresponding name appears in that position within a similar graphic on the other side.

Various supplemental information can be included. The political party or the like of candidates can, for example, be listed with them and even as an alternate choice without a candidate. Also offices or ballot questions can, for example, be appear along with explanatory text.

Overlay Ballots

Another example approach to ballot format is to consider each vote to be composed of a collection of smaller elements, such as for example the pixels comprising symbolic indicia representing the vote. For clarity, rectangular arrays of square, binary-valued pixels will be used in the examples. (Pixels can, however, be of any number of values and of any shape and/or arrangement, including a honeycomb packing of round pixels; moreover, various kinds of "segmented" display of text are also known and could be applied.) Techniques know as "visual cryptography" were proposed by Naor and Shamir in 1995 and received subsequent attention in the academic literature. They were concerned primarily with splitting information across two copies. The present invention can utilize some of the optical combining techniques proposed for visual cryptography but also discloses substantially improved techniques for this.

Recovery From Lost Data

If the electronic version of the vote cast were to be lost, in some examples, the votes cast could be reconstructed by anyone using both ballot halves. It may be desired in some applications to allow the vote to be re-constructed from either collection of ballot halves, being of mixed types; for instance, those ballot halves held by voters.

It may be desired in some applications that the choice of a voter is not revealed by either half alone, even to the trustees at least up to some point. This can be provided by, for example, local precinct equipment that creates the same random "change" in both halves in such a way that the choice is unchanged. For instance, increasing the values used on both sides of a contest by the same amount (e.g., increase the index on one side by a number and then further cycling shifting the candidates on the other side by that same number of positions). In the case when the trustees are to sign the ballot half, the precinct computer can prove to the trustees that the correct perturbation value previously committed to was applied. At a later point, in one example, everything can be opened to the trustees by the precinct equipment. Or, in another example, the precinct equipment can at a later point also prove to the trustees (or the public) the correctness of the coded tallies for the precinct per office. These partially aggregated values can, in some examples, then be further aggregated by the trustees.

Serial Numbers

The notion of a "ballot serial number" used in the included application, "Physical and Digital Secret Ballot Systems," can be applied to some examples in accordance with the present invention. In particular, the serial number of a ballot can be used by the trustees and other entities to manage the data and can be printed on both halves. More specifically, the serial number printed would preferably, in some exemplary embodiments, contain redundancy to make guessing by voters difficult, thereby preventing false printed ballot halves from being able to be prepared in advance. Furthermore, barcode printing of ballot numbers can allow for efficient and economical machine reading (also by machines not capable of reading more confidential information). Yet further, running each of the bars of a linear barcode from one ballot part to the other illustrates ways to allow voters to immediately see that both halves contain the same serial number. And still further, serial numbers in some examples are printed on the back of the forms, or on parts of the forms that are revealed through windows when properly folded and/or contained in a cassette, so that scanning can be conducted without having to reveal confidential data.

Multiparty Protocols

As would be appreciated, the protocols disclosed in the abovementioned application titled "Physical and Digital Secret Ballot Systems," can be adapted and applied in some example applications of some of the present inventive concepts. In particular, that application uses terms "shift amounts" and "public position" (for instance, in the description of FIG. 13, page 31, line 18, of the PCT publication). When these two values are added (or in some embodiments subtracted, but in the appropriate group such as modulo the number of effective candidates) the result determines the candidate. One example way to apply these techniques to the present invention is that the shift amount determines the shifting of the candidate ordering and the public position is the position within that ordering of the selected candidate. Both values would be used to compute the ballot form to be provided to the voter; however, the tally cannot be computed until the trustees agree to compute it, and when they do they would preserve the secrecy of the linking between ballots and candidates voted. The individual trustee "contributions" to the shift amount could be provided in encrypted form to the local device responsible for creating the image to be rendered (or, for efficiency in communication, seeds to generate ranges of them could be provided).

Ballot Styles

Plural so called "ballot styles" are used in many public elections. A definition for the present purposes is: ballots of different styles can differ in the choices that are available to the voter and/or in language/presentation; within a style these are both fixed.

Generally, there may be rules for which ballot styles or combinations voters are allowed to have and/or too choose between. Typically, in practice, a decision is made at the time of check in that determines the style, but a restriction on the options may suffice at this point and the final determination be made by the voter deeper in the voting process. (One example of this would be styles that are equivalent except for the language that they are rendered in and another example would be where the choice of style can be decided by the voter up to the last minute.) It will be preferred in practice that the voter not be able to vote styles outside the allowed range of choices. One advantage of the systems disclosed here over known techniques is believed to be that, while the style a voter can use may be fixed, it can appear in a coded form in the register and not be know to those doing check in. Also, the voter can choose between a range. And, the voter should preferably also be unable to have the wrong style accepted in checkout.

What is sometimes called "non-geographic," "state-wide," or "county-wide" voting can call for many ballot styles to be available at each precinct location. Also, systems may be desired that are able to operate when precincts are offline during voting. Since the number of candidates per office can vary according to ballot style, if pre-defined shift amounts are used, compatibility of modulus may be an issue. One example way, as will be appreciated, to provide for this is that the greatest common multiple of the moduli anticipated would be used and then reduced to the appropriate range as needed. Another way would be to have lists of the various sized moduli and use the entries up sequentially. In the case that seeds or the like are provided for local use, values with the needed ranges can be generated directly.

Whether the set of contests voted is to be revealed (all or in part) by the form taken by the voter can, depend on the application. By including a "no-vote" virtual candidate and printing all contests, nothing is revealed. (As will be appreciated, such a "virtual candidate" need not be the same as an "abstain" type of virtual candidate provided for in some jurisdictions/contests.)

Process Control

Generally, a voter in attendance at a poling place enters a voting process by "checking in," where a decision is made to allow the voter to vote. The process ends for that voter at the instant when, usually after the voter's vote is "cast" or finalized, the voter "checks out" of the poling place. The number of "stations" or places that the voter visits in voting can be one, two, three or even more. In some systems, stations can also be re-visited in exceptional circumstances and/or the same station can serve multiple functions and routinely be visited more than once.

An example single station system is a so called "kiosk," where the voter provides information establishing the right to vote and then votes on the same machine, typically in a public place such as a shopping or transportation center. In a typical example two-station system, the voter checks in at a first station and is given some sort of permission or authorization to go to a second station, such as a so called DRE machine, to cast a vote. The typical three stage example comprises check in during which a blank form is provided, filling out of the form in a booth, and checkout by turning in the filled form, such as in traditional paper ballot or so-called "optical scan" systems. Schemes where voters must move forward through a series of stations are known in which poll workers simply have to ensure that nobody goes backwards.

In some cases a single station can be used for two or more functions, such as for check in and checkout. Sometime the basic functions of a station are spread across multiple poll workers at a single desk, such as check in comprising a first poll worker making a lookup on a roster and then a second poll worker providing a ballot. When a mistake is made by a voter and the voter wishes to spoil a ballot, for instance, the voter can return to a check in desk and exchange the spoilt ballot for a fresh one.

There are also, as mentioned already, various scenarios for cheating by voters allowing improper influence of votes during the voting process: the authorization the voter has to vote can be given to others, the voter's freedom in voting can be constrained, or evidence of how the voter voted can be provided to others. Examples of transferring the authorization to vote include the voter giving to another person a code, token, or form that allows that person to vote instead of a voter abandoning a voting machine in a state that allows it to be voted by, someone else. Examples of constraints are those in which a voter is supplied an already filled form or nearly voted machine and is to complete the casting of the vote, possibly while at least the time taken is under observation. Examples of providing evidence include showing a form while transporting it or exchanging filled forms at an intermediate point with someone else.

Single station systems are attractive when fully automated. Manually staffed check in suggests at least two stations. Three station systems, where the check in and checkout are manually staffed offer advantages, including the ability of poll workers to interact with voters outside the booths but still control the flow; however, they do admit more possibilities for the right to vote or votes themselves to be disassociated with voters or to be observed by others. Two or more stations can be configured to provide a kind of privacy resulting from an unlinking of the check in with the voting, though linking can still be provided in some examples by ballot styles and possibly to a very limited extent by timing.

Consider a two stage system. The voter takes with him from the first station to the second, for example, nothing special, some information carrier, or an active device. When nothing is taken, the ballot style requirements can be communicated by other means, such as a network connection between the two stations. When information is taken, such as by a code printed on a piece of paper that the voter enters on the second station or a passive ID tag, the information can determine the ballot style. In either of these two cases, if the voter is to be kept from voting a second machine, or for a second time, by the information, then it should presumably identify the voter instance and then could also be used for linking as mentioned. An active device, by contrast, can provide authorization for voting, and also for a particular range of styles, without providing further identification. An example novel technique for accomplishing this is where the active device engages in authenticated communication sessions first with the first station and then with the second station, accepting the vote authorization and ballot style information from one and providing it to the other. By suitable state transitions, such as between "authorized," entered when a transaction with the first station is consummated, and "not authorized," entered once a transaction with the second station is consummated, the authorization will not be transferred more than once. Furthermore, plural active devices can use the same keys, and thus under some assumptions be indistinguishable to the various stations, thus removing the source of linking.

Physical embodiments of active tokens can comprise many forms and include various communication means, such as those known as contact or contactless and provide for proximity detection. One preferred form is a large object. This allows easy observation of the movements of the object and its physical association with the voter. To enhance this effect, each object would preferably be substantially visibly different, such as being of a substantially unique color, texture, pattern, graphic, and/or shape. The object would preferably also serve as a ballot form carrier and filled ballots should preferably be contained within a carrier at least during transport by the voter between stations. Furthermore, in some embodiments the carrier can selectively expose parts of the form that are needed at checkout and also allow the separation of parts of the form without requiring removal of all parts from the carrier.

Another example preferred in some applications is a "wrist band," something resembling a wristwatch that contains an active device. Preferably, the band would be configured to detect the removal of the band and change the behavior of the device as a consequence. For instance, cutting or opening the band would break a signal path and the device would then cease functioning until reset by suitable authenticated communication. So called "quick release" style of wristwatch strap, in at least some variations of the known art, allows closing at plural size positions to fit a range of voters.

As in other embodiments, the objects could be "recycled," that is turned in at checkout and then brought back for issue at check in, either by poll workers or because the two stations are located in close proximity. In this way, presumably the number of tokens needed would not be substantially greater than the number of stations.

Two stage systems can be more susceptible to vandalism and voters leaving frustrated or otherwise without fully voting. Traditional paper ballot systems are three-stage. The known approach of a poll worker taking the voter to a booth has the disadvantage that the poll worker may conceivably linger or otherwise influence part of the voting process, although the voter may be able to change this part once the poll worker has left. Such escorted authorization can work for chains of stations is of length two; for longer chains, it becomes cumbersome and the issue of tracking the connection of visits is believed to require other techniques. Furthermore, it is believed that voter choice of which booth to enter is desirable in applications. Reasons may include increased sense of non-discrimination, safety and privacy. Also efficiency can be improved as there may the discrepancy between what is in fact open (or about to open up) and what the system considers to be open. Voters with various disabilities may wish to quietly choose the appropriate booth or weigh the options themselves. Moreover, less poll-worker time is needed.

Administrative control processes can improve security. One example is control over who is allowed to vote. For instance, in known systems, the number of names crossed off the roster may be less than the number of ballots in the box or counts on a DRE machine. Often there is no way to determine how this situation has occurred and, perhaps more importantly, no way to correct the situation without throwing out all the ballots, which generally is not done. Linking voters to ballot numbers in the present systems can solve this problem, because of the way the role of trustees in tabulation addresses privacy.

Familiar and easy to administer processes are also anticipated. For instance, a "ticket" can be issued to the voter at check in, used to enable the voting machine, and finally at least part of it becomes at least a part of the receipt. The ticket can be the paper stock on which ballots are printed, for instance. Spoilt ballots can require the corresponding ticket. A retained part or counterfoil of the ticket can, for example, then provide a traditional physical control for the checkout station.

Exit Devices

Checkout is a transaction that goes two ways: (1) the voter ideally gets a receipt or other proof that they did not run out with both halves and (2) the officials preferably get convincing evidence that the voter was crossed off the rolls and even that the voter really gave them the half and that they are not just voting permissions given voters that left without consummating a vote. Various ways to provide various aspects of it are also disclosed elsewhere here. An exit device or procedure can provide this transactional functionality.

An example embodiment "exit device" is one into which the voter inserts the two ballot parts, preferably still attached to one another. In some exemplary examples a random dice roll visible to the voter can be initiated; the result of which is used to determine which half to shred (and/or retain) and which half the voter gets back. (The result of the toss could also printed on at least the half that is returned, thereby providing other assurance that the signature is not one that could have been provided to others.) The signature is preferably obtained from the prover and printed on the form before it is returned. All or part of the exit device functions can be done manually as well.

Additionally, some exemplary embodiments implement the notion of a ticket (physical or "virtual" as in a wristwatch or other active token) which would preferably be read by the exit device as well. It is believed that many voters who would leave a ballot un-voted would not be inclined to actually give the ticket to a poll worker (especially if a virtual ticket had to be delivered in close temporal proximity to the casting of the ballot).

The associating of ballot numbers (or at least parts of them) with the voter entry on the roster, such as is believed to be done in some current practice, provides a way to identify ballots that are cast that are not associated with a voter and then to cancel them. The publication of lists of who voted helps deter abuse where voters would be falsely marked as having appeared.

Coin Flipping

Coin-flip values, used as the "random" value to determine which half is released to the voter, can be arrived at in various ways. In some examples a value is used that preferably cannot be readily manipulated by at least one party. In other examples, a trusted "oracle" can supply the bit. If the prover supplies it, it is believed that the recipient may be cheated. If the voter supplies it, it is believed that in some applications the recipient may be lazy and thus predictable and/or subject to collusion with the intermediary channel to give up the ability to see what the prover has sent. Accordingly, preferred, at least for some examples, is a system where a physical event is observable by the recipient and then authenticated to the prover.

Authentication Technologies

A range of techniques can be applied to "authenticate" the ballot information to the voter and others who may inspect it. One example is the ballot printing itself. Whatever document-security techniques can be employed, such as serial or other numbering, special papers inks and printing methods, and various inclusions/coatings such as holograms, ribbons and fibers. Scratch-off validation, described elsewhere can, as another example, be employed. Various digital signatures and other authenticators can be applied to the data on the document, as is known in the cryptographic art. The data can, in other examples, be posted electronically and various time-stamping and other known techniques applied to the posting. Further objects can be associated with the ballot, such as other pieces of paper, stickers, holograms, chips, and so forth. The binding of multiple objects can for example be by serial number, physically attaching them, and/or by their information content.

Scratch-Off

So called "scratch-off" printing technology can be employed advantageously in a variety of ways. One example use of scratch-off is for committed values. The pre-image of a one-way function commit can be printed under latex; when it has not been scratched away, the secret is substantially hidden. One example use of this approach is with a ticket or ballot form. Once voted, the half to be retained is checked (manually and/or automatically) to verify that it has not been read and the other half is released to the voter. One advantage of this approach is believed to be that the retained parts can be audited/verified later to ensure that the hidden data was not released, since it could be used to invade privacy or in coercion schemes. Another advantage of the approach, for some applications, is that local computer security need not be relied upon to protect these secrets, even in offline operation. Flexibility in what secret is revealed can, for example, be obtained by a second number released, such as being printed next to the scratch-off, that is combined (such as, for example, by X-OR) with the hidden number to reveal what is in effect the secret value.

Another example use of scratch-off is to provide some kind of authentication to the voter or other checking parties. Indicia are printed at the polling place, such as after voting, that can be checked for agreement afterwards with what is below the latex. Some example related techniques have been previously disclosed in the previously mentioned "Physical and digital secret ballot systems."

Still a further example use of scratch-off is to provide some protection against improper spoiling of ballots. In one example approach, not requiring latex, information from both ballot parts is required to send in the spoil request. In another, information required for the spoil request is at least under latex. If the information required for spoil requests in divided among the two parts, then shredding one part provides assurance to the voter that the precinct should be unable to spoil the ballot once it is committed to. Another way to lock against improper spoiling is that information needed for this is printed on top of latex and the latex is scratched off by the voter once it is determined that the ballot is not to be spoilt.

Destruction

In general, shredding or retaining a piece of paper are not the only options. In other embodiments, "erasing" of printed data can be accomplished by abrading, overprinting, non-mechanical destruction of ink, and/or non-macro destruction of structure. For instance, printing over the information to be destroyed can be accomplished, particularly by using optical reading, such as is known in the printer art, to ensure alignment. As another example, ink remover and/or combinations of various hiding overprint patterns can be used. Also, substrate etching or destroying solvents or activators could be applied and/or heating and/or pressure. Imaged data can be "retained" electronically, photographically, and so forth.

Proof Systems

Various aspects of voting proof systems include what is committed to in advance of the election or vote as well as what is released to the voter and/or published. Commitments in advance of the election are believed to offer advantages, such as for instance, that potential controversy has time to be resolved, it relatively easy for the voter to know that they are made before the choice, and also commits can be stored offline for use by offline checkers. Whatever can be released to the voter, it is believed, in an example can also be published and vice versa, since it will all potentially become public. Checking of the consistency of such published data can, it is believed, be done most efficiently on a wholesale basis and by anyone for all voters. The posting or at least inclusion in the tally of the coded vote may not be effectively verified, it is believed, by the voter at the time of coin-flip; but, such verification can at least to some extent be made wholesale or audited based on polling-place records and/or by data obtained by checkers positioned outside polling places. The numbers held by individuals provides it is believed definite verification, but may not be checked by a large proportion of voters due to such things as laziness and complacency. Nevertheless, the less that is known about which voter is likely to check, the harder it would be to cheat voters without a substantial chance of being detected.

An example technique, suitable for a wide range of applications, in simplified introductory form, is as follows: An "assertion" or statement is divided or "stretched" into two parts. Taken separately, each is ambiguous without the other as far as what assertion or statement is made by the combination; taken together, the parts constitute a complete, unambiguous, statement or assertion. (As an example, consider a half statement like "if this number, 343423, is added to the number in the other half statement the result is my public key".) Both half statements are provided, such as by the prover to the recipient and/or vice-versa and/or by other parties. This "providing" can be without authentication and even with plausible deniability or by whatever means so that it cannot substantially be verified or authenticated by third parties. Then a "coin flip" is conducted at least in a way that the prover cannot substantially manipulate the outcome toward a chosen value. If the toss outcome is heads, then the first part would be "acknowledged" by the prover and if tails, the second part would be "acknowledged". The "acknowledged" part is authenticated by the prover and provided to the recipient and/or published, and could preferably be verified by the recipient and/or others. As will be appreciated, and unlike some systems, the acknowledged part does not authenticate or even reveal the assertion itself. In addition to the acknowledged part itself, proofs of various properties of it and its relation to committed values can be provided, and they need not reveal the assertion either.

In one example, the above defined terminology can be mapped to an example of the inventive election techniques as follows: The term "receipt composite" designates the information provided to a voter; the term "receipt portion kept" designates the portion of the receipt composite retained by the voter and/or acknowledged by the prover; and an example assertion is whether or not the "voting decision between at least one of plural votes" is the vote encoded in the receipt portion kept. In a physical instantiation for elections, the receipt composite is the form(s) provided to the voter for checking in the booth and the receipt portion kept is the part of the forms that the voter is allowed to retain. As will be appreciated by those of skill in the art, substantially all the disclosures made elsewhere here in the context of physical forms can be interpreted as having an analog that is an informational protocol, and such protocol versions should be considered disclosed as well, even though a physical embodiment is presented for clarity.

A number of example generalizations will now be presented: The number of parts that the assertion/statement is stretched into can also be more than two. The assertion can be decomposable into plural sub-assertions, each an independent coded version of what should be the same information, such as a vote. The random value can determine which of the sub-assertions is of interest, such as which encoded vote is processed along with possibly other parts of the assertion in forming the tally of the election. The random value can be chosen by the verifier and/or by verifiers; the prover can also participate, but not exclusively (otherwise the proofs it is believed would be unconvincing). Commits by the prover can be in advance of the whole process when the prover is free to choose the stretch; commits by the prover unable to manipulate the stretch would be after the stretch or the prover could contribute non-committed values to the stretch. Intermediaries can provide the stretch to the verifier. Intermediaries can alter the stretch and also the random choice on its way through the parties. The stretched value need not be fully authenticated, so long as the parts proved are; the whole combination can be convincing to the verifier even if some fraction of the stretched values (such as substantially less than 50% in the two part case) are not properly returned in an authenticated form. There are many variations of commitments, coding schemes, and checking possibilities, such as that the same coded vote can be verified by multiple independent ballot forms to increase the confidence in its correctness or that a single commit can contain the values used to shift or code a set of contests on a ballot.

As an example, consider a system presented in two "phases," a "voting" phase followed by a "tally" phase. First consider the voting phase, which is comprised of a number instances. Each instance is in up to 6 successive steps: (1) the prospective "voter" supplies a "ballot image" B; (2) the system responds by providing two initial 4-tuples: $<{}^{z}L, q, {}^{t}D, {}^{b}D>$, each printed on a separate "layer," the "top" layer with z=t and the "bottom" with z=b; (3) the voter verifies, using the optical properties of the printing, that ${}^{t}R \oplus {}^{b}W = {}^{t}B$ and ${}^{b}R \oplus {}^{t}W = {}^{b}B$ as well as that the last three components of the 4-tuple are identical on both layers; (4) the voter either aborts (and is assumed to do so if the optical verification fails) or "selects" the top layer x=t or the bottom layer x=b; (5) the system makes two digital signatures and provides them in a 2-tuple$<{}^{x}s(q), {}^{x}o({}^{x}L, q, {}^{t}D, {}^{b}D, {}^{x}s(q)>$; and (6) the voter or a designate "checks" that (a) the digital signatures of the 2-tuple verify, using the proper public keys of the system, with the unsigned version of the corresponding values of the selected 4-tuple as printed on the selected layer and (b) that ${}^{x}D$, and the half of the elements of ${}^{x}L$ that should be, are correctly determined by ${}^{x}s(q)$.

More particularly, the relations between the elements of the 4-tuples and the 2-tuple are defined as follows. The m by n binary matrices ${}^{z}L$ are determined by the "red" bits ${}^{z}R$ and "white" bits ${}^{z}W$(both m by n/2, n even), in a way that depends on whether z=t or z=b: ${}^{t}L_{i,2j-(i \bmod 2)} = {}^{t}R_{i,j}$, ${}^{t}L_{i,2j-(i+1 \bmod 2)} = {}^{t}W_{i,j}$, $L^{b}_{i,2j-(i+1 \bmod 2)} = {}^{b}R_{i,j}$, ${}^{b}L_{i,2j-(i \bmod 2)} = {}^{b}W_{i,j}$, where $1 \leqq i \leqq m$ and $1 \leqq j \leqq n/2$. The red bits are determined by the ballot image and the white bits of the opposite layer: ${}^{x}R \oplus {}^{y}W = {}^{x}B$. The white bits are themselves determined (as is checked in the sixth step above) by the cryptographic pseudo-random sequence function h (which outputs binary sequences of length mn/2) as follows: ${}^{z}W_{i,j} = ({}^{z}d_{k} \oplus {}^{z}d_{k-1} \oplus \ldots \oplus {}^{z}d_{1})_{(mj-m)+i}$, where ${}^{y}d_{i} = h({}^{y}s(q), i)$. The "dolls" are also formed (and checked in step 6) from the ${}^{z}d_{l}$ using the public key encryption functions $e_{l}$ whose inverse is known to one of the trustees (as will be described): ${}^{z}D_{l} = e_{l}({}^{z}d_{l} \ldots e_{2}({}^{z}d_{2}, (e_{1}({}^{z}d_{1}))$, where $1 \leqq l \leqq k$ and for convenience ${}^{z}D = {}^{z}D_{k}$.

Now consider the tally phase, which takes its input batch from the outputs of an agreed subset of voting instances that reached step 6. For each such instance, only half of ${}^{x}L$ and all of ${}^{y}D$ are included in the tally input batch, comprised of "pairs" ${}^{x}B_{k} = {}^{x}R$, ${}^{y}D = {}^{y}D_{k}$, that can be written here as $B_{k}$, $D_{k}$. Each such pair transformed, through a series of k mix operations (as described in "Untraceable Electronic Mail, Return Addresses, and Digital Pseudonyrns," D. Chaum, *Communications of the ACM,* vol. 24 no. 2, February, 1981) into a corresponding ballot image ${}^{z}B$. The l'th mix transforms each pair $B_{l}$, $D_{l}$ in its input batch into a corresponding $B_{l-1}$, $D_{l-1}$ pair in its lexicographically-ordered output batch, by first decrypting $D_{l}$ using its secret decryption key corresponding to $e_{l}$, extracting $d_{l}$ from the resulting plaintext, and then applying $B_{l-1} = d_{l} \oplus B_{l}$. The k'th mix performs the same operation on each pair, but since ${}^{z}B_{0} = {}^{z}B$ and $D_{0}$ is empty, the result may be written as B.

The k mixes are partitioned into contiguous sequences of four among a set of k/4 trustees, where k is divisible by 4. The input batch size is, for simplicity, also assumed divisible by 4. After all the mixing is done, half the tuples in each batch are selected for "opening". A random public draw, such as is used for lotto, allows these choices to be assumed independent and uniformly distributed. The tuples selected for opening depend on the order within each trustee's four mixes: in the first mix, half of all tuples are chosen; in the second, all those not pointed to by those opened in the first mix are opened; in the third, opened are half those pointed to by those opened in the second mix and half that are not; and for the fourth mix, as with the second, those tuples not pointed to by the previous mix are opened.

Printing Technologies

System in which the relationship of images on layers of documents allow voters to check their votes are an example application of novel printing techniques that can also be applicable to other applications. Light used in viewing these documents differs at each of plural pixel locations, depending on the relationship of the images positioned at the same pixel location opposite each other on the two surfaces. It is believed generally that preferred, though not necessarily all acceptable, results are obtained with at least a substantially transparent upper layer (the layer closer to the viewer). If a diffusing lower layer is used, then the image should preferably be on its upper surface (the surface closer to the viewer).

Various pigments, dies or whatever techniques are employed to alter the optical properties of the layers, referred to here as "printing," are typically applied to the surfaces of the layers. One layer can be pre-printed and a second demand printed; both layers can be demand printed; one layer can be both pre-printed and demand printed; or both layers can be pre-printed and demand printed. A pre-printing can, in another example, be a layer that is separate from the other two. (A layer that is both pre-printed and demand printed would typically, it is believed, be pre-printed with registration and/or framing, to be described later.)

The distance between the printed surfaces can cause undesirable effects related to viewing angle. Framing by an optical blocking, in one example resembling graph paper, can be printed on one or both layers. The angle of view that is prevented from mixing one region on one layer with a region adjacent to the opposite region can be increased by widening the framing. Framing on both layers is believed to double the effectiveness of framing only a single layer with the same frame width. Registration error between framing layers or between framing and regions is believed to diminish the worst-case effectiveness of the framing.

More specifically, some of these exemplary aspects of duplex optical ballot systems include what will be called: “angle of view”, “angle of degraded view”, and “error angle”. Much as with today’s LCD display panels or the like, the range of angles over which the user can see a good image is of interest; however, since ballots contain private information, the widest possible angle may not be desired. The angles over which users can see the correct image without substantial degradation will here be called the angle of view. The remaining angles over which the image can be seen, though in substantially degraded form, will be called angle of degraded view. (Differences in side-to-side, up-down, and other three-dimensional differences will be ignored here for clarity.) There are also angles in some embodiments through which substantial light can pass through non-opposite pixels; such angles are here called error angles. These various angles apply primarily when there is a substantial distance between the two faces and their effect is related to the relative size of pixels and gap.

One example technique for such printing disclosed is the lamination of the two halves and printing both front and back at substantially the same time. This approach greatly reduces the difficulty of registering the two halves for viewing, allowing smaller pixel sizes and more satisfactory operation. Lamination in some embodiments is accomplished in advance, using easily separable adhesive/cohesive, though all or part of it can also be accomplished as a part of the demand duplex printing operation in other embodiments. Some embodiments arrange the printing operations for both sides close together to provide a kind of automatic registration. Other example embodiments use sensors and control systems to obtain alignment, either against pre-printed marks or mutual alignment of the demand printing on opposite sides (such as disclosed for web printing in U.S. Pat. No. 6,285,850 Van Weverberg, et al, Sep. 4, 2001).

One example technique disclosed comprises opposite pixels having different sizes and/or relatively opaque borders around at least one of two opposite pixels. As will be appreciated, if there are no borders and opposite pixels are the same size, then the viewing angle is very limited, degraded viewing starts almost immediately, and the error angle is coextensive with the degraded viewing angle. By, for instance, placing a black border of the same thickness around both pixels the error angle is improved with border width. If one of two opposite pixels is smaller than the other and surrounded with a black border, then it is believed that the viewing angle can be improved by increasing the border thickness. Such configurations are also believed to substantially begin degraded viewing at the error angle. Introducing a second narrower border is believed to increase the error angle beyond the degraded viewing angle.

Different lighting options are anticipated. When viewed with transmissive light, the light penetrates the lower layer and then the upper layer before reaching the eye. When viewed with reflected light, the reflector can be the substrate of the lower layer itself, such as paper, or the reflector can be below the lower layer. Reflected light viewing has the advantage of being the familiar way that documents are read and, in many settings, suitable lighting already exists. It also has the property that typically the unimpeded light passes through whatever printing twice: once on the way in from the top and once on the way back from the bottom. This it is believed allows printed indicia to have a lower transmissive optical density, closer to what is used for normal printing, than would be required to obtain the same effect with the transmissive lighting option.

If two transparent layers are used and a separate reflective layer imposed unevenly below them, shadows may be cast on the reflective layer that confuse the viewing of the images. When viewed backlit, laminated films it is believed can overcome the shadow effect.

Holding the two layers in a uniform relation is preferable for viewing. One example approach to achieve this, already mentioned, is that the layers be adhered together by a suitable bonding technique, referred to here as an “adhesive,” such as so-called fugitive or dry-peal and/or static electric or cling. If the adhesive is applied before the images are placed, then the registration of the images is believed to also remain substantially as applied. Another example approach is that the layers be pressed together by additional means, such as a substantially clear glass or plastic sheet. One way to accomplish the pressing is simply by the weight of the overlaying sheet. When the layers are pressed together, registration is preferably provided for at least the mutual relationship of the two layers. One example way to obtain registration is by use of positioning elements, such as alignment pins, registration pins, or sprockets. Another way to obtain registration is by having the two layers attached in at least two points. An example of such attachment is when the layer media is folded to form the two layers. The fold line preferably has a registration relation to the printing, such as by printing after it is folded, registering the printing to a pre-determined fold line or devices related to the same, or registering the fold line to the printing.

Another way to reduce the problem of undesirable degradation of images when viewing from oblique angles is by constraining the angle of view through additional means. Some example techniques use so-called “light control film,” which is in effect a micro-louver system in a relatively thin plastic sheet. Orienting two layers of light control film perpendicular to each other, but in parallel planes one on top of the other, creates a combined layer that light does not readily travel through at angles that are too oblique. Such biaxial light-control film can, in one example, be placed between the layers to be viewed and the backlighting source or reflective media. When the laminated layers of media are placed on, for example, a light table or light box that includes such a layer, the oblique angles of view have reduced light levels.

Demand printing in registration on two sides of a pre-laminated media can be accomplished with a double print station, one for each side. It can also be accomplished by a single print station which is brought into a positional relationship successively with one and then the other side of the media. One arrangement for this would be that a single so-called “swath” or row of printing by a movable printhead is placed on one surface and then the printhead is moved to position over the other surface and a swath is applied there. Multiple swaths are applied, with those on each layer being one directional or two directional, as is known in the art.

Another type of arrangement for repositioning the media with the opposite side facing the printhead is anticipated. In one example if this type, the leading edge of the media loops back while twisting it 180 degrees around the axis of motion; in another example, the media is twisted before re-inserting it into the exit end of the printhead mechanism. Two other examples do not twist the media. One brings the lead end of the media into the exit of the printhead assembly. A second, preferred, technique brings the tail end of the media back to the printhead but then takes it on an alternate path around the head and back to the original entrance. This last example has the advantage of no space consuming twisting and having an un-interrupted grip on the media, such as by pinch rollers just downstream of the printhead exit. These re-positioning single-printhead type of arrangements call for a "buffer" area where the media segment can be retained while the duplex operation is taking place. Such a buffer can also be re-used to store the media section until it is completed and can be released for the user to remove.

In a preferred embodiment, when the media is positioned for printing on the second surface, sensors are used to obtain suitable registration between the two printings. One kind of registration is in the direction of media travel. A second deals with skew of the media. Known so-called "calibration" is generally used to refer to determining the distance in positioning system movement between the printheads of different colors. One kind of calibration is relative between two printed patterns, one of each color. One or more interference patterns are created that allow a macro property to be measured to determine the alignment with substantial precision. For example, slightly different spacing of black lines compared to yellow lines that they are printed over produces some regions where much unprinted media is exposed and others where very little is: the position of the extreme values of these easily measured regions reveals the alignment.

The term "sense-distance" will refer to the positioning system movement between a feature as seen by a sensor and the feature as printed by the printhead. One way to perform calibration between color positions is be determining the sense-distance of each color and then calculating the distance between those. Sense-distance can be measured, in an example where a so-called "edge detector" is mounted along with the printhead, by determining the coordinates of the positioning system that maximize the edge detector output and the coordinates used to print the edge features that was detected. (The edge detector output can itself be calibrated so that it sees a leading and trailing edge at the same point, for example by scanning two such features printed with the same edge line, like one black rectangle touching one above it only just at the corner.) Another example way to determine sense distance is with a grating fixed to the sensor that can then, much as overprinted gratings already described, be used to determine a particular relationship to the printed indicia. Knowing the sense-distance, and measuring a feature previously printed on the other layer, allows the head to be positioned to print any desired distance (along the particular axis used) from that feature, at least in the direction of the sense-distance and assuming no skew.

Media may slip in the roller system and it may skew. One example way to compensate for these potential problems uses features printed on the first surface that are sensed while printing the second surface. Preferably the features would be at opposite sides of the media, so as to maximize the accuracy of measuring skew. Edge detectors can be used to determine the position along the direction of printing that the media is in relative to the printhead. Skew is recognized as the difference between such distance measurements taken at the two sides of the media. Special features can be printed or the known features of the pattern printed can be used.

One example way to deal with skew is to move the media as the printhead moves; another example way is simply to shift the image as printed, such as the row of an inkjet used for the bottom of the swath, in a linear way as the printhead moves. At the start of a swath, preferably each swath, the vertical position can be adjusted physically by moving the media so that it in a pre-arranged or normalized vertical position; such normalization can also be accomplished fully or in part by which elements of the printhead are considered to be the bottom most. If the skew compensation is by moving the media, then the normalized position can be the starting point; but if the skew compensation is by shifting the image pixels, then an offset from the normalized position is preferred if a constant swath width is desired.

Another exemplary approach to dealing with skew uses the full printhead swath width with the whole image digitally rotated to accommodate the skew. Such skew compensation can be adjusted from time to time and/or as needed in case slip causes changes in skew. It should be noted that backlash considerations would suggest that if the media is to be moved during printing of a swath, then the sensed position would preferably be measured in the same direction of motion as the compensation. By choosing the side skewed upwards to print from, the motion of the media can be kept in the forward direction. Another example approach is for the mechanical motion to remain the same, but for the sensor(s) to report during printing and for the digital image of the pixels to be printed to be adjusted so that the registration results. In such a mode, the sensors are believed preferably leading the printing position so that they allow compensation for upcoming positions.

DETAILED DESCRIPTION OF PREFERRED EMBODIMENTS

Detailed descriptions are presented here sufficient to allow those of skill in the art to use the exemplary preferred embodiments of the inventive concepts.

The application titled "Physical and Digital Secret Ballot Systems," PCT/US01/02883 filed 29 Jan. 2001, by the present applicant, is hereby included here in its entirety by reference.

Turning now to FIG. 1, seven example ways to split ballot information are shown. Each shows the two parts separated by a dotted line. It is believed that taken together the two parts determine the choice of candidate, but that either of them taken separately does not reveal anything about which candidate was chosen (as already described).

Figures 1A, 1B, 1C, 1D, 1E, 1F, 1G:
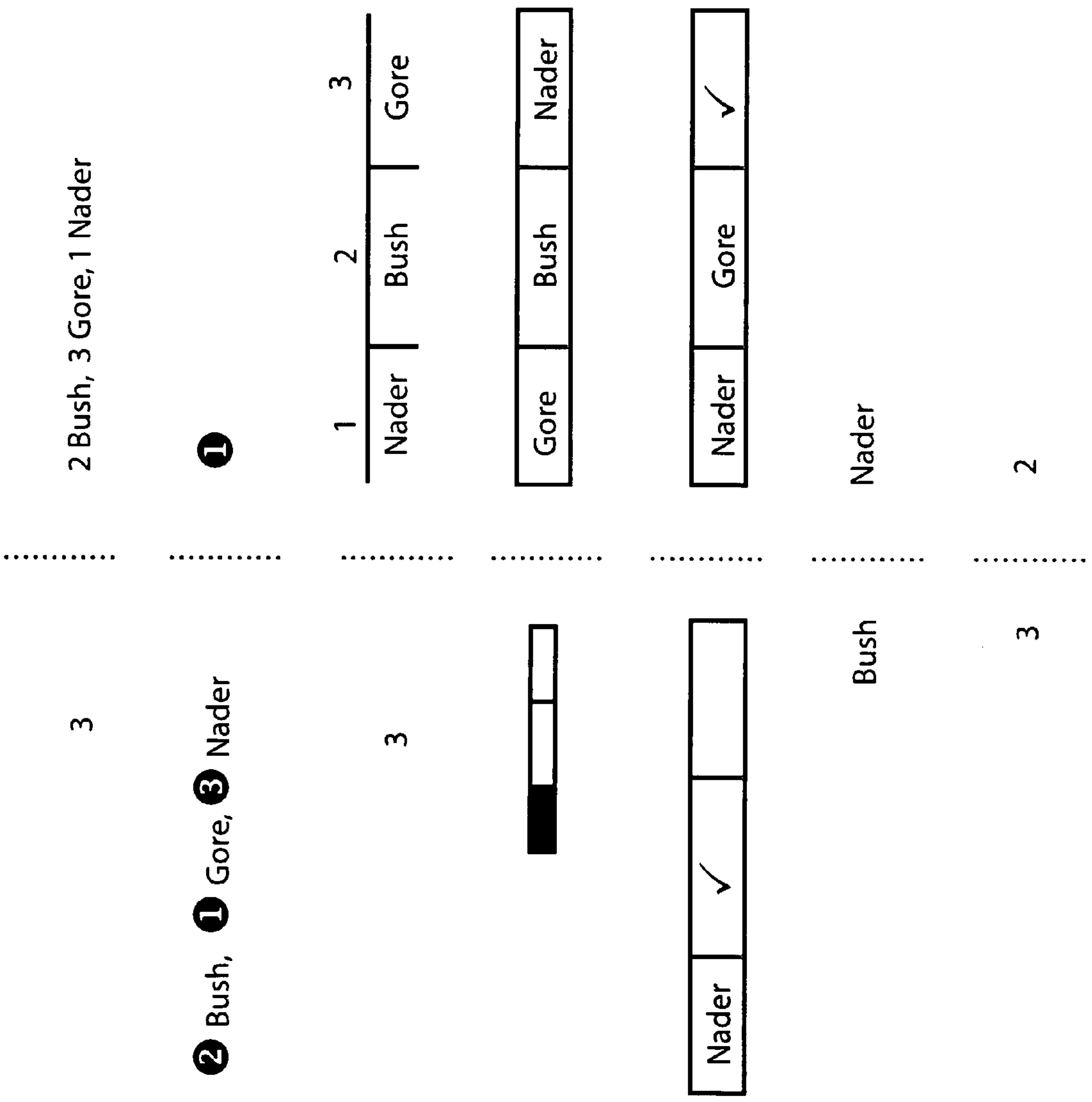

Referring to FIG. 1*a,* for instance, the value on the left is the label of the candidate in the list on the right. The list is in order, except that a random cyclic shift has been made in the ordering of the labels. Clearly "Bush" is the selected candidate, because the label on "Bush" matches the value on the left of the line. But knowing 3 alone, does not give any clue as to the candidate. Similarly, a randomly labeled list by itself also give not clue.

Referring to FIG. 1*b,* variations on the version of FIG. 1*a* are shown. The right and left sides are reversed, which would allow a piece of paper to be more evenly divided if done alternately for each contest or in sections of contests. Also special indicia are used as labels for extra readability and less ambiguity. Furthermore, a full random permutation of labels is shown, rather than a simple shift. As will be appreciated, however, such a permutation can be determined uniquely from a shift amount allowing for the factorial of the number of candidates.

Referring to FIG. 1*c,* on the left are columns of a table that are labeled in a standard way. The candidates have been arranged randomly in the columns. On the left is the column number of the chosen candidate Referring to FIG. 1*d,* a geometric pattern is duplicated on the two sides. The candidate names are associated with certain positions in the pattern on the right; on the left, one position is marked in a distinguished way.

Referring to FIG. 1*e,* room for preferably about half of the candidate names is provided in ordered locations on both sides. The idea is that one or more locations on a side would contain a selection symbol, shown as a check mark. When the same location on the opposite side of a check mark has a candidate name, that is the selected candidate; when the corresponding location opposite a check mark is empty, it does not select a candidate.

Referring to FIG. 1*f,* on the left is one candidate and on the right is one candidate. The rule is that if they differ, the one on the right is the selected candidate. This can be regarded as related to the game theoretic game, attributed to Von Neumann and Morgenstem, of "Penny Matching". A variation of this not shown for clarity is the familiar children's game, with unclear origin, "Rock Paper Scissors" (known also as "Roshambo" and other names): each side would be marked with one of the three symbols; the selected candidate would be the winner: stone over scissors, paper over stone, and scissors over paper.) Variations and generalizations on these games can, also be applied, in some examples, and if the game admits a draw, then multiple instances for the same office can be present.

Referring to FIG. 1*g,* on the left is the index of the candidate and on the right is the shift amount of the standard candidate order, such as has been described with reference to FIG. 1*a.*

These techniques can be applied for each contest (whether candidate or referenda) and printed on the same form, as will be readily appreciated. Serial numbers and other items described herein can be contained on such forms, not being shown here for clarity. Perforations or other devices to allow the halves to be separated and/or to be folded for privacy are not shown for clarity. Another exemplary variation not shown for clarity is where one strip lists all candidate names and the other contains a check mark next to the one selected. Suitable registration marks would be provided to fix the alignment of the strips and also possibly make alignment of slots more obvious.

Figure 2:
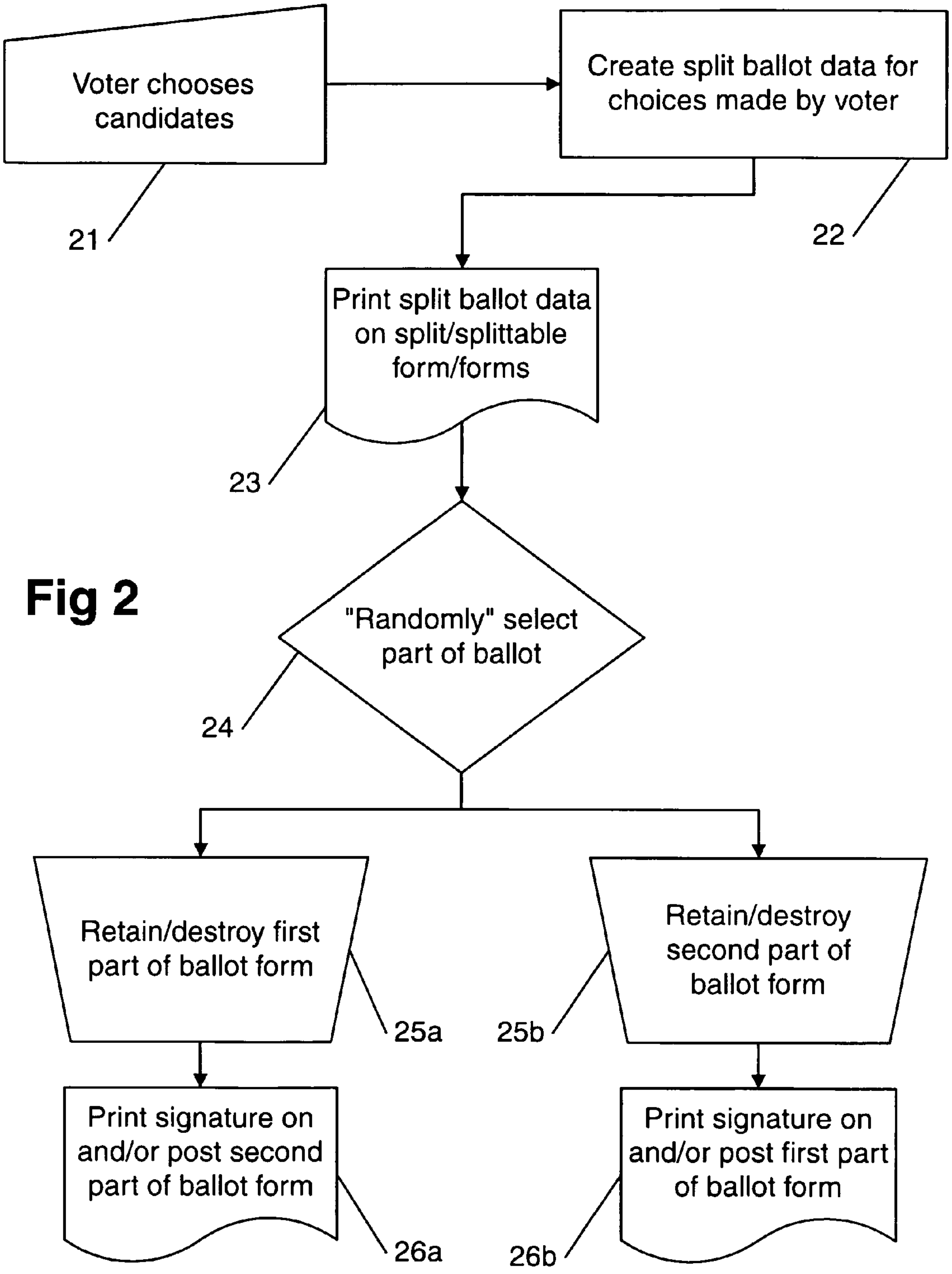
FIG. 2 is a combination block, functional and flow diagram for an exemplary printed split ballot scheme, in accordance with the teachings of the present invention.

Turning now to FIG. 2, first the voter makes a choice of candidates 21. One way is know touchscreen voting that may include optional review and edit features. An inventive variation is that a scan of a paper form filled out by the voter would provide the initial choices that could then be reviewed and possibly edited by the voter (as was mentioned and will be detailed further with reference to FIG. 5). Once the voter decides to in effect "push the cast my ballot button," step 21 is completed and the ballot form can be created and printed. Creation 22 can include choosing random values for shift/permutations, such as those described with reference to FIG. 1. Printing 23 can be accomplished with a single printer for a single form or pre-perforated form ready to be split; two printers could be used, one for each half form; or the output of a single printer could be split before it leaves the device.

The "random" selection 24 of part of the ballot is preferably done in a mutually verifiable manner, such as an automated dice roll as already mentioned. Voter choice or third party choice are also possible. Moreover, additional information beyond the choice bit would further help differentiate the ballot and provide a challenge to the signature, and possibly have other advantages. Once the choice is made, it determines whether the left or right branch is followed. Each ranch is similar in the example, except that right and left are interchanged as are the label suffixes "a" and "b".

The processing after the choice is made can take various forms as indicated elsewhere. One illustrative example is presented here in detail, though any of the other variations could readily be realized based on the descriptions provided. Thus, in the case that the choice is for the left branch, the first part of the ballot is retained at the polling place or destroyed 25*a,* such as by shredding, preferably in front of the voter. Then the digital signature is formed on that part and printed for the voter (preferably on the same form) and/or the ballot form data is posted 26*a*. And in the case that the choice is for the right branch, the first part of the ballot is retained at the polling place or destroyed 25*b,* such as by shredding, preferably in front of the voter. Then the digital signature is formed on that part and printed for the voter (preferably on the same form) and/or the ballot form data is posted 26*b*.

Figure 3:
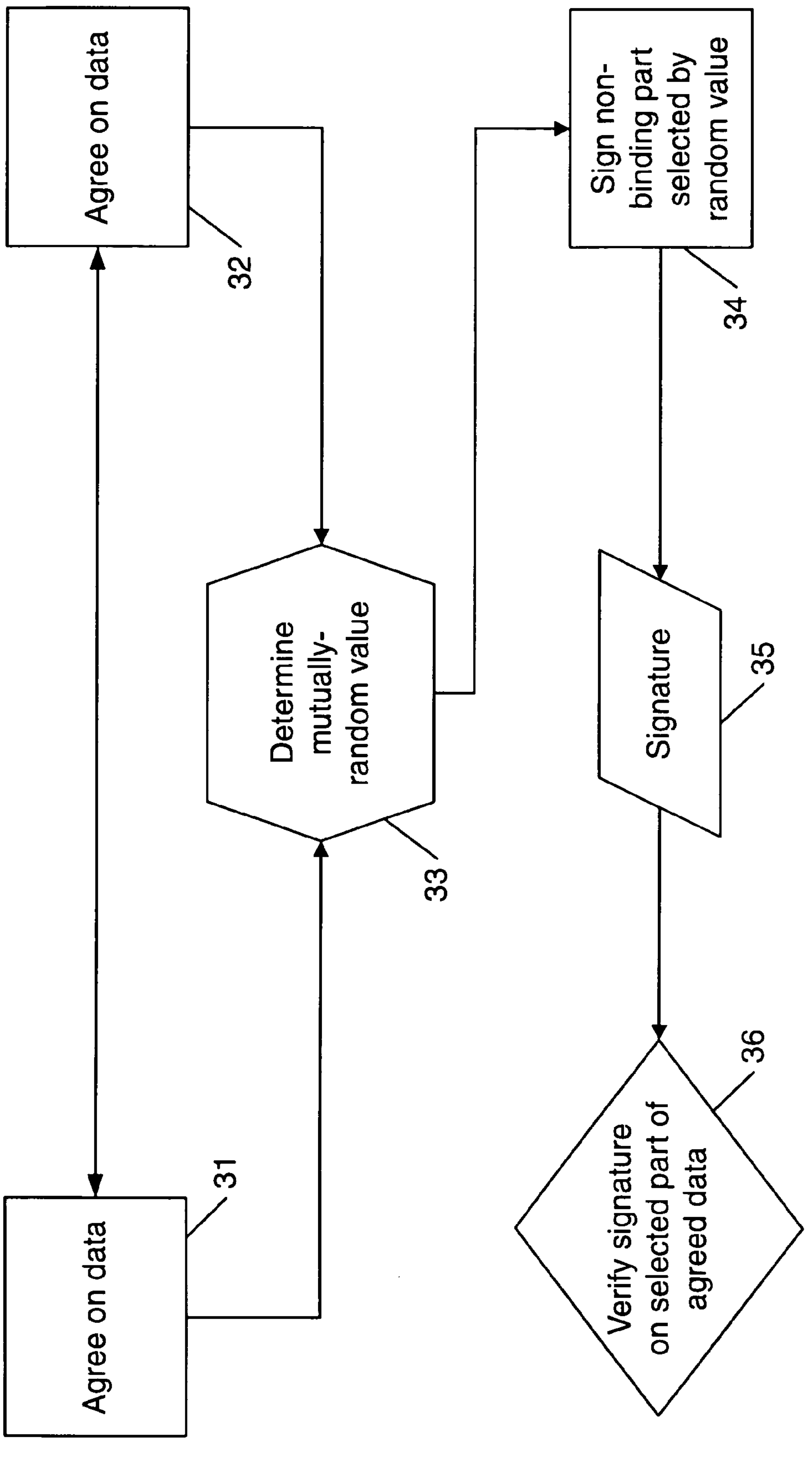
FIG. 3 is a combination block, functional and flow diagram for an exemplary split signature scheme, in accordance with the teachings of the present invention.

Turning now to FIG. 3, a network version of an example of a general embodiment not necessarily related to voting is provided in detail. First the two parties agree on the data, as shown in boxes 31 and 32. In the example of voting, the data could be the splitable ballot image. After this, they complete the determination 33 of a "random" value, preferably "mutually random" so that neither can manipulate it. After this, the prover provides 35 a digital signature on the selected part of the data. The data can be divided into two parts, or in other examples more parts. When more than two parts are used, coding and threshold techniques can be used to make any agreed subset necessary and sufficient to recover the actual data. The recipient party can then verify 36 the signature.

Figure 4:
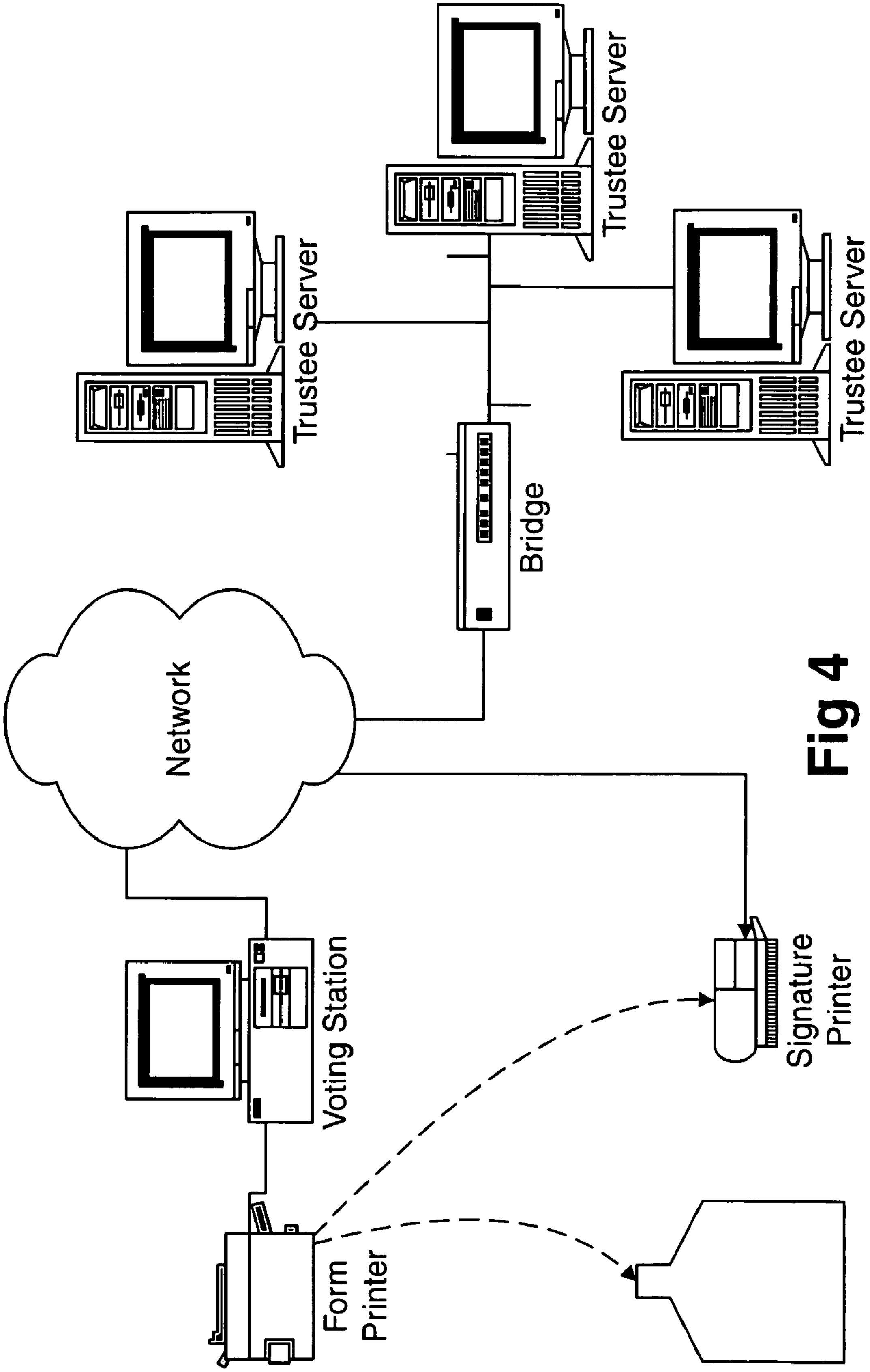
FIG. 4 is a combination block, network, functional and flow diagram for an exemplary printed split ballot system, in accordance with the teachings of the present invention.

Turning now to FIG. 4, an example realization of a voting system is shown in realistic detail for clarity and so that various inventive aspects can be more readily appreciated, but without the intention of any limitation whatsoever. On the right are three Trustee Servers. These are intended to be independent parties to conducting and ensuring the integrity of the election results. Their cooperation (or a threshold of them) is preferably required to accept the votes and make the signatures. They communicate through an optional intermediary, shown as a Bridge and Network. The voter interacts with equipment, shown as a Voting Station, which could include scanner and/or touchscreen equipment, to make and commit to the choice of candidates. Then the Form Printer shown connected to the Voting Station prints the form, such as with entries like those in FIG. 1. The voter, not shown for clarity, then provides as shown by the dotted arcs the two halves to the vessel/shredder shown on the left and the Signature Printer on the right. The choice of which part to send to which is determined preferably by the random event as already described and not shown here for clarity. The Signature Printer can know which form has been inserted for double printing by a small scanner part, manual entry, or other means; alternatively, the printing of the signature may be on a separate sheet with some indicia provided for correlation.

Figure 5:
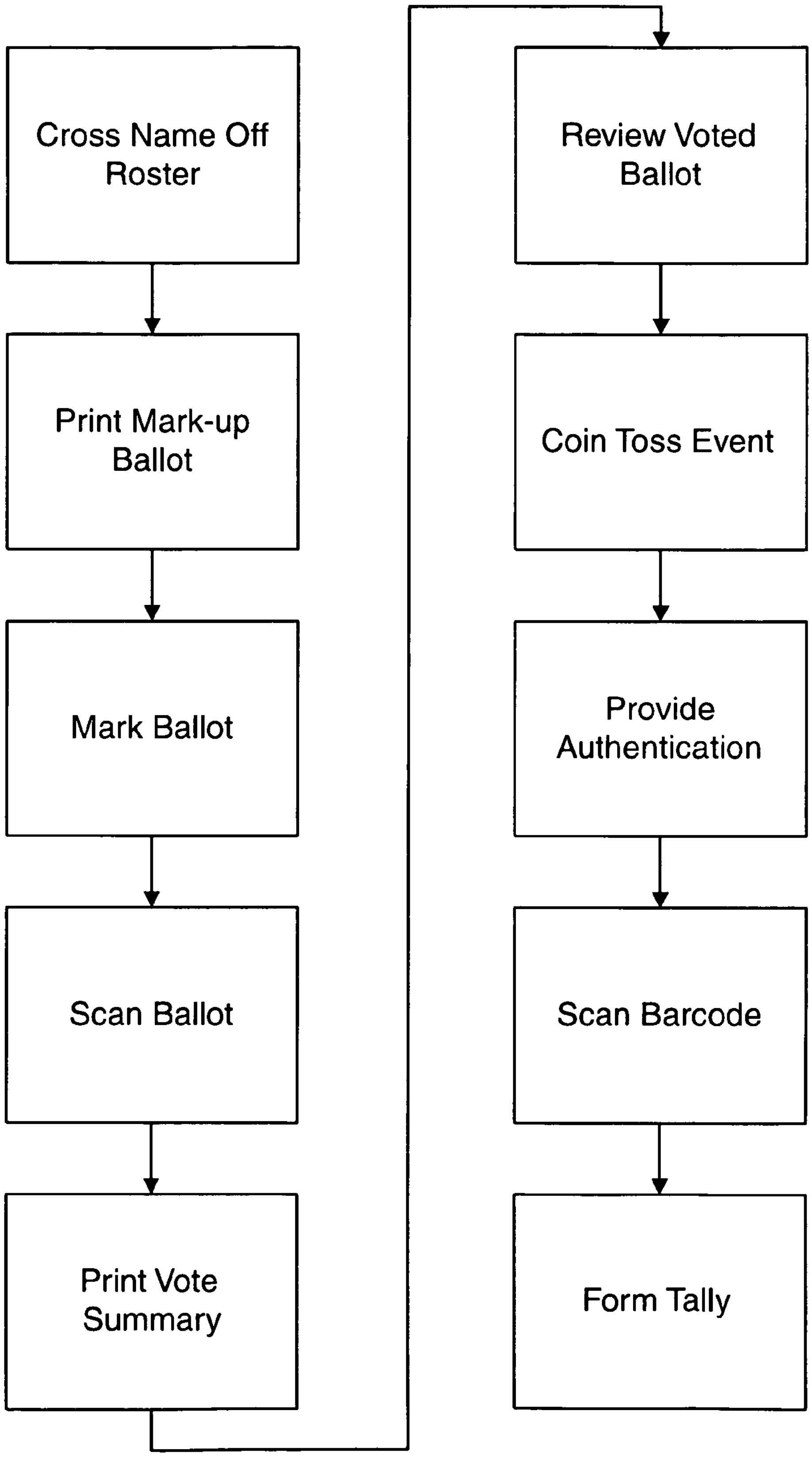
FIG. 5 is a combination block, functional and flow diagram for an exemplary scanned-entry voting system, in accordance with the teachings of the present invention.
Figure 6A:
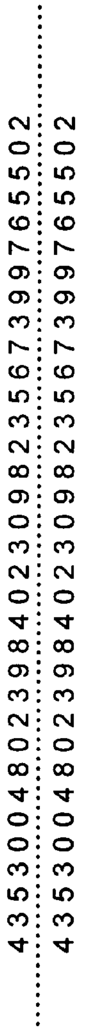
Figure 6B:
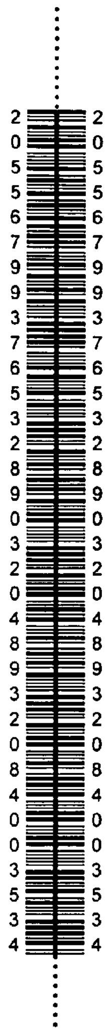
Figure 6C:
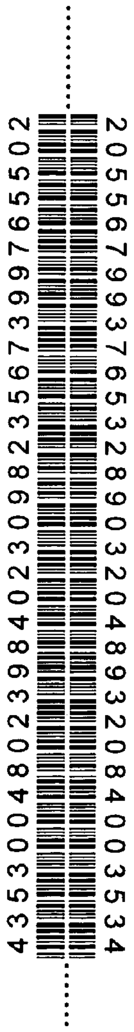
Figure 6D:
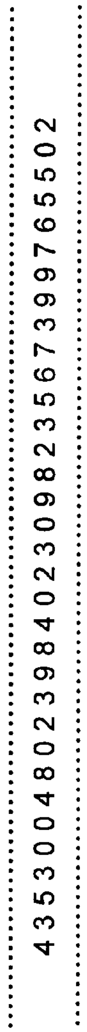
Figure 6E:
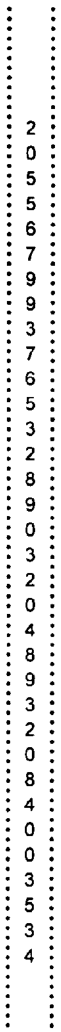

Turning now to FIG. 5, an example application of some of the inventive concepts allows plural voters to be using a single set of hardware, thereby reducing cost and waiting time for voters. Moreover, common ballot styles can be printed in advance; less common ones printed on demand. Each step/element in the figure is described in the bullet item below with the corresponding name:

Cross Name Off Roster—A voter is allowed to vote and prevented from voting again, by whatever means, such as crossing a name off a list of registered voters or modifying a database entry for that voter. The "ballot style" appropriate for the voter is determined in this process, such as by the location where they live, the language they prefer, and/or the political party they belong to. (Only a restriction on ballot style may be determined, as described elsewhere.)

Print Mark-up Ballot—If the particular ballot style required is not readily at hand, perhaps because it is less common or the reserves are depleted for common styles, one can be printed on the spot.

Mark Ballot—The voter enters a booth and can mark the choices of candidates using a marking instrument (such as one supplied for the purpose or one carried by the voter).

Scan Ballot—The marked ballot is scanned by an optical scanner (a standard scanner can be used instead of a dedicated "mark-sense" reader). Preferably, this form would not be returned to the voter, but rather retained or destroyed by the voting equipment.

Print Vote Summary—The candidate choices made are reflected in the two-part ballot form that is then printed out and provided to the voter. The data captured is also recorded electronically, locally and/or remotely.

Review Voted Ballot—The voter can check, preferably inside a booth, the voted ballot.

Coin Toss Event—A bit is determined that is hard for the system to manipulate, (preferably, e.g., a coin toss experiment in view of the voter) to determine which half of the ballot the voter will be able to take away.

Provide Authentication—The ballot part that will be released to the voter can be authenticated by, for example, being posted in an electronic form and/or by a corresponding digital signature. (The ballot part not released can be retained and/or destroyed in whole or in part in a related operation.)

Scan Barcode—The barcode or whatever indicia printed on the ballot half kept (preferably in a way that does not reveal the other information on the ballot) is read. (The ballot part not released can be retained and/or destroyed in whole or in part in a related operation if this has not been done related to the provision of authentication as mentioned above.)

Form Tally—When it is time to tabulate votes, the recorded data can be used to form the tally, by operation on the data by the trustees. If this data is unavailable, the ballot halves that have been kept can be scanned in and used for this purpose or the ballot halves held by voters could be used as a last resort.

Turning now to FIG. 6, disclosed are some example "splitable" symbologies, those that can be identified uniquely even when only a left or right half is provided. The example 6*a* shows the same set of digits repeated on each side of the split line. FIGS. 6*b* and 6*c* show barcodes (of the common 3 of 9 type, as an example), such that each bar spans the split. Optional numeric labels are provided for these codes, and they can be oriented in various ways, two being illustrated (which are also applicable to the style of FIG. 6*a*) and another example provided in FIG. 6*a*. Also shown are example different treatments for indicating the split line through the barcode, black in FIG. 6*b* and while in FIG. 6*c*, though no split or other indicia are anticipated. FIG. 6*d* has two dashed lines. The one that should be used is the one that would make the piece of paper released to the voter larger; in other words, the digits will always be included in their entirety on the portion provided the voter. The other portion would not be sufficient to allow the election results to be calculated in general and might be shredded. FIG. 6*e* is similar to 6*d*, except that the digits are arranged differently.

Figure 7A:
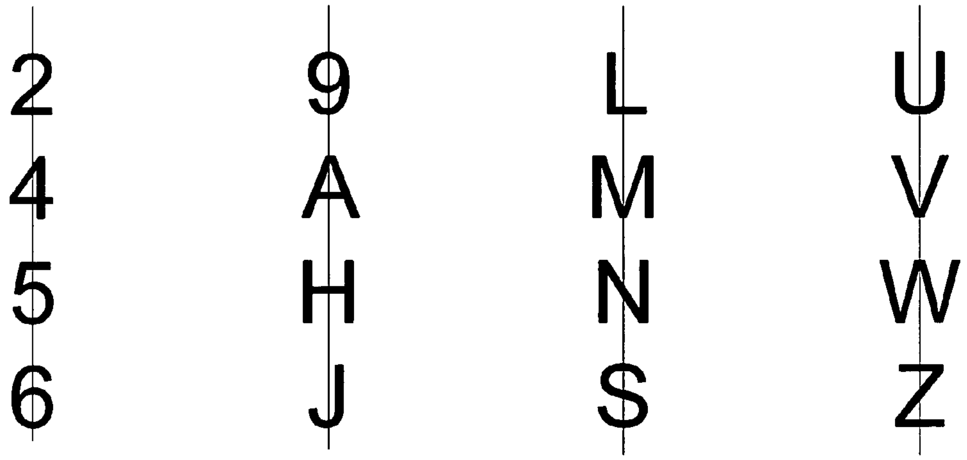
Figure 7B:
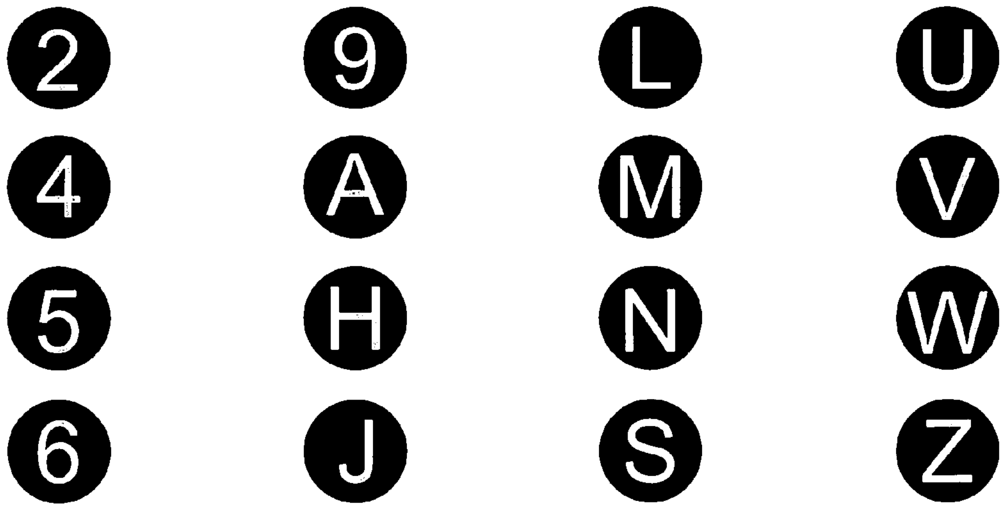

Turning now to FIG. 7, disclosed are some example "splitable" symbologies, those that can be identified uniquely even when only a left or right half is provided. The particular choice of 16 common letters and numbers in a standard upper-case sans-serif font are believed examples of readily recognized such symbologies. More specifically, FIG. 7*a* shows the example with a vertical split line and FIG. 7*b* shows each reversed-out of black circles. Other criteria used in selecting these rejected those with centered vertical lines, as these features might be too registration sensitive. Also, the choice was made in the example not to include a single member from an indistinguishable group, though this might be done to increase the number of symbols, possibly at the expense of ease of understanding or use by the public. The symbologies of FIG. 7*b* are used elsewhere in the figures as examples, but without limitation.

Turning now to FIGS. 8 and 9, example ballots are shown. The split line is shown as a dotted line on that cuts through the splitable symbologies already described with reference to FIG. 7*b*. In both examples, candidates are listed in order of the offices and within the offices shifted by the corresponding shift amount. The "no-vote candidates" are shown as empty strings, but there position is determined by the shift amount (as a canonical position of after all the named candidates, for instance, is used). In FIG. 8 two referenda are also shown, with the "yes" and "no" answers being treaded as candidates, but without no-vote option. The votes are shown in bold outside the candidate field: on the left of the split for FIG. 8 and above the split, and labeled by example office names, in FIG. 9. The split values, that represent an encoding of the concatenation of the ballot serial number with the "vote+hiding rotation" value, are intended to be unambiguously readable on both haves after a ballot is split (although they could be left with the half released to the voter). As an example, note in FIG. 8, the 19 on the left refers to Honda; similarly, in FIG. 9, the 35 vote for Attorney General is for Waxman.

Turning now to FIG. 10, a detailed exemplary schema as will be appreciated to further elucidate an example voting system in accordance with the present invention is described. The schema consists of an upper diagram and separate parts detailing two cases, "A" and "B". For clarity in exposition, a single voter and a single contest are shown, but without limitation. Referring to the upper diagram, two values are shown committed to initially by the conductors of the election: the "shift" and the "rotation", each being shown as the pre-image under a cryptographic function that also takes secret seed values, D and C respectively, as input. Such commit values would typically, in known manner, be digitally signed and published on an open network, such as the Internet, by the conductors of the election; the secret seeds, would however be kept secret by the conductors at least until used as will be explained. The lower line of text in the upper diagram shows the three values that would be contained in the ballot provided to the Voter for review. The leftmost is the sum (all modulo the number of effective candidates, without explicit notation or mention, for clarity, as described elsewhere) of the actual voter's vote and the secret shift amount already mentioned as committed to. The middle is the sum of the actual vote and the rotation, referred to here variously as the "coded vote" or the "rotated voted," also as already mentioned above. The third is the shift, already mentioned for this line. The two underscore lines are intended to indicate that the first two values on this line are what are released in case "A" and that the second and third in case "B" detailed below. The diagonal lines indicate relationships established in the corresponding cases, as will be described.

Referring to the lower part of FIG. 10, the two cases are described in detail. In case "A", preferably chosen at "random" as described elsewhere, two values are released. One is the sum of the actual vote and the rotation, the other is the sum of the vote and the shift. Also, a "proof" such as in the sense of the term used in the cryptographic protocol art, is given. What is proved is that two differences are equal (sometimes referred to as congruent in the present modular setting). One difference is simply that of the two values released, which can readily be computed by any party with access to them. The other difference is between the two values committed to, as already mentioned with reference to the upper part of the diagram: the rotation minus the shift. To establish this second difference, various techniques are known in the cryptographic protocol art. The difference is to be established, preferably with high certainty, but without substantially further disclosing the individual subtrahend or minuend. Plural examples of suitable commitment schemes allowing addition/subtraction are known in the art, but for concreteness see, "Zero-Knowledge Proofs for Finite Field Arithmetic . . . " R. Cramer & I. B. Damgaard, BRICS RS-97-27, ISSN 0909-0878, November 1997.

Figure 11A:
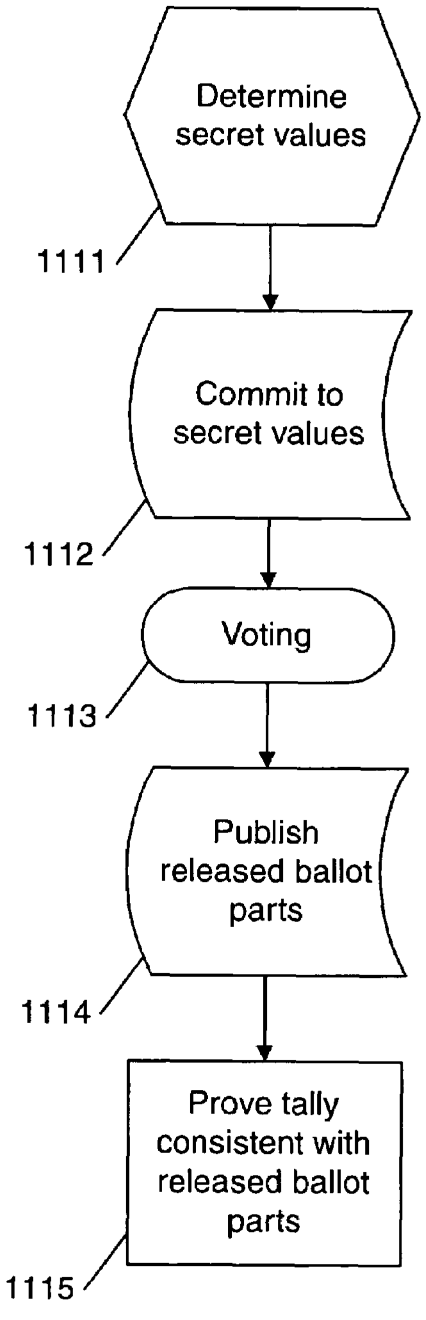

Referring to case "B", three values are released. One is the sum of the vote and the rotation (the coded vote), the value common to both cases, as already mentioned. The second value is the shift, which would for instance be revealed if the amount of shifting a list of candidate names is printed in some embodiments. The third value is the seed D, already mentioned referring to the upper part of the figure, that hid the shift amount in the commitment. Anyone with access to these last two values and to the commitment should be able to readily verify that they properly correspond, such as by applying the commitment function "f" to the last two values and verifying that the result is the first commitment Turning now to FIG. 11, detailed exemplary overall method and apparatus flow and block diagrams will be presented. FIG. 11*a* shows an example overall election, whereas FIG. 11*b* shows an example voting part in more detail.

Overall, in some examples, there are two related parts before the voting and two other related parts after it. The first part before, the "Determining of secret values" 1111, indicates that the party(s) conducting the election, the "conductors," can choose values that preferably will be secret to the conductors at least until the privacy of voting is no longer an issue. After each and any value is determined by the conductors it can be committed to by the conductors, such as by a "Commit to secret values" 1112. Example ways to commit are release of digital signatures/authenticators of whatever type on the data, release of hash functions on the data, publishing values on electronic networks, sending values to others who may do some or all of these things, and so forth, whether iteratively, recursively, redundantly, and/or in combination. The "Voting" part 113 will be detailed later with reference to FIG. 11*b*. The "Publishing of released ballot parts" 1114 is a way to ensure the agreement of the conductors with certain values released during the voting 1113. Example ways to establish agreement include, but are not limited to, publishing over electronic networks, sending in electronic form, releasing of digital signatures/authenticators of whatever type, sending values to others who may do some or all of these things, and so forth, whether iteratively, recursively, redundantly, and/or in combination. The "Proving of tally consistent with released ballot parts" 1115, at least in some examples, comprises revealing certain values and/or responding to certain challenge values, by the conductors, in such a way as to convince others, and preferably any interested party, as is known in the cryptographic art, that appropriate correspondence between the committed, released and tally values holds.

Figure 11B:
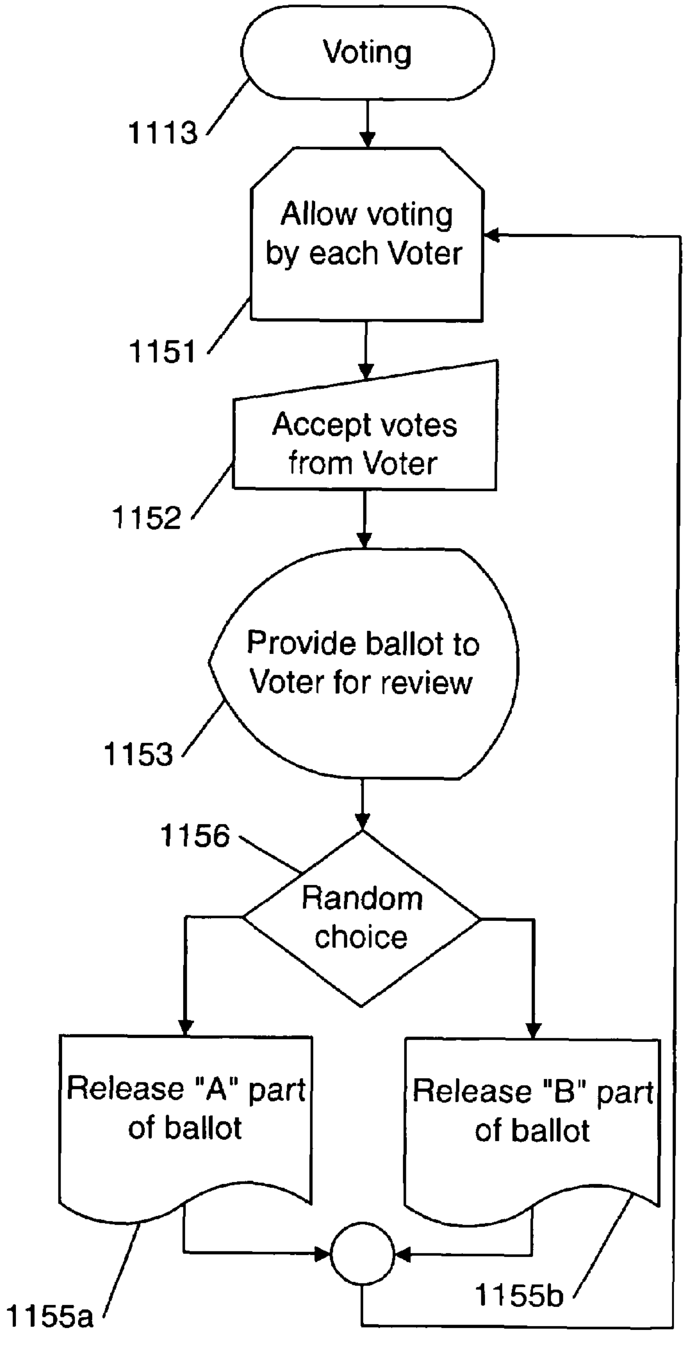

Referring to the "Voting" part 1113 as detailed further in FIG. 11*b*, some examples without limitation are given. Voting by plural voters can be in any order and with any degree of parallelism and/or sequentially, but is shown for clarity here as a loop starting with "Allow voting by each Voter" 1151. Considering now for clarity a single voter, the conductors "Accept votes from Voter" 1152 by whatever means, such as, for example, but without limitation, scanning paper, sensing touching of buttons or surfaces, voice, and/or other human utterances, many examples of which are known in the art. After one or more votes are accepted for a Voter, the conductors can "Provide ballot to Voter for review" 1153, such as preferably by printing it out and/or by displaying/voicing it. Once all or part of a ballot has been provided Voter for review, a "Random choice" 1156 is made between alternatives, of which there can in general be any number, but a two-way choice being shown for clarity. Depending on the choice, different parts of the ballot are released to the voter so that the voter can in general have them and take them away for further purposes, such as, but not limited to, further verification, scrutiny, publishing, safekeeping, recovery, and so forth. Other parts provided in 1153, however, are not released, such as by keeping them inaccessible to, or recovering them from, the voter. The two example alternatives shown are "Release 'A' part of ballot" 1155*a* and "Release of 'B' part of ballot" 1155*b*. As mentioned, voting is shown as a loop iteration per voter, but can in general be comprised of any number of parts per voter and across voters.

Turning now to FIG. 12, another detailed exemplary overall method and apparatus flow and block diagrams will be presented. The upper row, 1211, 1212, and 1213, show what are public postings of information in the corresponding temporal order. The lower arrows, 1221 through 1224 show the voting of an example voter (or a collection of voters, depending on how it is viewed) also in a temporal ordering from left to right. The second layer up from the bottom shows things the voter interacts with, 1231 through 1234, also correspondingly ordered. First, the voter approaches the user input 1231, as shown by arrow 1221. Once having entered input (at least in some embodiments) the voter next, as shown by arrow 1222, collects the user output 1232 and then proceeds, as shown by arrow 1223, to the choice 1233. At this point, the voter may decide to finish voting as shown by arrow 1224 or to spoil the ballot and try again, as shown by backwards pointing arrow 1226. The voter may also check 1234 the posted ballot part for equivalence with the ballot part released to the voter (such as at 1232 or 1233) The middle layers, where computation is done by the voting system, can be structured in a variety of ways in keeping with the inventive concepts disclosed here, one example being shown for clarity. A preprocessing makes 1241 the initial commitments, as a post processing makes 1242 the tallies and proofs (these could be by the same parties or, for instance, by potentially different quota of the same set of trustees). Knowledge of the vote is believed inherent in some local intelligence 1232, which maps the choices from the input 1231 into what is output 1232. Not shown for clarity are potential ballot style databases that devices need to know to render choices to voters.

Two sources for posted ballot parts are shown, the local party that knows the votes 1241 and the choice or scan 1233. Either could supply the data. For example, the released part could be scanned 1233 and the scan data posted. Or, as another example, the device that knows the votes could retain and then provide the ballot part data once it learns the choice of parts.

Not shown for clarity in the figure are various possible multiplicities. Naturally, there might be many precinct locations and even multiple installations at a single precinct. Similarly, “posting” can be accomplished at multiple venues and also in combination with digital signature or other authentication. Possession of the secrets used to form commits and later proofs and tallies, are also naturally spread across multiple parties. In the cryptographic protocol art, it is common for secrets to be divided across a set of parties, such that a quorum comprises a majority of parties and can perform the computations.

Multiple ballot styles can introduce other complexity not shown for clarity. For instance, a party not shown could be in charge of deciding which ballot style (or from which set of ballot styles) the voter is to be allowed to vote. The authenticated message from this party would then be provided to the system shown, and voting would be conducted with the appropriate ballot style(s). The tallies at least would reflect substantively different ballot styles. In some settings, the set of trustees might vary with ballot style, as would the postings.

Turning now to FIG. 13, some exemplary write-in ballots are shown in accordance with the teachings of the present invention. In FIG. 13*a,* a scheme is illustrated with two digit coded write-in candidates on the upper part of the ballot and the coding table on the lower part. The rule is to map each letter of the candidate name by looking up the corresponding two digits in the table. In FIG. 13*b,* a substitution that includes mainly letters in the ciphertext, with a couple of digits (3 and 5 in the example). The rule here is to look up each character in the middle bold row and choose the first unused symbol, starting from above, then below, then above to the right one, and so forth. This way, unlike with FIG. 13*a,* repeated characters in the write-in name do not yield repeats in the cyphertext printed on ballot. As would be appreciated, the mapping would preferably be treated essentially as a shift amount.

Figure 14A:
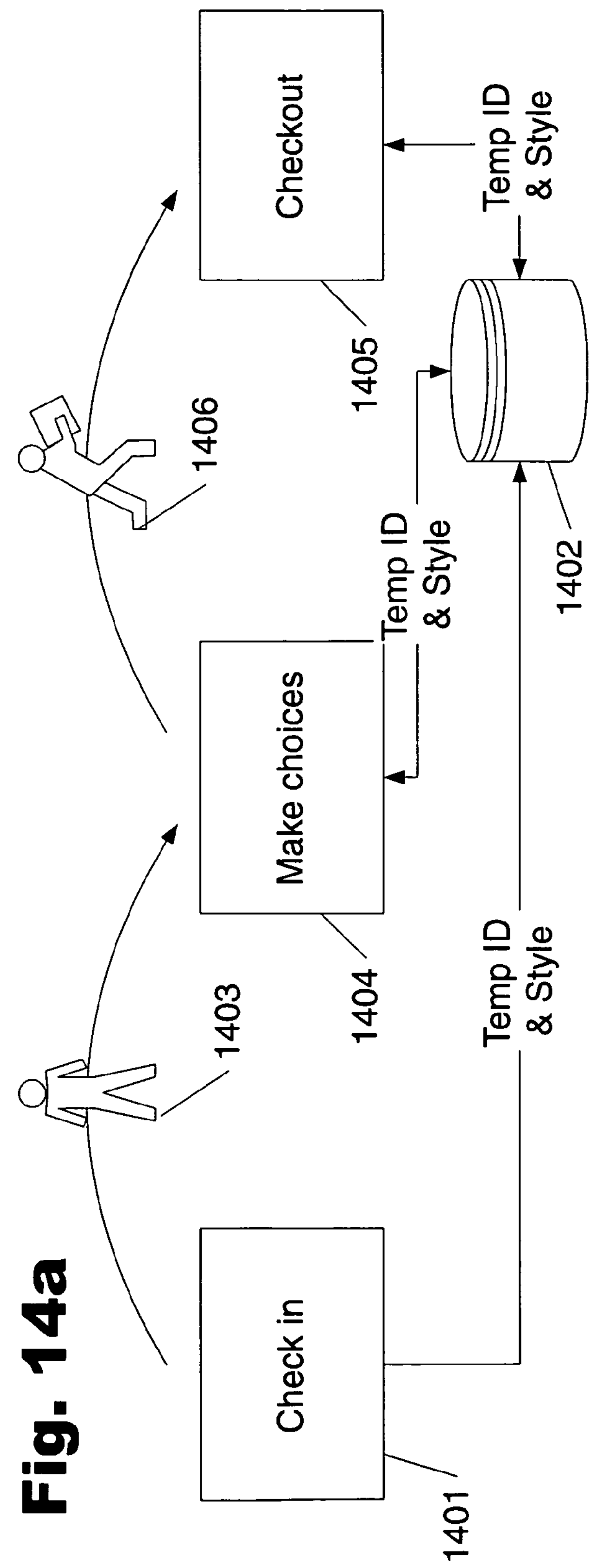

Turning now to FIG. 14, shown is a combination block, functional, schematic, and protocol diagrams for exemplary ways to control voter interaction in some exemplary embodiments of the invention. Referring to FIG. 14*a,* first the voter checks in 1401, which typically comprises checking on a voting roster or register and marking the voter as having checked in. At this point a ballot style range is determined and a temporary voter ID is assigned. The ballot style range can be the single authorized style, or a set of styles that the voter is free to choose between as will be described. It can be in coded form in the roster and only readable to the station. The ID can for instance be created afresh, preferably at random, or as a serial number. It is believed preferable from a privacy perspective to use a temporary value, but an actual voter ID could also be used.

Next the voter moves 1403 from the check in 1401 to the make choices 1404 processing stage; the ID and style range are agreed between the database 1402 and the make choices. In this embodiment, no objects are shown being transported at this stage. One example way for this agreement is that the voter supplies some kind of identifying information, such as a PIN code corresponding to the temporary ID, not shown for clarity, and this is provided to the database 1402 that then determines the choice range and returns this. Another example is where the poll worker(s) in effect indicate, such as by entering into a control device connected to one or more of the make choice 1404 or database 1402, the correspondence between voter ID and the particular make choice that the voter will visit. In some embodiments, the make choice 1404 is merged with the checkout 1405 to be described, in others the voter may make visits to plural make choices before checking out. For clarity, a separate checkout is shown. The style used at make choice 1404 can be left uncontrolled, and only controlled at checkout; however, voters may appreciate being sure that they are voting the correct style (so that they don’t have to redo it). Not shown for clarity is that there can be plural instances of check in(s) 1401, make choice(s) 1404 and checkout(s) 1405.

The voter takes 1406 the printed ballot from the make choices 1404 to the checkout 1405. Checkout 1405 preferably is able to ascertain that this ballot is of an allowed style for the voter and that the voter has not checked out yet, and to make records sufficient to ensure that the voter cannot check out again. One example way to perform these functions is that the temporary voter ID is read from the ballot, database 1402 is queried and updated, and the vote lodged. Linking to the temporary ID at making of choices 1404 and also at checkout 1405 can provide an impediment to those who would allow others to vote for them and provide them with a ballot to checkout with. Linking can be by ballot number containing the ID. Verifying that the ballot style is allowed can be unnecessary in some configurations, where the ID was used to control the ballot styles voted and then the ID also remains associated with the ballot. It is believed sufficient to enforce whatever restriction on ballot style at either the make choices 1404 or alternatively at the checkout 1406—provided that there is enforcement of the ID correspondence at the two points.

Figure 14B:
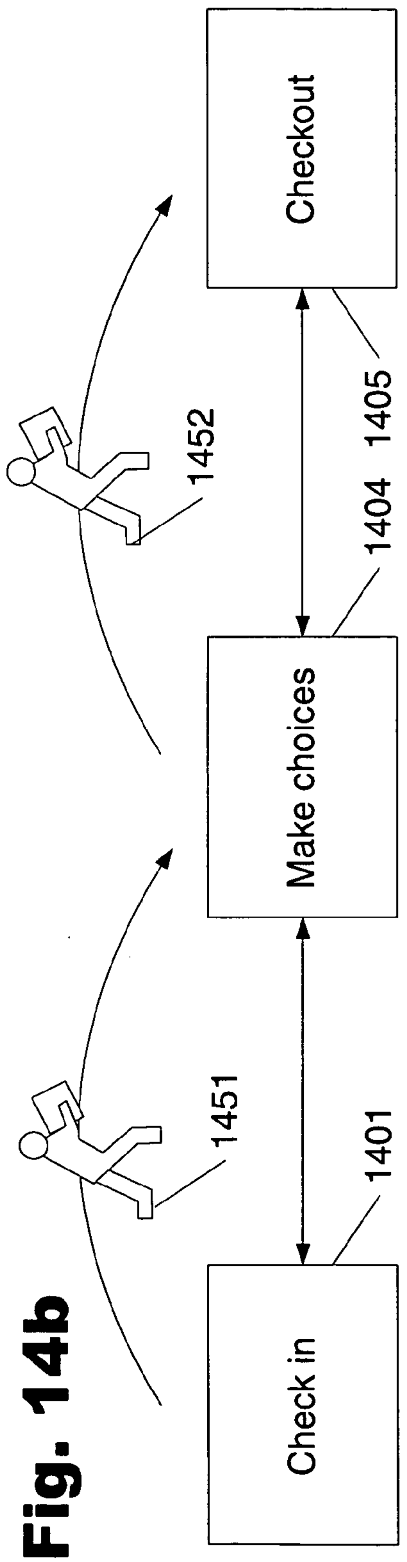

Referring now to FIG. 14*b,* check in 1401, make choices 1404 and checkout 1405 are shown as in FIG. 14*a.* Movement 1451 by the voter from check in 1401 to make choices 1404 is shown with one or more objects being transported with the person; similarly, movement 1452 by the voter from make choices 1404 to checkout 1405 is shown with one or more objects being transported with the person. Examples of suitable objects are microcircuitry, such as computers, memory, battery, wireless/contact communication, cryptographic functions and so forth, as are known, combined with carriers, such as metal touch buttons, smart cards, bracelets with erase-on-open features, or ballot cassettes. Instead of the central database architecture shown in FIG. 14*a,* this approach of maintaining the data by the devices and then recycling the devices can be used, such as by employing cryptographic authentication as is known. Another example approach, that can be combined or used separately, is direct communication between the check in 1401, make choices 1404 and checkout 1405, instead of communicating to a common database; as is known in the art, such a database and its functions can be distributed over these points in general.

A PIN number or the like printed on a paper or sticker or the like and handed to the voter at check in 1401 can then be used by the voter to get the correct ballot style or style range during making choices 1404 and then optionally, but preferably, again to allow checkout 1405. (As will be appreciated: interchanging of such slips or the information on them can allow styles to be swapped by cooperating voters; physically checking them at checkout can require physical swapping. Including a photo or the like can require swapping and re-swapping.) A plain large ballot carrier, can also be used in combination with such a slip, and the slip can be placed as a sticker or otherwise bound to the carrier. A passive or active data token can also be taken with the voter in the movement 1451 and 1452. An active carrier can be used without the database and communication between stations. A passive token can be used in combination with communication between instances of the same station type, not shown for clarity.

Turning now to FIG. 15, shown is a combination block, functional, schematic, and protocol diagrams for exemplary ways to control voter interaction in some exemplary embodiments of the invention. In particular, three examples are shown: one with an active token carried by the voter, one with a passive token, and the third with no token. Each is shown as three parts, the actions/mechanisms of the three stations with respect to a voter visit; some of these can be combined and/or one or more could be split.

Figure 15A:
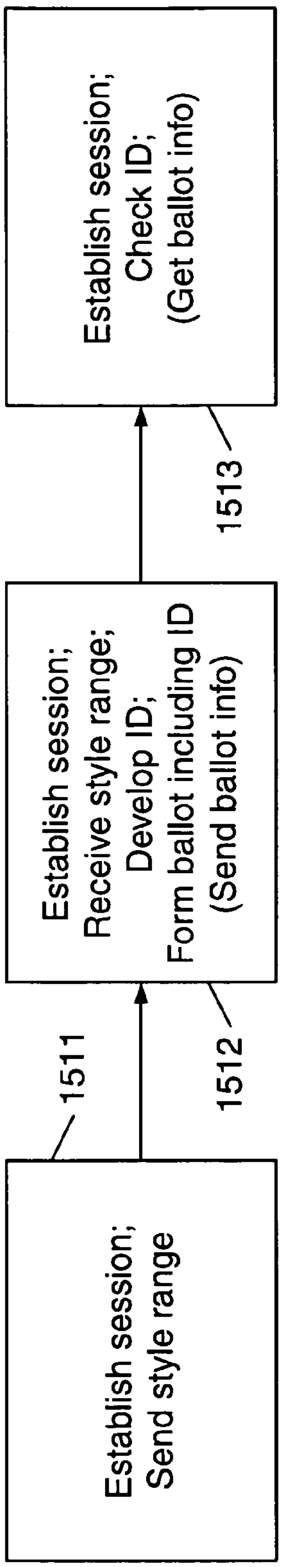

Referring to FIG. 15*a*, an active token example is shown. The first station, as indicated in box 1511, establishes a preferably cryptographically authenticated session between the station and the active token carried by the voter (not shown for clarity). Within the authentication of this session, the style range established by the station is communicated to the token. Not shown for clarity, however, is that the token state changes as a result of this transaction to one ready for voting.

The voting station, as shown in box 1512, first establishes a cryptographically authenticated session with the token. Then the token communicates the style range to the station. An ID for the ballot is developed preferably through a cooperation between the station and the token in such a way that neither can manipulate the outcome. One example known approach to this is where each commits to a random value by disclosing to the other the image of the value under a suitable one-way function; then the ID is taken as the modulo two sum of the two random values, released after both commitments are received. This ID is then formed into the ballot to be taken to the next station. Optionally, some or all of the ballot image information can be transferred through the active token.

The checkout station, as shown in box 1513, first establishes a preferably cryptographically authenticated session with the active token. Next the ID of the ballot is checked against that in the token. This optionally resets the token so that the ballot cannot be cast again, such as in the case of multiple disconnected checkout stations. Optionally, instead of scanning the ballot for the ballot info, the ballot info can be obtained by the checkout from the token.

Figure 15B:
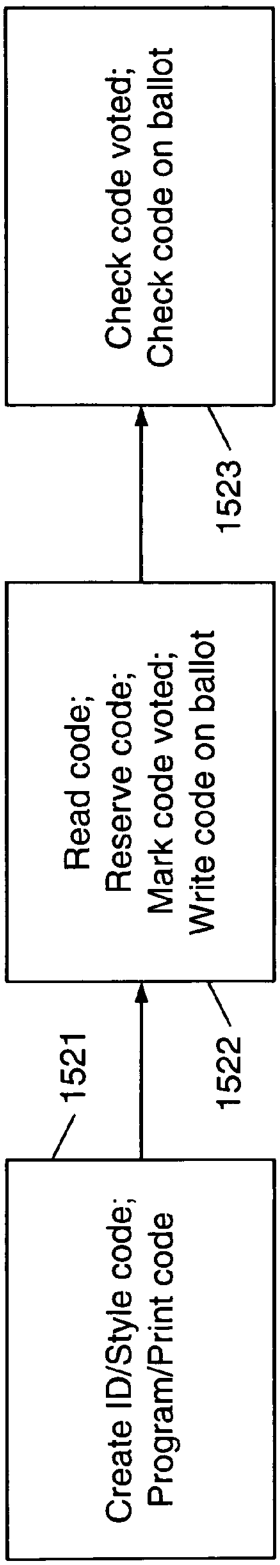

Referring now to FIG. 15*b*, a passive token example is shown. The first station, as indicated in box 1521, can create and ID and determine style range information and encode these in the token, whether it be a writeable tag, such as by RF or galvanic contact, or printing on paper or the like. Alternatively, a tag that has a fixed and preferably unique ID can be chosen from a pre-established collection of such tags; it may include the style indication, or a mapping to such indication may be otherwise provided to the voting station.

The voting station, as shown in box 1522, first reads the code from the token. It then in communication with the other voting stations makes sure that it has exclusive use of it, at least for the moment, by "reserving" it; all the other stations agree that it is reserved by this station. Preferably once the voting is completed, the station informs the other stations of this by "marking" the code. Stations could mark the code initially, but then if the station failed for some reason to be voted, the voter would not be able to visit another station. The code is preferably incorporated in the ballot.

The checkout station, as shown in box 1523, first checks the code on the network to ensure that it was voted. Also, the code is checked against that on the ballot. Then the code can be "tagged" to indicate that the ballot has been cast, either over the network if there are other checkout stations, or simply by local memory if there are not.

Figure 15C:

Referring now to FIG. 15*c*, a no token example is shown. The first station, as indicated in box 1531, transmits the ID and any style restriction to the voting station that the voting official(s) have designated for the voter.

The voting station, as shown in box 1532, reads the ID and the style. The code is preferably included in the ballot information.

The checkout station, as shown in box 1533, first checks the code voted. As one example, it could be a digital signature and self authenticating, as another, it could be received from the voting station. Recycling fixed codes would, it is believed, allow an imposter ballot to be fabricated and counted. If there is more than one checkout station, the code should be marked as voted.

Turning now to FIG. 16, shown are various views of an example single voting station, with automatic paper handling capabilities, in accordance with the teachings of the present invention.

Figure 16D:
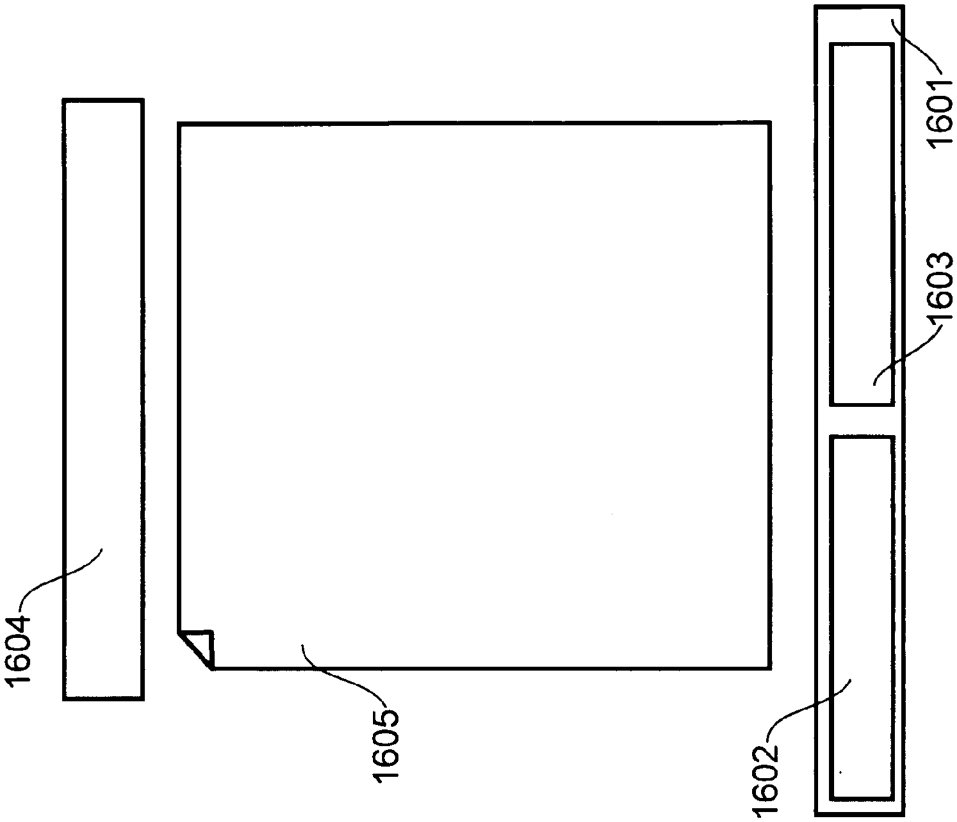
Figure 16A:
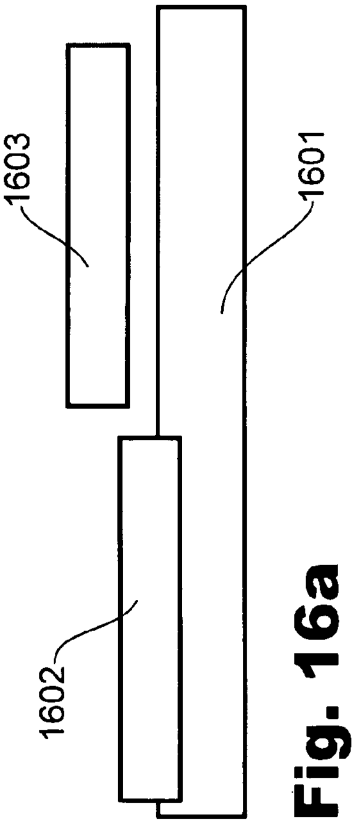
Figure 16B:
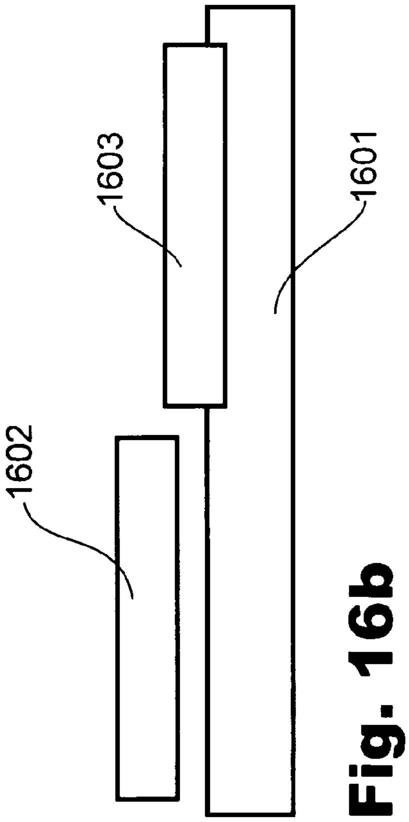
Figure 16C:
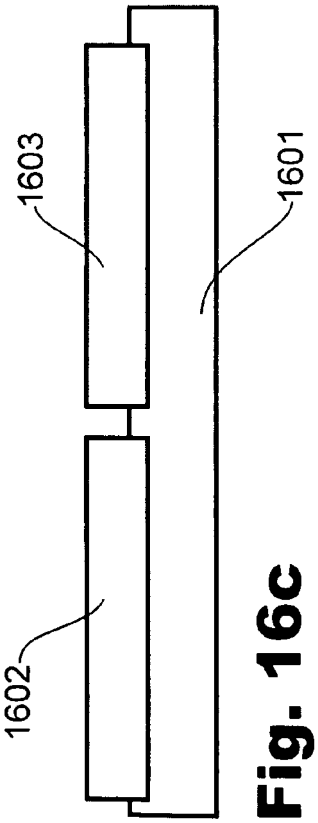

Referring to FIG. 16*a-c*, the apparatus can be seen in front view looking at the rollers where the paper would come out. Referring to FIG. 16*a*, a configuration in which the left side of the ballot is shredded and the right side passed through, roller 1601 remains in a spaced relationship to roller 1603 while roller 1602 engages roller 1601. Referring to FIG. 16*b*, a configuration in which the right side of the ballot is shredded and the left side passed through, roller 1601 remains in a spaced relationship to roller 1602 while roller 1603 engages roller 1601. Referring to FIG. 16*c*, a configuration in which both sides of the ballot are shredded, such as in the case of a spoilt ballot, rollers 1602 and 1603 engage roller 1601.

Referring to FIG. 16*d*, the apparatus can be seen in plan view. The print engine 1604 can be seen at the beginning of the paper flow. An example piece of paper, on which typically a ballot would be printed, is shown at rest on its way between the printing and shredding stations. The shredding rollers shown in FIG. 16*a-c* in a front view, are shown in top view in FIG. 16*d*. The two smaller rollers, 1602 and 1603, are shown on top of lower roller 1601. In operation, ballots 1605 would be printed by print engine 1604. The voter would then be given an opportunity to review the ballot, preferably through a transparent window or the like, not shown for clarity, so that the voter cannot readily and/or undetectably remove the ballot. Also, not shown for clarity, is a mechanical lever or the like that could alter the configuration of the mechanism between those shown; alternatively, the position of the rollers could be changed under solenoid or other actuator control as would be understood in the electromechanical arts. Then, the voter can be presented with two or three options. The voter can, in case of three options, choose to spoil the ballot, in which case both smaller rollers 1602 and 1603 would be in engagement with lower roller 1601 as the ballot is moved forward and shredded substantially in its entirety, possibly leaving a middle segment. In case it is decided that the voter should be able to retain the right half of the ballot, then the configuration of FIG. 16*a* would be entered and roller 1602 would shred the left half of the ballot on its way out, with the chips falling into a receptacle not shown for clarity; the right half of the ballot would leave the device and be available to the voter. In case it is decided that the voter should be able to retain the left half of the ballot, then the configuration of FIG. 16*b* would be entered and roller 1603 would, in cooperation with roller 1601, shred the right half of the ballot on its way out; the left half of the ballot would leave the device and be available to the voter.

In some embodiments, part of the ballot 1605 would remain under the print engine while the decision about which part to shred is being made; once it is made, additional information would be printed on the part that is not to be shredded, such as a digital signature or other compact proof such as a pre-image. In some embodiments, the ballot form 1605 could be moved backwards some distance to allow for this final printing, such as when print engine 1604 requires too much bite.

Turning now to FIG. 17, a plan schematic functional view of an exemplary inventive ballot carrier cassette in accordance with the present invention is shown. In operation, first the ballot would be placed into the cassette, either by the voter or automatically, not shown for clarity. The cassette comprises a structure 1701 that is preferably substantially not transparent and not too flimsy to conveniently hold the ballot. Window 1702 preferably allows a part of the ballot, preferably a part of the serial number or other identifying information, to be viewed. Furthermore, cutouts 1703*a* and 1703*b* preferably allow the placing of markings, such as adhesive labels, on the ballot form without removing the form from the carrier 1701. Apertures 1704*a* and 1704*b* allow, in some example embodiments, a slicing by manually or automatically operated cutter not shown, of the ballot into parts without removing both from carrier 1701. Also shown is a label, passive, or preferably active tag 1705 as described elsewhere here. In operation, various indicia and/or scratch-off elements could be applied, such as by adhesive, to ballot through the cutouts 1703. After the choice of halves is made, the ballot would be split physically using one of the corresponding apertures 1704, and one part would be taken by the voter and the other would be placed in a ballot box or shredded. The cassette 1701 could be configured to accept the ballot form in a folded arrangement, where the lower edge is brought up in front to just below the top of the form, exposing the upper part of the form but hiding the vote information when halves are removed. Optional tag 1705 would be used at check in, voting stations, and checkout as described elsewhere here.

Referring now to FIG. 18, a section of an exemplary bracelet or band in accordance with the invention is shown. The band is intended to be placed around the wrist of the voter at check in and removed at checkout, with recycling a possibility, all as mentioned elsewhere here. The structure comprises a substantially un-stretchable band 1801. The fastening means, not shown for clarity, would preferably be capable of adapting to various sizes of wrist, much as with quick-release watch bands. Preferably active tag 1802, as also described elsewhere here, would be affixed to band 1801. As mentioned elsewhere here, it is preferable that when the band is opened and/or cut, the tag is able to change state or at least sense this configuration at a later point, thereby deterring people from transferring the band because the tag behavior would be changed, preferably destroying ballot information and reporting only a tamper or ready to be re-checked-in.

Figure 19C:
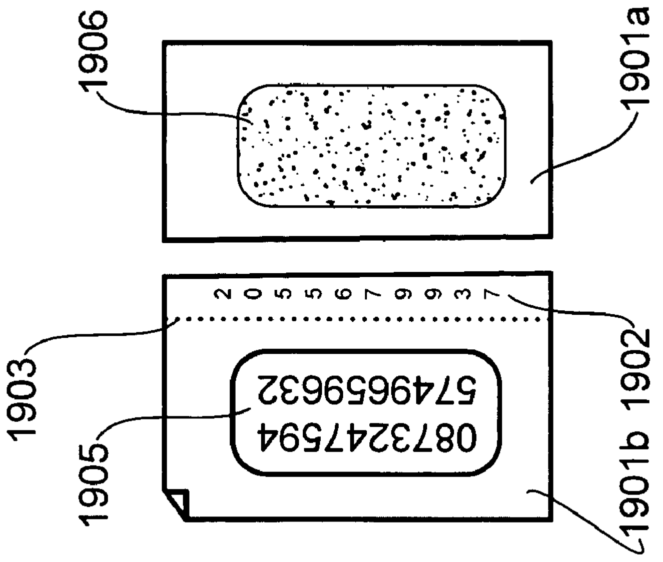
Figure 19B:
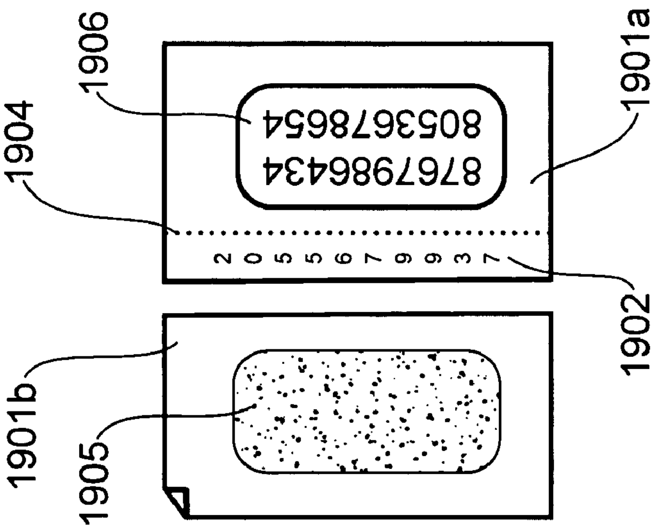
Figure 19A:
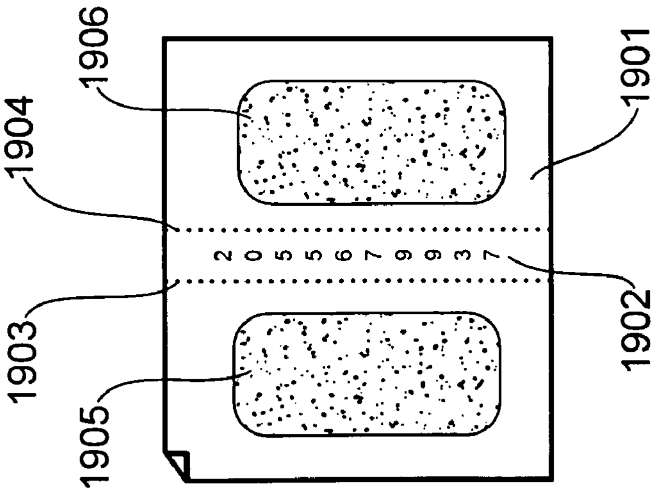

Turning now to FIG. 19, an exemplary scratch-off ticket in accordance with the teachings of the invention is shown. The paper ticket or sticker 1901 is shown with the scratch-off latex intact in FIG. 19*a*, with it removed on the right in FIG. 19*b*, and removed on the left in FIG. 19*c*. All three bear the same serial number indicia 1902 and the two separation lines 1903 and 1904 where not split. The regions bearing the twenty-digit pre-image or key for the respective commits are 1905 and 1906. Both are hidden by latex in FIG. 19*a*, number 1906 is revealed by scratching off the latex in FIG. 19*b*, and number 1905 in FIG. 19*c*. As mentioned elsewhere, when the form is split, the serial number 1902 will, in the example, stay with the part given the voter. When the half with 1906 is to be given the voter, as shown in FIG. 19*b*, the split is made on destroyed line 1903; similarly, when the half with 1905 is to be given the voter, the split is made on destroyed line 1904. Of course the indicia on this ticket or sticker can in some example embodiments be on the ballot form itself. The seed numbers 1905 and 1906 can serve to prevent false spoiling, as already mentioned. Number 1905 can, in some embodiments be the key used to decrypt the difference between the value added to the vote and the shift amount; number 1906 can, in those embodiments, be the key used to decrypt the shift amount (and the tally process would use the difference between the commits as the encrypted vote).

Turning now to FIG. 20, shown is an example voting location in a combined block, functional and flow diagram, with trustee modules, online connections and plural checkers, in accordance with the teachings of the present invention. Box 2001 is intended to denote the equipment that is inside the polling-place. This equipment is anticipated to be comprised of various computers, communication, I/O means, and storage including for software. Additionally, preferably tamper-resistant modules 2003*a-c* are shown (three strong, though the number used can depend on the application) for holding and administering the secret values of the trustees that can be used during an elections, such as those used to make digital signatures and/or to open or show relationships between committed values, as described elsewhere. For each local trustee module, there can also be an online server managing those secrets, 2004*a-c,* shown connected to the corresponding local module by a telecommunication facility. In some embodiments, only local modules could be used without connections, in others, only online connections could be used without the need for local modules. Having both, of course, allows offline operation, but lets control revert to the online center when there is a connection. The communication facilities could be independent per trustee, as is shown, but various kinds of sharing are potentially more practical. The actual transmission of the coded votes can also be by the means shown here.

Voter choice box 2005 indicates that the voter can, after leaving the polling place, choose to have the ballot checked by one or more checkers 2006*a-c*. The voter might, in some embodiments, for instance, provide the ballot part to the voter's party representative stationed outside the polling place for the purpose. It would be preferred that the checker could completely verify the ballot part. If the polling place and checker are online, then the checker can determine if the coded vote on the paper has been properly posted. The proofs, if any are needed at this stage as has been mentioned depends on the embodiment, can also be verified online. But in those example embodiments mentioned, where the ballot part has (perhaps once the scratch-off layer is removed) the needed information, possibly in combination with data that can be obtained and stored by the checkers in advance of the election, the checker can do everything in real-time except verify that the coded vote is published. The checker 2006 can, however, store the coded votes and check later that they have been properly published and raise an alarm if they have not been. Digital signatures, for example, contained on the form would allow the checker to publish the alarm in a convincing way.

Turning now to FIG. 21a through 21*c,* shown are exemplary scratch-off coin-flip ballot features in accordance with the teachings of the present invention. In particular, each figure shows one of the four distinct configurations of a form 2101 that is to be split in two along a line 2103 bearing printed messages hidden by scratch-off covering 2102. As will be appreciated, the rest of the ballot and/or other information could be on the reverse side and/or is left out for clarity. Whatever scratch-off covering, referred to as "latex" here, is applied over each rounded corner rectangle 2102 and would hide the messages printed below it—though the messages are all shown through in the figure for clarity.

In operation, the voter would, at least in a preferred example, be free to choose one of the four rectangles and scratch the latex off of that rectangle and show the revealed printing to the poll worker (or a machine) at checkout. If the text says "This half is to be kept by voter," then the voter would be allowed to keep that part of the form and would have to give the other half to the poll worker. If, in the other case, the rectangle scratched off reveals the message "This half for polling place," then the voter should give the scratched-off half to the attendant (or machine) and take the other half away. In either case, one half remains at the polling place (possibly shredded) and the other half is preferably taken away by the voter. At most one rectangle would be scratched off in front of the election official before the decision about which half goes where. The half the remains at the polling place should have at most one rectangle scratched off. But the voter would be free to scratch off both rectangles on the half that they take away. It is preferred that voters be instructed to do so, since checking that both messages are present gives assurance that the forms are correctly printed and allow the voter to receive both halves, each in case the voter makes certain choices.

Turning now to FIG. 22*a* and 22*b*, exemplary monochrome overlay ballot features in accordance with the teachings of the present invention will now be described in detail. In FIG. 22*a*, a two-part ballot form is shown with a division mark and illustrates both a single ink color system and a novel type of physical form and way to produce the form. The illustration of FIG. 22*b* shows the same form in the reading configuration.

Referring particularly to FIG. 22*a*, in the example embodiment shown, the two halves are mirrored so that when the form is folded along the division mark, which could facilitate this, for example such as by a perforation and/or scoring, the pixels of the one half can substantially come into registration with the corresponding pixels of the other half. This type of arrangement is believed to have several advantages: the thickness of the substrate on which the graphic elements are supported does not cause potential misalignment due to angle; the graphics bearing surfaces/layers are substantially equally far from the outside surface, making their relative intensity and clarity substantially the same; the user, such as a voter, is able to conveniently fold the form and have the two halves held roughly in alignment; only a single surface is printed; alignment of the printing can be only to the division mark and then only in angle and horizontal position., but not vertical position.

Referring to FIG. 22*b*, the form of FIG. 22*a* is shown folded over the division line, the right half being folded over the left half, as can be seen by the position of the folded down corner and it's being covered by a layer of form. For clarity, the form is shown as if it were a transparent material. The name of the candidate has been encoded in a simple five by five fixed-width font. Of course whatever font, including handwritten drawing captured from the voter, can be used. Also, the inter-character space have been left blank for clarity and economy of ink and partly as an aid to registration; however, whatever field shapes and sizes that may be desired can be realized, with or without various approaches to dummy pixels.

Each pixel on the one half form is intended to correspond with a particular pixel on the other half form. When like pixels are superimposed, both graphics cover the same half of the pixel area. With opaque black ink on paper, as one example, light transitivity would be reduced to about half. When opposite pixels are superimposed, each graphic covers a different half of the pixel area and, again with opaque black ink on paper as an example, light transitivity would be nearly zero. The more transmissive the media, the more light, and the less diffusing, the more clear. Nevertheless, some diffusion may aid in blurring the rough edges of the pixels and the amount of transitivity required for good viewing is believed to depend on the lighting environment and the relative intensity of the backlighting and how well it is masked.

Turning now to FIG. 23*a* through 23*c*, exemplary polychromatic ballot features in accordance with the teachings of the present invention will now be described in detail. The final figure, FIG. 23*c*, represents the superimposition of the form shown in FIG. 23*b* over that shown in FIG. 23*a*. Only clarity, two different pixel colors are used, blue and green, and their overlap is shown as black. Any combination of radiation-influencing pixels that interact suitable would be applicable.

Referring to FIG. 23*a* and 23*b*, each pixel can be seen to be one of two different types and each appears independently to be apparently random and devoid of information content.

Referring now FIG. 23*c*, the superimposition of the two previous figures, ignoring any interference of the medium/substrate for clarity, the coded image appears in a five by five pixel font, as already described and discussed more generally with reference to FIG. 22.

Figure 24A:
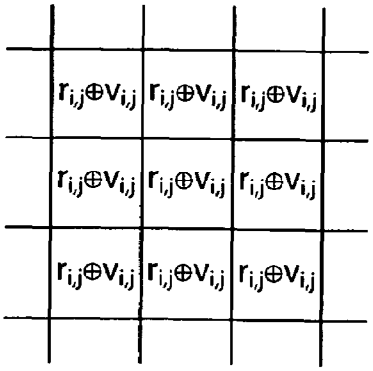

Turning now to FIG. 24*a* through FIG. 24*e*, example schemas and formulas for overlay systems in accordance with the teachings of the present invention are shown. In particular, these formulas follow an approach already presented but adapted here to binary values for clarity. FIG. 24*a* represents the coded vote that is a part of both haves, FIG. 24*b* what would be on a first half, FIG. 24*c* what would be shown and proved if that half is taken by the voter, FIG. 24*d* what would be on the second half, and 24*e* what would be shown and proved if that half is taken by the voter.

Referring specifically to FIG. 24*a*, each bit of the rotated vote is shown as a table entry corresponding to a particular pixel. Each entry is shown as $r_{ij} \oplus v_{ij}$. The "$\oplus$" symbol is used to denote exclusive-or (or potentially a group operation in whatever Abelian group with more than two pixel values). The subscripts, ij, are intended throughout the present descriptions to refer to the coordinates of the pixel that they correspond to. For clarity, in this correspondence, the matrix entries can be taken as mapping in the most obvious direct and one-to-one way to the individual pixels, as if the two were superimposed in space. Each entry in this matrix is the exclusive-or of the corresponding secret rotation bit $r_{ij}$ and the secret vote pixel bit $v_{ij}$. Thus, instead of a single rotation amount for a whole office with the number of values appropriate to cover all choices for that office, there is a single rotation value for each pixel used to display the candidate name and that rotation value assumes only one of the two binary values 0 or 1. Similarly, instead of a single vote value that ranges over all allowed vote options, there will be multiple values, each corresponding to a different pixel that together represent the vote, and each ranging only over the values 0 and 1. Naturally, the choice of font and layout rules can be fixed to create a one-one mapping between the pixel matrix and the vote, or optionally, such as in the case of a voter written write-in, there may be no single such mapping.

The rotated vote matrix can be encoded on the ballot form, not shown for clarity in FIG. 22 and FIG. 23, in a variety of ways. One is using the same pixel coding as for the parts shown there. Another way would be by a separate machine-readable part, such as a two-dimensional barcode for example.

Figure 24B:
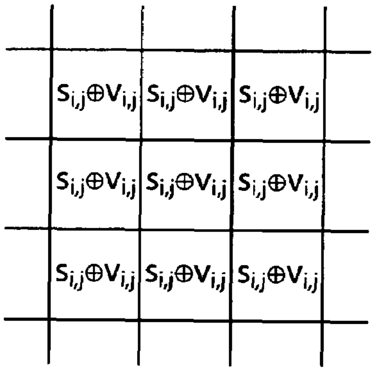

Referring now to FIG. 24*b*, a few pixels of one part of the ballot form, such as the part shown in FIG. 23*a*, for example, is shown. The formulas shown in FIG. 24*b* represent the bit value $s_{ij}\oplus v_{ij}$ that are encoded by the choice of color in pixel i,j of that example. To prepare the ballot part, the secret shift value is added modulo two with the corresponding vote pixel value and the resulting bit determines the particular color that is then printed in that corresponding pixel of the form.

Figure 24D:
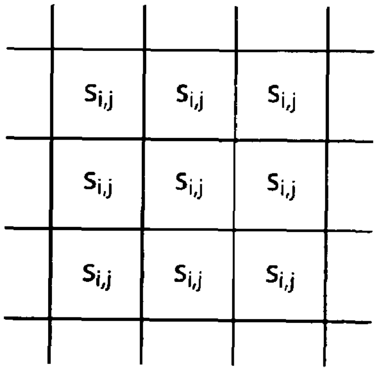
Figure 24C:
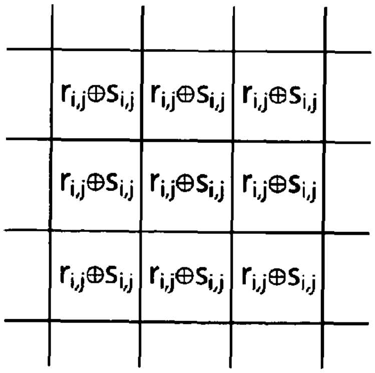

Referring to FIG. 24*c,* shown are some example values, $r_{ij}\oplus s_{ij}$, that would be revealed and preferably proven correct in the case when the ballot half of FIG. 24*b* is taken by the voter. As will be appreciated, when any of these bits is added modulo two with the corresponding bit that is encoded by the color of the corresponding pixel i,j and the corresponding i,j bit of FIG. 24*a,* the result should be zero. This would be checked by a voter or on behalf of a voter, as already described.

Referring now to FIG. 24*d,* a some pixels of one part of the ballot form, such as the part shown in FIG. 23*b*, for example, are shown. The formulas shown in FIG. 24*d* represent the bit value $s_{ij}$ that are encoded by the choice of color in pixel i,j of that example. To prepare the ballot part, the secret shift value is determines the particular color that is then printed in that corresponding pixel of the form.

Figure 24E:
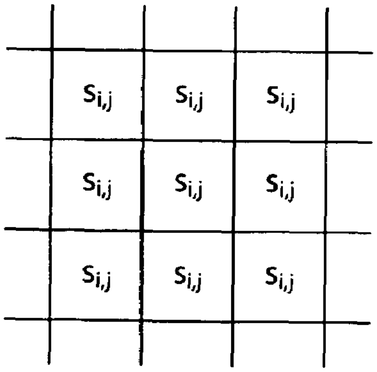

Referring to FIG. 24*e*, shown are some example values, $s_{ij}$, that would be revealed and preferably proven correct in the case when the ballot half of FIG. 24*d* is taken by the voter. These would then preferably checked for equality with the corresponding i,j bit of FIG. 24*d* on the ballot form, for example by a voter.

Turning now to FIG. 25*a* through 25*c*, shown are example schemas and formulas for streamlined overlay systems in accordance with the teachings of the present invention. First FIG. 24*a* shows an example "checkerboard" arrangement for dividing the pixels between the two kinds of treatment. Then FIG. 25*b* and FIG. 25*c* show the values that would be used to print and also would be proven for the respective halves. The notational conventions introduce din FIG. 24 are used here as well.

Referring particularly to FIG. 25*a*, an example part of a binary-valued matrix is shown. The pixels corresponding to 1 bits are treated a first way in FIG. 25*b* and a second way in FIG. 25*c*. The pixels corresponding to 0 bits are treated the second way in FIG. 25*b* and the first way in FIG. 25*c*. The binary matrix can have a regular structure, such as a familiar checkerboard. It can have an apparently random structure, fixed for an election, or as a preferably cryptographic hash function of random input supplied by voters and/or other parameters fixed or committed to in advance. It is anticipated that the structure optionally may be tuned in accordance with particular properties of particular fonts or handwriting encoding.

Referring to FIG. 25*b*, the entries corresponding to 1 bits in FIG. 25*a* have the value shown as $s_{ij}\oplus v_{ij}$ and those corresponding to 0 bits in FIG. 25*a* have the value $s_{ij}$. As mentioned, the value printed on the particular ballot form part would encode the corresponding bit and the corresponding value revealed and proved correct if this half is taken by the voter should match.

Referring to FIG. 25*c*, the entries corresponding to 0 bits in FIG. 25*a* have the value shown as $s_{ij}\oplus v_{ij}$ and those corresponding to 1 bits in FIG. 25*a* have the value $s_{ij}$. The value printed on the ballot form part not corresponding to FIG. 25*b* would encode the corresponding bit and the corresponding value revealed and proved correct if the present half is taken by the voter should match.

Turning now to FIG. 26*a* through 26*c*, shown is an exemplary ballot form splitting comprising more than two potential parts in accordance with the teachings of the present invention. In particular, the type of ballot already described with reference to FIGS. 22 and 23 is shown intact but with the location of the separation indicated in FIG. 26*a* and each of two parts retained by the voter in FIGS. 26*b* and 26*c*.

Referring to FIG. 26*a*, the character cells 2601 are places where a single separate character of a candidate name can be made visible in the superposition shown, as indicated by the overlapping corners as already mentioned with reference to FIG. 22. The dotted division line 2602 is shown taking an apparently "random walk" across the ballot form while avoiding the cells 2601. This line can be created physically at random and/or by cooperation of the voter and other parties. It is chosen from a large set of possible division lines. The form is physically divided according to the line, such as by being separated by following pre-perforated lines or by being cut using whatever arrangement of tearing, knives, and/or shears. The actual separation of the complete form into two parts is not shown for clarity.

Referring to FIG. 26*b* and 26*c*, however, what is shown are the two parts retained by the voter: that of FIG. 26*b* is from the upper layer but below the dotted line; that of FIG. 26*c* is from the lower layer, but above the dotted line. The folded corner is included and the shape of the character cells 2603 on the lower layer are shown with rounded corners.

As will be appreciated, the example divides the overlayed form into two parts, although any number of parts could be used (including zero as in the previous examples). Also, the example avoids the character cells in an example solution to the problem of a cut through an information bearing pixel possibly revealing the content of the pixel on both layers, part of the pixel being on the upper layer and part on the lower layer. It is believed that the probability of a ballot part that is improper in many cells—even on a single layer—avoiding detection with such schemes is substantially lower than 50%.

Figure 27B:
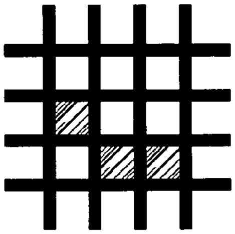
Figure 27C:
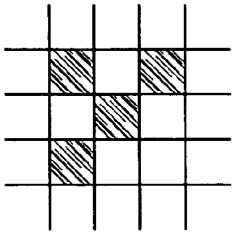

Turning now to FIG. 27, shown are three configurations of an exemplary ballot form material and printing technique in accordance with the teachings of the present invention. The framework lines in all three figures are intended to be preprinted on the media in this example embodiment. The heavy lines are preferably on one layer of the media in some prelaminated embodiments; the lines are on both layers in some embodiments in which the layers are printed separately; and in yet other embodiments, the heavy lines are on one layer and preferably invisible or very thin lines are on the other layer. FIG. 27*b* shows that some of the elementary cell locations are filled in by printing. The registration of this printing to the lines can be adjusted based on sensors that detect the position of the lines. As will be appreciated, whatever flaws in the printing registration and edge definition that are covered by the this printing are believed hidden and prevented from doing any harm by the pre-printed lines. Similarly FIG. 27*c* shows another layer with its own positioning of printing. If these lines can be sensed, whether or not they are visible, then they can be used for automatic registration adjustments, as are known in the art. As will be appreciated, the thickness of the heavy lines also provides some non-zero error angle and viewing angle if the heavy lines only appear on one layer.

Figure 28A:
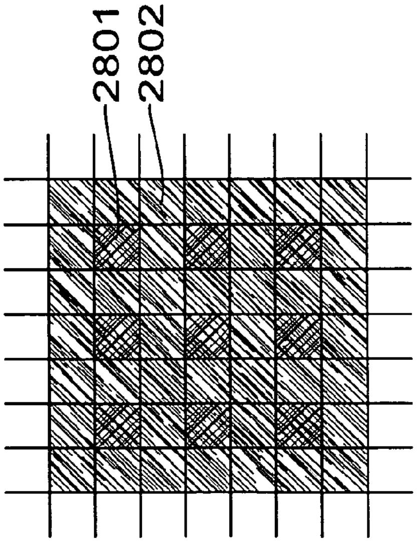
Figure 28B:
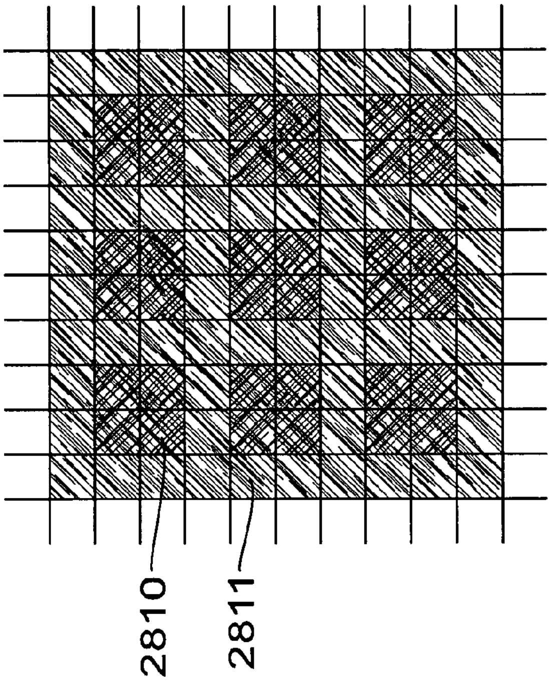

Turning now to FIG. 28, shown is an exemplary single pixel spacing around a block of pixels in accordance with the teachings of the present invention. In FIG. 28*a,* the pixel block can be seen to be comprised of a single pixel 2801 surrounded by a single layer of border pixels 2802, in a regular pattern as shown. As another example illustration, FIG. 28*b* shows a pixel comprising four pixels 2810 but still separated by a single row of border pixels 2811. As would be obvious, any shape of block pixels could be used and surrounded by any number of border pixels. In particular, square block pixels and the grid of border pixels each of any counting number can be envisioned. When both layers are in one of the same such configurations and they are registered above one another, it is believed that deteriorated viewing begins substantially immediately after the perpendicular but that error viewing does not occur for an angle determined by the relationship of spacing between layers to the minimum width of the border pixels.

Figure 29A:
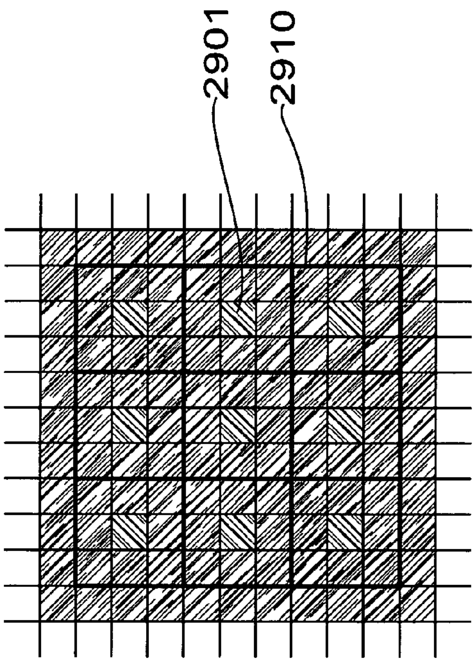
Figure 29C:
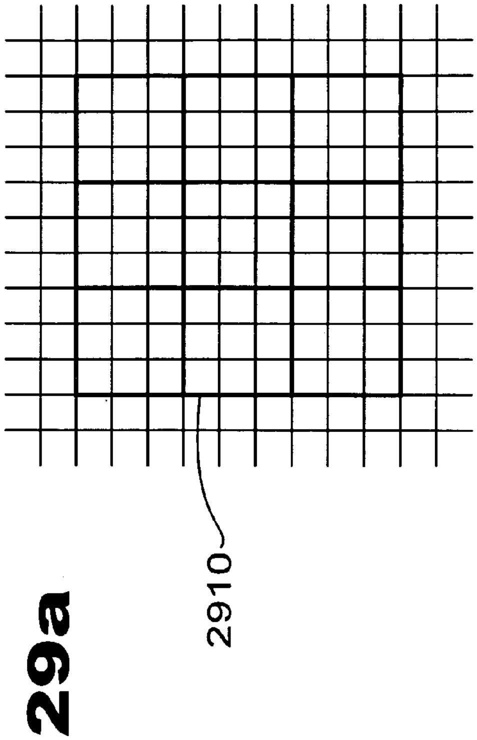
Figure 29B:
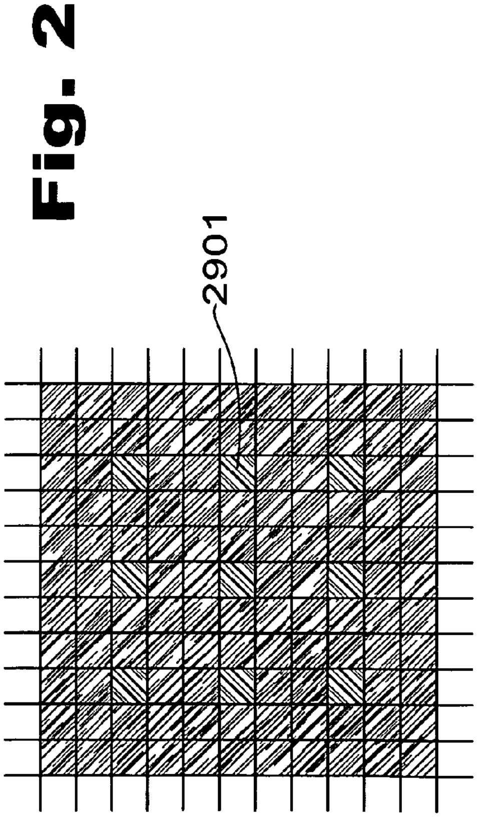

Turning now to FIG. 29, shown are exemplary stacked window sizes in accordance with the teachings of the current invention. The upper FIG. 29*a* shows both layers in superposition, the lower FIG. 29*b* can be interpreted as the upper layer and FIG. 29*c* as the lower layer. As can be seen, each pixel block 2901, comprising a single pixel in the example shown, is surrounded by its own border of a single pixel in the upper layer. The block printing would vary depending on the bit to be printed, as already explained, but the border pixels would always be printed preferably black. The heavy line grid 2910 indicates the pixel blocks used in the lower layer of FIG. 29*c*. Thus, in the example, considering a single cell in registration on the upper and lower layer, and black and white printing for clarity, the upper layer is either opaque or contains a single open pixel in the center, whereas the lower layer is either fully opaque or fully open. Again as in FIG. 28, the inner cells could be any size, not simply the single pixel shown, and the outer cells could be any size, not just only the three-by-three square shown. As will be appreciated, the viewing angle and error angle are believed to be about the same and to depend on the relative size of the pixels and the distance between the layers.

Figure 30A:
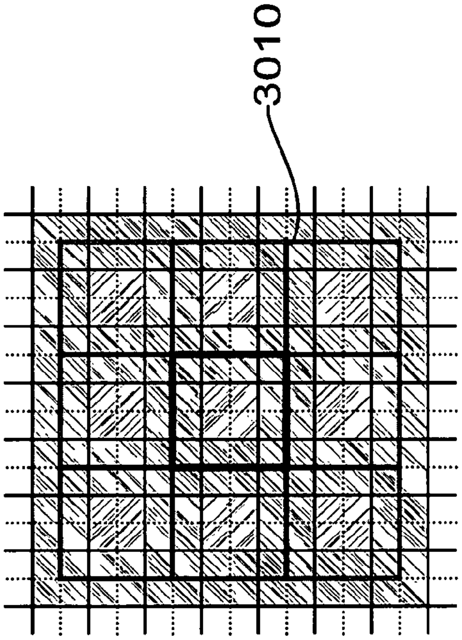
Figure 30C:
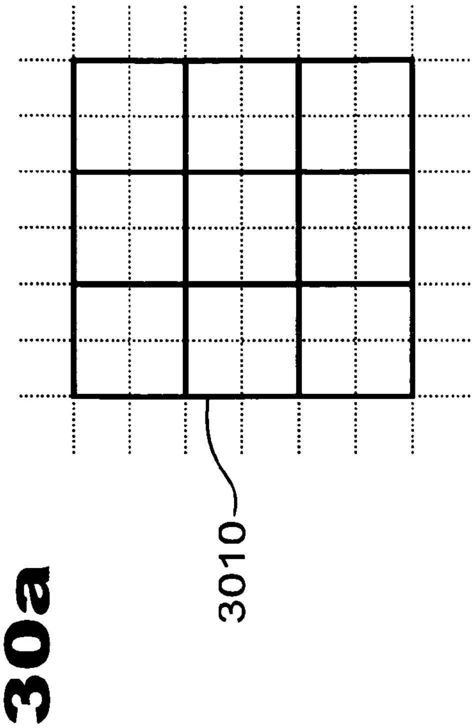
Figure 30B:
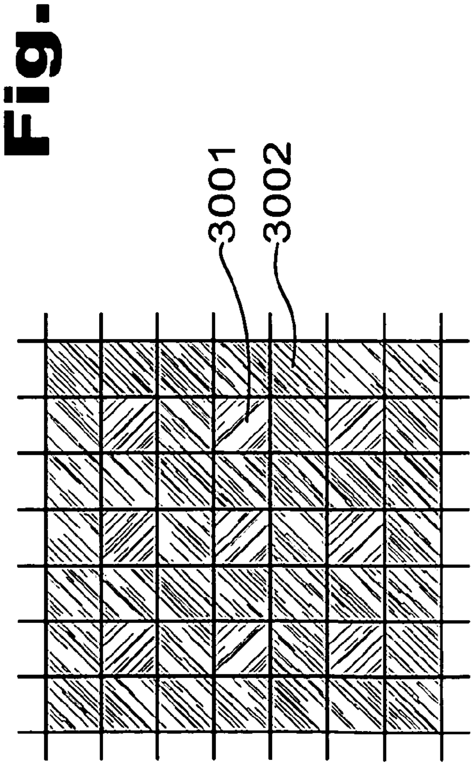

Turning to FIG. 30, shown is an exemplary embodiment of staggered pixel locations in accordance with the teachings of the present invention. An effect much as in FIG. 29 already described is created, but pixels twice as large are used in this embodiment, thereby benefiting by creating higher resolution from a given pixel size or reducing the pixel size used to take advantage of lower cost and tolerances as well as less data. Again the upper FIG. 30*a* shows a composite of both what can be regarded for clarity as the upper layer FIG. 30*b* and the lower layer FIG. 30*c*. In particular, a block 3001 on the upper layer of FIG. 30*b* is shown surrounded by a total border of one pixel 3002, as contrasted with a total border width of two pixels in previous FIG. 29*b*. As will be appreciated, these pixels of the upper layer are shown aligned to the solid thin line grid, whereas those of the lower layer, FIG. 30*c*, are shown aligned to the dotted line grid. These two grids are fully out of phase with each other in both dimensions. Thus, for example, the center of a block on the top layer 3001 is at the intersection of pixel boundaries on the lower layer. The lower layer of FIG. 30*c* is divided into two-by-two blocks, as indicated by the thick lines 3010, that are aligned to the grid pattern shown as dotted lines. As will be appreciated, any block shape and boundary configuration could again be used with these staggered techniques, the example shown believed to be one of the smallest and simplest and chosen for clarity. An example variation would stagger in only one dimension.

Figure 31B:
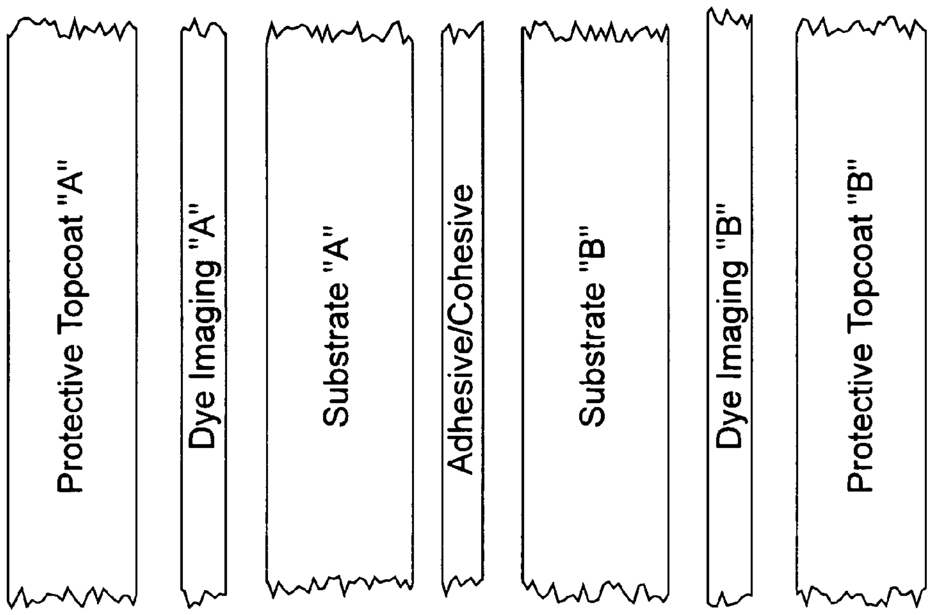
Figure 31A:
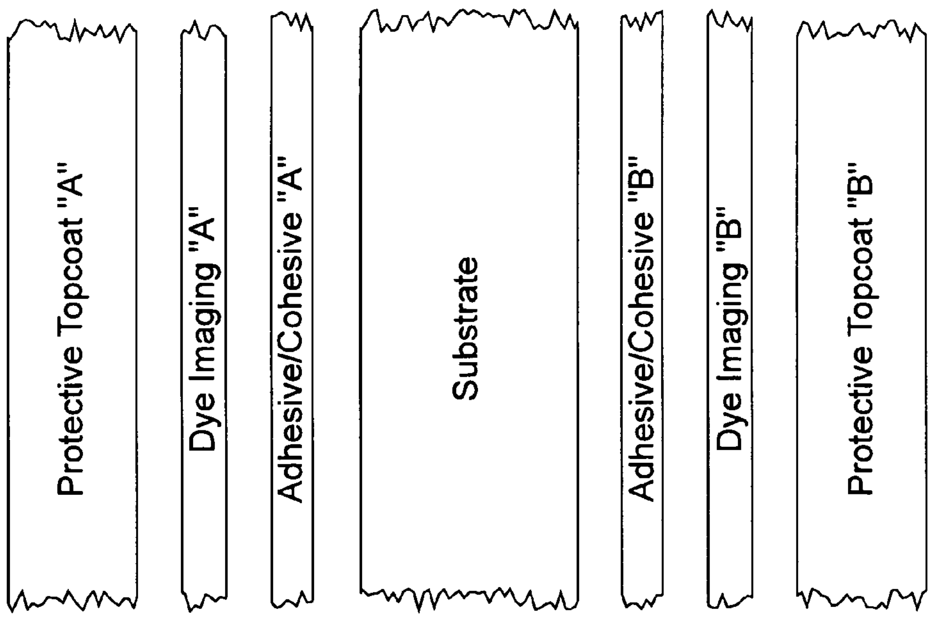

Turning now to FIG. 31, shown is are exemplary pre-laminated media in accordance with the teachings of the invention. Both are shown as cross sections through the layers of the laminate in exploded view, using groupings of sub-layers into layers and layer thickness chosen for clarity but without limitation. A shared substrate is shown in the embodiment of FIG. 31*a* while an exemplary split substrate is shown in FIG. 31*b*.

The substrates are preferably translucent and/or transparent, such as so-called "vellum" paper stock or transparent plastic sheet such as, for example, polyester. A total thickness around three to five mil is typical of documents or plastic sheets to be handled by people. The protective topcoat serves multiple functions, as are known in the art, including providing a so called "slip" coat as a possible sub-layer to ease sliding by the printhead and reduce wear as well as to protect the dye imaging layer. The dye layer optionally may comprise protective optional barrier and/or binding sub-layers, for example. In some cases, the protective and dye layers are supplied as a single web to converters, such as with the CL-532 Clear Face stock manufactured by Labelon Corporation of Canandaigua, N.Y. The adhesive/cohesive layer(s) can be any of the well known adhesives, ranging from the very aggressive/sticky and permanent types all the way to the so-called "re-positionable" such as that made by 3M and sold under the trade name "ReMount" and better known as the sticky stuff in "Post-it" products. One advantage of such adhesives is that the ballot part could conveniently be adhered to another surface to aid in handling, such as by the voter and/or by the poll workers and/or by apparatus at the polling place. A cohesive, such as the "exceptionally transparent cohesive" CH252 manufactured by VALPAC Inc. of Hurlock, Md., allows the separated parts to be handled without adhering them to other media. It is known in the converting and laminating art how to prevent air bubbles in such laminations.

Referring particularly now to FIG. 31*a*, shown is a shared substrate labeled "Substrate" that is sandwiched between two similar triple layers, "A" and "B". In order of distance from the substrate, the triple layers comprise: an "Adhesive/Cohesive" layer, a "Dye Imaging" layer, and a "Protective Topcoat" layer, all as already described.

Referring particularly now to FIG. 31*b*, shown is a split substrate system, comprising two triple layers, again referred to as "A" and "B", adhered by a layer labeled "Adhesive/Cohesive," as already described. Each triple layer comprises, in order away from the adhering central layer, a "Substrate", a "Dye Imaging" layer, and a "Protective Topcoat" layer, all as already described.

Figure 32A:
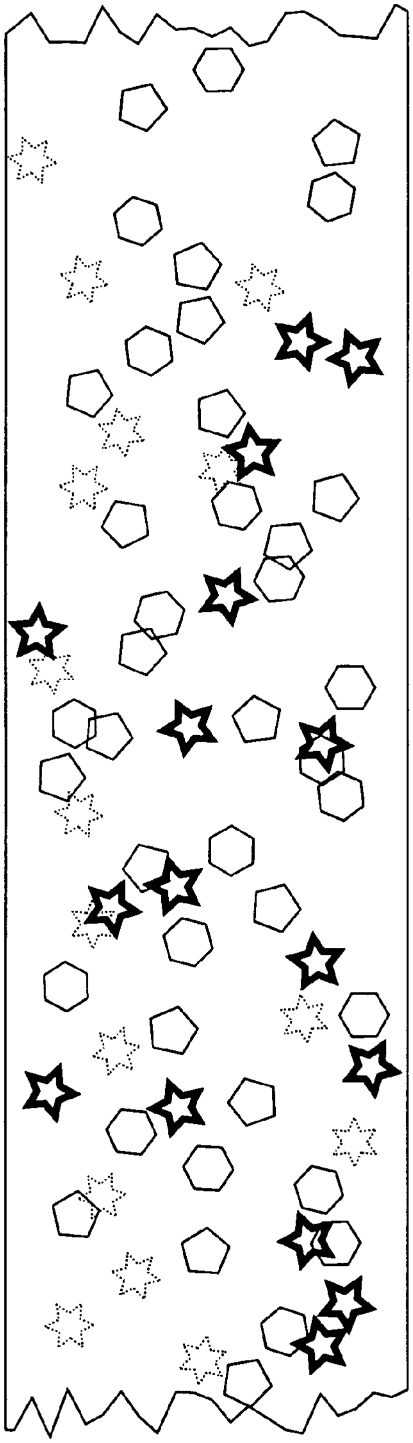
Figure 32B:
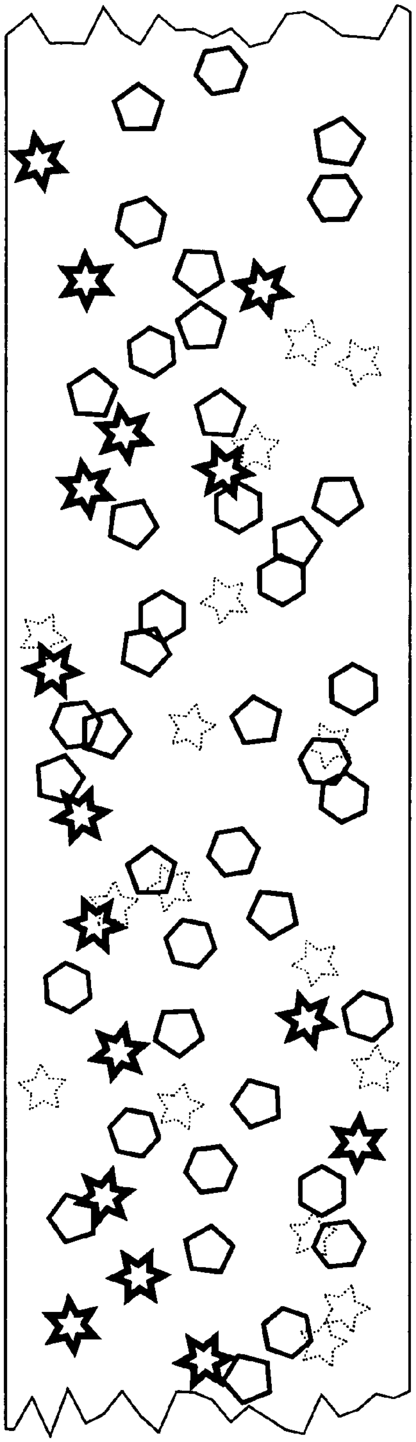

Turning now to FIG. 32, shown is exemplary media that changes from one transmissive color to another in accordance with the teachings of the present invention. Such a dye-based imaging layer would it is believed be suitable for the metamer-based approach described with reference to FIG. 23. Both figures show a cross section of the same dye imaging layer: FIG. 32*a* shows the layer before heating and FIG. 32*b* shows it after heating. Both layers are shown in the example comprised of a matrix containing four types of particles: the convex polygons are activators and the concave or "star" polygons are dyes. The five-point stars are the first color, say for clarity "green", and in the upper state they provide substantially the color for the layer, making it a transparent green filter, while the other color, the six-sided star, is in a dormant inactive state (shown by dotted lines). When heated, however, the convex polygons are activated (shown by thicker lines), such as by various known techniques used in thermal printing. The activated pentagons "destroy" or otherwise inhibit the color properties of the green dye (shown by turning the lines dotted), in a fashion such as is known in photography; the hexagon activators, at the same time, cause the six-sided stars to be developed (shown as bold lines) and their color, for instance, blue, to dominate the filter.

Figure 33A:
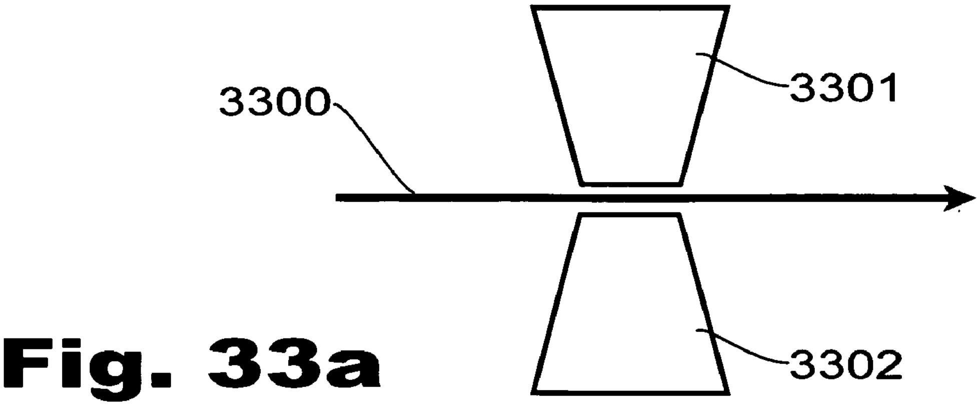
Figure 33B:
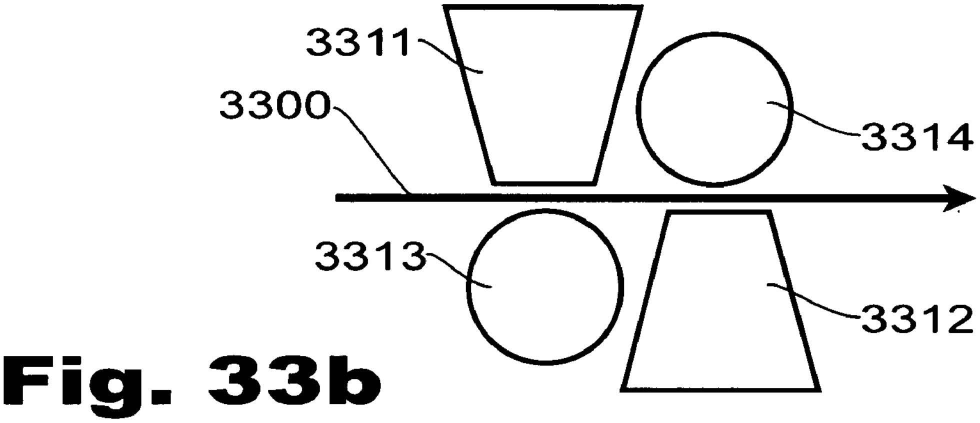
Figure 33C:
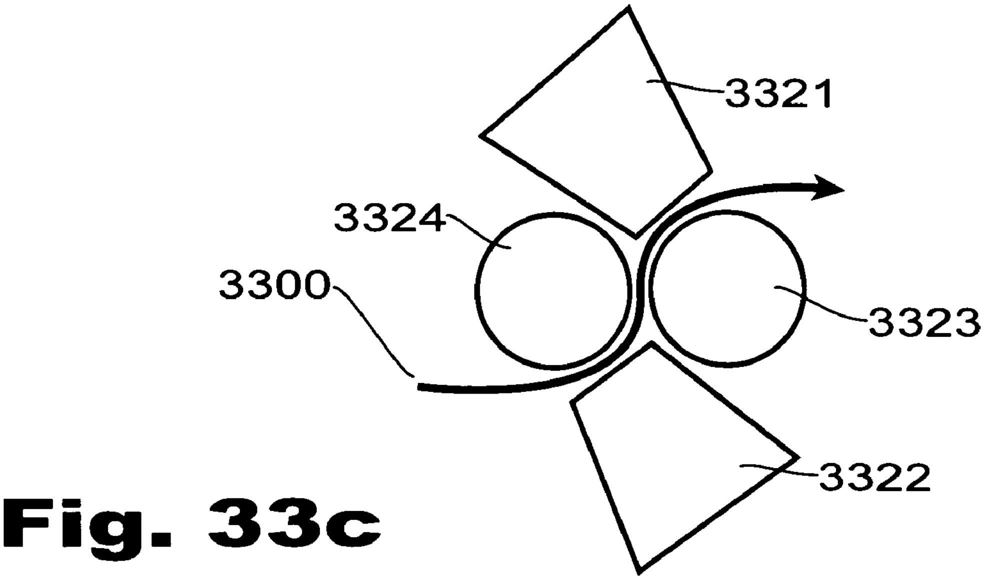

Turning now to FIG. 33, shown in section are exemplary printhead and roller arrangements in accordance with the teachings of the present invention. Three different arrangements of printheads and media are shown, the first FIG. 33*a* is without rollers, while FIG. 33*b* and FIG. 33*c* do contain rollers. As will be seen, the media path is substantially straight in the first two, for instance allowing thicker and/or less flexible stock, while it is substantially curved in FIG. 33*c*.

Additional rollers are anticipated, not shown for clarity, that would in some embodiments further guide the media and prevent interference with the mechanism, as is know or could be readily conceived. Also not shown for clarity is the drive arrangement: systems where the rollers shown drive the media and/or where the media is pulled by rollers not shown are anticipated, as are arrangements for synchronously coupling plural rollers in media feed systems and/or providing tensioning with or without sensors. Pressing the media and printhead together is also known in the thermal printer art and can be accomplished, not shown for clarity, by deformable members such as springs or rubber arranged to urge the printheads and/or the rollers towards each other. Various printhead geometries are known in the art, including so called "true edge," shown for clarity, "corner edge" and "flat".

Referring to FIG. 33*a*, shown are two printheads 3301 and 3302 on opposite sides of the ballot stock 3300. If the printheads are flat enough, or broken into sections small enough, then such an approach is believed workable. Additionally, the more deformable the media 3300, the better any aberrations in its thickness and so forth as well as printhead flatness and positioning can be tolerated. Some internal layers, such as the adhesive or even substrate can, it is believed, be made from relatively elastic material, to provide resiliency sufficient to conform to the printheads.

Referring now to FIG. 33*b*, shown are printheads 3311 and 3312 with rollers 3313 and 3314 configured in series with the media suspended between them. This embodiment allows a straight media path, though the gap is believed to potentially introduce more registration errors than a system like that shown in FIG. 33*c*.

Finally, referring to FIG. 33*c*, shown again are two rollers 3323 and 3324 that are substantially in compressing contact around media 3300. Moreover, printheads 3321 and 3322 are also arranged so as to trap media 3300 in between themselves and the respective rollers 3323 and 3324. It is believed that the continuous contact between media 3300 and rollers 3323 and/or 3324 can provide in some example embodiments more control than the configuration of FIG. 33*b*.

Turning now to FIG. 34, exemplary detailed block, schematic, partial ordering, flowchart, plan view, and protocol schema are shown in accordance with the teachings of the present invention. Included are major parts related to a single voter. Shown first is the actual voting choice making by the voter as box 3411.

Next a meta box 3412 is shown following box 3411 temporally, as indicated by the arrow. Three boxes are included, without temporal dependencies indicated. Box 3412*a* is the printing or other rendering of the layers and associated indicia, as has been and will be mentioned further. Box 3412*b* is the printing or other rendering of the shared data, as has been and will be mentioned further. A decision box 3412*c* is shown contained within meta box 3412 that suggests the voter can as optionally part of an ongoing process, presumably based on inspection of the layers, determine whether to accept the layers or not: if not, then optionally the voter may return to make new voting choices, amend choice, or obtain new layers for the existing choices; if yes, the voter moves on to box 3414. In this box, the voter is shown as being able to make a choice between layers, selecting in some examples which layer will be the voter layer and which the system layer, as already mentioned. Preferably before the choice in box 3414 is made, there is a commitment made, box 3413, related to the particular ballot. One way such a commitment can be made is the printing on the form, as has been previously disclosed and as indicated in the present specification particularly with reference to FIG. 36. Another exemplary way to establish such a commitment is by publishing, such as on a computer network, perhaps all the values committed to. Still another approach is to provide as physical storage media, such as optical disc, the commitments. Digital signatures, time-stamping, and so forth can be helpful in ensure the commitments are not surreptitiously changed.

Having accomplished the actions of boxes 3412 and 3413, box 3414 indicates that the voter is preferably able to at least have an influence over what layer will become the voter layer and what layer the system layer. Now meta box 3415 indicates some optional steps, as indicated by the dashed boxes it contains. One is box 3415*a* that scans at least one layer. Scanning the voter layer can for example ensure that it is properly printed and, that it corresponds to the system layer, and/or that the data it contains is made available to the station doing the scanning. The other box in meta box 3415, 3415*b*, indicates that the system layer can be shredded or otherwise destroyed or rendered illegible once the voter choice is made and preferably once it has been at least recognized as correctly corresponding to the voter layer. In some embodiments, to be described in more detail, the system layer can preferably be retained for the purpose of recount and/or audit of ballot style or votes.

Box 3416 depicts that some additional information is preferably but optionally released, after the layer choice is committed, such as that would allow a digital signature to be obtained on the voter layer and/or allow the commit related to the other layer to be verified. Finally, box 3417 provides for the optional verification of the voter layer, which can be by the voter, third parties in person and/or over computer networks.

Turning now to FIG. 35, a plan view and schematic diagram is shown for an exemplary printed two-layer receipt, in accordance with the teachings of the present invention. FIG. 35*a* is the form combined as a single piece of material, such as paper, with a dashed line down the middle, which can optionally be a pre-perforation or otherwise allow pre-determined or assisted separation of the two layers shown side by side. The order of the candidates has been shifted, constituting a group element. The position of the indicator, shown as a triangle pointer, on the other layer is a second group element. The pointer points to the candidate chosen by the voter and the voter is believed to be able to readily verify this by inspection of the combined layers. In particular, voted for are James Monroe and Thomas Jefferson. The serial number of the ballot is shown, 9365-4549, and should also be included in the barcode that constitutes the shared data by spanning the shear line as already mentioned.

Referring to FIG. 35*b*, what would be regarded as one layer is shown after being processed as the voter layer, as suggested by the barcode at the bottom that would include the key matter providing for signatures and allowing verification of commits published elsewhere as already described. Similarly, FIG. 35*c* is of the receipt represents a layer that has been separated from the whole and has received additional information in the form of extra printing (although this is only an option) as already indicated.

Figure 36C:
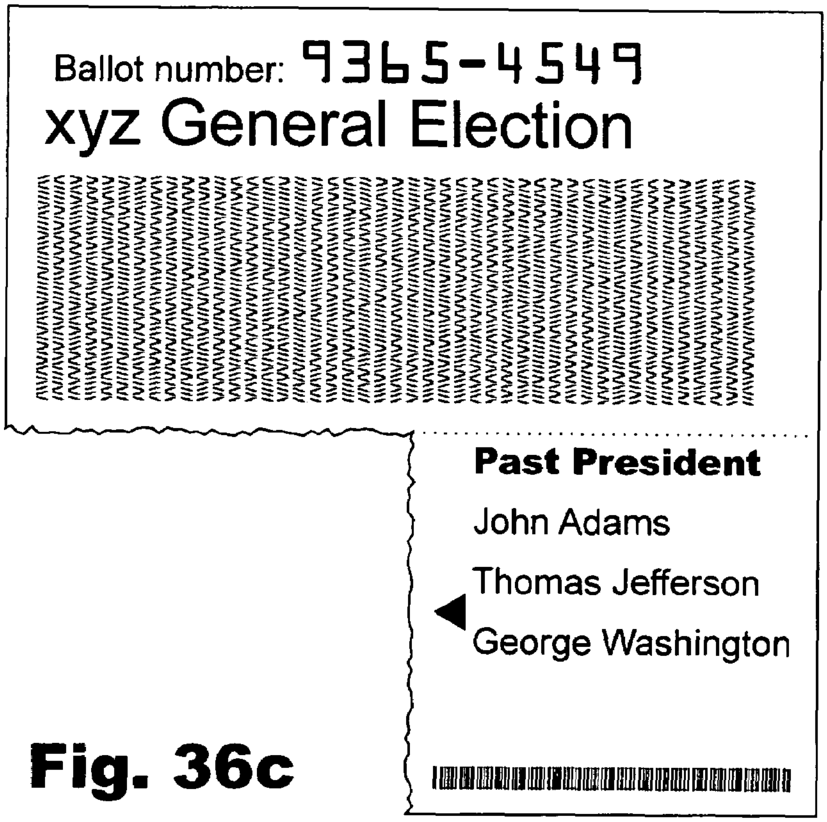

Turning now to FIG. 36, a variation on the embodiment of FIG. 35 is shown in substantially the same way. That of FIG. 36 differs in that the commit is shown included on the form and then when the layers are separated, the commit is kept with the voter layer as shown in FIG. 35*b* and FIG. 36*c* for the right and left layers, respectively.

Turning now to FIG. 37, a plan view and schematic diagram is shown for an exemplary two-layer receipt with a marked ballot, in accordance with the teachings of the present invention. Referring to FIG. 37*a*, the ballot form can be seen with the candidates names for two contests in the canonical order. The rectangular marks along the left edge are traditionally used with mark sense technology to allow registration to the marks filled by a voter; when general-purpose scanners are used, for example, such marks are often omitted.

Figure 37A:
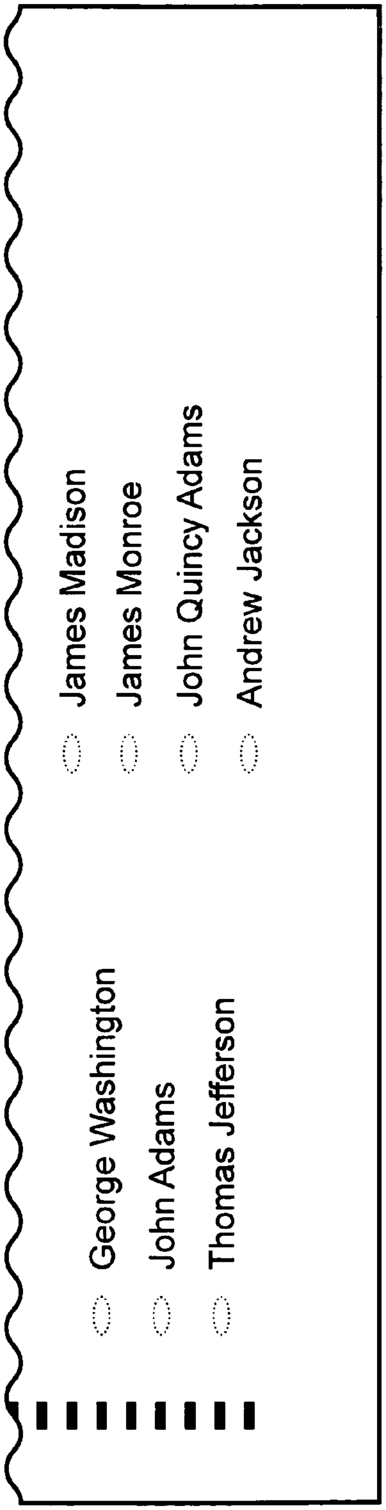
Figure 37B:
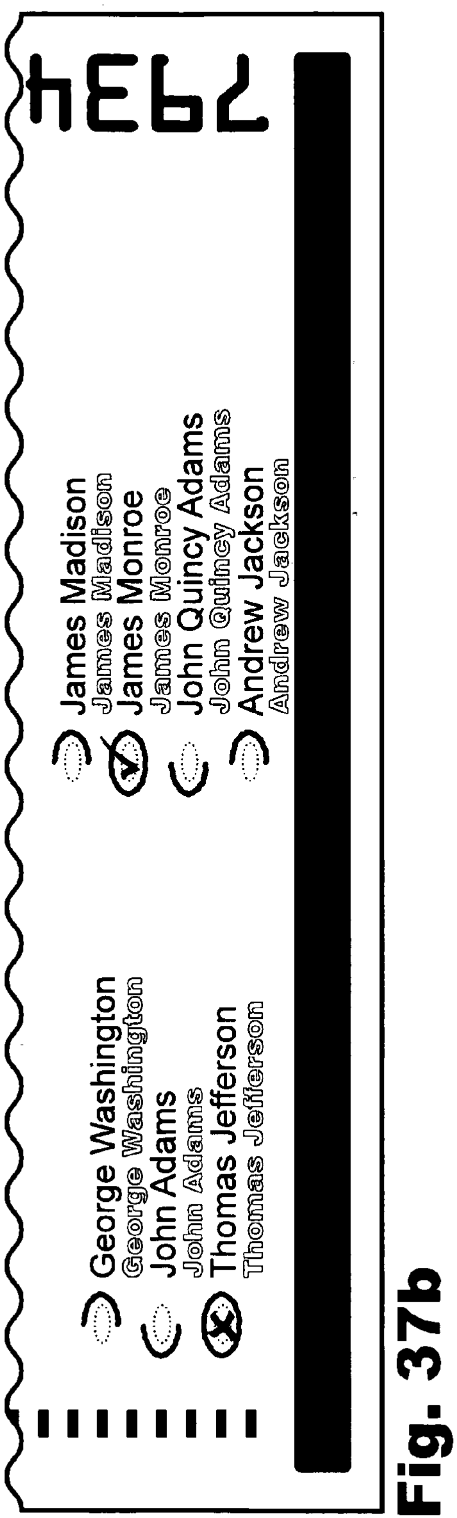
Figure 37C:
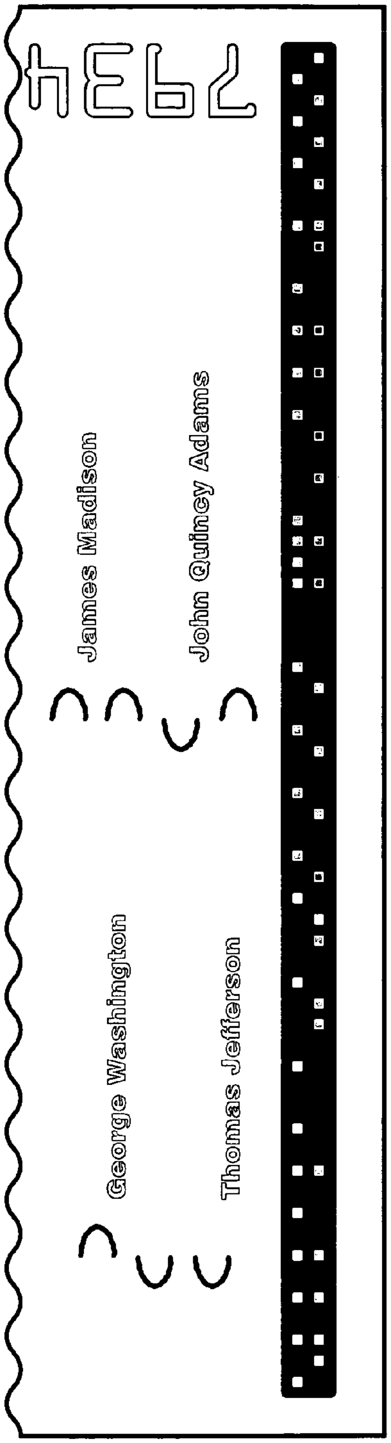
Figure 37D:
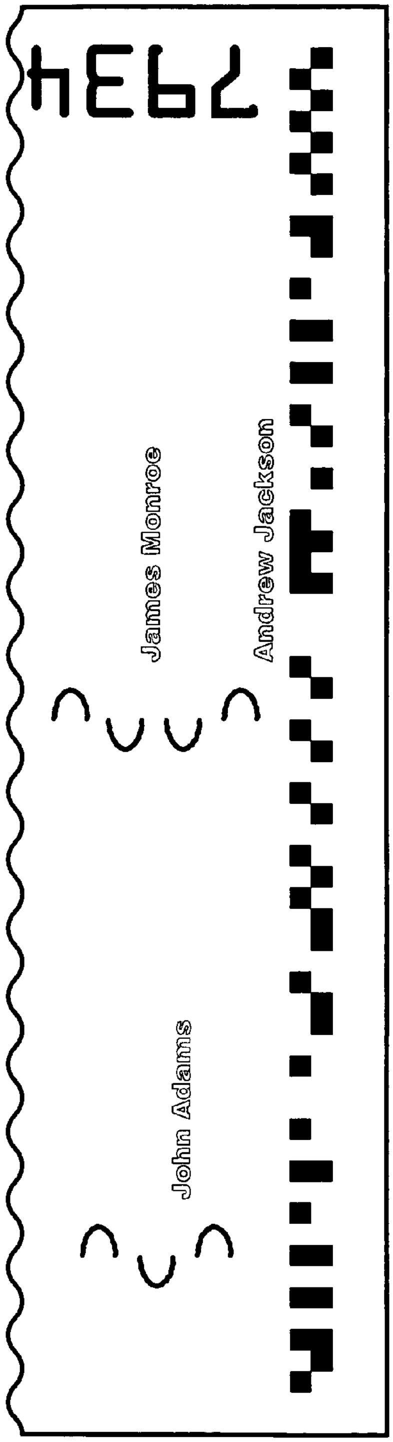

With reference to FIG. 37*b*, shown is the combined ballot: the paper form marked by the voter from FIG. 37*a* on the bottom, and the two transparent foils of FIGS. 37*c-d* to be described layered on top. The marks made by the voter on the ballot are indicated as cross and a check mark, although whatever darkening pattern chosen by a voter and recognized by the scanning technology may be used. The voter marks are encircled by marks that are actually printed on in part on each foil as will be seen; the ovals not marked by the voter have only half of a surrounding symbol, as will be seen to be printed on one or the other transparent foils. The candidate names are repeated in adjacent white space as an optional device to allow the foils to include information that can be used to verify the so-called "ballot style," the candidates and other information contained on the ballot. The solid bar at the bottom is used for the shared data and is made up of parts from each of the two foils. The ballot number is also provided in this example by the foils; this allows the forms to be distributed without regard to the voter instance involved. The serial numbers are show in a font that is intended to allow the voter to easily recognize that the two foils each contain the same serial number, with one being in the example an outline of the other.

Turning to FIG. 37*c-d,* the foils are shown separately. Each can be seen to contain only half of the encircling symbols. The group element being a single bit encoding the direction of the corresponding symbol. The candidate names, as mentioned, appear only once in the example, so as to reduce the issues of registration. Various shortened forms of the candidate names could be included, such as initials, last name only, and so forth. Also the names could be split, say, first on one foil and last on the other. Registration permitting, the letters could be split and/or even finer splits are anticipated. It is believed that splitting the names improves symmetry of the choice provided and includes some checking of ballot style in case either foil is chosen.

Various optical devices, as will be appreciated, can enhance the appearance and clarity of what is presented to the voter. For example, the particular squiggly lines shown are intended to illustrate shapes that have a good tolerance for misalignment. As another example, transparent colors can be printed, so that when two overlap the result is a muddy dark brown or black; but when the two do not overlap, as with the candidate selected, they each appear a bright color, allowing the eye to find the circled candidates even more easily. In some examples, metamer dies are used, so that the combined circle is a single color, but the overlapping half circles are dark.

The bars at the bottom encode the shared data, as already mentioned. The example coding shown is intended to provide substantial tolerance for misregistration of the foils when combined, however, more or less registration may be available as the technology varies and symbologies other than those shown may be more appropriate. Where one coordinate in the matrix is filled in on one foil it should be clear on the other. The framing provided by the symbologies is intended to make the combined layers solid within the registration tolerance. Various schemes can ensure that both are not filled if each is recognizably properly coded. For instance, one scheme would be half open and half filled, another would be including an encoding of the Hamming weight in one's complement. The serial numbers are shown printed one as outline and one as its fill. Since the numbers are preferably also encoded in the machine read part, this readily human-readable version is for convenience in handling. Various other arrangements are possible, including splitting the digits themselves.

Turning now to FIG. 38, a plan view and schematic diagram is shown for an exemplary tactile receipt, in accordance with the teachings of the present invention. Shown is a Braille version substantially similar in parts to that of FIG. 35*a-c*. The optional printing of the serial number in normal text is to facilitate handling by poll-workers and the like. The keys are printed at the bottom in non-tactile form, but could be in tactile as well. The dashed horizontal bars demarcate the contests, which are labeled in Braille. Within a contest, the solid horizontal bars encode the shared data, preferably the bit of shared data corresponding to the candidate immediately below each. The candidate names are printed in Braille. The vote is indicated by the small and large circles, though any symbols could be used. When the two symbols are the same, that indicates the candidate voted for; when the two circles on a given line differ, that candidate is not voted for. It is believed that a voter running his or her finger down the center can readily recognize that the shared data lines are the same across the distance. The double lines encode one bit value, the single the other bit value. The group elements are bits and the operation is exclusive-OR, both for the shared data and for the circles.

Turning to FIG. 39*a-d,* plan view and schematic diagram is shown for an exemplary two-layer receipt with a marked ballot, in accordance with the teachings of the present invention. This figure is shows a variant on that shown in FIG. 37, but here the bars at the bottom encoding the shared data are replaced by the encoding the shared data in the shape and/or orientation of the marks printed on the laminates.

Figure 39A:
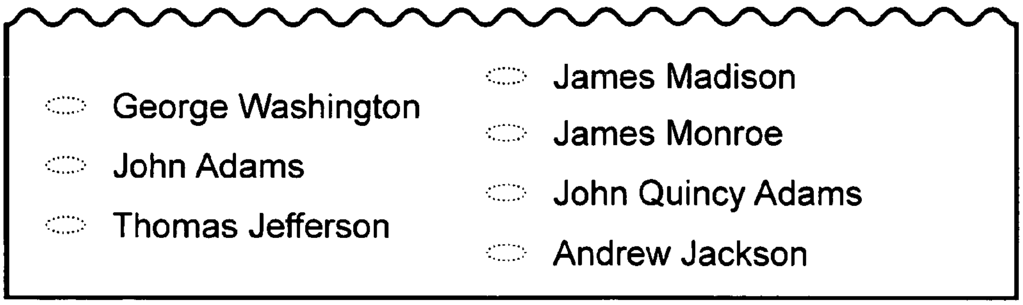
Figure 39B:
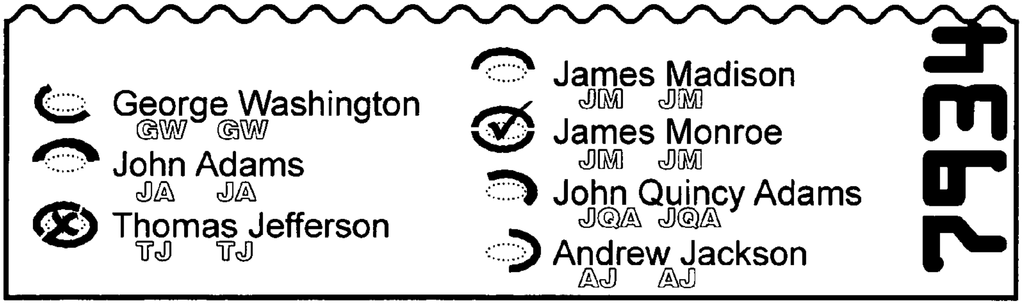

Referring specifically to FIG. 39*a*, the unmarked ballot form can be seen with the candidates names for two contests in the canonical order. Next, referring to FIG. 39*b*, the laminate overlaid on the ballot form is shown. Just as in FIG. 37, the two candidates Adams and Monroe have been marked and have their ovals circled. But, unlike FIG. 37, there are four types of half circles: horizontal split, vertical split, upper-left to lower-right diagonal, and upper-right to lower-left diagonal. The type of half circle chosen for the particular oval position on the form encodes the two bits of shared data corresponding to that location. (Another example way to encode different combinations is with different colors, not shown here for clarity.)

Figure 39C:
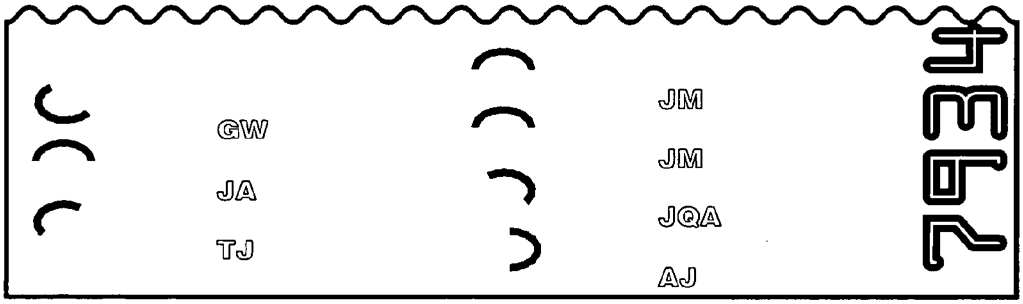
Figure 39D:
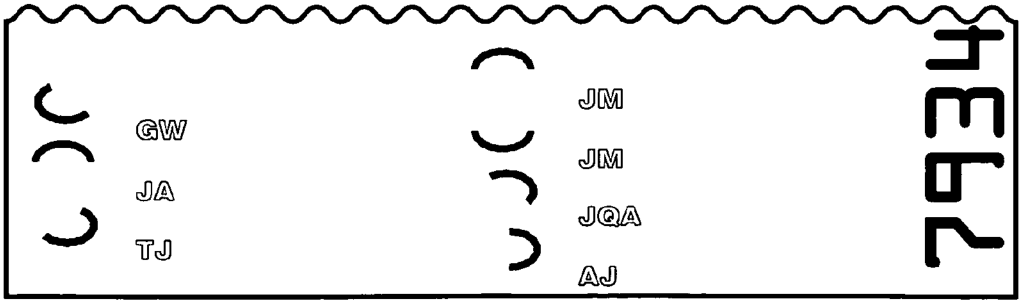
Figure 40A:
Figure 40B:
Figure 40C:
Figure 40D:
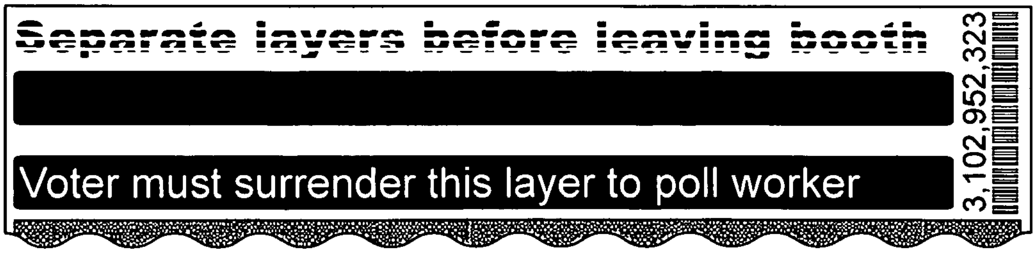

Referring to FIGS. 39*c* and 39*d,* the two laminates are shown separately. The overlapping serial numbers can be seen by the thickened shape, illustrating a single example. The candidate initials are used instead of candidate names as in FIG. 37, again to illustrate another example.

Turning finally now to FIG. 40*a-d,* a plan view and schematic diagram is shown for an exemplary two-layer receipt, in accordance with the teachings of the present invention. In particular, a user experience with a pixel-based receipt is described next as a user experience scenario, for clarity, as will be appreciated.

After making your choices on a touch screen or the like, when using this new approach, a small printer that looks like those at cash registers prints the main part of your receipt. This printout shows your vote and only your vote. The names of those candidates you chose, together with indication of such things as office sought and party affiliation, would be listed as well as your choice on any ballot questions. Included would be any allowed "write-ins" or choices you made, such as with "open primaries" or "instant-runoff voting". There could even be warnings about contests or questions not voted.

(As detailed later, there is a security feature, such as an unbroken black background around the text, that voters should also check for at this point.) You are then asked whether or not you agree with the receipt so far; and, if you don't agree you can amend your vote and try again. (Referring to FIG. 40*a*.)

If you do agree with the receipt, you are asked to indicate whether you wish to take the top or the bottom "layer" of the two-layer receipt. Overall security hinges on your freedom to choose, even though it is an arbitrary decision, which layer you want to keep. Once you've chosen, a further inch or so is printed and the then complete form is automatically cut off and presented to you. (referring to FIG. 40*b*.)

As you separate the two layers, you will notice that each layer is mainly a different, unreadable and seemingly random pattern of tiny squares printed on a transparent plastic material—it was the light passing through the combination of still-laminated layers that showed your choices. The special printers used differ from ordinary single-color receipt printers only in that instead of just printing on the top side of the form, they can also simultaneously print separate but aligned graphics on the bottom side of the form.

The last inch printed contains per-layer messages that are clearly readable only when the layer is viewed separately. Whichever layer you had selected as the one you keep, whether top or bottom, would bear a message like "voter keeps this layer" (referring to FIG. 40*c*), while the other layer would state something like "provide this layer to official" (referring to FIG. 40*d*). On the way out, you hand the poll worker the layer marked for them. They make sure they got the right layer and as you watch they insert it into a small transparently-housed paper shredder in which it is destroyed.

Outside the polling place you might find one or more groups, such as the League of Women Voters, prepared to verify the validity of your receipt if you wish. They simply scan it and immediately let you know that it is valid (by subjecting the receipt's printed image and coded data to a consistency check and saving the results for later confirmation online). If they were ever to detect an invalid receipt, incorrect operation of election equipment would be indicated, hopefully before any unwitting recipients of invalid receipts had already left he polling place. You can even, on the official website, look up the page for the range of serial numbers that includes your receipt, and check for yourself that it has been posted correctly.

After the polls close, and all agreed receipts are posted on the website, a series of encrypted process steps used to produce the tally is also posted. Then randomly-selected samples of it are decrypted and posted. The choice of samples is made so that it does not reveal so much information as to compromise privacy. The samples do reveal enough, however, that anyone can run a simple open-source program that checks them against the published process steps to verify that the tally correctly resulted from exactly the votes encoded in the posted receipts.

It is important to ask, as with any security system: What are the properties claimed? How does the mechanism work? and What is the proof that the mechanism really ensures the properties? First all three questions are considered in introductory overview, starting with the first question. Then introductory answers to the second and third questions are combined for each of three aspects: the receipts, the tally process, and the cryptography. Finally the system is detailed more formally and the properties are proved.

The punchscan system described with reference to FIGS. 41 and 42, will be described first more generally. It uses two or more layers. The material is opaque or transparent or translucent. In case of three layers, nesting holes, for instance, allow all three to be marked and the middle one can be used for recording the positions and the voter can keep one of the two outer layers. In some examples, both those not kept by the voter are separately sent in or collected and posted as encrypted votes, the redundancy providing protection against loss and also revealing cheating.

Marking means is for instance by application of ink or activation of coatings or mechanical deformation. Ink can be, for instance, by dauber or stamp or pen or pencil.

Holes are formed such as by drilling, punching, die-cutting, laser cutting. They can be pre-formed in a way customized to a particular ballot layout or in a more generic way that may have some unused holes but that preferably also allows demand printing of ballots. Round holes per symbol or slots for multiple symbols are examples. More generally, whatever shape combination, called here a "provision," allows one or more symbols to be seen and records a mark on the upper layer as well as the lower layer indicating the position of the mark. As an example, an edge of one sheet exposes a portion of the sheet below, with marking optionally straddling the edge. The shape of the hole optionally, in some embodiments, encodes all or part of the symbol.

Perforation or adhesive or mechanical joining holds parts but is separable. A tamper-evident aspect to the separation can protect against combining improperly and also can keep the identifying information hidden at least until after the voter fills the forms, such as that described with reference to FIGS. 63 through 71. Tamper proof tape is known and optionally is applied to adhere parts together.

Perforation along fold line along leading edge allows processing through paper handling equipment, such as demand printers. This can print the top layer and through the holes to the lower layer at the same time, such as with a conformable rubber belt of a laser printer or inkjet printing or various kinds of thermal printing. A leading fold line with or without whole or partial or crossing perforation patterns is also anticipated.

The scanner at a polling place or where absentee ballots are received optionally reads the identifying information on one layer and determines the other layer and provides authentication of both that other layer and the mark position information read. At polling places, voters are optionally allowed to see the scanned image and preferably then also indications on it of how the marks are interpreted, such as whether recognized, overvotes, or stray.

A "double sided" version, in one example, allows voting by flipping the still attached layers over. Holes in one layer preferably do not line up with those on the other layer, so there are no holes through the laminated layer arrangement.

The identifying numbers on the two layers are anticipated to be marked or encoded in various forms, such as human readable or based on steganography. In some examples, all or parts of a number are to be the same and they are preferably punched through so that this property is readily apparent to voters.

Printing is preferably done by three separate entities, one for each layer and a third that places the number on both layers. In other examples, two separate printers are used and the numbering is that supplied by each. It is believed that with only two, a security audit of actual printed forms is one way to detect that the wrong layers are paired. With three printers, the third printer in some examples applies a common serial number that the voter can the readily recognize is the same on both layers and that a security audit of the paper to ensure layers are combined properly is obviated. Other example ways to reduce the need for such audit include: letting the voter choose which serial number to take independently of which layer, such as by perforated tabs that can be left attached to either layer; letting the voter choose some digits of the serial numbers from one layer to mark on the other layer; providing for multiple hole locations and/or indicia positions so that mismatched layers cause improper marking; and so forth.

In some examples a single entity prints the forms completely. In other cases, different machines and/or entities do parts of the printing. In some cases, a machine can be assumed to not record information that it has access to, such as because it is unable to read that information or its structure is such that it does not retain that information even if it processes it. In the example of demand printing, parts of the form may already be printed and the device unable to read those. Some devices may read limited information from other devices and then print, such as a common serial number applying device. Two or more entities can each form their own "onions" to allow the decryption, mixing, audit and posting of the final result. Each gets what it needs from communication with the other. Layers of a form are optionally divided into parts that are processed by separate entities.

Figures 41A, 41B, 41C, 41D:
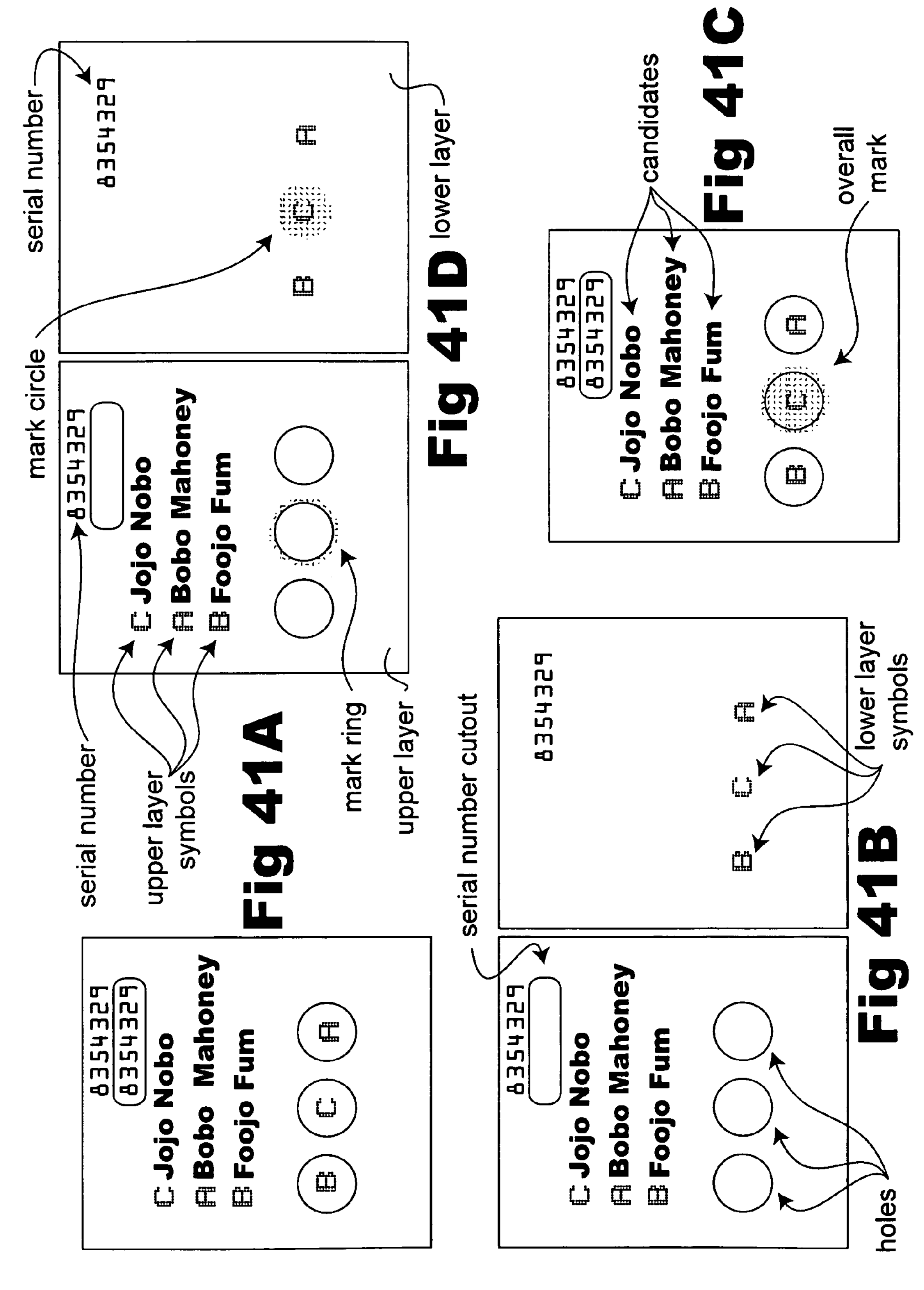

Turning now to FIG. 41, a combination plan, schematic, and layout diagram of an exemplary embodiment of a punch-scan ballot in accordance with the teachings of the present invention will now be described in detail sufficient for those of skill in the relevant art. FIGS. 41A and 41B are views before voting, laminated and separated respectively; FIGS. 41C and 41D are similarly views after voting, laminated and separated respectively. A single contest between three candidates is shown for clarity and concreteness. The voted ballot shows a vote for the first candidate named, as an example and uses a dauber style of filled circle marking.

Specifically referring to FIG. 41A (with the terminology shown for clarity in the other parts of FIG. 41), depicted is what the voter would see when the ballot is in the laminated and still un-voted state. It will be appreciated that each candidate name has an uppercase letter next to it, an example of a symbol. Similarly, through the holes, the same three uppercase letters are seen, in the example in a different order. Of course since the orderings are preferably apparently random, it is anticipated that there is probability that they would be the same on some ballots. It will be appreciated that the serial number is visible to the voter both as printed on the upper layer and as visible on the lower layer through the cutout.

Referring to FIG. 41B, the two layers of the example are shown side-by-side. What is not shown for clarity and readability of the figures is that the lower layer is preferably formed from the same sheet and its upper face seen through the holes is actually the back face of the sheet. A preferred fold line is across the top, with a co-extensive perforation score line. For demand printing, or other feeding, the ballots feed through with the folded edge leading and so are not as likely to get separated into two sheets as if they were fed through with two separate edges leading (especially those opposite the fold line).

Referring now to FIG. 41C, the overall mark by the voter is shown as an approximate circular disc of transparent ink. Such a mark can be made using a bingo dauber or a rubber stamp or the like. Also, a similar mark can be made using ordinary writing instruments, such as by putting a cross through the whole structure. In some embodiments, the voter may be free to only mark one or the other form, the one that is to be turned in. This is believed to have some privacy advantages.

Referring to FIG. 41D, the voted layers are shown separately. The mark circle that was inked through the hole is on the lower layer and the marked ring with the hold punched out from it on the upper layer. The other indicia are as before. It will be appreciated that in this example the vote has been for Jojo Nobo. The reason is that Jojo has the symbol "C" next to his name and that symbol appears on the bottom layer in the middle hole, and the middle hole is the one that was marked with the circle. It is believed that looking at either layer separately does not reveal who was voted for; it is in the combination that the vote is readily seen. However, by the marking of the middle circle, either layer records the particular vote, it is believed, as a consequence of the commits to the overall structure. Similarly, the first or left circle would constitute a vote for Ms. Fum and the right or last circle for Mr. Mahoney.

Turning now to FIG. 42, a combination block, schematic, flow, diagram of an exemplary embodiment of a overall punchscan election in accordance with the teachings of the present invention will now be described in detail sufficient for those of skill in the relevant art. Included are two different kinds of voting, either or both of which could be used in a particular election or related use scenario. Three stages precede the physical creation of the ballots and then there are the two types of voting and the final processing in two stages.

More particularly, the process begins in step 10201 and then box 10240 indicates that for each layer the arrangements of the symbols and so-called onions, being the example used for clarity in the descriptions without limitation, known in the art for mix-based elections are constructed. Then in box 10241 the values of the layers, being the arrangements of symbols and the serial number or other identifying information, are preferably committed to, such as in the cryptographic sense. Next shown as 10242 is a so-called "proof" process step that preferably is able to convince various parties that the commits are at least substantially correct with at least substantially high probability. One example shown for clarity, but without limitation, is the opening of a random selection of the layers so that their structure can be checked.

Now box 10260 indicates that the ballot forms are physically created such as by printing and punching and perforating and folding. These use the committed to data that was not revealed, if any was revealed, in step 10242. Some further examples of this step are included in FIGS. 43 and 44.

In a first kind of voting the voter allows the system to make a copy, such as by scanner or digital camera, of the layer that the voter will keep; the other layer is preferably verifiably destroyed. This is shown in box 10262. Then box 10264 shows that the ballot obtained from the voter can be posted and/or signed or otherwise provided with a way to confirm its authenticity.

In a second kind of voting the voter provides the system with one actual layer and the voter retains the other actual layer. Examples are mail-in ballots and polling places that are not equipped to copy and/or destroy layers. A novel inventive feature of the present invention is that the layer the voter keeps can be re-constructed from the layer retained by the system. This then allows the systems to post and/or other wise provide authentication of the layer taken. It will be understood that this is preferably done in a way that strips away unnecessary detail, such as the particular imperfections in marks or alignment or uncounted marks and the like. The main thing to be gleaned from the layer the system has is which holes are marked and the identity of the layer. In one example, the system then looks up the corresponding other layer by the serial number, such as when they are identical or maps them if they are not, and then opens the commit to the layer held by the voter and uses the onion of that layer. The rendering provided in the authentication includes the locations of the holes marked.

Box 10280 presents the step of forming the tally from the encrypted votes, as is known in some example systems and could readily be adapted here for use with a single layer and its onion. The audit and verification 10290 then provides "proof" preferably to the public that the operations 10280 were performed correctly, and sometimes further checks on committed to or posted data. Known examples are suitable, where certain links in a mixing structure are opened responsive to random challenges created by a publicly verifiable process. The election then ends in step 10202.

Turning now to FIG. 43, a combination block, schematic, flow, diagram of an exemplary embodiment of a punchscan ballot production in accordance with the teachings of the present invention will now be described in detail sufficient for those of skill in the relevant art. When the process begins, 10301, the paper or other media is marked 10320 by a first device or entity. In some examples web fed processing is preferably used until a late stage; in other examples, processing is largely sheet fed. Then a second example entity marks the ballots as they flow by, as indicated in box 10330. In one example, the ballots are given process serial numbers to ensure synchronization from stage to stage, but these are then removed later so that an entity knowing only one layer, for instance, does not learn the identity of that layer from the other layer if shown or posted. In some examples the printing devices can be assumed not to retain data that they should not; in other examples, they are assumed to retain the data and more care is needed in dealing with them, although the assumption itself is easier to ensure.

Box 10340 indicates a third entity that marks numbers that will be retained on the layers. In some examples the same number is marked on both layers, such as preferably by perforation through both, although this may be done with advantage after the folding 10370 for better alignment of layers.

Once the forms are marked, possibly apart from the numbers or other last-minute data, box 10350 indicates that the cutouts and holes are preferably formed, while still a web and after printing. At this time, also whatever perforation 10360 is made. Then box 10370 indicates that the forms are cut into sheets and/or trimmed of serial numbers and then folded or otherwise laminated.

Referring now to FIG. 44, a block diagram and flowchart of an exemplary embodiment of a punchscan ballot demand printing in accordance with the teachings of the present invention will now be described in detail sufficient for those of skill in the relevant art. Box 10301 is the start of the demand printing. The process typically includes a request for a ballot and also the form that has been pre-punched as input as indicated in box 10420.

The ballot is printed as indicated in box 1030, including optionally through the pre-punched holes mentioned. Then box 10440 indicates that the resulting ballot is ready for use and the process ends 10402.

Turning now to FIG. 45, a combination block, flowchart, schematic of an exemplary embodiment of a first disabilities-friendly voting system in accordance with the teachings of the present invention will now be described in detail sufficient for those of skill in the relevant art. The voter in the booth hears the audio through transducer means shown as headphones 20101. The voter preferably is provided with ballot form 20110 to mark while hearing the audio. Each of the audio and paper are shown in two parts: the audio is divided between track or channel "A" and track or channel "B," shown for clarity as being provided by separate transducers 20101*a* and 20101*b*, respectively; the paper is initially in two sheets, the upper labeled "A" and the lower labeled "B," 20110*a* and 20110*b*, respectively.

The "scripts" for each audio track, that is the text corresponding to what the voice on the track reads, are shown in schematic form: the script for channel "A" is shown as dotted box 20130*a*; that for track "B" similarly as 20130*b*. The dotted arrows between the two scripts are intended to suggest the lines that are simultaneously on both tracks and the temporal interleaving and pacing of the other lines. For instance, arrow 20140 indicates by arrowheads at both ends that the line of each script 20130*a* and 20130*b* are the same and that they are to be read at the same time on both channels, so that they are recorded on both tracks. Thus, the voter hears through both ears a voice say "Serial number three four three four." Then, line 20141 indicates that again simultaneously a second line, in this example a contest identifier, similarly is read on both channels.

Next begins the sequence of candidate names and positions, mentioned earlier. Arrow 20142 indicates that relatively quickly after candidate name "Joe Man" is read on channel "A" from script 20130*a,* the location of the corresponding hole is audibly indicated, such as by script 20130*b* calling for a voice to read "position three." After this, a relative pause is indicted by the wiggle in arrow 20143, before the next candidate/position pair is read, as this phrasing is believed to be a convenience for voters and to provide a kind of punctuation. As will be appreciated, if the voter wishes to vote for Joe, then he or she is to find the first position on the first contest, such as by scanning his or her finger down the ballot until that hole is felt and then mark that hole with the dauber (which is provided to the voter but not shown for clarity). Again, the mark is preferably in the same position on both sheets. (Also not mentioned further, but optionally present, is a tactile guide to facilitate voters finding the correct holes.)

The other candidates and their positions are read in a similar manner: Shortly after "Mary Woman" is read on channel "A," channel "B" voices "Position four," according to arrow 20144, after which a pause is indicated by arrow 20145. Then, just after "Daffy Duck" is read on channel "A," channel "B" voices "Position one," according to arrow 20146, after which a pause is indicated by the wiggle in arrow 20147. Again, then, just after "Sean Sealion" is read on channel "A," channel "B" voices "Position two," according to arrow 20148.

The voter, not shown for clarity, may wish to repeat parts of the audio, skip forward, fast forward, rewind, or otherwise navigate/traverse with or without audio on. Input means 20156, shown as a touchtone keypad, a familiar input mechanism, allows such navigation, much as with known so-called "Interactive Voice Response" systems. As a concrete example: the left column (one, four, seven, star) correspond to move backwards through the tape slowly with playback, move backwards rapidly with playback, skip back to begin of candidate (or previous candidate on repeat/hold), and skip back to start of contest (or previous contest on repeat/hold), respectively; and similarly, the left column corresponds to forward motion of the same type as the opposite on its row. Overall speed of voice and even choice of speaker are preferably options for the middle row, such as: "five" pause, "eight" speed up a notch, "zero" slow down a notch, and "two" change speaker and/or mode. In some modes pairs of candidate and position are only read when prompted by voter using four and six. Optionally, where a voter is to be able to audibly mark a position, as mentioned, a special action is preferably used to avoid inadvertent marking. One example is a so-called "cord," more than one button is pushed at a time. For instance, pushing down all three buttons, four-five-six, is an example chord for marking.

The audio is generated by computer 20161, such as a computer at a polling place, using the well-known techniques for playing sampled voices and/or synthesizing voices. Computer 20161 receives navigation commands from keypad 20156, as just mentioned, and these control its logic, as is well known in the IVR art. In terms of hardware, for instance, telephone cards are manufactured by a number of companies that attach to standard computer back plane buses and interface to the switched telephone network. These, or sound cards, generally have the well-known capability to detect Touch Tone or DTMF signals from a suitably-powered standard telephone keypad. Computer 20161 knows the ballot serial number before it reads it. One example way to accomplish this is for the number to be from a pre-arranged sequence. Another example is for the number to be supplied by input means, such as a barcode reader or keypad 20156, preferably after an operator "PIN" code sequence is entered.

While the voter is navigating, operating are two tape recorders, 20155*a* and 20155*b*. They preferably record a log of what the voter hears, in the sequence heard, and are not affected by the navigation, but rather record a chronological log of what the voter hears. In particular, recorder 20155*a* is connected by cable 20162*a* to sound source 20161, to be described further, and to transducer 20101*a*, already described; similarly, recorder 20155*b* is connected by cable 20162*b*to sound source 20161 and to transducer 20101*b*. Shown contained within tape recorder 20155*a*, during the time of recording, is standard compact cassette tape 20150*a;* similarly, shown contained during recording within tape recorder 20155*b* is standard compact cassette tape 20150*b*. (Of course analog tape recording is rapidly being replaced by digital methods, and cassette tapes are shown here for concreteness and illustrative purposes.)

After the voter has finished voting, he or she is preferably provided with his or her choice of either both "A" parts, or, as the other option, both "B" parts. Thus, there are two scenarios: one shown in dotted box 20121 and the other in box 20122. The box for scenario is shown including the respective tape and sheet: box 20121 contains tape 20150*c* and sheet 20110*c*, which are the same as tape 20150*a* and sheet 20110*a*, but shown again as part of one of the two alternative after-voting scenarios; box 20122 contains tape 20150*d* and sheet 20110*d,* which are the same as tape 20150*b* and sheet 20110*b*. The hollow arrows show for clarity, as will be appreciated, the flow of these objects from the voting configuration to one of the two scenarios 20121 or 20122. (The arrow taking the sheet to scenario 20122 is shown as starting under ballot 20110 to suggest that the bottom sheet is taken, whereas that taking the sheet to scenario 20121 is shown starting above the ballot indicating the upper sheet.) Within each scenario shown also is the rendered image of the paper receipt that is preferably available online, 20175 for scenario 20121 and 20176 for scenario 20122. Also shown are instances of potentially the same voter audio connection or telephone, 20170*a* and 20170*b*, whereby the voter is preferably able to compare the audio sequence to that on the tape. For instance, the voter is preferably able to navigate over the network as during voting, but in any case only hearing the scenario channel. The providing over a communication network of this content, whether video and/or audio, is shown as being done by server 20162.

Audio optionally contains audio "markers" that mark certain ballot positions, whether associated with the A channel information or the B channel information. For, instance, just after the candidate name and position are read (one on each channel) a distinctive audio signal is inserted during the pause. In some embodiments optionally voters provide input to indicate where the audio markers are to be placed to correspond with what they have physically marked the paper. In other optional example embodiments, the system introduces audio markers based on what it has learned from scanning physical ballots. As mentioned earlier, if both sources of markers are used by a system and it detects an inconsistency, that is the voter apparently placed audio markers on positions other than those that the voter has physically marked, then the system preferably notifies the voter of this, such as by an audio message. Preferably in such cases, voters may be allowed to "spoil" their ballot and cast a new one. Audio markers present on online audio are preferably regarded as checked for consistency with other online forms of ballots by automated auditors, such auditing more fully described generally later. Of course voters may be free to make their own record of what they have marked, and then they can check against audio markers inserted by the system from reading the physical ballots. It will be appreciated that in one option instead of inking the ballots all voters in the system use, for instance oversized paper punches, or otherwise at least partly mechanical marking means. It is believed that the set of persons able to recognize the positions of the marks on the sheets is substantially increased and that audio markers would allow adequate audio checking of such ballots.

Now consider the checking of the physical sheet, physical tape, online visual data, and online audio data available to a voter under one of the scenarios (without audio markers, as has already been described). Each of the four can, it is believed, be checked against any one or more of the others of the four.

There are believed to be six pairwise comparisons examples for each scenario instance. The pairwise checking of electronic renderings of visual and audio are believed preferably open to anyone over the network and can thus be checked rather fully by devices impersonating voters. Such automated checking by whatever parties is believed in practice possible to make substantially indistinguishable from that of humans. This is preferably used to compare this rendered online information to that made available for audit of the rest of the system, such as the tally process. (Included are audio markers, if present, as mentioned earlier.)

An artifact is optionally checked against its corresponding online rendered version. Checking a paper ballot against the online graphic version, presumably entails entering the serial number, and optionally is by visual inspection of what should be two identical sets of indicia (except that optional "helper" numbering information, as will be described, is on the online version, although it is preferably set off graphically, by color, font, or the like, so that it can readily be ignored in the comparison). Checking the tape against the online system, optionally, entails entering the ballot number and then navigating through the online system as the tape plays and checking that the candidate or locations match, in scenario "A" or "B," respectively.

Online graphics are optionally compared to the corresponding tape. First consider comparing the online graphics 20175 with tape 20150*c*. The order in which candidate names are read by the tape should be according to the helper numbers added to the online rendering 20175 beyond what is shown on sheet 20110*c* (these helper numbers can be checked for consistency from 20175 alone using the fixed lexicographic ordering convention as mentioned). Now consider comparing the online graphics 20176 with tape 20150*d*. The order in which positions are read on the tape should be according to the upper row of numbers (the lower numbers simply provide a convenient reminder of the number of the columns). Thus, for instance, the first position that should correspond to the first candidate name read (but not read on 20150_d_, only 20150_c_) is three, which is found by locating the one in the top row (above "a") and then looking up its column number in the bottom row, three. (As with 20175 and 20110_c_, these numbers on 20176 are ignored when comparing it with 20110_d_, since they are not on 20110_d_ and can be checked for consistency on 20176 alone using the fixed lexicographic ordering mentioned.)

Online audio is optionally compared to the corresponding paper. The effect is the same as with the online graphics, though the helper numbers are not present. When sheet 20110_c_ is consulted during interaction with audio navigation 20170_a_, the order in which the names are read per contest is checked to be in the fixed lexicographic order of the symbols present. When sheet 20110_d_ is consulted during interaction with audio navigation 20170_b_, the position number sequence heard should be that of the symbols traversed in the lexicographic order.

Not shown for clarity in the figure are examples of actual vote marks in the scenarios. A voter could mark any hole or back sheet symbol. Which position is marked is preferably shown in the online sheet, 20175 or 20176, to allow the voter to check that it was recorded correctly. Similarly, the audio navigation 20170 preferably indicates which positions were marked (as mentioned earlier), such as for instance to facilitate the case when the paper is punched or a sited person is checking using the public switched telephone network.

Also shown, ignoring the scenario boxes 20121 and 20122, is the possibility for a voter to practice using the audio navigation system over the phone. Of course, software could be available that would allow voters to practice at home, even while offline, but when server 20165 offers this service, such as a toll free service for a few weeks before the close of polls, voters can familiarize themselves with it and practice, thereby saving time at the polling place and increasing their confidence. Also, extra comfort would encourage and facilitate checking the tape online.

Turning now to FIG. 46, a combination block, flowchart, schematic of an exemplary embodiment of a second disabilities friendly voting system in accordance with the teachings of the present invention will now be described in detail sufficient for those of skill in the relevant art. Much of the setup is, for clarity, shown as it was for FIG. 45. Those parts that differ substantially are for clarity explained in detail, while those parts that are the same as corresponding parts of FIG. 45 have already been detailed with respect to FIG. 45 and are not further described for clarity.

One difference, as will be appreciated, is that both channels are played to each ear, as shown in the labeling of transducers in headphones 20101. Thus, a single mono audio is played to both ears; since the information is read at preferably substantially un-overlapping times, the effect is believed to be very natural. If there is only one speaker, for example, the fact that there are two tracks can be hidden from the user at this point.

Another difference is that a single recording is used as the source and the voter can play this recording using standard players. For clarity and simplicity but without loss of generality, the recording will be referred to as disc 20153, such as a CD or DVD. The two tracks are both stored on the disc, but each is encrypted under separate keys. The disc 20153 is provided to the voter, under either scenario, preferably substantially unaltered from when it was originally burned before the election. A media with write once capability, such as laser discs, is believed and advantage in the present arrangement. (Audio marker positions or keys are optionally appended, however, as mentioned later.)

In some example embodiments, the disc uses an audio encoding allowing a standard audio disc player to be used. This is believed to have advantages, including cost savings and verification advantages when voters and/or observers are allowed to supply their own. Since audio recording devices have substantially higher fidelity/bandwidth than is typically used for speech, and since modem codecs can provide substantial compression, the two audio tracks are believed readily able to store encrypted digital versions of the voice tracks with adequate playback speeds.

Referring to box 20180, the conversion from audio to decrypted speech is shown, as would be readily understood by those skilled in the speech encryption art. For clarity, a single speech stream, including three kinds of segments is described: (a) unencrypted segments that are part of both logical channels, (b) those segments encrypted with a key for channels A, and (c) segments encrypted with the key for channel B. (Overlap in the speech streams is not considered, but could be incorporated by someone of ordinary skill in the speech art, such as by using separate tracks). First "modem" 20181 converts the audio stream to a digital one. Then the result is decrypted by decryption device 20182: unencrypted segments of the stream are passed through, those for channel A decrypted with the key for that channel, and those for B with its key. The resulting cleartext stream is converted to speech stream by "codec" 20183. The resulting digital speech is then converted to analog audio by a-to-d converter 20185. A mono headphone driver 20186 is included for clarity. (For optional compatibility with other embodiments, separate time division multiplexing of the audio out onto the A and B channels is performed by two single pole single throw switches 20184, onto lines 20162_a_ and 20162_b_, with drivers for these lines not shown for clarity).

The generation of discs 20153 is in some embodiments performed before the day of the election, as would be readily understood by those of skill in the art. Each disc is associated with a paper ballot of a particular serial number. The keys needed to read the disc are then distributed securely to the units 20180 or preferably the decryption engines 20182 within them, using known key management techniques. After the voter votes, the disc can be provided to them. The key, E or F, depending on whether scenario A or B applies, respectively, is provided to the voter. One way to issue such a key is by writing it onto the audio, though this has the disadvantage of requiring a write-capable disc drive. Other example ways include providing the voter with another piece of paper or sticker bearing the appropriate key. Yet another option is to publish the key along with the content of the disc and/or signature on the disc content. (Copies of the digital signatures of the data on the disc, including some known error correction coding, is preferably included on each disc.) A voter's personal computer could optionally check that the signature on the disc matches the data on it and that the signature is posted online. Speech recognition software, in some embodiments, optionally even checks the disc against the online ballot information.

One exemplary use of this embodiment is for an "unautomated" polling place, where pre-made discs, matching ballots, a standard disc player and special headphones with the decryption chips built in, would allow the blind to vote. It is believed that if the circuitry 20180 is miniaturized and visible, various inspectors can readily ascertain that it is limited in its capability to store and permute the audio, such as would be required for various cheating scenarios.

Turning now to FIG. 47, a combination block, flowchart, schematic of an exemplary embodiment of a third disabilities friendly voting system in accordance with the teachings of the present invention will now be described in detail sufficient for those of skill in the relevant art. Again, those parts that differ substantially are for clarity explained in detail, while those parts that are the same as corresponding parts of FIG. 45 have already been detailed with respect to FIG. 45 and are not further described for clarity.

Container 20191 allows the voter or observer to hide which channel, A or B, is being recorded by a recorder supplied by a voter or observer during the voting. In the example, circuitry in device 20190 that is believed would have to be compromised to cheat voters is simple analog electronic components that can be arranged in transparent and miniaturized fashion that it is believed would allow determination by physical inspection that no extraordinary functionality is included. Buffer devices protect which channel the recorder is attached to from being measured from the signal source. The channels are optionally mixed, while avoiding crosstalk, to a mono signal for the headphones. While keypad 20156 and computer 20161 are shown, as in FIG. 45, the separate channel inputs are optionally provided by the embodiment of FIG. 46, using the ports 20162 as signal source. Recording media 20152, such as for instance a compact flash memory card, is shown communicating with recorder 20151.

In particular, container 20191, such as a locking metal box, is shown containing a single-throw double-pole switch 20195 whose structure is readily ascertainable by inspection. A connector 20196, such as so-called 3.5 mm plug, connects to the mating connector, such as jack 20151*a*, in the recorder 20151. In some embodiments, container 20191 only houses switch 20195 and connector 20196 is external, such as at the end of a cable. It will be appreciated that a consideration is emanations from a cable and/or recorder that might reveal which channel is connected. Another example embodiment of the switching and plugging functions will be described later with reference to FIG. 48.

One function of device 20190 protects the configuration of box 20191 from being measured remotely. It is believed that, for instance, simple power measurements or even time domain techniques could be used by a sound source to "look inside" box 20191 and determine which channel is being recorded. Accordingly, buffers 20192*a* and 20192*b* are provided to prevent this. Suitable structures would readily be conceived by those of skill in the electronics art. For instance, low pass filters are believed helpful in preventing time domain measurements and zero-gain amplifiers for preventing simpler measurements. Other techniques, known in the art, include isolation transformers and optical isolators. A different consideration is that the level of noise on a single channel output should be relatively high compared to the crosstalk level.

A second function of box 20190 is to provide the mono drive 20163 for headphones 20101. Since it is believed that summing amplifiers might increase the amount of crosstalk on the two lines, buffers 20193*a*-*b* (which might be simple resistors in some examples) are shown preceding the input to summing amplifier 20194 that also servers to drive headphones 20163, such buffers, amplifiers and drivers being well known in the audio electronics art.

After the voter has voted, at least, it should be readily ascertainable whether the voter has recorded only a single channel. One example embodiment is a mechanical lock whose key cannot be removed until closed, where the voter is to surrender the key before the sound source is activated. Another example is automatic means to detect that the container is closed and prevent a valid vote from resulting if the container is opened before the poll worker or other authorized inspector is present. Yet another example is a switch that can only be changed between positions by a key that is surrendered during the entire voting interval or must be inserted into another device during that interval.

The voter or observer is able to take the same player, 20151 away from the polling place and use it to listen to media 20152, which is shown as 20152*a* for scenario A and 20152*b*, when it is storing the audio of channel B.

Turning now to FIG. 48, a combination block, flowchart, schematic of an exemplary embodiment of a fourth disabilities friendly voting system in accordance with the teachings of the present invention will now be described in detail sufficient for those of skill in the relevant art. Those parts that differ substantially from FIG. 47 are explained in detail, while those parts that are the same as corresponding parts of FIG. 47 have already been detailed with respect to FIG. 47 and are not further described for clarity.

This embodiment allows sited voters to vote without paper but with encrypted ballots, using an adaptation of the recorder techniques already described with respect to FIG. 47. A rule 20133 is made know in advance that associates certain pairs with positions within a contest. In the example, three pairs comprising the top row, are associated with the zero'th position; they are readily recognized in the example for convenience as having modulo three sum equal zero. Similarly, the middle row of rule 20133 comprises pairs each summing to one mod two; and the bottom row pairs sum to two when the remainder is taken after dividing by three. It will be appreciated that each value zero, one or two appears exactly once in each first component of each column and similarly in each second component. Moreover, each digit appears as the first component in a different row in each column and also in a different row in the second component of each column. The column is committed to for the particular combination of serial number and question.

For a particular ballot serial number and contest, the first digit determines the row, which determines the candidate in the fixed ordering given by the rule, assumed here alphabetical by candidate name and not shown in rule 20133 for clarity. Similarly, the second digit also determines a candidate. Each digit alone, however, is believed not to reveal the candidate to those not knowing which of the columns is being used for the particular contest, as each component appears in a row per column, as already mentioned.

In the example instance shown, the touch screen 20111 shows the voter the ballot serial number and contest identifier, along with a row per candidate. The candidate names appear in alphabetical order as mentioned and for convenience. Adjacent to each candidate name is the ordinal number of the row for convenience and as may be customary. At the beginning of each row is the pair from the rule column being used, the first column in the example instance shown.

When the vote touches the screen, as shown by the hand, to select the particular candidate he or she wishes to vote for, touch screen 20111 transfers this information to computer 20161 over the line shown. At this point, channel "C" reads out the first digit of the pair, "zero," and channel "D" reads out the second, "two." Either one of these, as mentioned, determines the candidate "Mary" for this particular ballot and contest, as they each identify the last row of the column committed to, as mentioned. The sounds are combined by mixer 20194 (which takes and additional input as will be described), and so the both "C" and "D" are heard as mono on each headphone speaker. The voter optionally, at this point, is provided with the opportunity by the system to check that what he or she hears is the pair shown next to the candidate name touched. Also the voter can check that the sum of the pair corresponds to the correct position on the row, in this case by adding the digits and checking that the result is the row number (in zero-based indexing). The voter is also able to check the data displayed for the other rows similarly, though the one voted for is of the most interest.

Later, the voter chooses between scenario "C" 20123 or "D" 20124 and leaves the polling place with the corresponding recording 20152*c* or recording 20152*d*, respectively. When playing the recording, the corresponding script is heard and the other one not, as in the previous embodiments, and as will be described more in detail. The voter then is provided the option to check the consistency of the recording with the online data provided, either audibly or visually. The visual image is shown in case of scenario 20123 as the contest identifier and first component zero; in scenario 20124 it is two. Similar data would be available through the phone, voice, or IVR like system as already described, which is in effect run against the same database of encrypted votes cast.

The commitment to the columns for each ballot serial number and the decryption and mixing of the votes for publication and audit is substantially as for the previously disclosed encrypted votes systems, as would be readily appreciated by those of skill in the cryptographic protocol art.

Candidate names and the like are, optionally, read through the headphones to voters as well. This type of feedback is believed useful to at least some voters and serves as a part of the user interface to confirm the choice made to the voter. This cleartext vote, however, is not to be allowed to be input to recorder 20151. Such cleartext is, accordingly, output by computer 20161 on a separate channel 20162*c*, which is then summed by mixer 20194*a* along with the other two channels 20162*a-b*. Buffer 20193*c* is inserted before the mixer optionally to reduce crosstalk.

Also shown explicitly is the option for two plugs 20196*a-b*, each connected to a firewall 20192*a-b*, respectively. Plugs 20196*a-b* are in container 20191, where the voter or observer chooses which one to connect to recorder 20151. One advantage of such a two-plug arrangement is believed to be that if the cables are sufficiently long and substantially unstructured in their arrangement, it may be difficult for anyone getting a glance of how the voter connects recorder 20151 to learn which channel it is on. Also, the voter is believed not to suffer from being forced to make a random choice of which channel is recorded, and is thereby protected against frauds that would require the voter to connect to a particular channel.

As will be appreciated, a variation is where the voter makes a choice between two alternative "challenges" in addition to the candidate, such as by "touching" the first or last half of the candidate name. In such a system, a different kind of rule is preferred and it is believed that only one channel of script is preferably read. The contests are labeled by two columns of numbers: each column in numerical order but in a modular system. The commitment is to the list items from the top row. In the case of "challenge 1" the top row for column one is read followed by the number in the second column labeling the candidate chosen; for "challenge 2," the first number read is the top item from the second column and then the second items is from the first column and is from the row labeling the candidate chosen. Thus, one channel of audio suffices. Optionally, the names of candidates are also read, but over a different channel or with different encryption, so that the voter hears the audio confirmation of the choice but is not provided a copy of that channel, as it could be used for improper influence schemes.

Turning now to FIG. 49, a combination block, flowchart, schematic of an exemplary embodiment of a untrusted-assistant disabilities friendly voting system in accordance with the teachings of the present invention will now be described in detail sufficient for those of skill in the relevant art. In this embodiment, persons with disabilities communicate their vote to an "assistant," who is then to mark the ballot accordingly. (Settings in which more than one other person marks the ballot, and/or where votes are entered by means other than through a paper ballot, are anticipated but not included in the description for clarity.) A headset 20102 is shown for the voter and another headset 20103 for the assistant. (In some examples, also not described for clarity, the voter and/or assistant optionally does not use audio input but video input or both audio and video; at least one of the inputs, voter or assistant, is preferably kept from being readily learned by others.) The voter optionally uses recorder 20157 to record an audio version of some of the channels, to be described. The voter also receives a marked receipt comprising one half of a ballot having one serial number and both halves forming a complete ballot for a second serial number.

Three scripts are read: one for the first ballot 20133, that has serial number "3434" (as will be appreciated, the same example indicia as that used in other figures), labeled "E" here for clarity as it is one of two; one for the second ballot 134, with serial number "3435" and labeled "F"; and one for the ballot position order 20135, labeled "G." Each of script 20133 and 20134 reads the candidates in the same order as the positions of the holes on the corresponding ballot, "E" or "F", respectively. In the example, the first ballot corresponds to the one the voter votes, and the recording of script 20133 is thus one that would compromise ballot secrecy if provided to the voter. (The ballot the voter does not vote, ballot 20134, once revealed to be so chosen by the voter after voting, is preferably provided in its entirety to the voter for checking against the published commitments.)

Each script is shown as transferred in an encrypted analog audio format between some equipment, such as digital playback or IVR means as mentioned earlier, and the headphones used by voters and assistants. This analog transfer is optional and believed useful in some applications as it would facilitate the recording of the encrypted signal by voters and/or others using standard equipment inputs. However, digital transmission and recording inputs are also anticipated, and would then preferably not use the various conversions between digital and analog and the modem functions, all of which are shown for completeness. In the example analog embodiment, the voice reading the script is shown received in a digital analog form and then compressed digitally using a so-called "codec" function for speech, 20187*a*, 20187*e*, and 20187*i*, for each of the respective scripts 20133-20135. Then the signals are encrypted, as described elsewhere, and such as by conventional encryption techniques, as shown in boxes 20187*b*, 20187*f* and 20187*j*, respectively. After encryption, the three output digital signals are converted to analog, by first passing through modems 20187*c*, 20187*g*, and 20187*k*, respectively. Then these three outputs are converted to analog for transmission by digital-to-analog converters 20187*d*, 20187*h*, and 20187*l*, respectively.

The inputs to headphones 20102 and 20103 are shown as bold analog lines. The output of d-to-a 20187*l* is the input to headphones 20103 for the assistant, providing the position information. Voter headphones 20102 are sourced input from each of the ballots "E" and "F" as well as the positions "G" under the control of switch 20188*a*. The voter is to choose which of the two ballots "E" or "F" to vote; the other ballot "E" or "F" being made available to the voter for checking as already mentioned. One of the three inputs at a time is shown being selected by switch 20188*f*. When contest 20141 and such data is playing to headphones 20103, it is preferably also playing to headphones 20102, and thus selected by switch

20188*f*. (When serial numbers are read, they are for clarity shown only to headphones 20102, however, they are optionally also provided to headphones 20103 by a switch not shown.)

Each of the headphones has associated circuitry to convert the transmitted signal to audio. In the example, this includes a first analog to digital conversion, 20188*a* or 20189*a*. This stage is followed by the modems 20188*b* and 20189*b*, respectively. These signals are the decrypted by decryption circuits 20188*c* and 20189*c*, respectively. Then codecs 20188*d* and 20189*d* convert the decrypted binary stream to digital speech samples and provide this as input to digital to analog conversion 20188*e* and 20189*e*, respectively, for input to headphones 20102 and 20103, respectively.

It will be appreciated that the voter and/or various observers, including the assistant, preferably are able to record parts of the audio, whether from an analog signal, as shown by single example recorder 20157, or by a direct digital coupling not shown for clarity. What the assistant hears is preferably recorded in its entirety, as indicated by the bold line from the assistant signal to recorder 20157. The voter hears the candidate names in the order corresponding to the ballot that is being marked and will be deposited, as indicated by the leftmost inputs to switch 20188*f*; the candidate names for the other order, however, are selected as an output by switch 20188*g* and provided to recorder 20157. In another example embodiment, not shown for clarity, streams of names for both ballots "E" and "F" are provided for recording without switching: the switching is carried out later by the decision about which key to provide to the voter and which to withhold. Also the voter preferably indicates which positions are to be marked, such as by input means such as buttons 20156 as already described (and shown for clarity but not shown connected to the underlying control system not shown for clarity in this embodiment) and, and these are preferably included on the audio channel fed to headphones 20102, 20103 and recorder 20157; these are believed to allow the voter later to verify the faithfulness of the marking by the assistant and for the system, optionally, to check the markings when they are scanned, as already mentioned for other embodiments.

Four ballot sheets are shown: a top and bottom sheet pair 20112*a* and 20112*b* for a first ballot and top and bottom sheet pair 20113*a* and 20113*b* for the second ballot. One of the four sheets is to be provided to the assistant and marked by the assistant. To make that sheet appear similar to other sheets marked by voters in pairs, a template 20115 with holes similar to a top sheet is provided for use on the bottom sheets 20112*b* and 20113*b*. Similarly, to absorb the ink through the hole in the case that a top sheet is marked, bottom blotter 20114 is optionally provided.

In operation, the voter makes the selection on switch 20188*f*, which causes corresponding opposite selection on switch 20188*g* (or later release of the corresponding key when both channels are recorded in encrypted form). The ballot the voter listens to is the one that the voter then provides one sheet of to the assistant. For instance, if the voter chooses to listen to "E," then recorder 20157 records "F" and assistant is given one of 20112*a* or 20112*b*; or, if voter chooses to listen to "F," then recorder 20157 records "E" and assistant is given one of 20113*a* or 20113*b*. Then the voter hears the corresponding ballot number followed by a contest and candidate list. The voter selects one of the candidates as it is read and this choice is indicated, preferably by input means 20156 and preferably translated to audio such as by a distinctive audio tone, and this indication is preferably recorded by recorder 20157, learned by control mechanism not shown for clarity as mentioned, and made known to the assistant, who marks the corresponding position. After the voter finishes voting, the marked sheet is turned in, preferably for scanning, and then it is returned to the voter. Those running the election, or automated means, preferably check that headphones 20102 were listening to the channel corresponding to the sheet marked (or the corresponding key is provided) and that the other sheet of the pair marked is not released to the voter. The voter optionally then checks the recorded candidate orders against those posted on the voided released complete ballot and/or against those printed on the voided full two-sheet ballot taken. The indicated positions recorded are preferably optionally checked, such as by the voter, against online information, to ensure the faithfulness of the marking by the assistant and/or the accuracy of scanning by the system.

Various generalizations, extensions, and variations are anticipated in keeping with the scope of the inventive concepts disclosed here. All manner of combinations that do not violate privacy and allow audit are anticipated. What the voter hears and/or sees, however, is preferably kept secret to the voter; what the assistant sees/hears is preferably not secret so that it can be recorded. Nevertheless, either or both the assistant and voter can receive secret information in audio and video; the voter and/or assistant optionally receives additional secret information from indicia on a ballot part. And furthermore, recording is optionally partial, such as with a log printer telling the assistant what to mark, but without timestamps so that the log does not reveal the timing of the instructions. Moreover, what secret information the voter and/or assistant receives (referred to here generally as a "presentation" to the voter or assistant) in some examples, such as those already described with reference to FIG. 45-48, is related to the vote encryption indicia on the ballot forms, and in other examples it is separately committed. For example, such information can be in parts that combine to the printed indicia and/or it can be substantially independent.

An example embodiment that is believed adaptable to both assisted and unassisted is now described, based on the embodiment of FIG. 49, but not shown in all cases in the drawings for clarity. Everything is preferably committed to in advance and then opened for the ballot the voter in effect spoils in audit. As one example, the order for the assistant is fixed, so that the tape of the tones and what the assistant hears ("G"), or even a video of everything including what the assistant hears/sees/does, can be recorded and/or made public; the voter chooses between two committed sets of instructions and corresponding ballot forms ("E" and "F"), without the untrusted equipment knowing the choice until afterwards. (Also, related examples are described with reference to FIG. 55.) An optional variant, without an assistant, is where the voter marks the positions as instructed by the chosen channel. For a sighted voter with assistant, the data is supplied visually (optionally by the ballot as mentioned below with a generic receipt), but auditory confirmation can also be provided. Similarly, for the assistant, either or both audio and video are optionally supplied, as mentioned. The voter may of course be allowed to hear and/or see what is supplied to the assistant including position indications and tones, as mentioned. Also, what the assistant hears/sees and even does is preferably recorded by audio and/or video means, as mentioned.

For embodiments where there is a cleartext ballot layer marked, such as that described with reference to FIG. 57, and also where sighted voters read the complete form but instruct an assistant where to mark, a "generic" receipt form optionally is marked by the assistant. Such a marked generic receipt forms would preferably include the relevant serial number. It is preferably scanned and used in the tally, with the absence of any cleartext indicia apart from serial number that is missing preferably ignored by the scanning system. Where counts are provided of the cleartext ballots, in some settings a randomized sampling may be preferable, as the tally corresponding to the generic receipts would then not be revealed. In settings where the voter does not use the actual ballot, what will be called here a "privacy shield" can be used to protect the voter's privacy while allowing the assistant to mark the actual ballot form. In one example embodiment, not shown for clarity, an envelope with holes cut in it allowing marks to be made on the ballot it contains serves to hide privacy-sensitive indicia on the ballot from the assistant.

The embodiments described with reference to FIGS. 45 through 48 are believed extensible also to the assisted case. The voter hears one part and the assistant hears the other part and marks the receipt.

In another example, in keeping with scope of the invention, a standard audio of the candidates is provided (optionally with ballot rotation) and the assistant hears one of two orderings, each indicating where the corresponding marks are in the standard order on the particular ballot part or generic receipt actually used by the assistant (logging without timing would be an acceptable recordation). In still another example, both orders are randomized, voter or assistant gets two versions to choose from, or there are two versions each chooses from in a coordinated manner. With two randomized parts, for instance, the voter can take a tape of what the voter heard or of what the assistant heard.

The assistant in some embodiments receives only an indication from equipment of which position to mark when the voter signals and a record of these positions, preferably apart from temporal information, is permanent and provided to the voter and/or assistant, such as with a logging printer without timestamps as mentioned. In some examples, two orderings are used that differ from what is printed but are equivalent in effect, and a mapping between the two is committed in advance and opened afterwards for the spoilt half; which half of the form the voter takes can be decided later or no half can be taken.

As other examples, audio streams are optionally digitally signed or otherwise authenticated. Whether they are recorded by voters/observers in analog or digital form, digital authentication is well known by those of skill in the cryptographic authentication arts as being readily added to confirm the other data/sounds on the channel. Such authentication preferably allows immediate confirmation that the recordings are not readily disavowed by those operating the election. Various techniques, such as so-called "undeniable signatures" or delayed release of public keys allow some restrictions in who can make and/or convince whom of the authentication.

In an unassisted voting setting, such as that described with reference to FIGS. 45 through 48, optionally two ballot forms are presented to the voter and the voter is able to select between them in a way substantially not known to the system until after the ballot is marked. Like the embodiment of FIG. 49, this allows the voter to listen to a single channel, chosen from the multiple possible channels. In such an embodiment, the voter can for example take one of two ballot/disc combinations into a booth, listen to one and mark the corresponding ballot accordingly and then surrender the one listened to while optionally keeping the other one for audit. Which of two layers of ballot are taken, in the case of punchscan or related symmetric systems is believed the voter's free choice after marking; in non-symmetric systems, such as those to be described, the choice of layer to take is determined.

Multiple contests are anticipated, including ballot questions and candidates for offices.

Voters are generally provided authentication, preferably such as so-called public key digital signatures, related to the parts taken in each media, which can also safely be checked without the party checking learning the votes. More than two layers of paper and/or parts of the audio are anticipated. The option for voters to change tracks for particular contests is also anticipated.

The electronics, wherever incorporated, are preferably on transparent substrates and include transparent covering over chips and passive elements. Simple standard chips are believed preferable to larger and/or custom chips. Switches are preferably easily seen mechanical structures.

Special headphones are anticipated. Transparent or at least partly transparent and/or translucent parts are believed advantageous. In some examples, they allow observers to verify that the voter has not placed any transducers inside. In particular, transparent plastic such as vinyl ear cups including transparent gel, such as silicon gel, and/or liquid are desirable. Similarly, molded plastic parts are preferably made from transparent thermoplastics. Speaker cones are optionally formed from transparent material. Instead of foam, liquid or gel is preferably used to provide passive sound isolation, to reduce the sound transmitted outside the headphones. Another protective measure is to mask the acoustic information emanated with suitably chosen randomized signals from transducers configured towards the outside of the sound isolation enclosures.

The electronics of FIG. 46 and/or FIG. 47 are optionally incorporated directly in the headset. When those of FIG. 47 are included, a single plug for a recorder is preferably provided. Means are provided to allow the voter to move the normally-open switch to connect one of the two channels to the recorder, but the switch is preferably structured so that it then must be reset by a key held by election workers. Without that key, which choice was made is preferably hidden within the device; using that key, or a separate key for the purpose, the state is revealed before it can be reset. For example, one key is needed to unlock the little door that exposes the mechanical switch and another is needed to reset the mechanical latch holding the voter chosen switch setting. The headset preferably does not operate until the voter selects one position and it preferably emits an optical/audible signal to indicate that the voter has not yet made the selection, in order to make clear that poll workers have provided the device to the voter in the proper state.

In another example, the electronics are mounted visibly to a steel box preferably built to suitable emanations specifications, not unlike a small first aid kit including a handle. The box optionally serves to hold and protect the headphones while not in use. The recorder of the embodiment of FIG. 47 is placed within the box. Mechanical locking ensure that the voter state cannot be set or reset improperly and that the device cannot be used until it is set by the voter, as described elsewhere here. In particular, positive interlock is anticipated, so that only when the box is closed is a substantially rigid element, such is used to hold a door open as with a gas spring, is brought into a configuration where a recess or hole in it allows operation. Cables are run out from the box through strain relief grommets that slide into channels accessible when the box is open or that are mountable as a unit through an opening in the box that is preferably closed off by a cover allowing the cables and electronics to be protected inside during transport and storage.

Turning now to FIG. 50, a combination block, flow, data, and cryptographic protocol diagram of an exemplary embodiment of a mixing system in accordance with the teachings of the present invention will now be described in detail sufficient for those of skill in the relevant art. Six instance examples are shown, 30001*a* through 30001*f.* The first, 30001*a*, indicates the initial state published before any audit. The second and third instances, 30001*b* and 30001*c,* are alternative examples illustrating the opening of different rows in initial audit, as indicated by the overarching bracket labeled by the word "or." In the fourth through sixth instances, 30001*d*-30001*f,* the example shown in instance 30001*b* is carried forward (as indicated by the arched "dash-dot-dot" arrow) rather than that of 30001*c,* as an arbitrary choice for simplicity and clarity. The row that would have been opened had instance 30001*c* been used, as will be explained (the upper of the two rows marked in the left of the three columns of tables), is the one used for the vote in 30001*d*-30001*f.* Instance 30001*d* shows the publishing of the encrypted votes, intermediate results, and cleartext votes, as a sequence connected by arched "dash-dash-dot" arrows. Finally, two alternative instances, again indicated by the "or" above a bracket, are shown with inverse binary challenge vectors of odd parity.

A particular notation is adopted for clarity. It indicates the content of the respective cell in the published data table rectangles: Light gray indicates values committed to; white is values yet to be filled in; black (for rows) and darkest gray (for whole columns) are values that have been committed to in earlier instances and are now opened. Light line texture, medium gray dot texture and dark line texture indicate the public encrypted votes, intermediate mix values, and cleartext outputs, respectively. Cells with a circle symbol in them are opened ballot parts. The straight lines with arrowheads indicate correspondences between data cells within an instance: "thicker dash-dot" lines being hidden correspondences, solid thinner lines being correspondences revealed in the initial audit explicitly by the data pointers in the corresponding data cell where the line originates, and "thicker long-dash-short-dot" lines indicated the correspondences revealed in the final audit by the opening of the data cells containing the pointers.

Referring now to the first instance, 30001*a,* the table structures are described. These appear again in each of the remaining five instances, 30001*b*-30001*f,* but are not labeled again for clarity. Four tables of data are shown: ballots 30011, example intermediate batch 30012 and example intermediate batch 30013, and cleartext votes 30014.

Each row of table 30011 corresponds with what will be called here a "potential" ballot: a set of data cells that if opened during initial audit is not used further or which if not opened in the initial audit at least potentially goes on to serve as corresponding to an actual ballot. The first two columns of table 30011 each correspond to a different one of the two parts of such potential ballot: for concreteness, it the leftmost column will correspond here to the top sheets and the middle column to the bottom sheets. The data cells of these two columns are informational copies of what would be printed on the corresponding ballot sheet. These two columns are shown in gray, as indicated above, corresponding to their initial state of being hidden by commitments. The rightmost/third column of table 30011 is initially empty but is where the encrypted vote from the corresponding ballot will be posted once it is determined (such as by scanning a ballot).

The two intermediate tables 30012 and 30013 are examples of the parallel audit instances: ultimately, one or the other half of each will be opened in a final audit stage. Each row corresponds to a potential ballot, again whether or not it survives beyond the initial audit. Even though the height of 30012 and 30013 is less relative to 30011 and 30014, no fewer rows are suggested. Two example rows are shown for convenience in each 30012 and 30013, but their content is not differently colored than other rows until instances 30001*b*-30001*f.* The left and rightmost columns contain pointers to rows of table 30011 and 30014, respectively, as indicated by the gray dashed arrows shown for the two example rows. The middle column is where the intermediate value, to be described, will be posted (as indicated by medium gray in instances 30001*d*-30001*f*).

Table 30014 is where the cleartext votes will be published for tally. Those rows that survive the initial audit and for which ballots are scanned, will be filled, allowing anyone to tally the votes. The final audit will check the accuracy of that filling.

Referring now to instances 30001*b* and 30001*c*, two example initial audit choices are shown. In the first, 30001*b,* the lower of the two indicated rows in table 30011 is chosen for audit; whereas in instance 30001*c*, the upper such row is so selected. The, accordingly for each intermediate table, two of which as mentioned are shown, 30012 and 30013, the commitments of corresponding rows are to be opened. It is believed that, depending on the size of the election and other specifics, some number of rows in table 30011 would be selected unpredictably for audit (for instance as a result of a publicly verifiable physical random generator, as in lotteries), such as, for instance, half the rows.

When a row is opened in an intermediate table 30012 or 30013, all four committed values are opened, as indicated in black. The middle value is still empty in instances 30001*b* and 30001*c*, and so it is not shown as opened. There are two types of checks made on such a row: the "links" and the "transformations." First consider the links. As will be appreciated, for each particular row selected for opening in table 30011, the leftmost pointers in all opened rows of tables 30012 and 30013 should point to that row in table 30011 and the rightmost pointers of those rows in table 30012 and 30013 should point to the same row in table 30014. If the pointers do so point, the initial audit of the links will be deemed not to have detected fraud. This can be seen in the two examples 30001*b* and 30001*c*.

In addition to the links, just described, the initial audit checks the way that the "encrypted votes" are transformed into "cleartext votes." The two leftmost columns of table 30011 record the information content of the indicia on the sheets of the ballot. They cause the cleartext vote to be transformed from the cleartext vote to the encrypted vote. This transformation will, in known and previously disclosed manner, be considered for clarity and concreteness as the application of a group operation between two group elements: the cleartext vote and a group element determined by the cells of the two columns. When the two group elements from the corresponding row of an intermediate table are successively applied to this, the result should be the cleartext vote back again. If the group elements do so combine, the initial audit of the group elements will be deemed not to have detected fraud.

Referring now to instance 30001*d*, shown as mentioned is a continuation of the example of instance 30001*b,* after the initial audit is completed successfully and the votes have been scanned. First the encrypted votes are posted, shown by the dark line texture column, the rightmost of table 30011 (where the entries for the rows opened in the initial audit are left blank, as the corresponding ballots are not used). The particular row the encrypted vote corresponds to is determined by the "serial number" identification indicia on the ballot, which corresponds in a public way, such as by being the row number. The example row is shown with circle-containing cell entry for the left column, corresponding to the voter having, continuing the example mentioned above, chosen to keep the top sheet. The commitment for the indicia on the top sheet is opened and the voter can show the receipt if the value differs from that on it. Also shown, for clarity as a dashed row, is an example where the voter kept the other sheet as indicated by the circle-containing cell being in the middle column.

Once the encrypted votes are known, the intermediate values, shown in medium gray as mentioned, can be determined as can the final decrypted ballots, shown in "light line texture" as mentioned. These values are believed, as will be appreciated, preferably posted in the natural ordering from left to right, first for tables 30012 and 30013 and then for table 30014, as indicated by the dot-dash-dash arrows. The dashed gray linking arrows indicate that which row in each intermediate table 30011 and 30012 points to a particular encrypted vote or a particular cleartext vote remains hidden at this point. (The opened row from instance 30001*b* and its thicker dashed links remains shown for concreteness.)

Referring now to instances 30001*e* and 30001*f*, alternative audit phase examples are shown. In instance 30001*e*, table 30012 has its left side audited and table 30013 its right side; the opposite choices were made for example instance 30001*f*, where the right side of table 30012 and the left side of table 30013 are to be opened. Again, the "or" labeling the brace indicates that one of the two example instances is carried out, as will be appreciated, keeping hidden the linking between actual published encrypted votes and published cleartext votes. The long-dash thick arrows indicate parts of each linking, but it is believed do not provide enough to reveal any whole linking. When a column in an intermediate table 30012 or 30013 is opened, the group elements it contains are preferably checked using the links opened: a left side opening (such as for table 30012 in 30001*e*) allows the group operation to be applied to the group element revealed and the published encrypted vote pointed to, and this should equal the intermediate value group element in the middle column, shown in medium gray; similarly, a right side opening (such as for table 30013 in 30001*e*) allows the group operation to be applied to the intermediate value group element in the middle column, shown in medium gray, and the group element revealed, and the result compared for equality with the cleartext vote pointed to in table 30014.

Turning now to FIG. 51, a combination block, flowchart, schematic, and protocol diagram of an exemplary embodiment of a mixing system in accordance with the teachings of the present invention will now be described in detail sufficient for those of skill in the relevant art. The process begins with entry point 30201. As shown in box 30240, all the potential ballot details are determined, preferably from a true random process or a cryptographic random process, so that they are substantially unpredictable and preferably uniformly distributed. For each potential ballot, as per box 30242, the indicia of the two halves are each separately committed, in the left and middle columns of table 30011. Next, box 30244 shows the public random selection of some of the potential ballots for opening.

Once the initial audit is completed in box 30244, the physical ballots are printed as per box 30260. Then voters vote the ballots, as described in box 30262. During voting and/or after voting the information marked on the ballot is scanned or otherwise captured, including the positions marked, the serial number, and which of the top or bottom sheet the voter keeps. Then box 30266 depicts the opening of the commitment on the indicia on the sheet retained by each voter. If the sheet is scanned and returned to the voter, then the sheet retained by the voter is that scanned; if the sheet is deposited by the voter and the other sheet retained, then the sheet scanned is that deposited and the opposite sheet is retained, so the sheet other than that scanned has its commitment opened in table 30011.

The intermediate table entries are preferably next filled, corresponding to the middle columns of tables 30012 and 30013 in the already described examples, as shown by box 30280. The values of this cell, for each particular row, is determined by applying the group operation to the transforming value in the left of center column and the encrypted vote pointed to by the leftmost column. The cleartext votes of table 30014 are readily determined as portrayed in box 30282 from any of the intermediate values, by applying, for each row, the group operation to the intermediate value and the right of center value and placing the result in the row pointed to by the corresponding rightmost column. Finally, box 30284 shows the preferably public random selection of which halves of the intermediate tables to open, such as the right or left halves of tables 30012 and 30013 as already described. The audit checks that the values revealed, when combined with the intermediate value using the group operation, properly correspond to the value pointed to by the adjacent opened entry. The end of the process 30202 is when sufficient values have been opened for post election audit. Further values are optionally opened later, as optional additional instances of box 30284.

Commitments, as will be appreciated, are known. In the cryptographic art, for instance, commitment schemes are known that are provably unconditionally unchangeable but only computationally hiding and these are believed preferable for election systems. Such provable commitments are believed to require substantial computation and storage. A hybrid approach entails such a "quality" commitment to a key, and then the key being used to commit to a much larger value, such as by x-or of a pseudorandom sequence generated by the key. It is believed that the hybrid has the properties of the underlying quality scheme.

In the present application, it is believed that hybrid schemes are well suited to the commitments for the halves of intermediate tables such as 30012 and 30013. The commits to each individual cell in table 30011 are believed numerous and would benefit from a conventional symmetric encryption type of commit, where the key is the secret revealed to open the commit. In order to maintain the properties of the quality commitments, however, each such key is preferably divided into pieces and each piece associated with the corresponding pointer of a corresponding intermediate tables, such as 30012 or 30013. Thus, on average half or so of these columns would be opened, and half or so of the bits of the keys used to open the rows of table 30011 would preferably then be subject to double check, ensuring their quality with high probability. Care is preferably taken that not all the left sides of intermediate tables are opened, leaving enough uncertainty about the keys to make them infeasible to guess. (Right halves of the intermediate tables optionally also reveal parts of the ballot commit keys, thereby increasing the key size and lowering the chance of substantial collisions.) It is believed that the left two columns of each intermediate table are preferably created pseudorandomly and that they then determine the right pointers and the keys for the commits in table 30011. The ballot parts are preferably independently created and in turn then determine the value of the right transformations. An example optional way to create the ballot parts is to create each pseudorandomly.

In addition to hybrid schemes, "redundant" schemes more generally are anticipated. With these, a commitment to some data is made with more than one scheme, and in some cases both are always opened, perhaps one later than the other. Thus, quick commitments are preferably used for each data cell and opened first. Then, redundant commitments are opened later for verification.

Furthermore, it shall be understood that use of conventional cryptographic encryption can be applied to form commitment schemes of high quality. For instance, publishing a commitment using the same key to some constants chosen as a kind of random challenge initially allows more confidence in the unique key opening. Similarly, the more "independent" and "redundant" data encrypted with a conventional commitment key, the more likely the key revealed in opening is unique.

Many variations and modifications are anticipated without departing from the spirit and scope of the present invention. For example, division between multiple trustees for robustness is optionally accomplished by so-called secret-sharing of the secrets for opening each set of mixes. As another example, the tables are split into partitions horizontally so that multiple challenge bits can be applied in the final audit of a single intermediate table. As a further example, the contests are divided into disjoint "partitions" that each have their own intermediate batch tables and cleartext votes tables but share the common ballot table, thereby hiding the correlation between contest results across partitions. A still further example allows more than one subset of the ballots from a single set of tables to be voted and audited together as needed after the table structure is fixed.

In systems related to those described with reference to FIG. 52 and FIG. 53, generally, voting is anticipated in substantially seven example types of setting:

(a) in person with automated scanning;

(b) in person with manual ballot box;

(c) remote, where a single piece of paper is mailed in;

(d) remote, where two pieces of paper are substantially separately mailed in;

(e) in person by voters with visual disabilities marking; and (f) in person voters by voters with disabilities having assistance in marking.

It is believed that a substantially two part form is sufficient for settings (a), (c), (e), (f). A three part form is believed more appropriate for settings such as (b) and (d), where three different dispositions of parts of the form are natural. It is believed that two-part forms can be used in the setting where three-part forms are preferable, but that privacy may be diminished particularly for the direct as compared with indirect marking interfaces. As will be appreciated, settings (a), (c), (e), (f) each have two variants: where the voter identity is not linked to the marked image or artifact retained by those running the election, and that where it is in order for the handling of so-called "provisional" or "vote-from-anywhere" ballots. In the linked case, privacy afforded by the ballot information associated with the voter identity is preferably not readily violated. With mail in ballots, linking to some degree is preferable in making the eligibility decision based on an affidavit or the like, which is believed to impede some improper influence scenarios; however, it is preferably also to the entity that cannot link to votes unilaterally.

Turning now to FIG. 52, a combination schematic and plan view of an exemplary embodiment of two-sheet combination ballot in accordance with the teachings of the present invention will now be described in detail sufficient for those of skill in the relevant art. A perspective view is shown in FIG. 52A, while two-up views of each side are shown in FIG. 52B and FIG. 52C. (The end view is from the bottom.) As will be appreciated, two separate ballots of the type shown in FIG. 41 are in effect combined into a single form in the lower half. I the upper half, a ballot with marks next to candidate names is shown with the marks to be made through the holes provided in the dotted ovals shown on the inner layer, as will be seen. Each of the two outer sheets has a different serial number, in the example they are linked as an odd/even pair. A perforation line is shown to allow the serial number part to be separated from the main part, thus four separable parts in all. The identification number for the inside layers are substantially independent. Moreover, each has a "code" prefix before the dash, "12" for the left and "55" for the right, which codes will be explained.

Figure 52B:
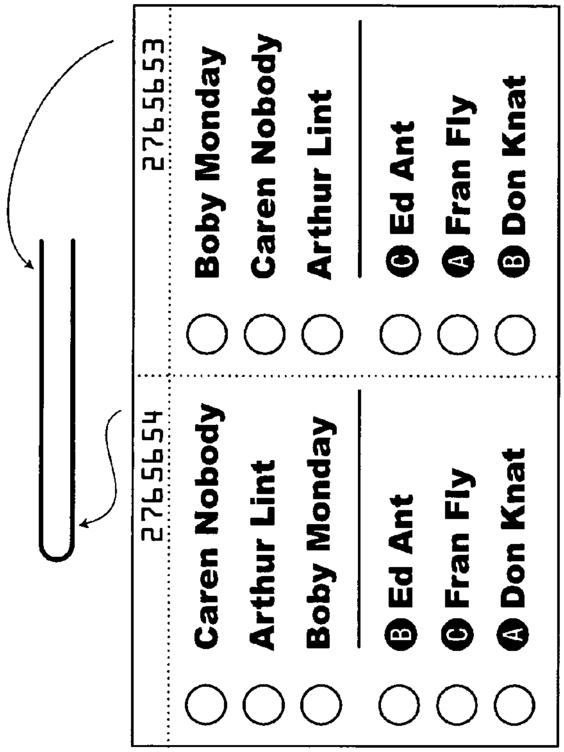
Figure 52C:
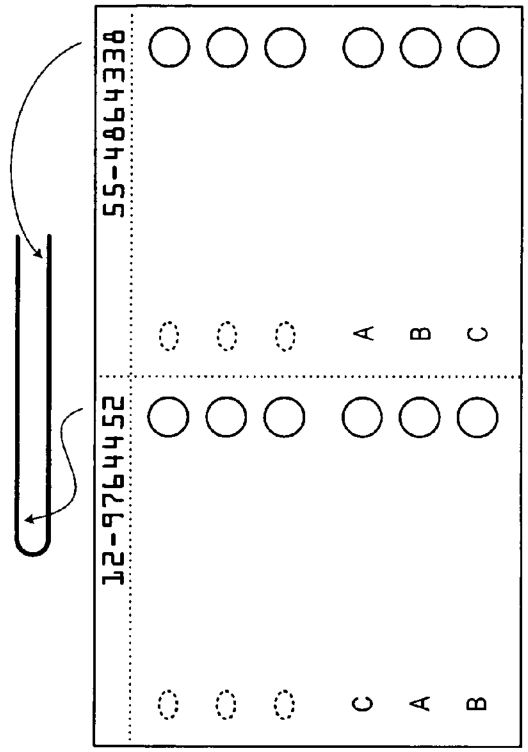
Figure 52A:
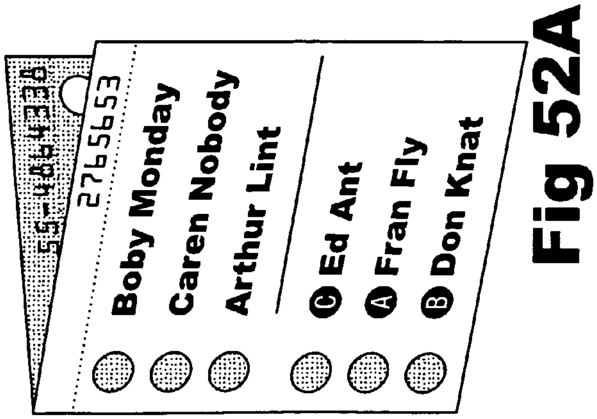
Figure 52D:
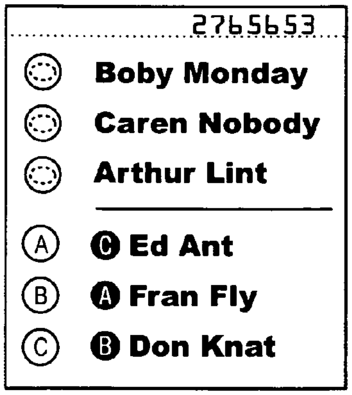
Figure 52E:
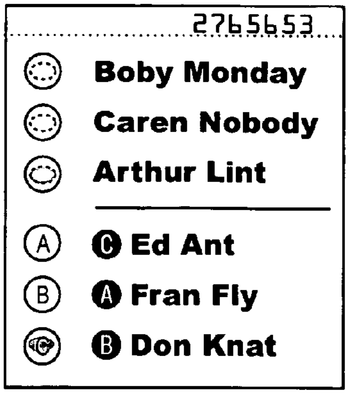
Figure 52F:
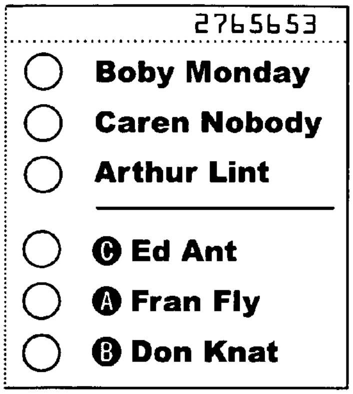
Figure 52G:
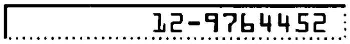
Figure 52H:
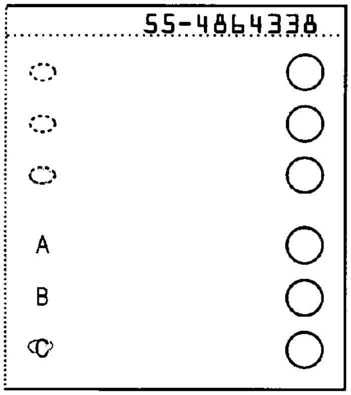
Figure 52I:
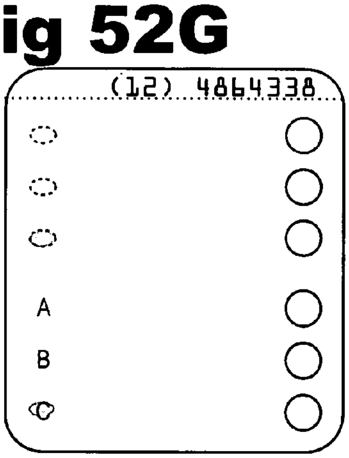
Figure 52J:
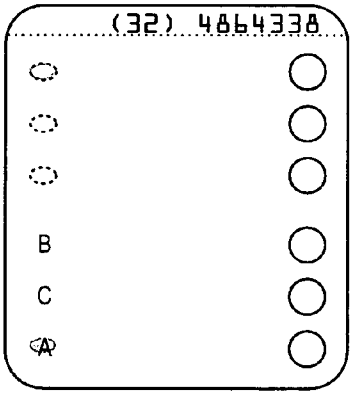

Turning now to FIG. 52D-M, various views and online images are shown. FIG. 52D shows the unvoted ballot form as viewed with the odd serial number up. FIG. 52E shows the orientation of FIG. 52D but voted, with a dotted oval for the third candidate "Arthur Lint" shown filled, such as by hand using a pen, and a daub over the letter "C," being a vote for "Ed Ant," as the candidate labeled by that symbol on what is in this orientation the top sheet. When the two sheets are separated at the vertical perforation, the odd one has no marks on it, as seen in FIG. 52F. The voter preferably also retains the upper foil from this unmarked form, the inner side of which is shown in FIG. 52G. The inner surface scanned and that serves as the rest of the receipt is shown in FIG. 52H. When the voter goes online, the number on the main receipt is entered and provided to the online system; the code from the slip described in FIG. 52G, however is entered locally in software preferably run at the user computer. The image the voter then sees, FIG. 52I, is a correct synthesized rendition of the essential information on the receipt, but with the code entered shown. The code preferably maps the data provided to the local computer, such as by an Abelian group operation, so that any pattern of marks is equally likely if the code is independent and uniformly distributed. This is illustrated further in FIG. 52J, where the wrong code is entered and the marks are randomized in their positions.

Figure 52K:
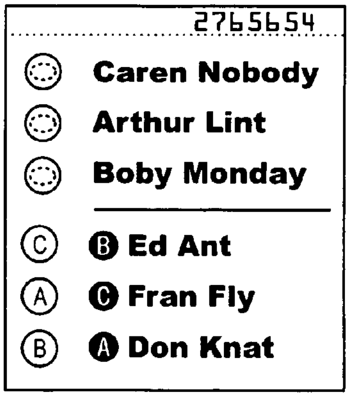
Figure 52L:
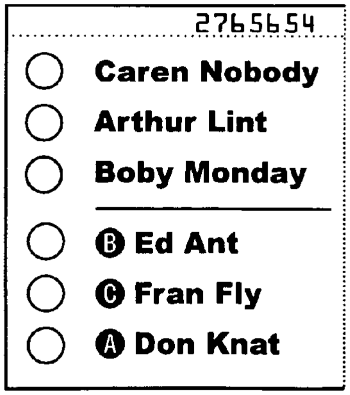
Figure 52M:
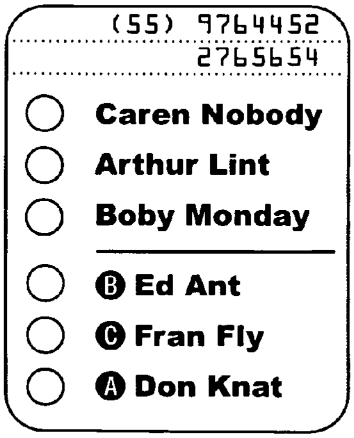

The reverse side view of the voted ballot is shown in FIG. 52K for clarity. The reverse side of the receipt, however, is shown in FIG. 52L, which matches that from the right side of FIG. 52B. What is preferably also displayed for audit by the voter is an online view of this that is augmented to include the identifier on the strip the voter kept from FIG. 52G, but with the code substituted for "55," that one the receipt. Thus the voter can check all the other printing against the online version.

It will be appreciated that, for example, if one of two parties prints the two-up indicia on the outside of the form, FIG. 52B, and the other party prints the inner two-up indicia of FIG. 52C inside the form (they use the common identifier printed on the inner is used to coordinate the printing), and the inner-printing party does the scanning, then neither party alone learns the votes. The scanning party does not learn the votes because the scanning party does not know what is on the corresponding outer, as the other party printed it. But the scanning party does know the code the voter has and provides the posted information so that the code is needed to decode it. The non-scanning party does know the outer printing associated with the common identifier mentioned and available online, but the outer printing party does not know the code used to permute the vote-determining information on the inner sheet rendered in FIG. 52I. Since the unused to parts are shown in clear, they can be checked against the posting and cheating in printing by the parties would be detected, as the commits for those parts would be opened after the scan is made. The serial number for rendering is from the opening of the commitment by the outer-printing party.

Figure 53A:
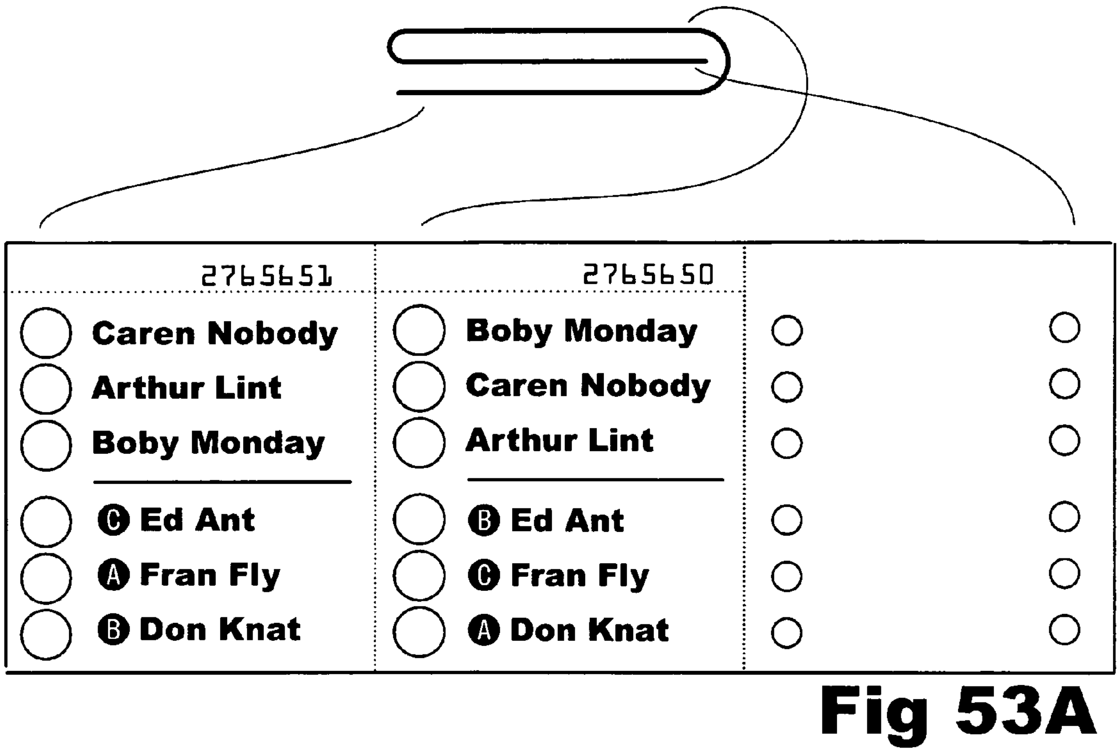
Figure 53B:
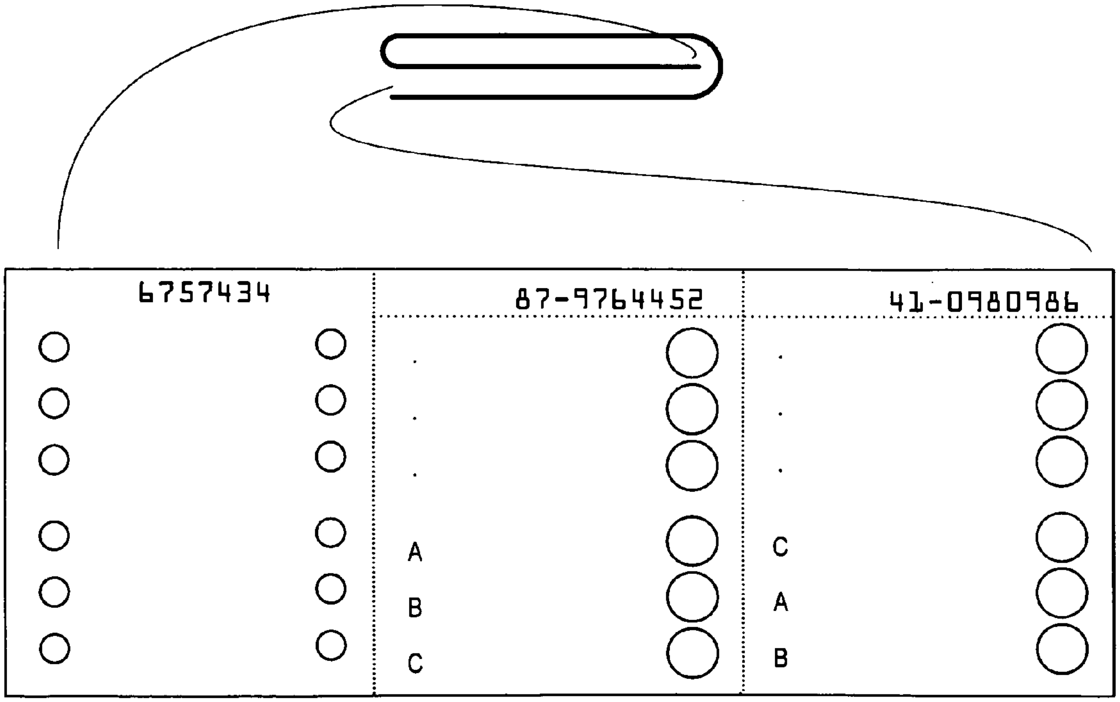

Turning now to FIG. 53, a combination schematic and plan view of an exemplary embodiment of three-sheet combination ballot in accordance with the teachings of the present invention will now be described in detail sufficient for those of skill in the relevant art. FIG. 53A shows the three-up version of the ballot with the candidate names, corresponding to the FIG. 52B, but with the extra sheet on the right that is "C-folded" into the middle and has the smaller holes in it. (The end view is from the top in this figure.) Similarly, the three-up plan view of the other side shows the indicia essentially of FIG. 52B, but with the additional panel on the left. The identification number for the sheet with the small holes only appears on this printed side for the inner part—it will be recognized when the party that printed the inner side scans and will allow it to thereby determine the other serial numbers and the codes.

Turning now to FIG. 53C-L, similar views are presented as were already described with reference to FIG. 52. The unvoted view of the side that will be voted in the example is shown in FIG. 53C, where the middle circle is from the small holes already mentioned. Voting is shown by daubing and the middle two positions are marked in this example as shown in FIG. 53D. The daub marks can be seen on the sheet with small holes in FIG. 53E, which is the sheet provided for double-sided scanning by the part who printed the inner side FIG. 53B. The voter again keeps the part of opposite top, shown as FIG. 53F, but that top part is destroyed. The voter also has the bottom part marked, FIG. 53G, which is then compared to the online version FIG. 53H. Since the code is used locally, the correct printing and mark positions are rendered; but as seen in FIG. 53I, without the correct code, neither mark positions nor symbols are likely in their correct place. Again, the voter is able to check that what looked like FIG. 53J before voting, and looks like FIG. 53K, now as the back of the voted bottom FIG. 53G, is shown correctly online with its serial number "2765651." Also shown is the identification for the other side and the code from the marked side, as with FIG. 52.

Turning now to FIG. 54, a combination block, flowchart, schematic, and protocol diagram of an exemplary embodiment of a combination disability friendly voting system in accordance with the teachings of the present invention will now be described in detail sufficient for those of skill in the relevant art. In this example, two different ballot sets are shown and the voter has preferably been able to choose which one. The system does not know which one. The assistant only marks the lower sheet from FIG. 52, based on the signal from the voter who is listening to the correct order of candidates (but which order the voter listens to is unknown to the system). The translation by "G" allows the orders the voter hears to more convenient, especially if two different "G" values are used, not shown for clarity. Also, as will be appreciated, a similar setup can be used for two ballot sets more generally. The voter also keeps the code for use in audit, as shown in the screen images. This setup and process is substantially similar to those already described with reference to FIG. 45-48.

Turning now to FIG. 55, a combination block, flowchart, schematic, and protocol diagram of an exemplary embodiment of an untrusted-assistant combination disability friendly voting system in accordance with the teachings of the present invention will now be described in detail sufficient for those of skill in the relevant art. This setup and process is substantially similar to those already described with reference to FIG. 54 and also FIG. 49. It will be appreciated that giving the voter the choice of two complete ballot sets, but not letting the system know which one until afterwards applies generally. The audio for the assistant shown can, as mentioned be public and/or replaced by visual signals. The voter signals the assistant using temporal signals or by speaking or signing numbers, for example.

Turning now to FIG. 56 a combination block, flowchart, schematic, and protocol diagram of an exemplary embodiment of a two-party mixing system in accordance with the teachings of the present invention will now be described in detail sufficient for those of skill in the relevant art. Values of various types are shown as entries in the three matrices of five columns and the two of one column. The dashed lines between the matrices illustrate the values of the pointers and indicate each pair of rows, one per matrix, with values corresponding to the same ballot. The numbers to the left of each row of the leftmost matrix are row numbers that apply to the position of rows in the matrices themselves.

The rows of the matrices are comprised of entries called cells, one per column. Each cell is of a particular one of three underlying data types: pointers (shown darkest gray) to other rows; transformation parameters, and the actual values corresponding to votes in various stages of processing. The underlying data types appear in either encrypted or "committed" form and decrypted or "cleartext" form, and some change from encrypted to decrypted form as processing proceeds through an election cycle. The pointers and transformation parameters (shown as table entries with various gray backgrounds) in particular appear initially in encrypted form and are selectively decrypted later, preferably in accordance with challenges. The vote values (shown as table cells without gray background) generally appear in cleartext, although they are subject to transformations as will be described. The cleartext representation shown for both vote values and transformation parameters is shown as integers modulo three, for clarity. The transformation operation is shown as addition modulo three, for clarity, although for multiple vote contests particularly, more general bijective mappings are anticipated, as would be readily appreciated by those of skill in the cryptographic art (for instance, composition of arbitrary randomly chosen group operation being well known).

Two entities, the "receipter" and the "Tallier" are shown in the preferred embodiment. The receipter knows the keys to the encryptions of the leftmost two matrices; the tallier knows those for the five-column matrix on the right side. Accordingly, the receipter knows the leftmost two row permutations and the tallier the rightmost two. The five matrices can be thought of as a single "virtual matrix" if the rows are taken to be re-ordered so that the row permutations are the identity. (Preferably each matrix has the same number of rows.) The secrecy of the ordering of the rows, however, protects privacy. The middle matrix, with its single column, is taken to be in the order of serial numbers of the corresponding ballots for clarity and simplicity. The linking of this order to the tally order is kept secret by the tallier, even though there may be more than one instance of the right five-column matrix. Similarly, the middle five-column matrix hides the linking of the serial number order to that to the "receipter's secret ID" that orders and allows voters to find the corresponding posted rendering precursors. (In some embodiments, a further indirection to the receipter's secret ID is provided, the receipter's super-secret ID, such as by a separately committed to and individually openable mapping, to allow the receipter but not others to link, as will be explained.) Multiple instances of the two permutation-containing matrices are preferably used in parallel, as will be appreciated, but not included here in the description for clarity.

Operation, in overview, includes a series of transformations. This begins from the leftmost column posted "rendering precursor" (v-p), which when combined with the scramble digits from the ballot on the voter computer should reveal the actual mark positions (m). After moving across from left to right, and being transformed and switching rows in accordance with the transformation parameters and pointers, the final result is the cleartext vote (v). Thus, the modulo three values in the "tally" column are preferably for clarity interpreted as corresponding with zero-based indexing to the three candidates in a pre-determined order, such as alphabetical order.

Overall processing proceeds in three main phases: "pre-election"; "election pre-tally"; and "tally and audit." Pre-election, the first phase, posts the pointers and transformation parameters in encrypted form. Then a preferably public random selection is made of these values, such as by indicating certain rows, for instance by the index of the "shared value cell," which is preferably the ballot serial number. The keys that allow these rows to be decrypted are then revealed, thereby "opening" the "commitments." Any interested observer is then able to check that the pointers are followed and that the net effect of the transformation of the resulting "virtual row," apart from the leftmost matrix, is correct, and that the pointers are at least distinct. Substantial probability of correctness of the postings can be established by this phase.

Election pre-tally, the second phase, entails two aspects, posting of "rendering precursors" and opening of rows indicated as unused in the voting. These preferably proceed in batches, preferably synchronized so as to provide a simpler voter experience. Voters are able, once their ballot batch is posted, to see two things preferably in their own information processing system (pc): the unused serial number of the pair of serial numbers forming the ballot is posted and matches that unused part of the ballot form the voter retains; and that the marked positions (and their symbols, where used) match that viewed when the scramble code and receipter secret number are entered and processed locally.

Tally and audit, the final phase, entails releasing the outcome and public verification that transformations, substantially and at least with substantial probability under the assumption of random challenge, are correct. (As will readily be appreciated, the values can optionally be encrypted and selectively checked without revealing the tally, preferably even to either entity, as a kind of robustness test of the transformations.) All the values will be posted substantially at once, first by the receipter entity and then by the tallier entity, for simplicity in explanation and clarity. Verification of the transformation proceeds as with previously disclosed systems referenced earlier: one or the other of two halves are requested to be opened, but not both, and optional parallel instances provide additional verification.

The formula notation indicates the basic transformations and their relations. The formula corresponding to each pair of transformations indicates the net effect of the pair. The values r1, r2, and t1, correspond to the two transformation pairs by the receipter and the single pair by the tallier, respectively. The same symbols with a comma and second numeral appear in the labels above the columns. Without the comma, the transformation is the net combined transformation (the sum in the case of addition modulo three); the values with the same symbol but the two different digits after the comma have a combined net transformative effect equal to that of the symbol without the comma. Thus, for example, applying r1, 1 and then r1, 2 give the same transformation as applying r1.

The formula for a value column gives a closed form for the value of each of its cells. The values v, p, and m have already been described. Each is instantiated once per virtual row. As will readily be appreciated, each entity introduces a transformation corresponding to its printing. There is a shared but otherwise preferably random transformation s(=s1+s2) that is know to each party to relate to each row of the shared value column. The receipter includes the shared permutation in two stages, first s1 and then s2, and then the tallier removes both of them. Transformation −p1 is what lets the posted rendering precursor not reveal the actual mark m. With direct marking, only one permutation, p1, is nontrivial; with indirect marking involving printing by both entities, both p1 and p2 preferably correspond to printed transformations.

Turning now to FIG. 57, a combination schematic and plan view of an exemplary embodiment of a carbonless ballot form in accordance with the teachings of the present invention will now be described in detail sufficient for those of skill in the relevant art. FIG. 57A-C shows a ballot formed from a substantially sheet material such as paper or the like with a so-called "carbonless copy" functionality preferably on the inner surfaces, those surfaces exposed in FIG. 57C. The so-called "self-contained" type of carbonless coating, such as that made by Appleton of Wisconsin under the name SC NCR paper and product number 2751, being an example. The printing on the outside surface of the folded and preferably pre-perforated form, as shown in FIG. 57A, has as examples two contests each of three candidates. The serial number, 765653, is shown on FIG. 57A. The order of the candidates is preferably arranged related to the serial number according to an encrypted voting scheme, as disclosed in references mentioned. It will be appreciated that an optional extra set of the same contests is shown printed on the reverse side of the ballot, as seen on the left half of the so-called "two-up" front surface of the form shown in FIG. 57B. One advantage of such apparent redundancy is believed to be that it provides voters the ability to keep a valid ballot that they or others can then audit, a technique mentioned elsewhere here and generally useful, as will be appreciated. Another believed example advantage is allowing the voter a chance to fill the form again in case of a mistake.

When the voter fills an oval—as with current optical scan systems—next to the candidate in a particular contest, the mark is transferred onto the other layer of the still preferably folded form through the carbonless system function. (The optional large ovals shown on the inner surfaces are an example graphic to help voters interpret the positions of marks formed on that surface of the receipt.) As will be appreciated, using an SC layer, such as a fully coated exposed surface of FIG. 57C, means that the mark is also visible on the inner side (the side shown on the left in FIG. 57C) of the sheet marked as well as the inner side of the other sheet (exposed on the right in FIG. 57C).

Such double-marking is believed an advantage as the scanning of the sheet submitted preferably is double-sided and detects the images of the marks created by the carbonless and preferably uses the additional information to help improve the accuracy of the scan. For instance, the system preferably warns if the marks on the inner surface (left side of FIG. 57C) do not reflect those on the front surface (right side of FIG. 57B). It is believed that using such inner carbonless mark, instead of or in addition to the corresponding outer mark, provides additional uniformity and information about voter marking. For instance, some marking instruments, such as certain pencils or colors of ink, do not scan well in some systems; with the carbonless, the mark color is determined by the dye. Moreover, marking pressure is indicated in carbonless images. In the case of the SC mating carbonless surfaces, they receive almost exactly the same pressure and thus produce substantially similar marks, ensuring that what is on the receipt is also essentially read during scanning of the ballot. This is in contrast to most copy technologies, where it is never sure if the copy reflects the original.

In production, the forms are preferably printed on the inner layer and perforated for folding in a first step, as this is preferably the same per ballot. Then the outer surface is printed, with unique serial number and corresponding permutations of candidate names per contest as known. If folding precedes the outer printing, then smaller format printers, including so-called demand printers, can be used, which may be an advantage in some applications. In large-volume production, so-called web printing is preferably used followed by die cutting and/or sheeting equipment, as is known. Two cooperating carbonless coatings, such as applied by modified offset printing as known, one located behind each set of ovals on the front surfaces on both sides of the inner layer, are preferable, as the amount of coating material is reduced compared to full coating and marks resulting from handling can be reduced by separating the layers.

In a novel example embodiment, two separate two-part carbonless chemistries are used, one part from each applied to each layer; the result appears to work like the SC type, except that when the two layers are separated, no stray marks are recorded as the typically micro-encapsulated activator needed for each sensitive coating is not present in its own layer. The inclusion of so-called "taggants" in the material optionally provides evidence that the marks were caused by the same opposite part.

Figure 57B:
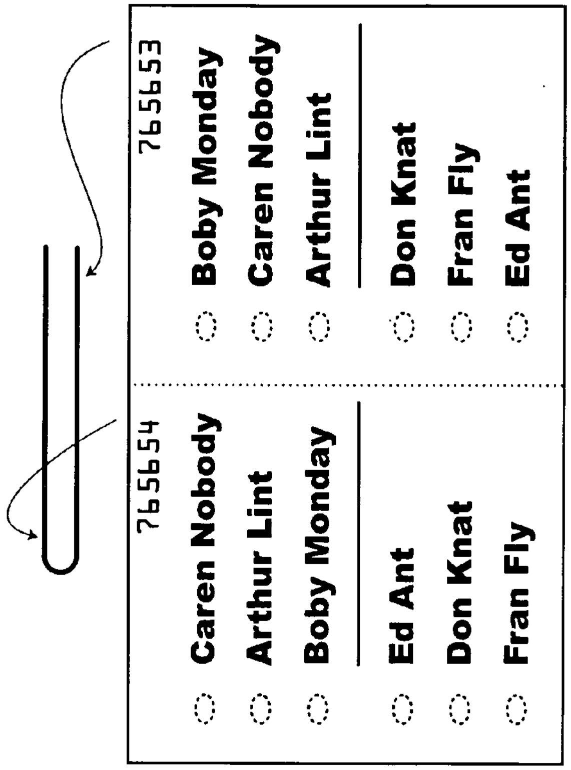
Figure 57C:
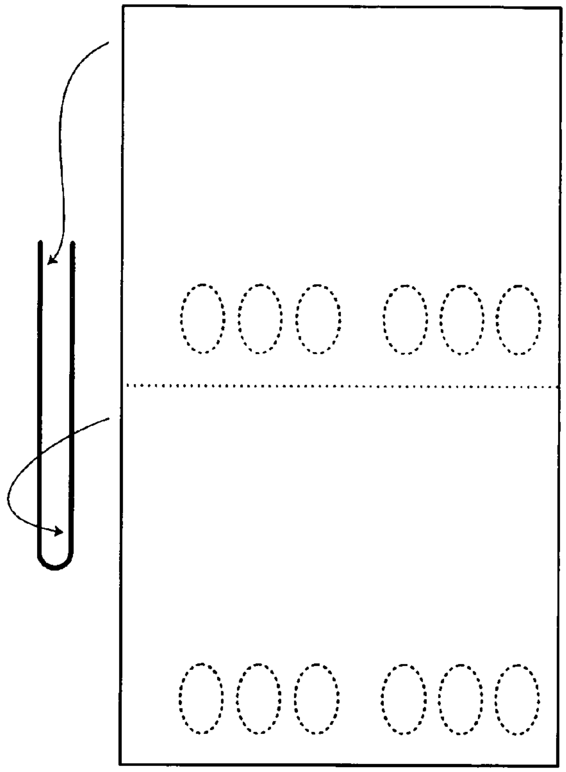
Figure 57A:
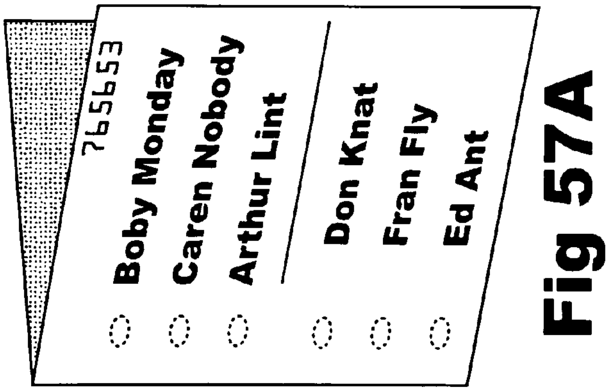
Figure 57D:
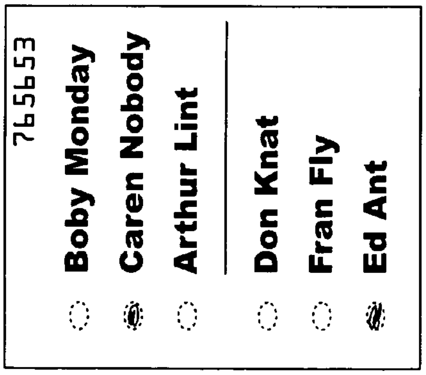
Figure 57E:
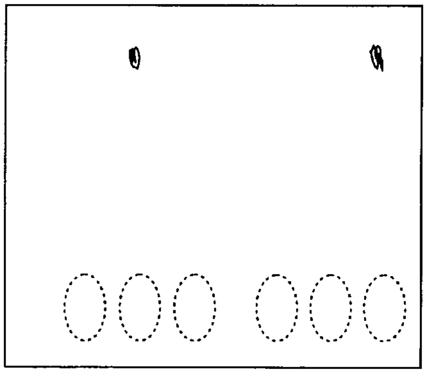

In operation, as will be understood, the permutations of positions related to serial numbers are committed and audited, such as described with reference to FIGS. 41-44 and FIG. 52-56. The voter then receives a form preferably folded as shown in FIG. 57A, for instance in the mail for so-called absentee voting, or at a polling place, and fills the ovals as usual. If there are redundant ballots, one on each side, as mentioned, the voter preferably chooses substantially randomly between them. After marking as with conventional ballots, the voter is to separate the forms along the perforation/fold line shown, to produce the two separate sheets shown in FIG. 57D through 57G. (In particular, 1D is the outer surface marked directly by the voter, 1E is its inner side; 1F is the inner surface of the receipt sheet and 1G its outer surface.) The upper sheet, shown in FIG. 57D-57E, is then submitted as the ballot, such as to a ballot box, scanner, or mailed in. It will be appreciated that this form is substantially similar to existing ballots and is readable and can be counted by hand if need be. For polling place voting, but not shown for clarity, part of the system optionally includes at least a scanner and screen to shown the voter the results of the scan.

Figure 57F:
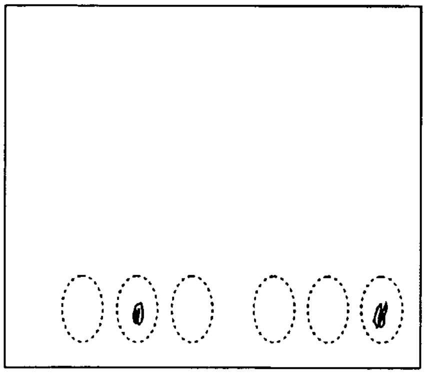
Figure 57G:
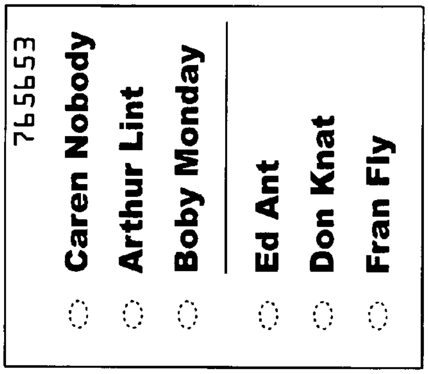
Figure 57H:
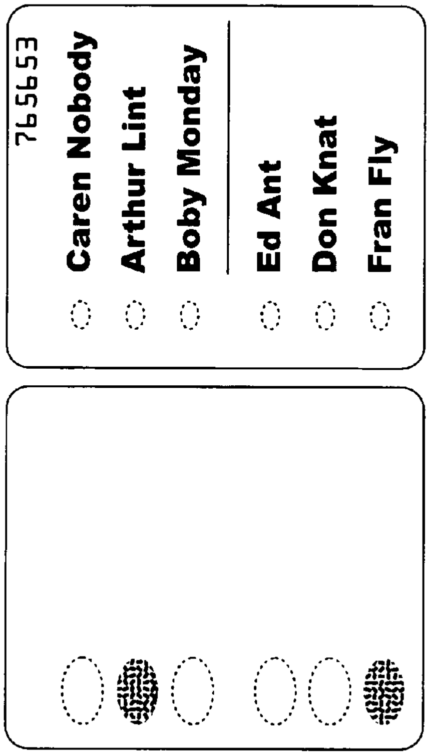

The other sheet, shown as FIG. 57F-57G, as mentioned, is preferably kept as a so-called encrypted receipt. The encrypted receipt preferably is also available online or otherwise for checking, as illustrated in FIG. 57H, which shows each side of the receipt, side-by-side. The voter preferably has at least the opportunity to check this as in related systems, typically by providing the serial number to an automated system. The large ovals of FIG. 57H correspond to those of FIG. 57F, and in the example are selectively filled as an example way to indicate whether a corresponding mark was recorded for the corresponding position in FIG. 57F.

In another exemplary embodiment, not shown for clarity, the association of candidates with positions is mediate through arrows, as in FIG. 59. Thus, the order of candidates, in some examples, is optionally fixed, for instance, yet the arrows associate apparently randomized oval positions with each candidate. As another example, symbol pair matching, such as described with reference to FIG. 41, is optionally used. Indirection through graphical or symbolic means, such as in the examples mentioned, is also applicable for instance to the embodiments of FIG. 52 and FIG. 53.

Turning now to FIG. 58, a combination schematic and plan view of an exemplary embodiment of a sticker palette and associated ballot form in accordance with the teachings of the present invention will now be described in detail sufficient for those of skill in the relevant art. FIG. 58A is what will be called here a sticker palette and 58B a ballot form, before voting; FIG. 58C is the palette of FIG. 58A after voting and FIG. 58D is the corresponding voted ballot. As will be appreciated, each of the example six stickers on palette 58A has the same barcode pattern; preferably these patterns are the same per palette, but at least substantially distinct across palettes. (In some settings, re-use of such patterns for a number of ballots in an unpredictable manner is believed to offer some privacy and provide only minimal risk of abuse, as returned to later.) Also, each sticker shows a symbol pair, a contest number and a candidate identifier.

Referring now to the un-voted ballot 2B, each candidate is shown in the example as being associated with a unique candidate identifier symbol. In the example, symbols are taken as lowercase letters from the same prefix of the alphabet, but other choices of unique indicia per candidate within a contest are believed suitable, such as including different letters per contest, different colors per letter, non-familiar symbols, and so forth. The corresponding committed data is as described in co-pending applications included by reference.

Figure 58A:
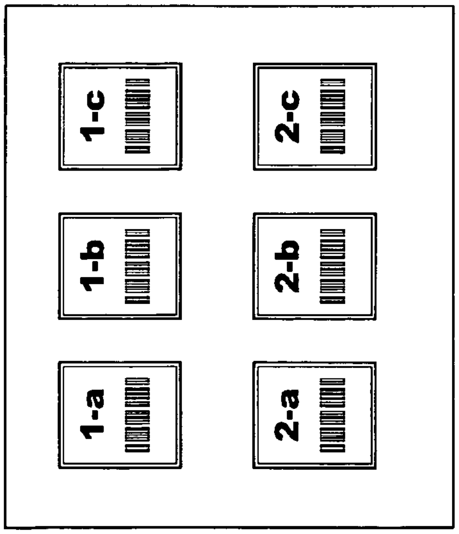
Figure 58B:
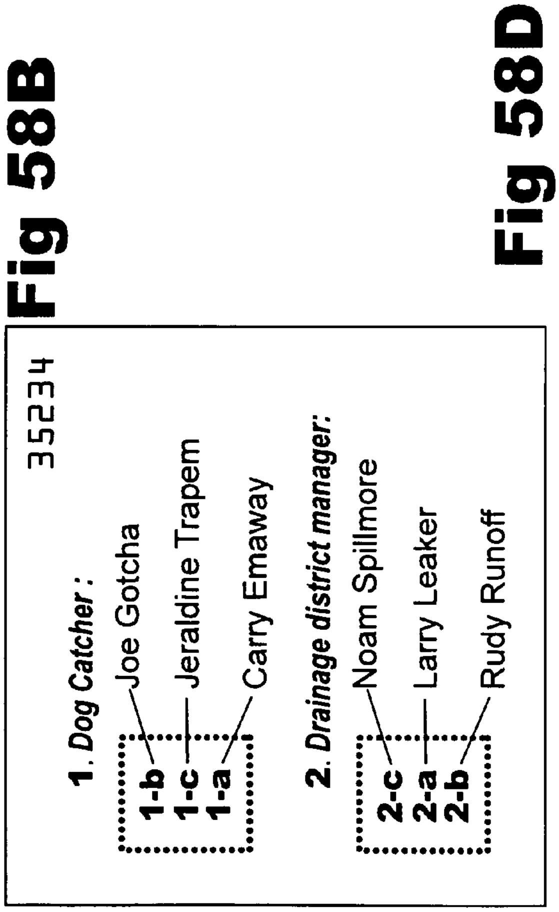
Figure 58C:
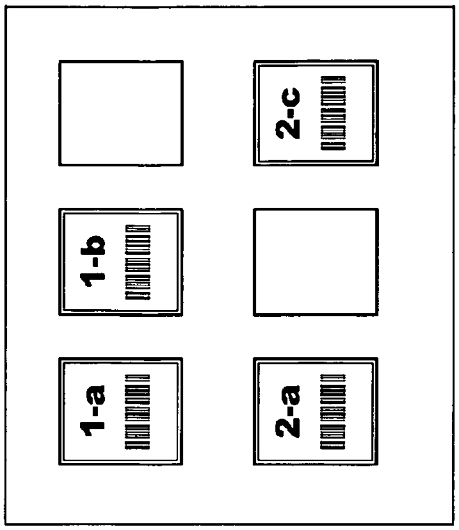
Figure 58D:
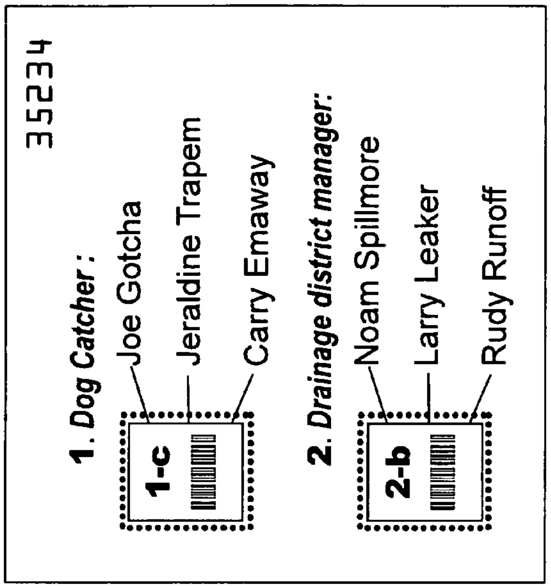

In operation, the mapping from symbols on the stickers to candidates, related to serial numbers and as defined by the indicia that will be covered by stickers during voting, is committed and audited, such as described with reference to FIGS. 41-44 and FIG. 52-56. To vote, the voter removes the sticker from the palette corresponding to the contest and symbol for the candidate and places it over the symbols in the region indicated, as shown in FIGS. 58C and 58D. The resulting palette is the encrypted receipt; the resulting ballot is the form that is mailed in or presented to an official or placed in a box or scanned. It will be appreciated that a properly positioned sticker covers the codes for the various candidates, thereby rendering the ballot (at least as ordinarily viewed) substantially encrypted. For polling place voting, but not shown for clarity, part of the system optionally includes at least a scanner and screen to shown the voter the results of the scan.

Generally it is desired to not give uniquely identifying numbers as parts of forms used by individuals where privacy is a concern. In the present system, it will be appreciated that the codes on the stickers (as in FIGS. 58A and 58C) are optionally independent of the ballot serial numbers (FIGS. 58B and 58D). Accordingly, if each is not unique but rather used with some multiplicity and each is assigned by an independent entity, then each entity knows only limited restrictions on each user (and should probably not even be allowed to retain this in many applications) and yet the combination of the numbers has a substantial probability of being unique. Moreover, even in the case there is a duplication of the combined numbers, it has a substantial probability of being detected if the voters chose different parts of the ballot and/or voted differently, and some after-the-fact accommodation for this case is also anticipated.

With reference to FIGS. 59A through 59F, generally, all manner of substrate material are anticipated, such as paper, card stock, coated paper or stock, laminates more generally, and various other materials, whether formed from single sheets/coatings and/or fibers and/or yarns. Scratch-off coatings are traditionally formed from latex. Attachment of tamper-indicating layers is by a wide variety of known techniques, including: adhering around the edge, self-adhesive materials, folded edges, and welded seems. Various tamper-indicating techniques, such as fugitive adhesives, residue layers, aging chemistry, frangible parts, and the like are known from various fields and are readily combined here.

Serial number or the like, preferably human and machine readable, preferably identify the ballot forms, however, these are optionally protected by various layers not described further for clarity. Information revealed to voters preferably comprises such things as digits, letters, code groups, pronounceable artificial words, various symbols, and the like. Bullets or other identifiers for candidates are preferably from different colors and symbologies that are unrelated to the election issues. In some examples, candidate and/or question identifiers themselves are optionally used in place of the bullet symbols. Label layers optionally contain arrows associating candidate/questions on one end with mark positions on the other.

The codes under the protective layers correspond to the symbol choice in other systems, such as those described with reference to FIGS. 41-44 and FIG. 52-56. The mappings between voter choices and codes that is preferably destroyed by the voter during discovery of the codes can be regarded as defining symbols marking the choices, as would be understood by those of skill in the art, and those symbols would be committed similarly to the way the codes are. Voters can check that the unused ballot parts, such as additional sheets, were committed properly, by not voting them and then checking the opened values of all the commits, that should be posted in this case. Similarly, voters can check that the codes they provide are in fact posted. Integrity is thus believed voter-verifiable, assuming the audit random values are truly unpredictable.

One example variation, as will be appreciated, comprises multiple contests on the same form. Another example is multiple forms, preferably attached, such that the voter can choose which form to vote and which to inspect and even check to ensure that it is well formed.

Turning now to FIG. 59, a combination schematic diagram and plan view of an exemplary embodiment of a ballot form including printing above scratch-off layers in accordance with the teachings of the present invention will now be described in detail sufficient for those of skill in the relevant art. For clarity, callout number is not used. Two candidates, "Tom Jones" and "John Dean" are used as example of what is being voted on. Each is labeled with a symbol, in the example "Ⓐ" (reverse circle "A") for the first, "Tom Jones," and "Ⓑ" (reverse circle "B") for the second, "John Dean."

The voter is to mark the upper square in case they wish to vote for Dean and the lower to vote for Jones—on this particular example ballot instance with serial number 34824. But other ballots, each preferably with their own unique serial number, preferably have substantially independently arrange symbols, such as being cyclically shifted or more generally permuted, as is known from other example voting system such as the so-called punchscan system. The indication to the voter of where to mark for which choice is preferably printed on top of the scratch-off layer shown with round corners and encircled by a dotted line that is printed on the sheet, as indicated on FIG. 59A. The example shown is where the indication is as bullet symbols and triangle pointers. Optional and/or alternate examples of arrows and/or color coding are anticipated as well.

Figure 59A:
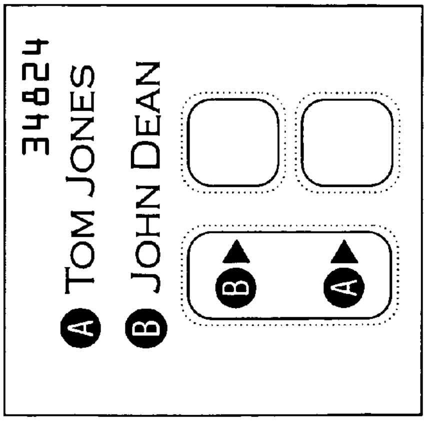
Figure 59B:
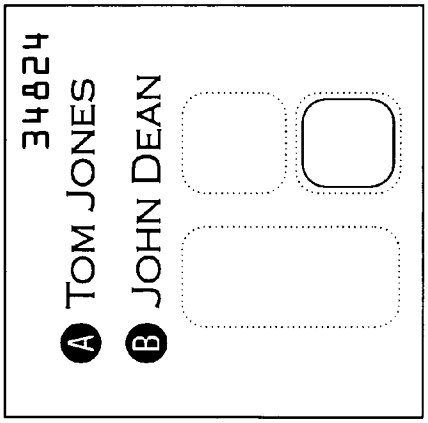
Figure 59C:
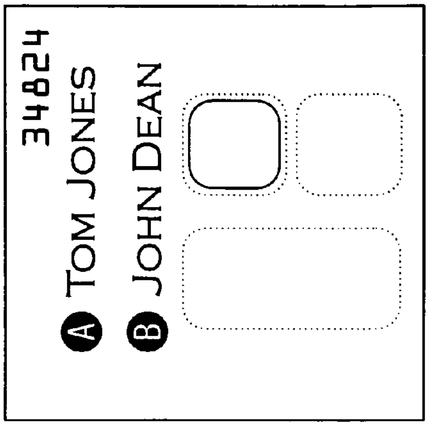

Referring to FIG. 59B-C, the indication of where to mark has been "scratched off" and effectively removed and destroyed. In the first example FIG. 59B shows the state of the ballot after the voter has selected and marked the upper square. This would correspond to a vote for Dean in the example as mentioned. The marking is shown in the preferred embodiment of scratching-off the layer covering that square. Other marking means are anticipated. FIG. 59C illustrates the case where Jones is voted for. It will be appreciated that in both voted forms the voter has substantially in parallel removed layers to protect ballot secrecy and to mark the vote. It will be appreciated that neither voted ballot reveals the actual candidate voted for to the public.

Figure 59D:
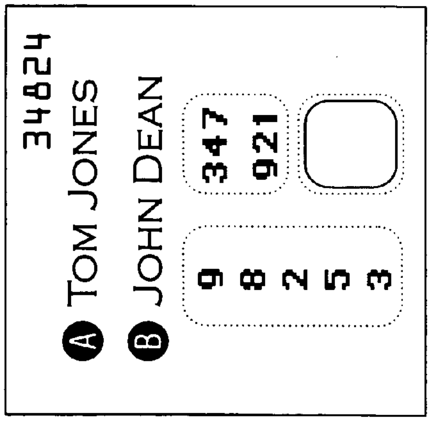
Figure 59E:
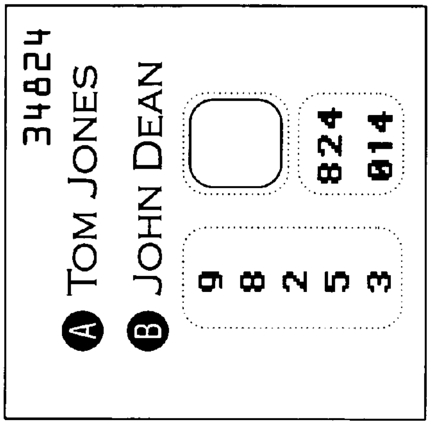

Referring now to FIG. 59D, a combination schematic diagram and plan view of an exemplary embodiment of a ballot form including printing below scratch-off layers in accordance with the teachings of the present invention will now be described in detail sufficient for those of skill in the relevant art. For clarity, callout numbers are not used and the two candidates are again labeled with symbols Ⓐ(reverse circle "A") for the first, "Tom Jones," and Ⓑ(reverse circle "B") for the second, "John Dean." The unvoted ballot would appear substantially as in FIG. 59A (or FIG. 59F to be described.) The two instances of the ballot shown include numbers printed under the scratch-off regions. The number "98253" under the larger region serves to authenticate that the scratch-off over that region was substantially removed, such as when that number is provided to those running the election; the number optionally servers as all or part of the serial number of the ballot, not shown for clarity.

When the voter marks the upper choice, the number "347921" is revealed. This number would be transmitted to those running the election to indicate that the particular choice and at the same time provide some authentication. Similarly, when the voter in effect marks the lower choice, the number "824014" is revealed. This number would alternatively be transmitted to those running the election to indicate that the particular choice and at the same time provide some authentication. Countersign numbers are known in the art, such as disclosed by the present applicant, and their use is anticipated as an option here. Again, it will be appreciated that neither voted ballot reveals the actual candidate voted for to the public.

In some examples scratch-off is not used for the mark squares but rather the printing is substantially visible and/or hidden by the cover to be described with reference to FIG. 59F.

Figure 59F:
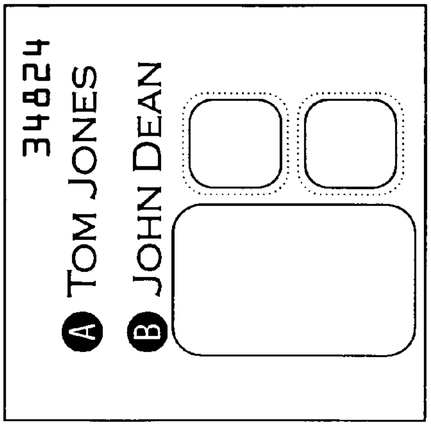

Referring now to FIG. 59F, a combination schematic diagram and plan view of an exemplary embodiment of a ballot form including cover layers over scratch-off layers in accordance with the teachings of the present invention will now be described in detail sufficient for those of skill in the relevant art. For clarity, callout numbers again are not used. The embodiment shown here optionally is incorporated in the embodiments already described with reference to FIG. 59 and FIG. 59D-E above as mentioned. The extra large region with round corners indicates a cover over the scratch-off layer shown in FIG. 59A already described. Such cover is optionally as mentioned from folded stock, self-adhesive layers, and or otherwise adhered protective substrates. It preferably provides tamper indication, in that when a voter receives the ballot and the cover has been circumvented this is preferably substantially apparent to the voter. Once the voter removes the cover, the ballot can be of the forms already described with reference to FIG. 59 or FIG. 59D-E. Someone without special information seeing the form before the voter votes it (while the cover is protecting the printing on the scratch-off from being learned) and after it has been voted, preferably is unable to learn how the voter voted.

With reference to FIGS. 60 through 62, generally, voters who are to be allowed to vote in a polling place are displayed in the sequence in which they are admitted, at least the most recent part of the display being visible to voters. Certain sensitive information, such as private addresses and/or signatures on file, is allowed to be viewed by voters present. Voters or parties are allowed to photograph or otherwise record the images displayed, but these are filtered selectively to protect the sensitive information from being recorded.

In some example settings the poll book is on paper, in others it is automated, and in yet others the book for the particular polling place is in paper but automated information is available for other polling locations within some political subdivision.

Turning now to FIG. 60, a combination block, flow, functional, schematic diagram, of an exemplary embodiment of a paper-based polling-place sign-in and forms in accordance with the teachings of the present invention will now be described in detail sufficient for those of skill in the relevant art. The process is shown as a loop repeated for each voter who appears at a polling place to cast a vote, as indicated by the repetition symbol of box 2001. A first step per voter, shown in box 2002, is to locate the voter name in the poll book. In some settings this is accomplished by the voter alone, in other by the voter in collaboration with one or more election workers, and in other by the election workers substantially independently. In this example setting, the poll book is read by an automated device, such as a barcode reader or scanner. (In case of a provisional type form, the name of the voter in some settings is retrieved from an online poll book; in other settings it is entered manually, such as by typing or writing.) Next box 2003 shows that an indication of where the voter name appeared in the poll book is printed out. (In the case of a form, the form number is preferably printed as a pointer.) Additionally, a sequence number for the signature slots and/or ballots in the box is also printed. (Different sequence numbering for provisional ballots may be called for in some settings, particularly where the ballots are segregated.) As indicated in parallel box 2004, the poll book entry for the voter should be marked. A preferred way to accomplish this is by an automatic advancing serial number stamp, as are known in the art. The serial number assigned is preferably printed as well. (In the case of a form, the sequence number or position of the entry on the paper record is preferably included on the form.)

At this point, as called out in box 2005, the voter is to make a handwritten signature, preferably adjacent to and on the same paper as the poll book pointer is printed. Once the voter signature has been made, a signature image on file is then printed, as called for in box 2006. This sequencing is intended to give confidence that imposter voters don't simply attempt to copy a signature already printed. If the sequencing is by the paper rolling back into the printer, then this is preferably also a convenient time to scan the signature provided, as well as whatever else is printed, for potential electronic backup and distribution. A further variation, not shown for clarity, is where a photograph of the voter appears instead of or preferably in addition to the signature. Naturally, whatever biometrics, identifiers, passwords, or facts related to the voter can be included optionally as well.

At this point, a determination is optionally made as to whether the signature is valid and matches close enough, such comparison by humans and/or automated. If there is a match, then the voter is allowed to act and attempt to vote, as indicated by the symbol of box 2008. If there is a sufficient discrepancy, then a procedure is preferably initiated to mark the entry printed and optionally that in the ballot book, accordingly. The process then repeats with box 2001 for the next voter.

Figure 61A:
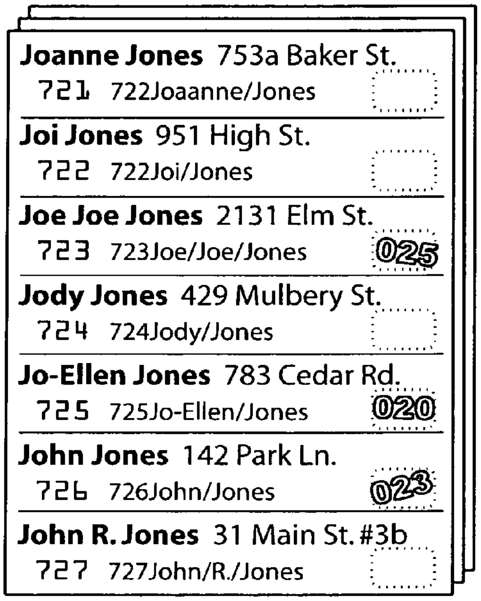
Figure 61B:
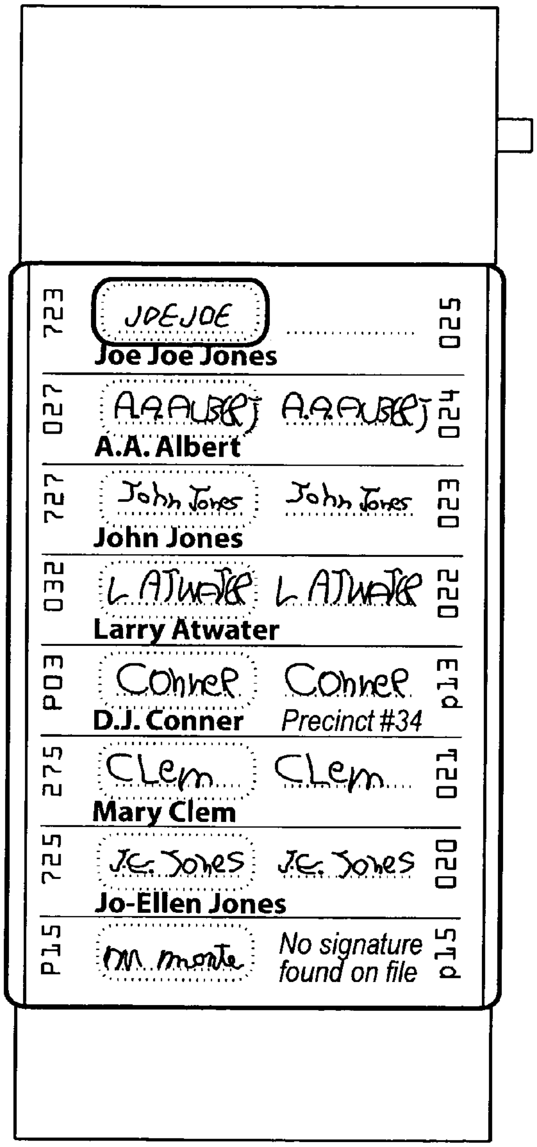
Figure 61C:
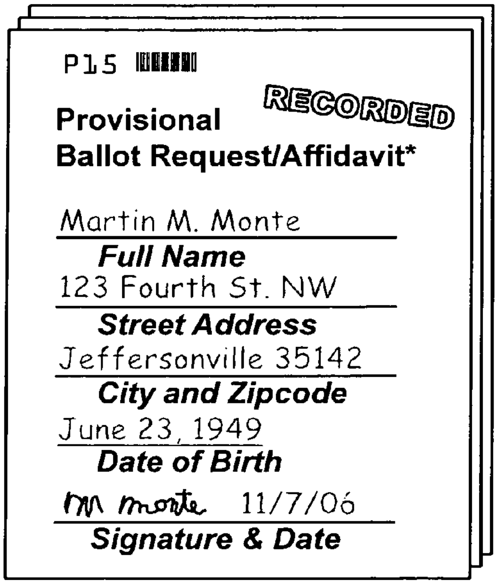

Turning now to FIG. 61, a combination block, functional, schematic diagram, plan, and pictorial view of an exemplary embodiment of a partly automated paper-based polling-place sign-in and forms in accordance with the teachings of the present invention will now be described in detail sufficient for those of skill in the relevant art. Three different related parts are shown in FIG. 61A-C, respectively.

FIG. 61A is an example poll book. It is preferably preprinted and should include the names of all registered voters for a particular polling place. A barcode is shown printed next to each name, as an example to indicate the voter name and/or identity in a readily machine-readable format, although it is believed that text can as well be read by scanners. Also printed is additional information, such as voter address, intended to help voters recognize their own entry and to allow other voters and/or observers to assess the validity of the poll book. Also shown is provision, as will be appreciated, for a mark to be made as already explained with respect to FIG. 60, that links a used entry to the printed signature roster form to be described with reference to FIG. 61B. In the example, it will be seen that three voters have already been admitted from the page or portion of the poll book shown, and the serial numbers stamped are "020" for Jo-Ellen Jones of 783 Cedar Rd., "023" for John Jones of 142 Park Ln., and 025 being filled in for Joe Joe Jones of 2131 Elm St., as will be explained further.

Referring to FIG. 61B, a printed form and device are shown, where the so-called "reel-to-reel" approach to printing is used as an example. Also indicated is a protective cover with an opening for voters to sign directly onto the paper that is preferably transparent to allow voters and other to view at least a part of the previous entries. In some examples, what can be photographed is differentiated from what can be seen, as already explained, such as by use of colored filters or other techniques described elsewhere here. (A mechanical shaft protruding from a part of the device will be understood to indicate that operation of the log by an increment for a signature can optionally allow another mechanism to advance. Examples include devices that give access to forms, voting machines, or voting machine access authorizations means.)

In the example, Joe Jones has signed his name as the 25'th actual voter in the poll book voting at this polling place. The signature stored electronically for him, however, has not yet been printed. As already explained with reference to FIG. 60, the signature on record is preferably printed or viewable only after the purported voter has made a signature. It will be appreciated that no signature is of record for the person filling provisional ballot request form "P15," although one was on record for voter D. J. Conner, who was known to an automated poll book function as being registered to vote at precinct "number 34."

Referring to FIG. 61C, an example provisional, contested, wrong-precinct, or other type of form is shown that is to be used in case a voter is not in the poll book correctly. A variety of information is required to be filled on the form, such as by the legal setting and operations, an example of which is shown for concreteness. Also indicated is a machine-readable and preferably unique number/identifier for the form instance, "P15," that is then scanned and shown on the log tape as explained. For this particular voter, no signature was on file. A mark, shown as the word "recorded" is stamped on the form to indicate that the corresponding log entry has been created and that the voter has signed it.

Figure 62A:
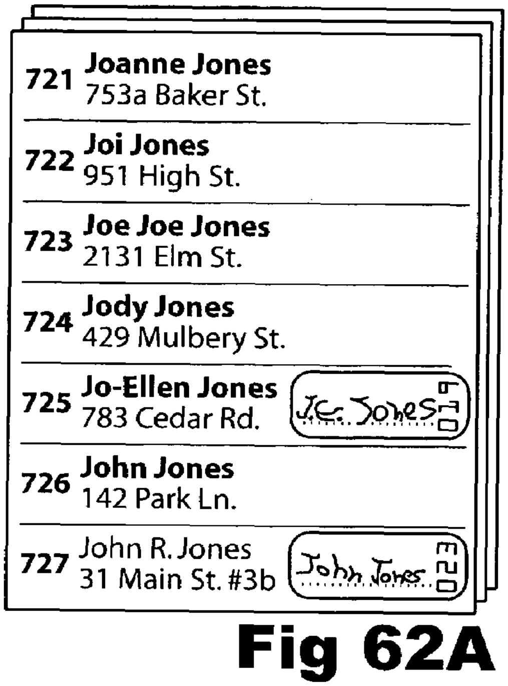

Turning now to FIG. 62, a combination block, functional, schematic diagram, plan, and pictorial view of an exemplary embodiment of a manual paper-based polling-place sign-in and forms in accordance with the teachings of the present invention will now be described in detail sufficient for those of skill in the relevant art. Three different related parts are shown in FIG. 61A-C, much as with the partly automated version of FIG. 61 already described. Compared to the embodiment of FIG. 61, the poll book FIG. 62A is without barcodes and instead of marking by sequence number stamps during use, sticker are adhered to it that include the signature formed by the voter and a pre-printed sequence number.

Figure 62C:
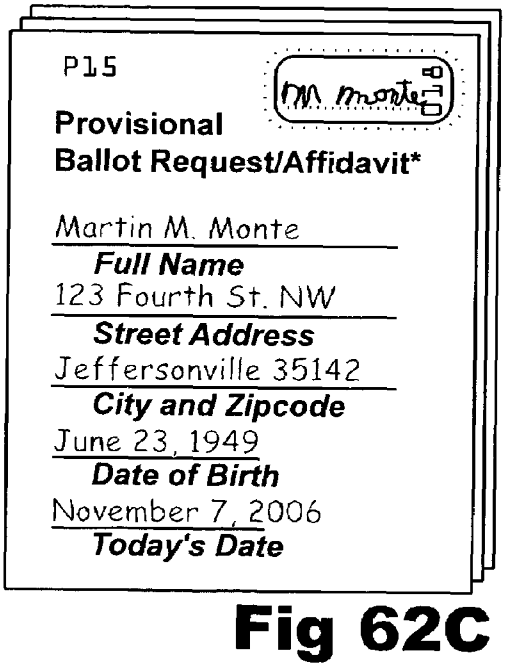
Figure 62B:
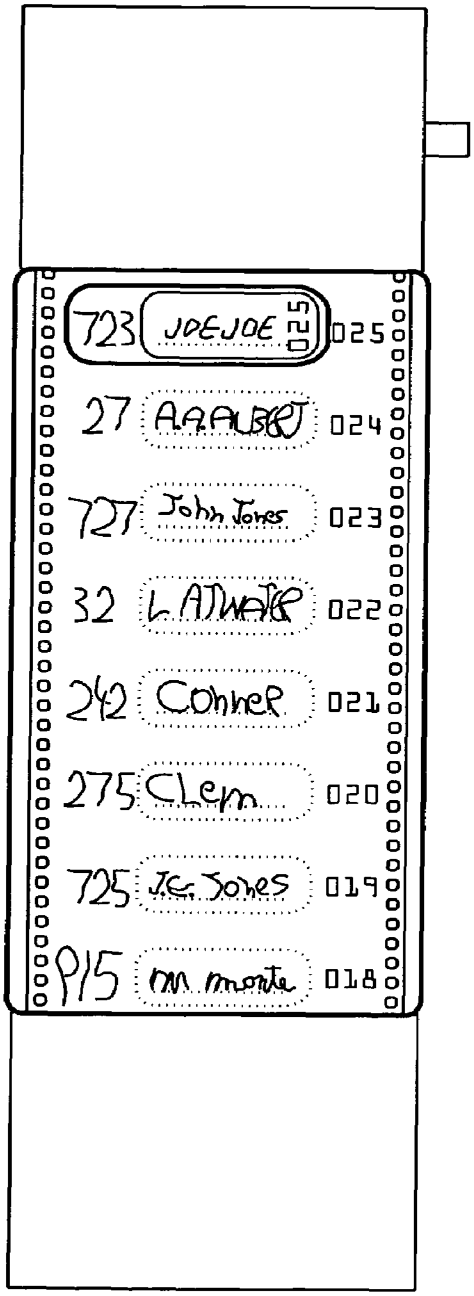

Referring to the log of FIG. 62B, a substantially mechanical device is shown that allows a single sticker and number position to come under the opening in the transparent cover. The number written is the poll book position of the corresponding voter (or the form number). This number is preferably written by an election worker. The voter signs the sticker through the opening and a carbonless image of the signature is transferred to the paper form that is shown with tractor feed. Carbonless stickers are believed known in the art, but in any case are readily formed as a carbonless paper that receives a pressure sensitive adhesive only around its periphery and that is adhered to the form for instance on an area coated with a release material. The sticker is then removed and placed on the corresponding position on the poll book. (An output shaft symbol is included, for purposes such as those already described with reference to FIG. 61B.)

Referring to the form of FIG. 62C, a substantial difference with respect to the form of FIG. 61C already described is the sticker from the log form that has been adhered instead of the "recorded" stamp marking.

With reference to FIGS. 63 through 68, generally, various threats can be categorized to allow better appreciation of the reasons for and differences between systems, though these are not necessarily considered to be exhaustive or mutually exclusive. An example threat is ballot box "stuffing," which is used here to refer to the addition of ballots that have no corresponding entry in the poll books, thereby creating more ballots than poll-book entries but hiding which are the improper ballots. Another threat is "swapping," which is used here to refer to the interchanging of ballots that will be counted with other ballots, either totally fake ballots or ballots actually cast that would not otherwise be counted, such as provisionals that are not positively adjudicated. Related is the threat of "swapping in" fake ballots for real ones, something that the systems described here are generally believed to substantially prevent. A further and subtler threat is ballot "spoofing," which has voters fooled into using false ballot forms with possibly other false supplies and/or poll books, thereby leaving open the possibility to fill and substitute the genuine ballot forms.

Different systems can be used for different voters in the same election. For instance, some voters may vote at their is home polling place and others may vote provisionally. The former need only a system that guarantees that each vote will be counted; the latter need a system that allows the votes to be divided after the election between those that will be counted and those that will not.

In some example variations, encrypted votes are also included. For example, write-ins are optionally not encrypted, but other votes are. In some examples, counterfoils, as well as optionally interfoils, have encrypted votes on them. It is anticipated that substantially any embodiment disclosed here can be augmented to include encrypted votes or to substantially run along side a system of encrypted votes.

A voter uses more than one object to vote, in some examples, and the voter preferably chooses these objects. The way the choice is made is preferably so that the voter can ensure the randomness of the choice and that the choice made is substantially hidden from the poll workers, such as by being taken or dropped from a rotatable hopper or by reaching into a box or bag. This is believed to ensure that the linkings would not be known to those who have scanned the forms in advance. Envelopes and/or scratch-off coverings for example, optionally, are used to obscure the identifiers and/or microstructure until they are to be revealed.

Redundancy developed by including linking to a poll book entry as well as a receipt is believed to have the advantage that both can be used separately, providing two avenues for audit. Optionally, also linking such poll book entries and receipts allows a kind of voter audit of the link between receipt and poll book. For example, in addition to or instead of voter receipts, a "stub," that counterfoil remaining after a ballot is removed from a poll book or booklet of ballot forms, links physically to an interfoil or ballot form and optionally also to a corresponding receipt.

The systems described here are believed capable of ensuring that substantially the correct ballots are counted. Modification of the votes on a ballot is preferably protected against. There are a number of techniques that are believed to increase the difficulty of surreptitiously changing something that has been written. One is to laminate a coverlay or apply a coating or spattering. Indelible inks and punching of holes are examples of permanent marks as is the fused toner of a copier or a chemical reactive ink system that is "fixed" to prevent further development of images. The marks can be made difficult to duplicate, such as by using special punch patterns or special pens/pencils, even with morphing color patterns and/or inks that reveal aging. A special no-vote mark, or simply overvoting by filling multiple locations, serves as protection for voters that un-voted contests will be voted for them by those gaining access to the ballots. Publishing scanned versions of the ballots as soon as possible gives less time for improper modifications.

In preferred embodiments it is desired that voters be unable to easily record identifiers for their ballots, since this can be used in various so-called "improper influence" schemes. One example of hiding means is by microstructure that requires special equipment to read, such as light, magnification, chemical development, electromagnetic readers, etc. A further feature of a hiding system involves a substantially irreversible step that leaves evidence that the information was read. One example of irreversibility is by well known latex scratch-off protection. Such means have the further advantage that identifying numbers can be printed next to each microstructure for ease in verification, particularly for voters.

Indicia are optionally on one side of a linked interface or different indicia on different sides of such an interface including with cryptographic linking.

Five exemplary embodiments are described, the second having two variants. The first embodiment and first variant of the second embodiment are not believed to rely on an accounting of the forms used; the other variant and embodiments do. Such an accounting is preferably against published lists of form microstructures, and is optionally augmented by dropping out marked blocks of objects, such as those labeled for a particular compromised precinct. It is believed that the systems relying on such accounting are more attractive at least in some embodiments, but that they are less robust in the face of slippage and failed accounting. Arguably, the integrity of an election with poll books and non-recallable votes, the most common type of election system, requires a good deal of audit capability around the poll books and especially ballot forms and a similar requirement additionally around foils may be acceptable, particularly since if it is violated the degradation in integrity is revealed.

Figure 63B:
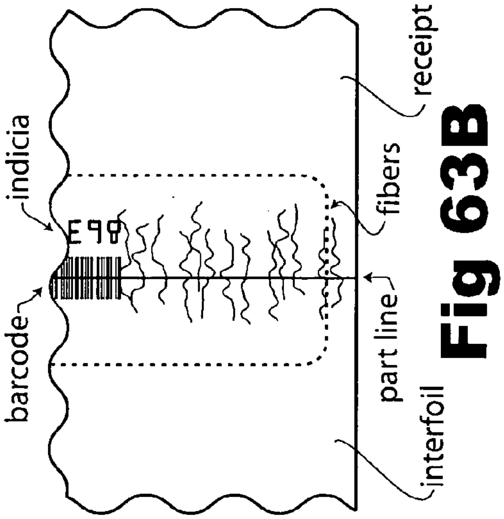

Turning now to FIG. 63, a combination schematic and plan view of an exemplary embodiment of an interfoil and counterfoil arrangement in accordance with the teachings of the present invention will now be described in detail sufficient for those of skill in the relevant art. An example system is as follows: Each form is comprised of a ballot and two foils. The counterfoil to the ballot, that is part of the form separably attached to the ballot, is called here the "interfoil." The interfoil itself has a counterfoil, which will serve as the voter receipt. Microstructure, such as paper fiber pattern, fiber/planchettes in whatever matrix, and or sandblasted region, believed hard to duplicate is in regions on the forms, such that splitting the form at a parting line of the region lets each half be a kind of "signature" that is readily authenticated as matched with its counterpart. As depicted more particularly in FIG. 63B, the interface between the interfoil and receipt is also for convenience printed with a barcode, each bar of which extends across the parting/perforation line separating the interfoil and receipt. Each receipt also preferably bears the barcode information as human-readable indicia.

During voting, a voter, after filling his or her ballot, separates the three parts of the form. Voters keep their receipts but deposit both the ballot and interfoil into ballot boxes. The interfoils are successively tumbled and scanned three times as follows: (i) The first scan, after the first tumble, is of the receipt number part (and is optionally used to divide the interfoils into batches, as described later, but a single batch is considered further here in this example for clarity). (ii) After the second tumble, signatures of, say, the middle section of the interfoil are scanned and posted. (iii) Then, after a third shuffle, the remaining interface, that between the ballot and interfoil, is published. (As will be appreciated, this particular exemplary tumbling and scanning is believed to have the advantage that the scanning apparatus can be arranged to only be able to see each signature area during the corresponding scanning pass and the signatures can be published as they are read.) The ballot images are preferably themselves published paired with the corresponding signatures, though it is believed integrity can be maintained without this step, through adequate accounting of the ballots.

As mentioned above related to tumbling and scanning (i), during that first pass the interfoils can be divided into separate batches and all subsequent processing carried out on each batch separately. As one example, three batches are used: regular ballots, provisional ballots to be counted, and provisionals not to be counted. The rest of the processing described is carried out for each of the batches, three in this example, separately.

Once all the signatures are thus published, the "challenge choice" is made, such as by a lottery style draw followed by cryptographic expansion of the draw result, so that one bit is associated with each interfoil signature. The interfoils are tumbled for the fourth time and parts of them are removed: if the bit for a particular interfoil is set, the receipt interface signature is cut away from that interfoil and destroyed; if the bit is reset, the ballot interface signature is cut away and destroyed. What remains of the interfoils is posted and made available for physical audit in its final ordering. The ballot counterfoil interfaces are preferably printed with unique identifiers (preferably after voting or at least preferably not readily readable by voters) and these are associated with the counterfoils that corresponded to set bits of the challenge choice. Any voter is preferably allowed to check that the receipt interface published matches that which they physically have, using the unique identifier to facilitate the lookup. Any ballot with a published interfoil interface signature should be physically auditable by interested parties.

Figure 64B:
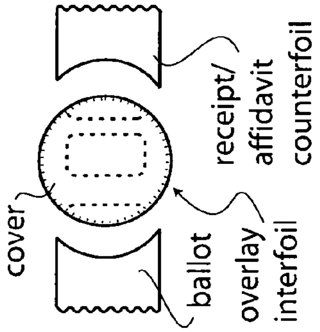

Turning now to FIG. 64, a combination schematic and plan view of an exemplary embodiment of a counterfoil overlay arrangement in accordance with the teachings of the present invention will now be described in detail sufficient for those of skill in the relevant art. An exemplary system is as follows: Both ballots and receipts have counterfoils, that of the receipt is numbered including by barcodes, preferably in some examples the bars of which as in the earlier example extend over the separation lines. Interfoils, in some embodiments taking the form of overlay stickers, are able to be affixed between the counterfoils. The interfoils can be attached to the ballot signature portion of the ballot, on one side, and the receipt/affidavit counterfoil, on the other side. The identifying numbers and unique microstructure detail are posted in advance for each interfoil object, such as the overlay interfoil shown. The microstructure regions of the counterfoils are at the parting lines, those of the interfoil preferably located away from where the counterfoil will affix; when the interfoil is affixed, the ballot and receipt parts can be separated, such as by die or perforation shown. As shown more particularly in FIG. 64B, a "cover" layer on the interfoil part can protect the privacy of any microstructure and particularly any indicia that may optionally be printed for convenience in use.

A voter chooses a ballot and interfoil, preferably independently at random from a collection of each (preferably giving the voter confidence that which instances the voter uses are not known to others, such as those running the election). The receipt can, for example, be given to the voter, be a counterfoil itself from a poll book, and/or an affidavit form. There are two variants: (i) the voter in the first variant chooses which counterfoil the interfoil will be associated with; (ii) in the second variant, the decision is made at once for a set of ballots, each ballot getting a bit that results from the challenge choice. In the first variant, the voter is to attach the interfoil to one of the two counterfoils, destroy the other counterfoil, and put the attached foils in the ballot box. In the second variant, the voter puts into the box the fully assembled combination of the two counterfoils affixed to the interfoil.

In the first variant, those running the election are, preferably prior to voting, to post images of the foils and put them on display or otherwise make them available for audit; in the second variant, a challenge choice determines which pairs are to survive and be made available for audit and as a consequence which counterfoils are to be severed from the interfoil and destroyed.

Audits in either variant should include the ballots voted, preferably both in a digital and physical form. Also, voters are preferably able to see that their receipts are among those posted, by number, and can even check the microstructure of their receipts against the posted image. The published records should be checked for consistency among themselves, such as lack of duplication of signatures. Auditors should check at least their own random sample of each of the available forms for consistency with the published record.

In the first variant, those components that were unused but not excluded from the accounting (such as by a polling place or other subdivision designator indelibly included in the object in advance) are preferably all made available for audit. Consistency checking should include particularly that exactly only signatures from the accounted set of signatures are used. It is believed that in the case of a batch of provisional ballots, the choices made by voters as evidenced by the retained parts should be kept secret from those conducting the election until the partitioning of ballots into batches is committed to (otherwise interchanging ballots between batches might not be detected).

Turning now to FIG. 65, a combination schematic and plan view of an exemplary embodiment of a sticker interfoil arrangement in accordance with the teachings of the present invention will now be described in detail sufficient for those of skill in the relevant art. An exemplary system is as follows: Stickers have unique numbering indicia and microstructure, published together preferably just prior to the election. Voters are to take two stickers from a tumbler hopper or the like, so that the voter has some confidence that the stickers are not known to correspond to each other or to the voter, and apply one to the ballot and take the other home as a kind of receipt. The receipt sticker can in one variant be applied to a counterfoil from a poll book before being provided to the voter, thereby providing a linking to the poll book or at least the page. Voters can check the validity of the receipt against the published list and auditors can check the ballot stickers against the same list. A cover layer not shown can provide protection for indicia, such as against voter or polling-place observer, until they are needed in processing.

It is believed that this embodiment bases its efficacy on an accounting of the stickers. If a known number of stickers are lost (and they can neither be counterfeited nor moved between forms), then it is believed injecting fake ballots into the pool would be limited to one per lost sticker. As mentioned elsewhere, indelible markings on stickers that divide them into collections that are not too small as to pose a privacy problem, such as per precinct, can be used to exclude collections that have fallen into the wrong hands.

Figure 65B:
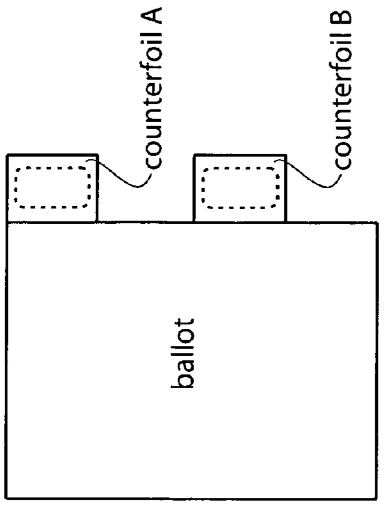

A second variant of the third system, differs from the first variant already described in that instead of stickers each ballot has two counterfoils. As indicated in FIG. 65B, a voter is to remove and keep one counterfoil as the receipt and leave the other intact. Which one the voter takes should be clearly the free choice of the voter. Each counterfoil has a microstructure and human readable identifier, at least the identifier being covered by scratch-off latex or the like (all much as in FIG. 63) but not shown here for clarity. Otherwise, the counterfoils act like the stickers of the first variant.

Turning now to FIG. 66, a combination schematic and plan view of an exemplary embodiment of a split foil arrangement in accordance with the teachings of the present invention will now be described in detail sufficient for those of skill in the relevant art. An exemplary system is as follows: This system handles provisional votes; it is well suited for combination with the above described third system, which cannot handle provisional votes. Voters are divided between the two systems, even though ballot forms from the same set are optionally used. The foils used are optionally self-adhesive and will be called "stickers" or "splits," because they are preferably pre-perforated to allow separation along substantially a preferably pre-arranged line, such as a perforation, leaving each with its unique identity hidden until revealed. The pairs of unique microstructure signatures and any identifying indicia are published preferably in advance.

Figure 66A:
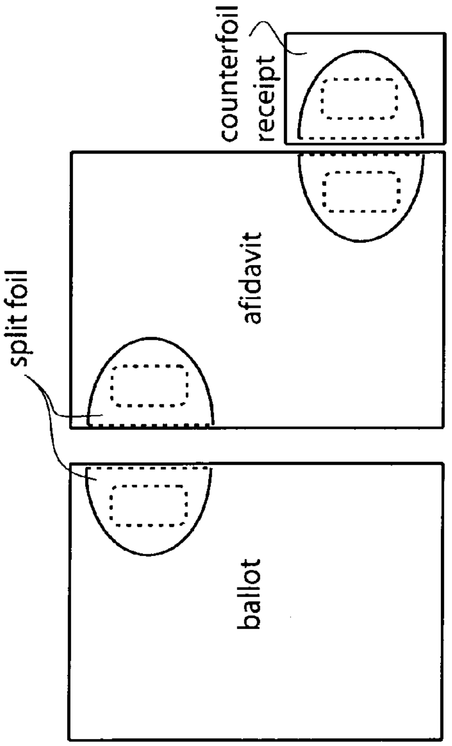
Figure 66B:
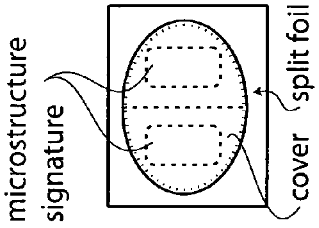

The ballots and matching affidavits each provisional voter receives are connected by a split sticker/foil, as shown in FIG. 66A. Voters choose a second sticker from the same batch and are to take it home, preferably adhered to something, such as a poll-book or affidavit receipt, in order to prevent its re-use for another purpose, and optionally split between the affidavit and the voter receipt. In one optional configuration, the affidavit itself receives one part of the second split and the other part is a counterfoil receipt for the voter. In another example, the voter can take an entire split affixed to a receipt backing, as shown more particularly in FIG. 66B.

After votes are cast, affidavits are adjudicated into "to be counted" and "not to be counted" classes, and each affidavit sticker split is preferably marked accordingly by an indelible means, such as a corresponding punch shape, on the sticker portion as well as preferably on the form itself. After an audit of the affidavits, the affidavit stickers are detached and tumbled and their numbers are then revealed. The numbers on stickers affixed to the ballots should preferably also be revealed at the same time. The ballots corresponding to the numbers in the to-be-counted batch of affidavit stickers is then ready to be counted and the ballots in the other batch are not counted but preferably checked for match as well. (It is anticipated that a variation uses false ballots to mask the provisional ballots.)

It is believed that this scheme bases its efficacy at least on the stickers not being counterfeitable or transferable among forms. And further, the severing and tumbling of the stickers must be carefully observed for substitution of numbers that would have been pre-arranged to correspond to fake ballots; unless, there is an accounted limit on the number of stickers available, such as already described publishing of all the sticker numbers before the election. The number of stickers unaccounted for is the number of votes that can readily be cheated unless the cutting and tumbling is watched.

Another exemplary system is as follows: First an introductory description will be given. The system is a hybrid of encrypted vote and signature techniques. The signatures are used mainly for write-ins, but also allow clear attribution of cheating in the case of disputed receipts.

In use, voters fill at least two layers of ballot form. An upper layer shows a set of choices preferably in permuted ordering (and/or positions not included for clarity), comprising the encryption of the vote. A lower layer, onto which the marks made by the voter on the upper layer are transferred, such as by carbon/carbonless copy paper, can also be written on directly by voters. For write-in votes, the voter is to fill the oval for the choice labeled "write-in" on the upper layer and then write on the lower layer, in the corresponding space provided, to record the name that is to be written in. The lower layer is preferably divided, and physically dividable, into regions for each write-in vote (or optionally contest that allows multiple write-ins). And each such region preferably contains a signature. Associated with such a signature, preferably by published cryptographic commit and/or also by printing on such region, is an indication of which position the transferred mark must be in to indicate that the voter has voted the write-in ballot position on the upper layer and not instead voted a candidate position. If the transferred mark is in this position, it is counted; if it is not in that position, it is not counted.

A signature is also preferably included on at least one page other than the page with the write-in regions, including preferably at least one of a receipt layer and/or a layer retained centrally. All signatures used are preferably posted/committed in advance, to allow audit of the forms themselves. One example type of such audit anticipated in the co-pending applications is that voters themselves would be allowed to take more than one form and can then look that form up later to verify that it contains the proper indicia. Another example type of audit, believed made effective by the signatures having been posted, is posting and display of randomly selected ballots. One example way to select such ballots is before an election using whatever physical randomization or lottery-style random draw techniques. This has the advantage of detecting bad setups before an election would have to be re-run. Another example way to select forms is to allow voters to choose their own forms from a batch of forms and then use all the remaining forms in audit, which has the advantage of making good use of extra form capacity.

In a preferred example embodiment, the signatures are committed to in advance by posting each and the signatures are grouped into lexicographically ordered sets for each part of the form and each contest within the write-in pat of the form. Posting encrypted signatures, preferably using the known types of encryption that ensure exactly one decryption, is believed to impede some cheating scenarios. Optionally, the commits for the lower-layer signatures are opened only once the write-in regions that have been filled are committed to, such as by being posted, again believed to impede some cheating scenarios. In some examples, encryptions of information about the signatures are used to tie two parts of the same form together. For example, a receipt page and a part that bears the encrypted votes can be linked by each having a signature with a commit to the pair of signatures published. The association is thus hidden from those who merely see the forms, but can be determined and even revealed using the decryption keys. In other examples, encryptions of information about the signatures commit to which position is the write-in corresponding to each region, and thus allow a physical write-in region that includes its signature to be sufficient to determine whether a name written on it should be counted.

Turning now to FIG. 67, an example flowchart in accordance with the teachings of the present invention will be described to illustrate the process steps as will be appreciated for one exemplary embodiment, the differences in steps for the other exemplary embodiments being believed substantially clear from the rest of this specification. Box 90501 begins with manufacture of the ballot articles with suitable microstructure regions. In one example, this can be ordinary paper, preferably with a printed boundary indicating the microstructure region, other examples already having been described more generally. Then box 90502 is the manufacture of the interfoil objects along with the posting, such as on the Internet or in a recording medium, of the corresponding identifying signatures. This establishes a "universal set" of all valid interfoils; further marking these partitions them, such as into batches per precinct, so that for instance supplies compromised for a precinct can be left out as mentioned.

Box 90503 is the top of the loop for the steps by each voter, although some voters may "bolt" and not finish all steps. More than one voter, naturally, may be performing these operations at the same time. Box 90504 includes the standard signing in of voters by marking a poll book, such as a manual paper poll book. It also includes the voter preferably being able to choose the ballot form from a collection of substantially identical ballot forms, preferably in a way that which form which voter gets is not known to those operating the polling station. Also, the voter preferably chooses the interfoil in like manner. Where an affidavit is used, for provisional voting, not shown for clarity, it would be provided and filled at this point. Then as shown by box 90505 the voter fills the ballot in the booth, as usual. Next the voter as called for in box 90506 combines the interfoil with the ballot part and receipt/affidavit part by affixing them together and then separates the ballot and receipt parts from the new combined part. In some examples, the voter in the booth accomplishes this without assistance; in other examples, apparatus automates this step in the booth or outside of the booth. Finally, the voter completes voting as shown in box 90507 by placing the ballot and interfoil configuration separately in one or in two ballot boxes.

After they are voted, at the close of polls or optionally periodically, the receipt or affidavit microstructure part is scanned in step 90509. Optionally, this step is accomplished during manufacture of the receipts and/or affidavits, as indicated by the dotted line, and allows step 90509 to be conducted preferably even at the opening of polls. Step 90509 is the facility for voters to check that the signatures that they have received on the receipt or affidavit is one of those listed. It will be appreciated that some posted signatures will not ever be matched by voters, at least because they were not issued; however, this is believed not to pose an issue to the integrity of the system.

Step 90510 represents two successive scans of the interfoil sets, each scan preceded by a tumbling of the interfoils. In the example shown, first the interfoil signatures are read and then in the second scan the ballot part signatures are read. As mentioned elsewhere, it is believed advantageous that the scanning can post the outcome as it is scanned and that the physical apparatus can be observed as only having access to the part of the interfoil that it is supposed to for the particular scan underway.

Box 90511 is the creation of the challenge choice, preferably by a mutually trusted random process once the signatures are committed to. In some examples this can, as mentioned, include a lottery draw type of public random number selection with an agreed method to expand the random number into a sufficiently large string of bits if needed. Examples of such expansion functions are the so-called cryptographic "pseudo-random sequence generators," about which a substantial there is substantial scientific literature, combined with a complete ordering of the interfoil signatures, such as a lexicographic ordering. As an illustrative variation, the interfoil sets are after being tumbled physically divided by bulk handling into two batches, one for each bit value.

Box 90512 then shows the final tumble and severing of the parts from the interfoil that are dictated by the challenge choice. In particular, in a preferred example, the scanning apparatus is loaded with the choice information per receipt or affidavit number or signature. Then, when an interfoil set is scanned, that number is looked up and if the corresponding bit is set, that signature is physically severed from the interfoil and destroyed. If the bit is reset, then the ballot signature part is severed and destroyed.

Finally, Box 90513 shows the opening for physical inspection in audit of the physical parts of the interfoils that remain after the previous step and/or the auditing of the information posted.

Turning to FIG. 68, a plan and schematic view of an exemplary embodiment of a ballot with write-in in accordance with the teachings of the present invention will now be described in detail sufficient for those of skill in the relevant art. Three primary "pages" are shown on a form preferably on a single piece of paper, though separate pieces and secure binding between them is an option. The top page looks like a traditional optical scan ballot, but the candidate names are in a permuted order for this particular form instance, which happens to have serial number 6-453-493-Z. The instructions with the "write-in" oval ballot position indicate that, in order to cast a write-in vote, the voter should fill the so-labeled oval and write the name on the inner page. The inner page in turn instructs the voter to print the name in the rectangle provided. It also warns the voter not to have any part of the form physically placed below the page while writing the name on it, which is to prevent copies of the names from being made on other sheets.

Figure 68A:
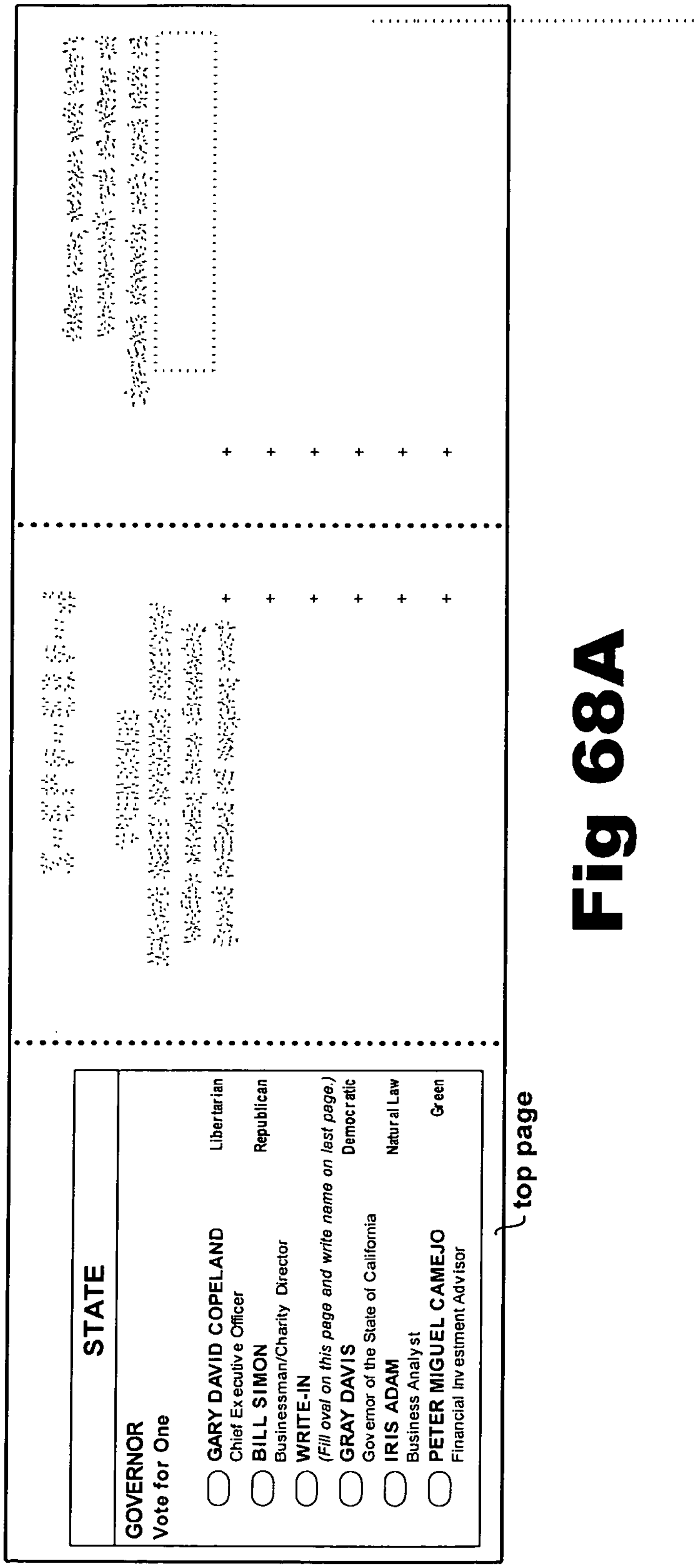
Figure 68B:
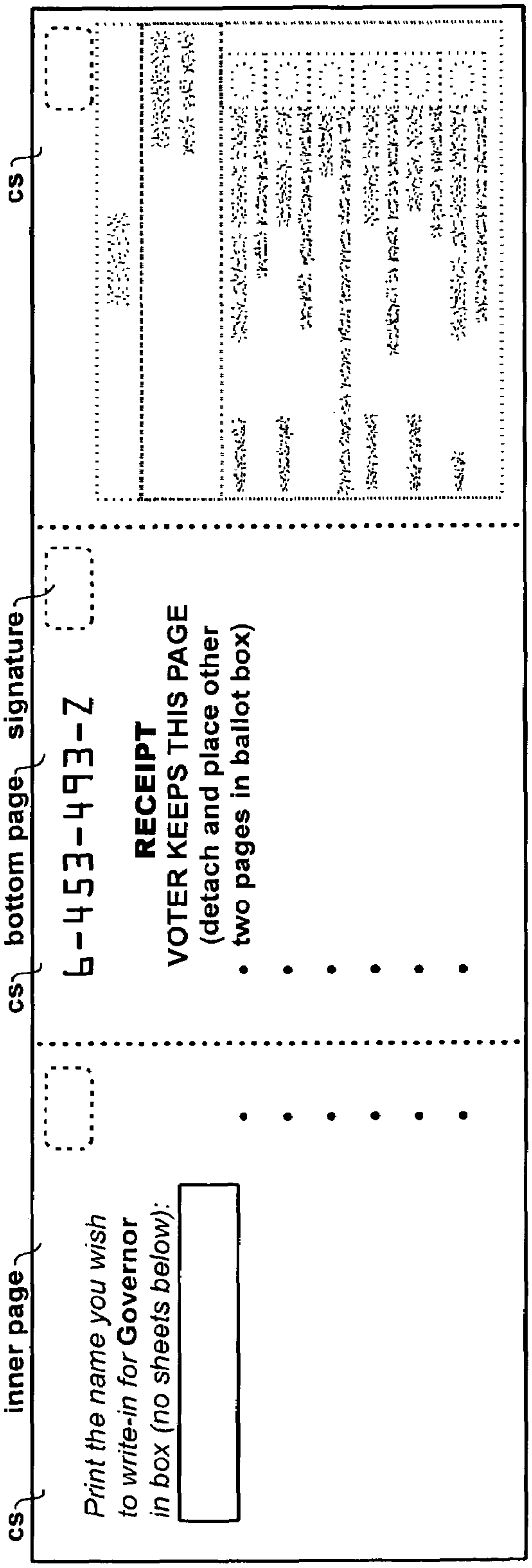
Figure 68C:
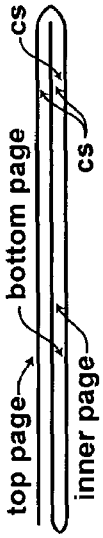

A single sheet of paper is shown with all three pages, three up, side-by-side, with perforation lines dividing the pages for ease in separation by the voter. The printing is on both sides; the backside of pages with printing is shown for clarity, as will be appreciated, grayed out as a dot pattern. The side shown facing up in FIG. 68A is uncoated; the opposite side, that shown facing up in FIG. 68B, is preferably coated with a well-known carbonless copy coating known as "cs" or "self-contained." With such coatings, writing pressure makes visible marks by rupturing microcapsules containing die precursors that are developed by other chemicals in the same coating layer(s). With the "G" as opposed to "Z" folding pattern, as shown in FIG. 68C, the inner page and bottom page are facing each other and below the top page. Thus, filling an oval on the top page using sufficient pressure applied to a writing instrument, for instance, should cause visible marks over one of the dots on the inner page and over a corresponding dot on the bottom page. It is believed that if the writing pressure is sufficient for a mark on the inner page to be developed, it is also sufficient for substantially as dark a mark to be developed on the bottom page, since no paper separates the two facing cs coatings. Also, as will be appreciated, the marks made on the top page also transfer to the underside of the top page, mirrored, because of the cs coating. This allows the backside of the top page to reveal the encrypted votes but not the plaintext votes.

Microstructure signature regions are shown on each of the three pages, all on the same side for convenience. Encodings of the microstructure for each are, as mentioned, posted before the election, each in a separate set: one set for all the front pages, one set for all the inner pages, and one set for all the bottom pages. If there were more contests with write-in positions, there would be corresponding write-in regions, and preferably each would have a signature and be posted in a corresponding set. Additionally, associated with each signature for a write-in region is an encryption of (or "commitment to") the ballot position that must be marked in order for that write-in to be counted.

A description of the operation of an exemplary embodiment will now be presented. First the forms are made and printed and the signatures are scanned. The signatures for a page are then preferably posted, preferably in lexicographic order (optionally encrypted as mentioned already). The signatures on the inner page are for convenience posted along with the corresponding serial numbers. A cryptographic commitment, preferably tied to the signature(s) on the inner page, is preferably posted as to which oval would need to be filled for the (corresponding) write-in to be counted. But preferably nobody knows which serial numbers the signatures, apart from those on the bottom page, correspond to. Another commit is preferably published locking-in but hiding to which serial number the signature on the backside of the top page corresponds. The encryption keys are maintained by at least one trusted entity.

Voters receive a form, say, at the polling place. In the booth, they then fill the oval corresponding to their vote using a preferably special pen or pencil. To vote write-in, they fill the third oval from the top in the example shown, the one that is labeled "write-in" where the candidate name would otherwise be; then they open the form up and write the name of the candidate they prefer in the box on the inner page. When finished filling the form, the voter separates the three pages along the perforation lines. The bottom page is kept by the voter as the receipt, as indicated by the text on it. The top page is placed in a ballot box, as is the inner page. The top page is optionally counted manually, as is well known, such as for a preliminary total, fallback, or double check. A digital capture of the vote, apart from write-ins, is accomplished by, for instance, scanning the top page or its mirrored image on its backside. Scanning the backside of the top page is preferable, as it gives the encrypted vote without exposing the cleartext vote. (Another option is to scan the image on the inner page and preferably use a separate signature to link it to a serial number as has been described for the backside of the top page.) Processing of encrypted votes, with the voter being in possession of the receipt containing the encrypted votes, is known in co-pending provisionals/applications by the present applicant hereby included in their entirety by reference.

The write-ins on the inner page are preferably scanned along with reading the adjacent signatures. The decryption related to the signature reveals the pre-determined write-in position. If this pre-determined position matches that of a unique transferred mark, then and only then is the write-in counted. An image of the write-in region is posted and the physical piece of paper, preferably cut away from any other write-in regions, is also made available for inspection. The decryption of votes, mentioned above, is believed to reveal the total number of write-in ovals properly filled for each contest. Only this number of write-in regions is believed strictly needed to be displayed/posted, in systems where all contests are voted or marked as un-voted. But, since guarantees of indelible marking on all ballots may not be adequate in some implementations, it is preferred that in such implementations all regions be displayed for verification.

An affidavit is currently required in some election settings, such as some provisional and absentee voting. A separate affidavit form bearing the receipt serial number is believed adequate. It is anticipated, however, that voters be allowed to retain copies of such affidavits, such as carbon/carbonless copies, optionally bearing some authenticator(s).

Turning now to FIG. 69, a detailed flow and block diagram related to an exemplary embodiment of a ballot with write-in in accordance with the teachings of the present invention will now be described in detail sufficient for those of skill in the relevant art. Structure related to this embodiment is to be described with reference to FIG. 68, and this should be read in conjunction as will be appreciated. Box 90701 is the production of the ballot forms. One aspect of this is the physical production of the paper, perforations, and folding. Another is the scanning of the signatures. A further aspect is the printing of the receipt numbers. The printing of the encrypted contest descriptions is preferably possible at a later time, such as with so-called demand printing.

Box 90702 includes the posting of the signatures. As already mentioned, these are posted in batches. There is a separate batch for each the top page and the bottom page. There is also one batch for each write-in region, of which only one is shown in the example for clarity. Another posting included is the cryptographic commitment to the write-in position valid for each write in region. A further posting, already mentioned, is the commit to the pairing of the ballot numbers and the top page signatures.

Box 90703 is the top of the loop for the voter process example for clarity in a polling place and provides the steps for a voter experience, many of which may occur in potentially overlapping times during the voting period. Box 90704 is the marking of the poll book and the issuing to the voter of the ballot and, in the case of provisional (or vote-anywhere) voting, an affidavit. Box 90705 then shows the voter marking the ballot for contests that either do not have write-in or for which the voter does not vote write-in. Box 90706 is the voter filling any write-in names on the inner page, after having marked the corresponding write-in position on the top page in box 90705. Preferably before leaving the booth, the voter separates the pages along the perforation, as indicated in box 90707. Finally, box 90708 shows the voter keeping the receipt and the placing of the other two pages into separate ballot boxes or a combined box. It is anticipated, however not shown for clarity, that the voter optionally displays the encrypted vote backside of the top page to a poll worker or to a digital camera device for instance, in order to provide a check that it was filled properly and/or to record the encrypted vote.

Returning to the central processing in box 90709, first the scanning of the encrypted votes is shown, although this optionally is a residue from the camera of box 90708. Also the signature related to the page from which the encrypted votes are scanned is preferably read at this time. Then, also shown, is the posting of the encrypted votes along with the receipt numbers. In the example, this number is determined by decryption of the commit to the pairings of signatures and numbers mentioned. Box 90710 shows voters then being able to check, preferably online, that the encrypted votes on the voter receipts do in fact match those posted under the matching receipt number.

Box 90711 shows the process of public decryption of the encrypted votes, as is known. Box 90712 is the creation and posting of the unpredictable challenge choice used in the audit of the encrypted votes. And box 90713 is the scanning of write-in regions and the marks copied on the regions from the ballot marking. Also, included is the capture of the corresponding signatures. The write-in regions are preferably physically separated and independently re-ordered, so as to reveal less information. Also, it is determined which write-in regions are to be counted. The actual OCR and/or human recognition of the names to be counted is optionally preferably done at this time, so that what is posted does not include handwriting or other additional information.

Box 90714, finally, is the publishing and displaying of the various keys and signatures for audit. Included among the keys are those used in known manner for the decryption of the encrypted votes. Also revealed are the keys establishing the correspondence between the receipt numbers and the backside of the top page. Included among the parts to display are preferably all the write-in regions and their attached signatures. It is anticipated that in case of dispute over the published image of particular receipts, the backside of the top page would be shown along with its signature.

Figure 70A:
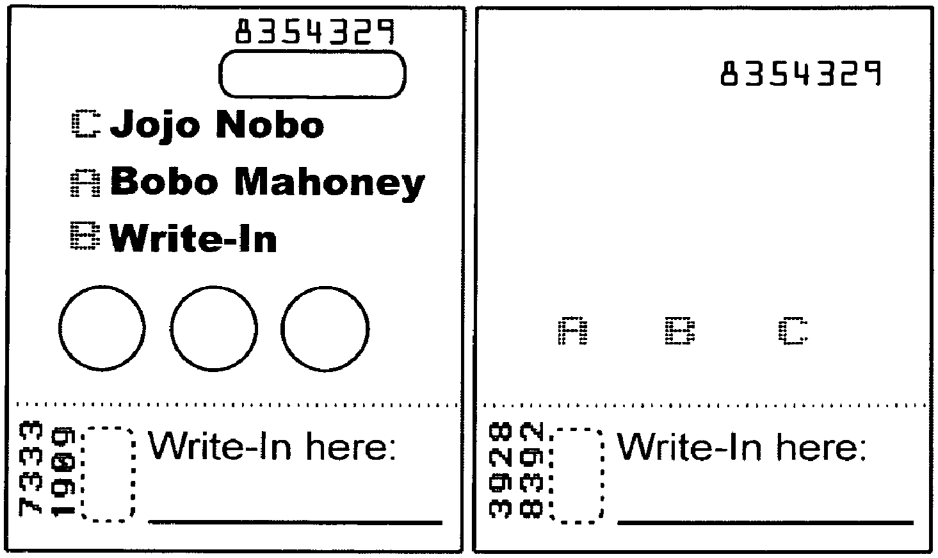
Figure 70B:
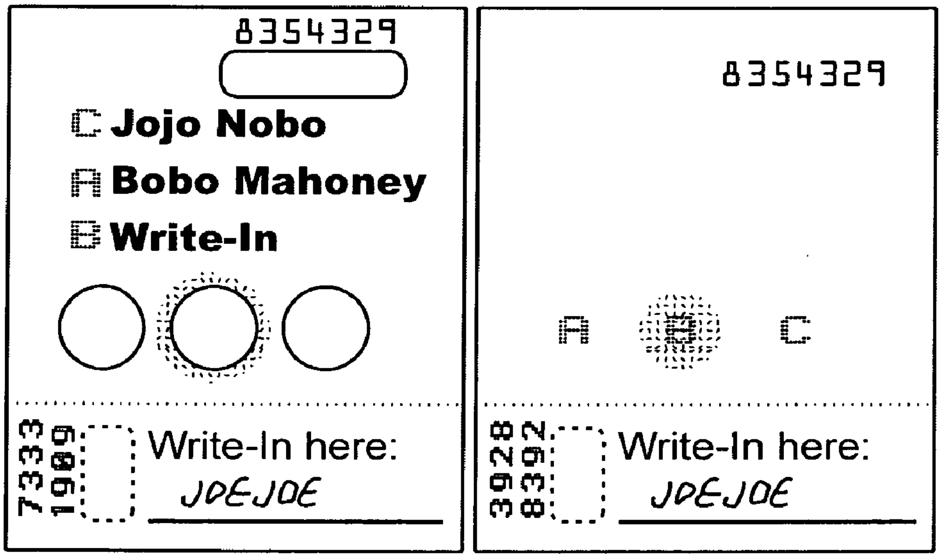
Figure 71A:
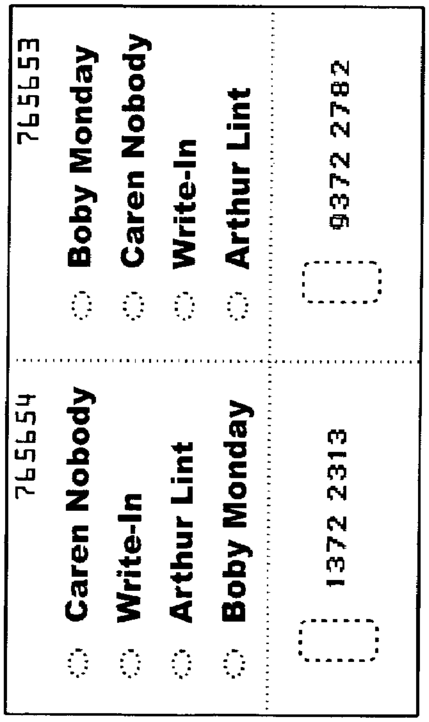
Figure 71B:
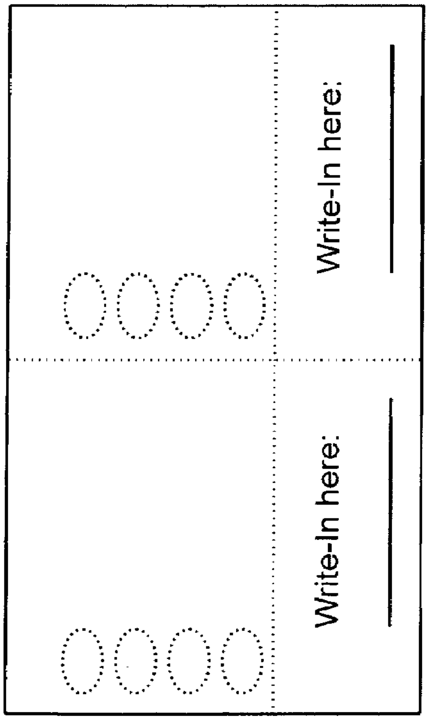
Figure 71C:
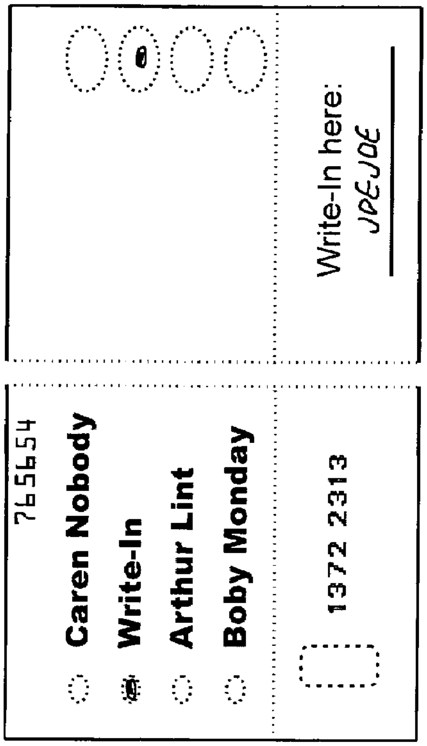
Figure 71D:
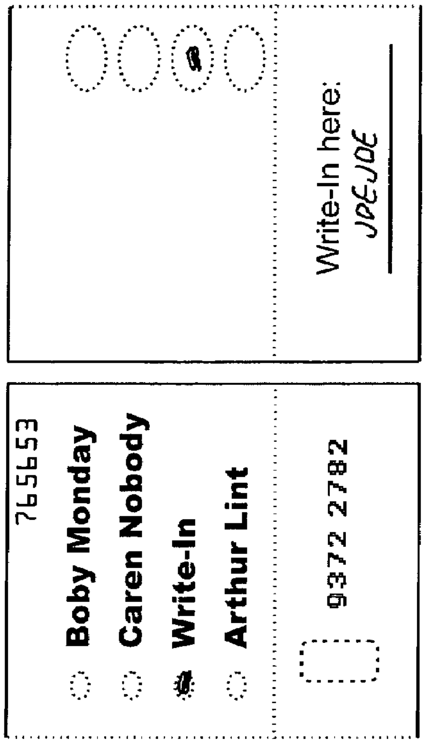

Turning now to FIG. 70, a detailed plan and schematic diagram of an exemplary punchscan ballot with write-in in accordance with the teachings of the present invention will now be described in detail sufficient for those of skill in the relevant art. Shown in FIG. 70A is a modified version of the un-voted ballots already described with reference to FIG. 41A-B. In particular a "write-in" option has replaced one of the candidate choices, as will be appreciate, and a microstructure signature region with associated apparently random identifying indicia has been added, all below a perforation line and on both layers. Accordingly, a corresponding example write-in voted version of each layer is shown in FIG. 70B, where the write-in position has been marked by the voter, much as explained with reference to FIG. 41C-D, but the name of the desired write-in candidate is then also written in by the voter on the line provided.

In operation, provision is preferably made during the initial commitment phase already described, such as that with reference to FIG. 50-51, for a second set of transformations that map to the original results table entries to the microstructure signatures identified by the write-in signature identifier numbers shown. (Thus, a kind mirrored copy of the middle transformation table and commits is formed around the line through the results table)During voting at a polling place, for example, the write-in part from the layer that would be destroyed is preferably separated and placed in a kind of ballot box; with mail-in or manual voting, the write-in is of course on the part mailed or placed in the box and optionally is not separated. When a results table entry shows a vote for a write-in (as shown by the marking of the middle position, "B" in the present figure), the second set of transformations is used to show that it does map to one of the posted set of write-in signature identifier numbers that has been written in (without revealing which one). The corresponding commits are preferably opened for checking during audit of the writ-in counterfoils. So that voters can check that the microstructure signature on the write-in part/counterfoil of their receipt does match that committed to, all the commits for microstructure of the receipt parts are also opened.

In some examples, not shown for clarity, a limited number of write-in lines are available to the voter and the voter is to identify both the contest and the desired candidate on whatever write-in line the voter chooses. Rows in the intermediate table of the transformation in this case preferably would appear to allow each result entry to map to the corresponding write-in (respecting any partitioning of results entries as mentioned elsewhere). In other examples, such as with asymmetric ballot forms, like those to be described with reference to FIG. 71, it is believed that the transformation is preferably not used.

Thus, it is believed that those running the election have established substantial confidence that the pieces of paper, identified by posted microstructure and in their possession, were in fact parts of the ballots for which voters voted write-in. As will be appreciated, if a voter writes a name but actually votes for another candidate, then the corresponding counterfoil can be discarded by those running the election. Improper influence can be further thwarted, for example, by separately treating write-in's that have a multiplicity below a threshold and/or only opening a fraction of the write-in's, chosen at random by audit, to inspection, optionally for those below threshold.

Finally now turning to FIG. 71, a detailed plan and block diagram of an exemplary ballot with write-in in accordance with the teachings of the present invention will now be described in detail sufficient for those of skill in the relevant art. The ballot form is substantially similar to that described with reference to FIG. 57, although only the first contest is shown and the write-in choice is included in it between the first and last candidate in alphabetical order, as with FIG. 70, for clarity. Additionally, it differs in that the write-in space and identified microstructure region are added, much as in FIG. 70, with the parts arranged over the four surfaces as shown. While 71A shows the un-voted top, 71B shows the un-voted bottom, both two up. Similarly, 71C is an example write-in voted front and back view of the left sheet from 71A-B, while 71D is an example write-in voted front and back view of the right sheet from 71A-B. As will be appreciated, the writing in is to be done by voters on the sheet that is turned in, and thus is done on the back side of it. This optional feature is believed convenient as the voter is less tempted to leave a carbon image of the write-in on the receipt, and with some carbonless techniques described earlier may not be able to create such an image. The receipt sheet and online images after voting are not shown, as they are substantially as in FIG. 57.

In operation, the system is much as already described with reference to FIG. 70. Voters, however, always return the top sheet they mark and any write-in's are on its reverse side. Separate ballot boxes or the like are appropriate for these, and scanning of the write-in parts is preferably done after they are batched or disassociated with provisional or mail in affidavit identifiers for improved secrecy.

An optional variation, as would be appreciated by those of skill in the art, and not shown here for clarity, omits contest on the ballot form and uses it simply for including in other voting systems the capability to handle write-in votes. For example, with a so-called DRE system in which a receipt is issued, write-in can be accomplished using the techniques disclosed here. The receipt has a serial number and one or more counterfoils for write-in as disclosed here. Extra foils would preferably be provided to allow voters to audit the microstructure signatures.

Another example use of the present techniques relates to so-called "spoiling" of ballots. When a voter wishes a particular ballot that has not been cast, to never be cast, the ballot is preferably prevented from being tallied and this process is referred to as spoiling. It is believed that a spoiling procedure should preferably not be possible for poll-workers to carry out on a ballot previously thought to have been cast by a voter. It is also believed that a spoiling procedure should not be able to be un-done or revoked without the voter being able to detect it and give evidence to the contrary. Accordingly, as an example in the system described with reference to FIG. 41-43, both the voter and the poll-workers should each obtain a part of each part of the ballot form. Two copies of the serial number are preferably included on each layer for this purpose (which offers some robustness in case of slight damage to a form). The voter gets a serial number from each layer and the poll-workers keep a serial number from each layer. The rest of the ballot is preferably shredded. Similar perpendicular partitioning is applicable to other two-part ballots. With one-part ballots, the ballot itself can be split with each part preferably bearing a serial number. Microstructure signatures help authenticate the parts of a ballot, and are preferably included at least on each piece of paper kept as a record/receipt of spoiling.

All manner of variations, modifications, equivalents, substitutions, simplifications, extensions, and so forth can readily be conceived relative to the present inventions by those of ordinary skill in the art. Many examples have already been given above with reference to various aspects of the inventive concepts disclosed.

What values are committed to, when, how, and how they are opened completely or partly to establish relationships are subject to innumerable variations, as is know in the cryptographic art. The two halves committed could be viewed on screen, and only the chosen one printed. The actual vote in clear could be printed on a third portion of the form and retained by the polling place for possible backup, recount and/or counting as part of certification. Instead of printing a digital signature on the form, it could be printed on a sticker that could then be affixed automatically (the serial numbers could be aligned barcodes and there could be secret numbers that also match). A poll-worker could use a barcode scanner to read the code from the ballot part to be kept, and this reader's output used to determine which halves to post and/or which ballots were not split before the voter left. Part of the ballot form may be retained by the precinct and another part shredded, thereby allowing manual checking that all were split and to discovers which ones if any were not split, but without letting poll-workers see the confidential data. The coin-flipping device can be tamper-resistant and be designed to first learn the ballot number (such as by barcode), and only then perform the flip, and after that issue a digitally authenticated message that can be used to determine what half to sign or post. The shared data using can be reduced by using the image under a cryptographic hash function or the like; this is believed to reduce the protection of integrity from the information theoretic potential to the merely computational.

While these descriptions of the present invention have been given as examples, it will be appreciated by those of ordinary skill in the art that various modifications, alternate configurations and equivalents may be employed without departing from the spirit and scope of the present invention.

While these descriptions of the present invention have been given as examples, it will be appreciated by those of ordinary skill in the art that various modifications, alternate configurations and equivalents may be employed without departing from the spirit and scope of the present invention.

What is claimed is:

1. In a paper ballot system, a ballot printed independently from a voter supplied vote information and the ballot comprised of at least two parts and the voter being able to choose at least any one of the at least two parts to retain as an encrypted vote receipt, wherein the ballot includes providing a voter with an indication of which position to mark corresponding to a voter choice by allowing a voter to substantially match indicia labeling choices on at least a first of said parts with indicia on at least a second of said parts and further wherein said indicia on at least one part is substantially visible through at least one provision in at least a second part and the second part substantially above the first part when in use by voters and the combination of the two layers cooperating so that a voter can mark the second part and substantially at the same time the voter can mark the first part through the provision in the second part.

2. The system of claim 1, wherein the ballot includes determining which mark positions correspond to which vote information in production of substantially each of said ballots based on a choice that is substantially unpredictable to the public in advance of the election and that is committed to in advance of the election.

3. The system of claim 2, wherein indicia on said ballot parts retained by a voter relate to commitments to values formed before the election that can be opened for inspection.

4. The system of claim 3, wherein the ballot system includes marks made by voters, the marks corresponding to coded votes that can be made public.

5. The system of claim 4, wherein a tally is established that corresponds to published coded votes by disclosure of information substantially committed to but not publicly known before the voting.

6. The system of claim 5, wherein at a polling location either one of the at least two said parts is configured to be freely selectable by a voter as the part to be destroyed and the other of said two parts is adapted to be retained by said voter as a receipt and information on the receipt is recorded at the polling location.

7. The system of claim 5, wherein the ballot allows a voter to be free to select either one of the at least two parts to provide to those running the election and to keep the other part as said receipt.

8. In a paper ballot system, including providing a voter with the option to retain either of at least two ballot parts, each one of the at least two ballot parts substantially comprising a ballot layer to receive cleartext votes and a receipt layer to receive encrypted votes, wherein the ballot layer includes mark positions determined based on a choice substantially unpredictable to the public and the choice committed to in advance of the election, wherein the commitment substantially defining indicia on said receipt layer is adapted to be opened to be made public, and wherein a tally is established that corresponds to the published coded votes by disclosure of information substantially committed to but not publicly known before the voting.

9. The system of claim 8, further comprising a least a first coating on at least a surface of at least one sheet of paper to transfer marks from a ballot layer to a receipt layer.

10. The system of claim 9, further comprising cooperating coatings on each of two facing surfaces of the ballot layer and receipt layer, the combination to be marked by a voter, and scanning at least a first of the facing copy surfaces to recover the marks and ensure that substantially the second of the facing copy surfaces bears substantially matching marks.

11. The system of claim 10, wherein the ballot is configured for scanning both the surface marked by the voter and the other surface of the same sheet of paper to ensure that the receipt should match the marks on the form.

12. The system of claim 10, wherein chemistry included in said coatings reveals that marks transferred between two layers are substantially distinguishable from marks made having only one layer.

13. In a voting method with a cleartext vote choice determined by indicia printed at least in advance of the voter supplying votes and that indicia substantially destroyed by voters in order for voters to reveal coded votes corresponding to the voter choice, voters being supplied substantially more than one part per choice and an opening of previously committed values caused by the substantial destroying step substantiating that at least some of the parts supplied have corresponding indicia.

14. The method of claim 13, further comprising receiving the coded votes transmitted by the voter and making those votes public.

15. The method of claim 14, further comprising establishing that a published tally corresponds to the published coded votes by disclosure of information substantially committed to but not publicly known before the voting.

16. In a paper ballot system, plural ballots each comprising at least a first part to be provided to voters for retention and the first part adapted to receive coded votes and the coded votes not substantially revealing cleartext votes when so provided to voters; each ballot comprising a second part and the second part to be prevented from being retained by voters; the first and the second part each including indicia, at least the relationship between the indicia of the first and the second part being determined based on a choice substantially unpredictable to the public and the choice committed to in advance of the election and the choice sufficient to determine the corresponding vote when combined with the coded vote; and the first part bearing coded votes adapted to be opened and published; wherein a tally is established as corresponding to the published coded votes by disclosure of information substantially committed to but not publicly known before the voting.

17. The system of claim 16, wherein the first part is marked during voting at positions corresponding to vote options identified by indicia in positions on the second part that are adjacent to the positions marked on the first part.

18. The system of claim 16, wherein the first part is marked during voting at positions corresponding to indicia on the second part and substantially matching indicia also appearing on the first part labeling vote options identified on the first part.

19. The system of claim 16, wherein the first part is marked during voting at positions corresponding to indicia on the first part and substantially matching indicia also appearing on the second part labeling vote options identified on the second part.

20. The system of claim 16, wherein the first and second parts are adapted to overlay one on top of the other and the cleartext vote is visible in the combination when the two parts are so overlaid.

21. The system of claim 16, wherein the second part comprises regions of a substrate and the first part comprises at least one layer adapted to be affixed to the regions of the substrate during voting and the at least one layer substantially obscuring indicia on the regions of the substrate.

22. The system of claim 16, wherein the first part comprises a substrate and the second part comprises at least one layer affixed to the substrate and the second part bearing at least indicia substantially separated from the substrate during voting.

23. The system of claim 22, wherein receipt information is contained in the pattern of areas of the second part that are separated.

* * * * *